US005543970A

United States Patent [19]
Hata et al.

[11] Patent Number: 5,543,970
[45] Date of Patent: Aug. 6, 1996

[54] ZOOM LENS SYSTEM

[75] Inventors: Kazuyoshi Hata, Osaka; Yukio Maekawa, Sakai; Katsuhiro Takamoto, Amagasaki; Manami Saka, Kyoto, all of Japan

[73] Assignee: Minolta Camera Kabushiki Kaisha, Osaka, Japan

[21] Appl. No.: 197,006

[22] Filed: Feb. 15, 1994

Related U.S. Application Data

[63] Continuation of Ser. No. 53,506, Apr. 27, 1993, abandoned, which is a continuation-in-part of Ser. No. 685,469, Apr. 10, 1991, abandoned.

[30] Foreign Application Priority Data

| Apr. 11, 1990 | [JP] | Japan | 2-95464 |
| May 21, 1990 | [JP] | Japan | 2-130494 |
| Jul. 26, 1990 | [JP] | Japan | 2-199927 |
| Aug. 7, 1990 | [JP] | Japan | 2-210012 |
| Mar. 8, 1991 | [JP] | Japan | 3-069120 |

[51] Int. Cl.⁶ ............................ G02B 15/14; G02B 13/18
[52] U.S. Cl. ......................... 359/690; 359/692; 359/708; 359/713; 359/714
[58] Field of Search ........................ 359/688, 687, 359/690, 683, 692, 708, 713, 714

[56] References Cited

U.S. PATENT DOCUMENTS

| 4,659,186 | 4/1987 | Sato et al. | 359/688 |
| 4,925,280 | 5/1990 | Hashimoto | 359/690 |
| 4,984,876 | 1/1991 | Hata | 359/690 |

*Primary Examiner*—Scott J. Sugarman
*Attorney, Agent, or Firm*—Price, Gess & Ubell

[57] ABSTRACT

A zoom lens system according to the present invention comprises, from the object side to the image side, a first lens unit with a positive refractive power including a negative high dispersion lens element and a positive lens element; a second lens unit with a negative refractive power consisting of two or three lens elements including a positive high dispersion lens element and a negative lens element, and having at least one aspherical surface; and a third lens unit with a positive refractive power consisting of five or less lens elements including a negative high dispersion lens element and one or two positive lens elements located on the object side of the negative high dispersion lens element, and having at least one aspherical surface. With the lens arrangement, a compact high-zoom-ratio zoom lens system having a high aberration correction performance is realized.

87 Claims, 87 Drawing Sheets

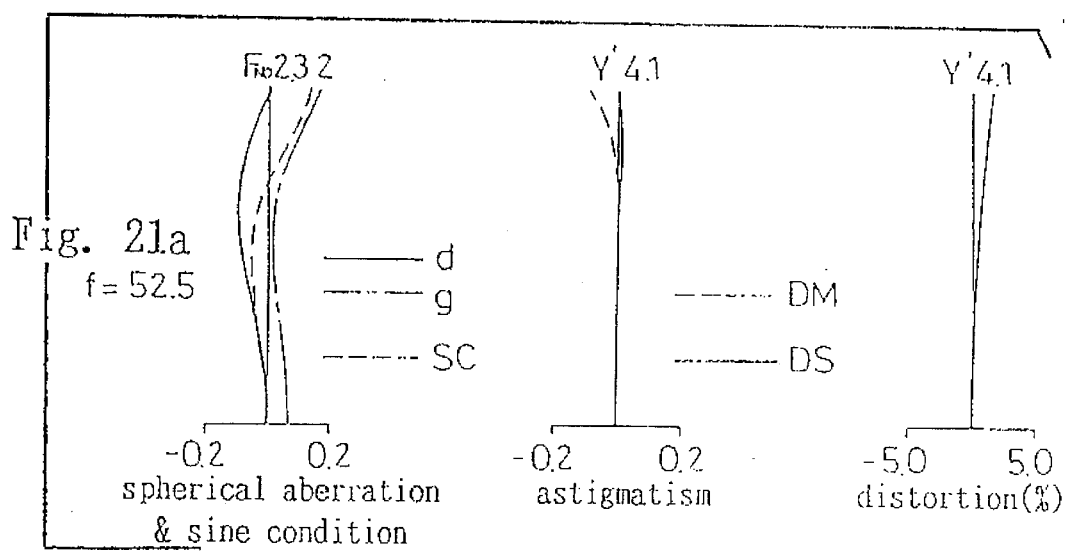
Fig. 21a  f=52.5
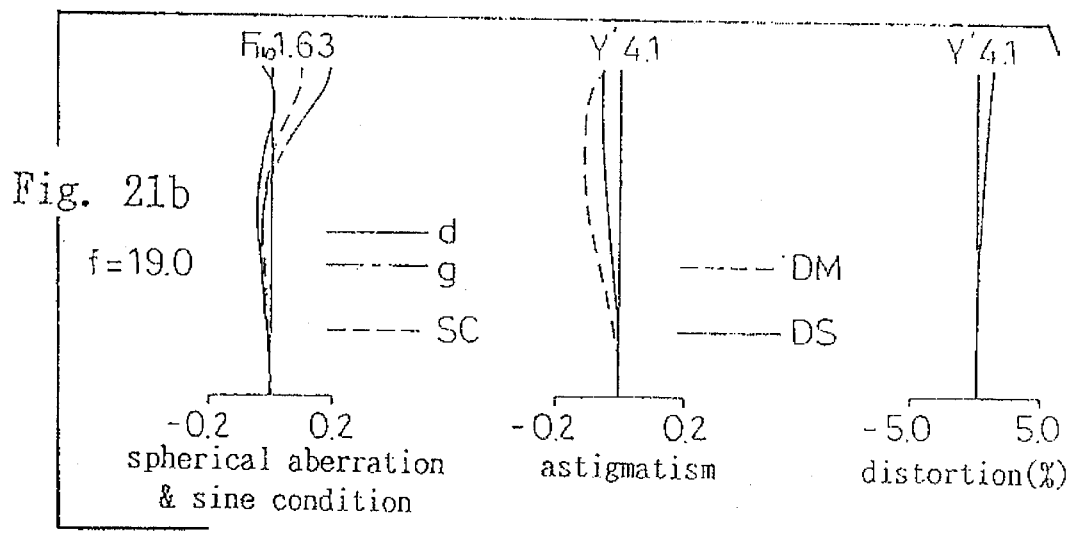
Fig. 21b  f=19.0
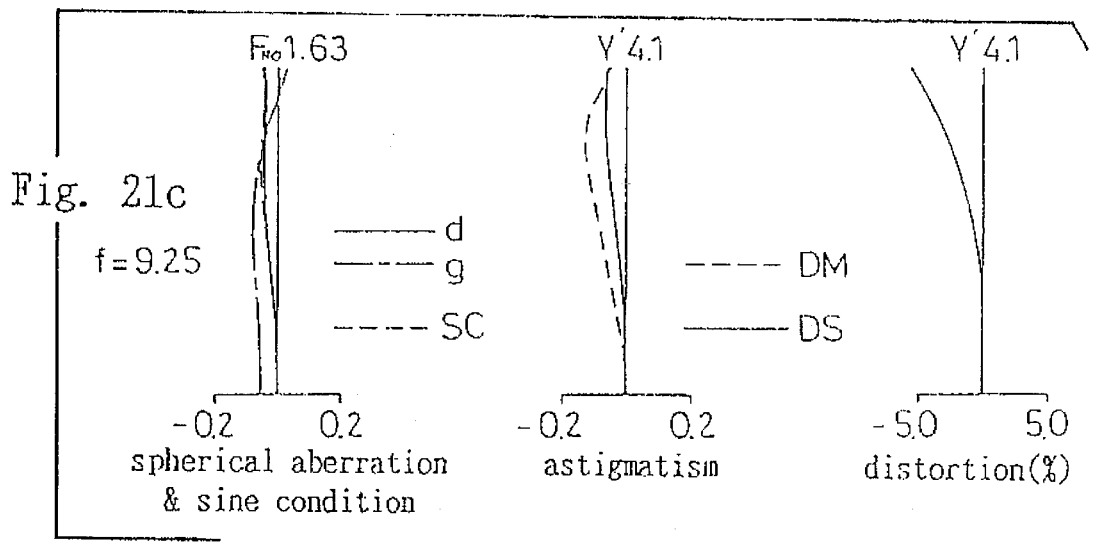
Fig. 21c  f=9.25

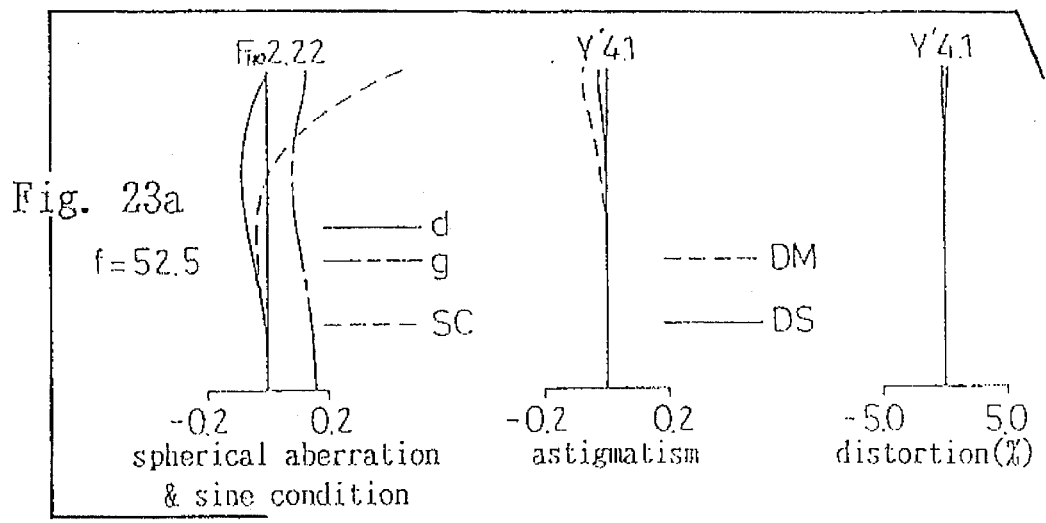
Fig. 23a  f=52.5
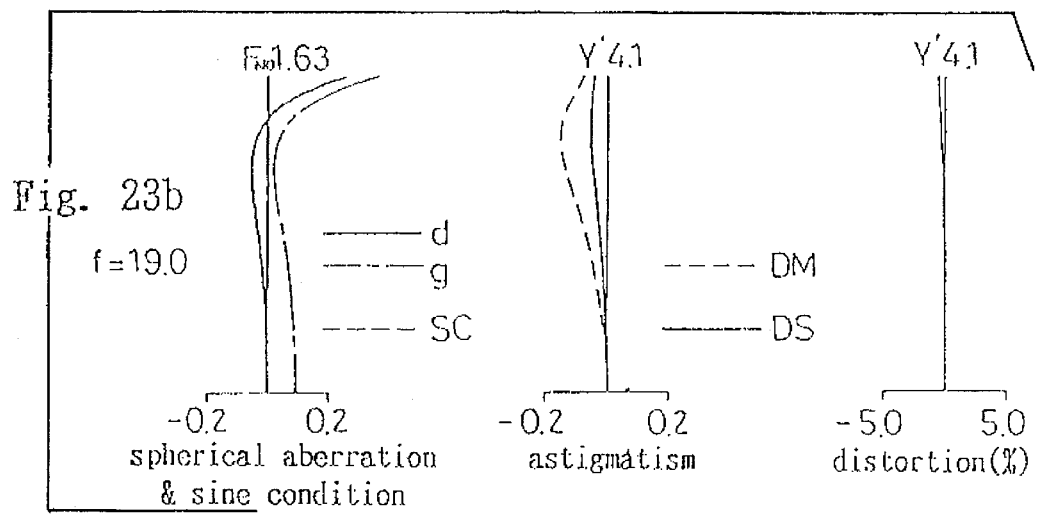
Fig. 23b  f=19.0
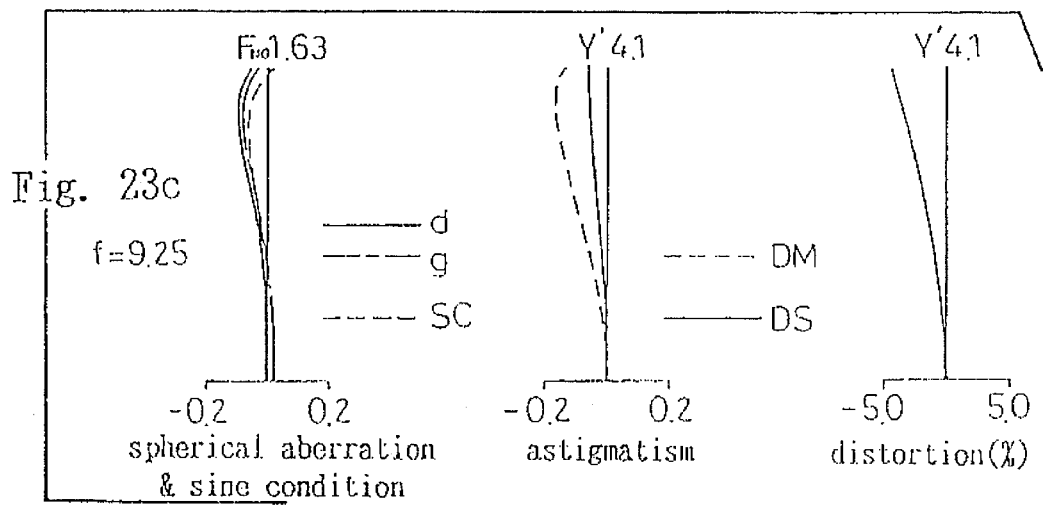
Fig. 23c  f=9.25

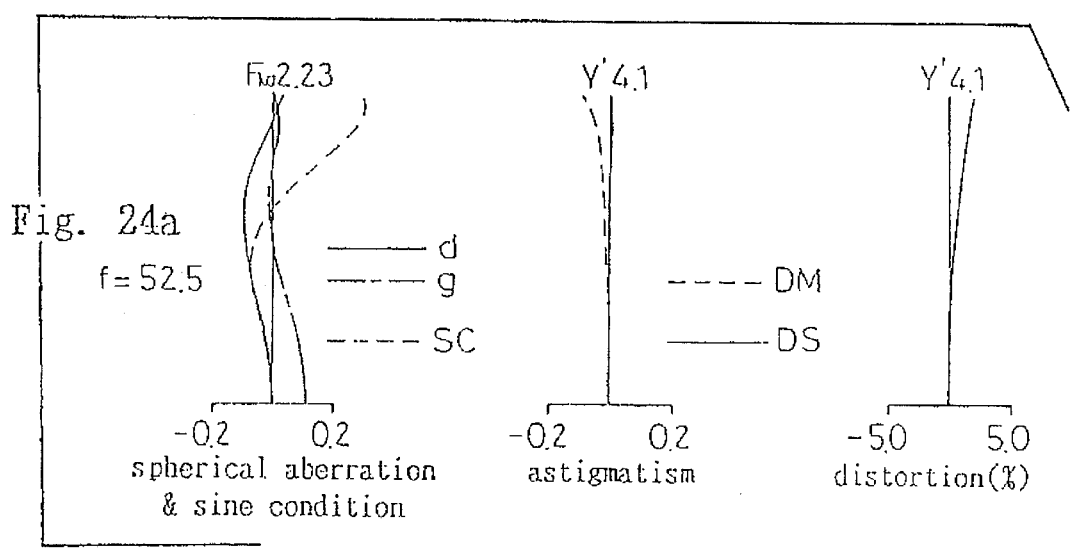
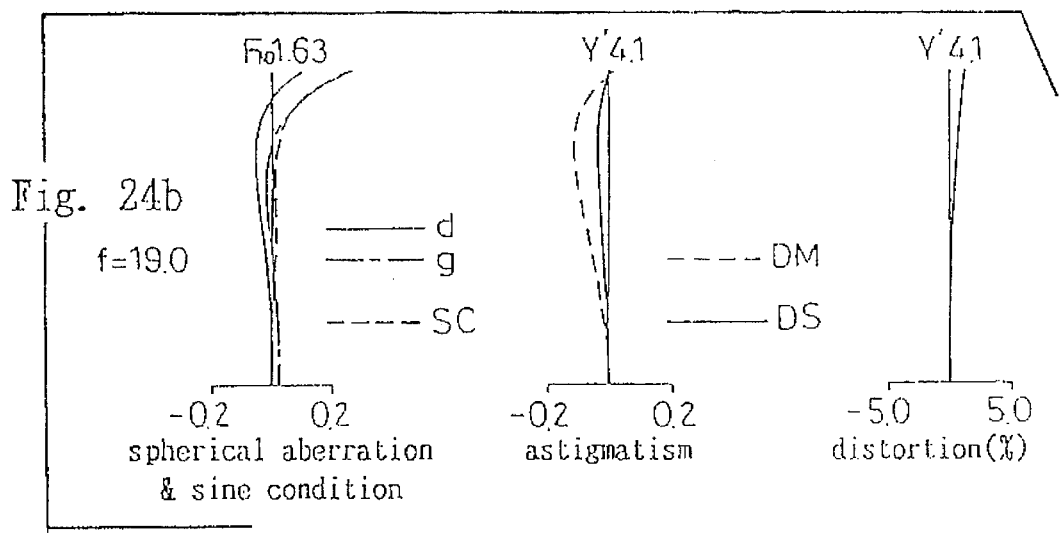
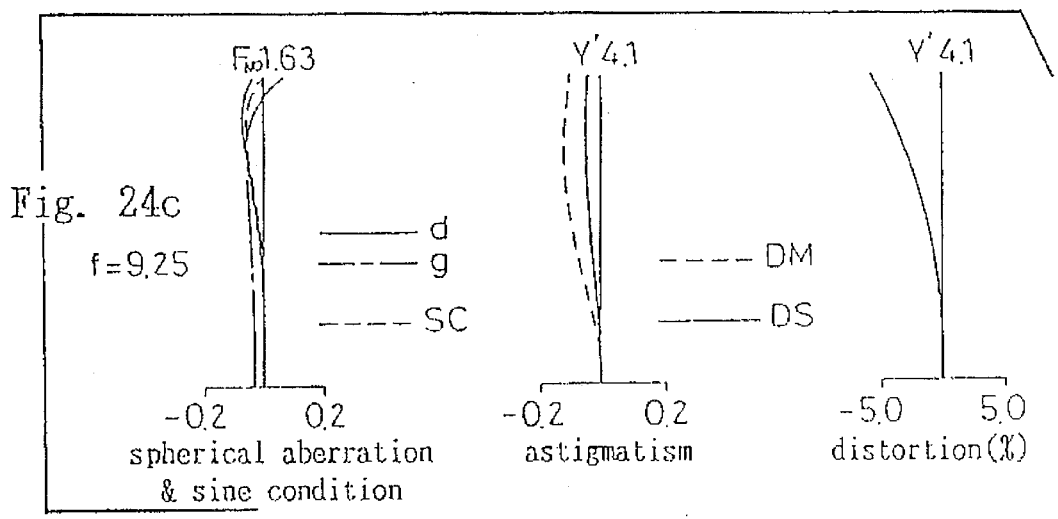

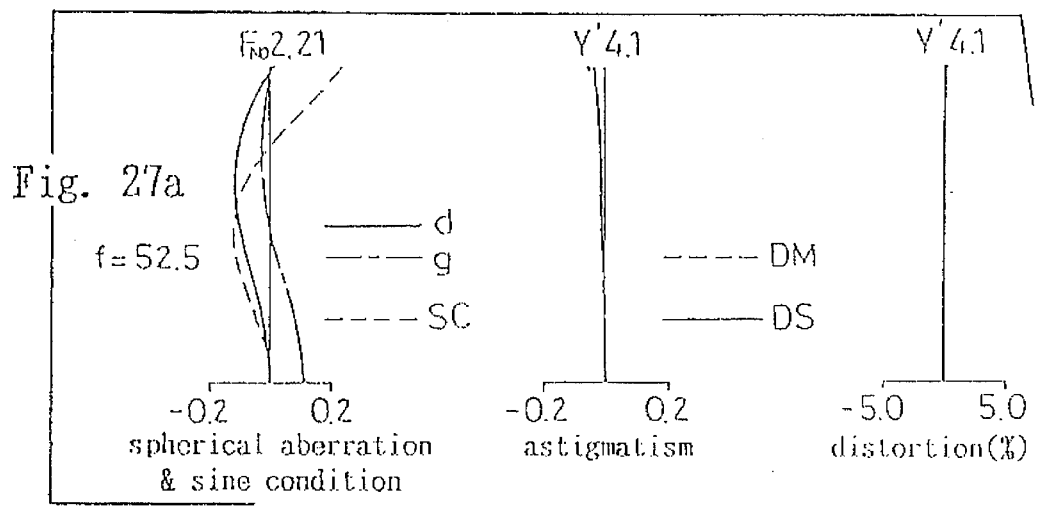
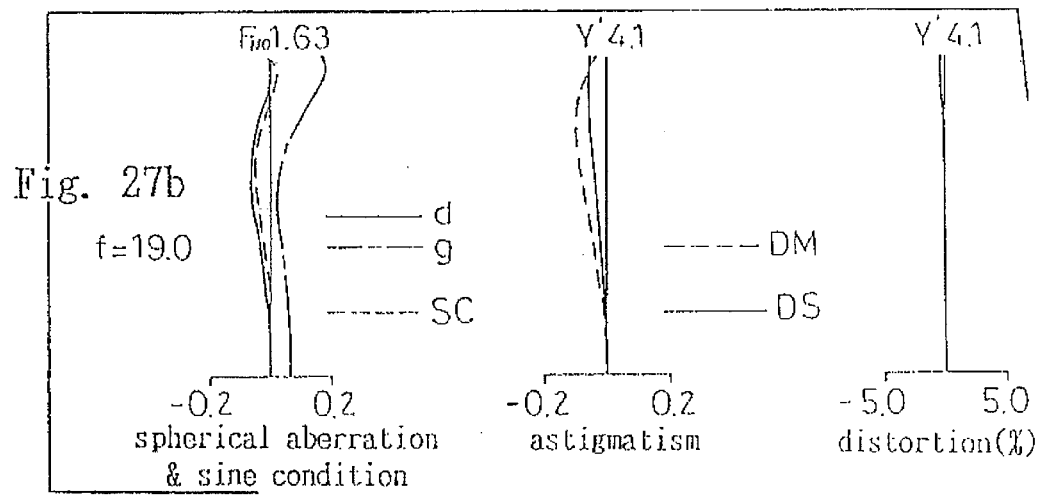
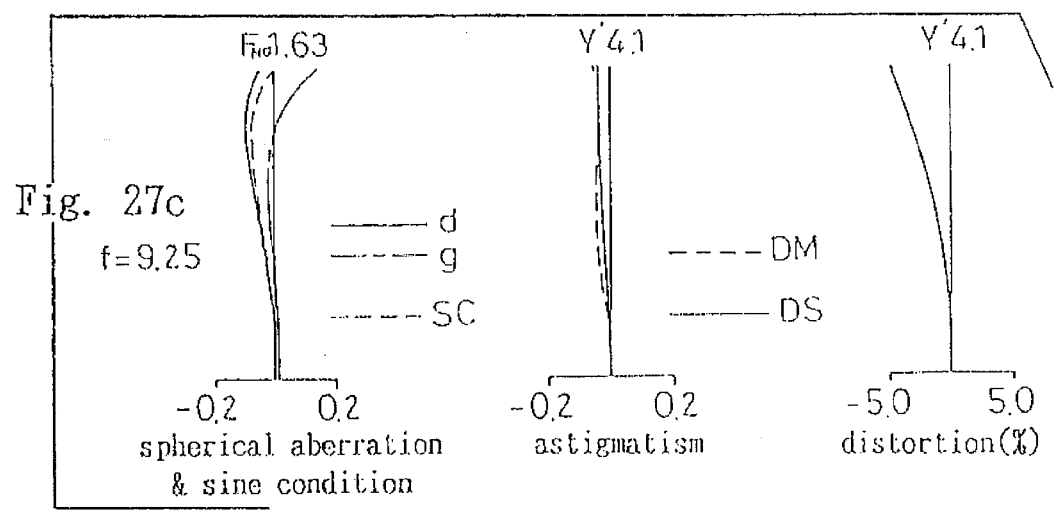

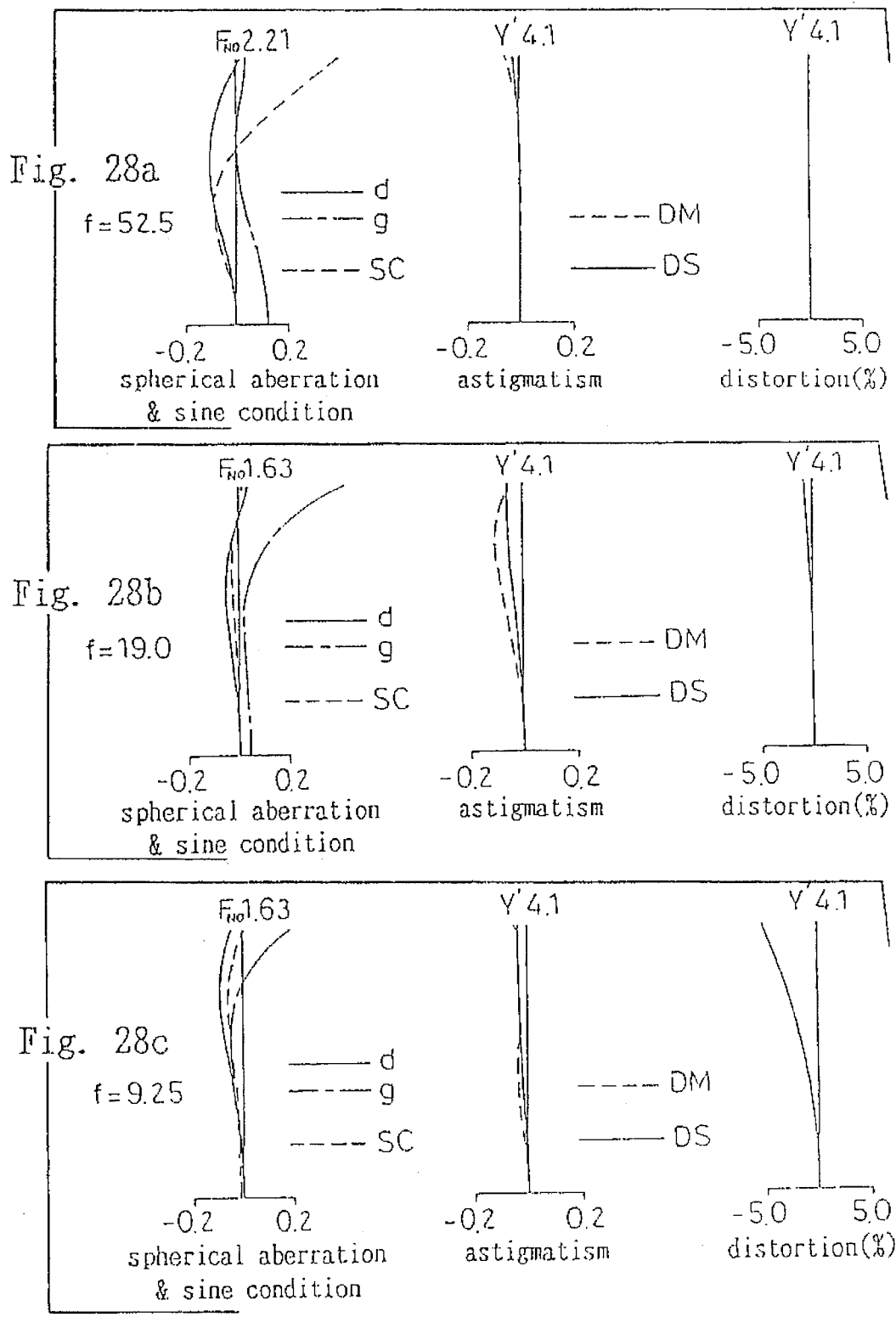

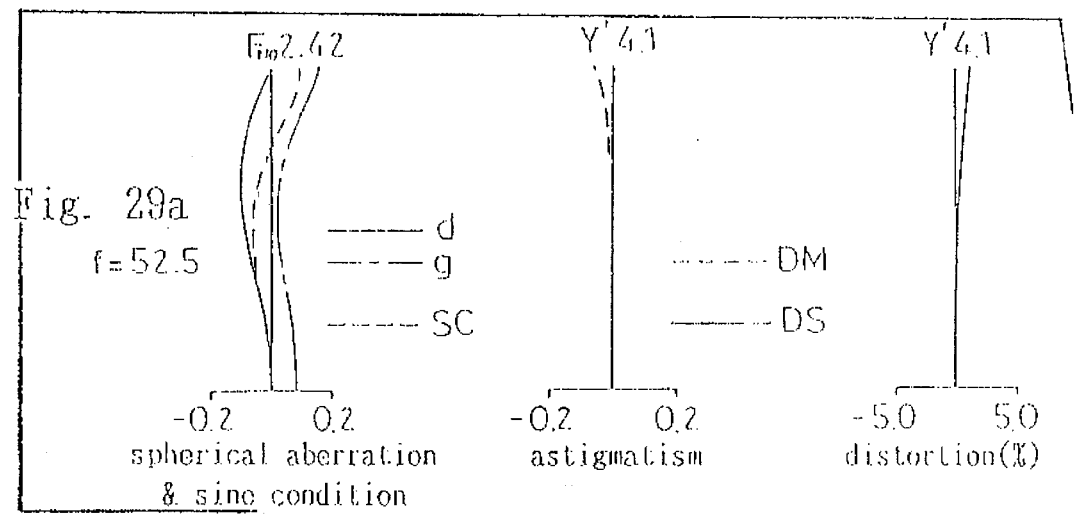
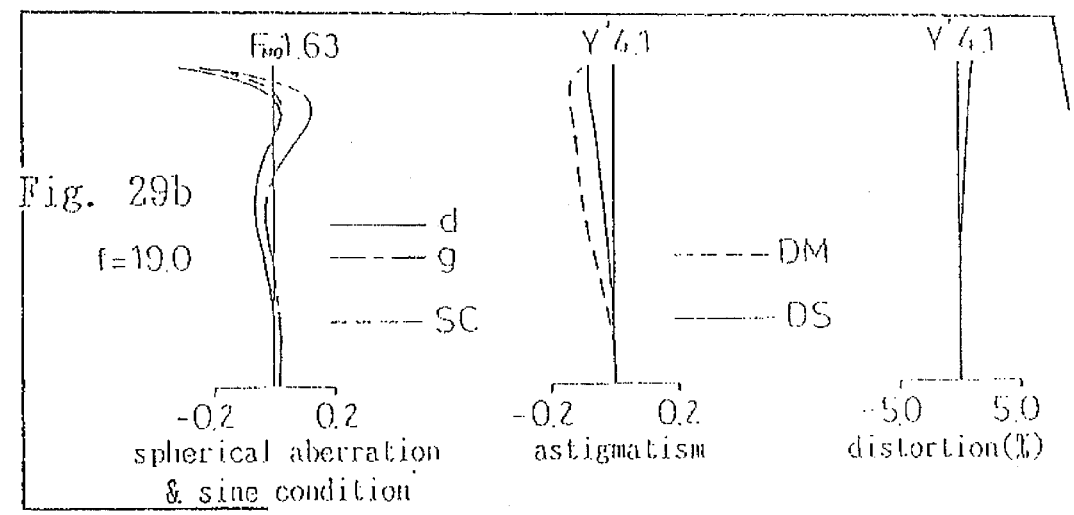
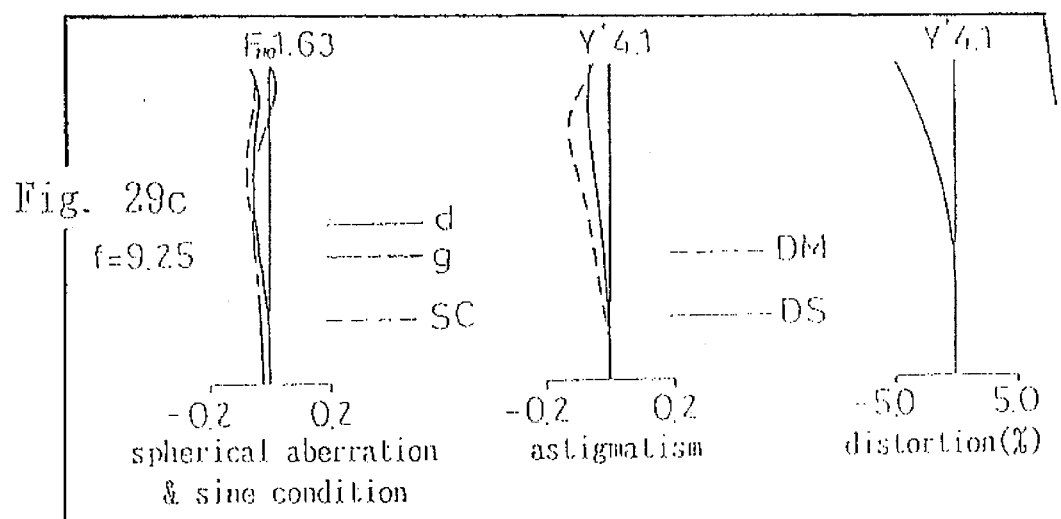

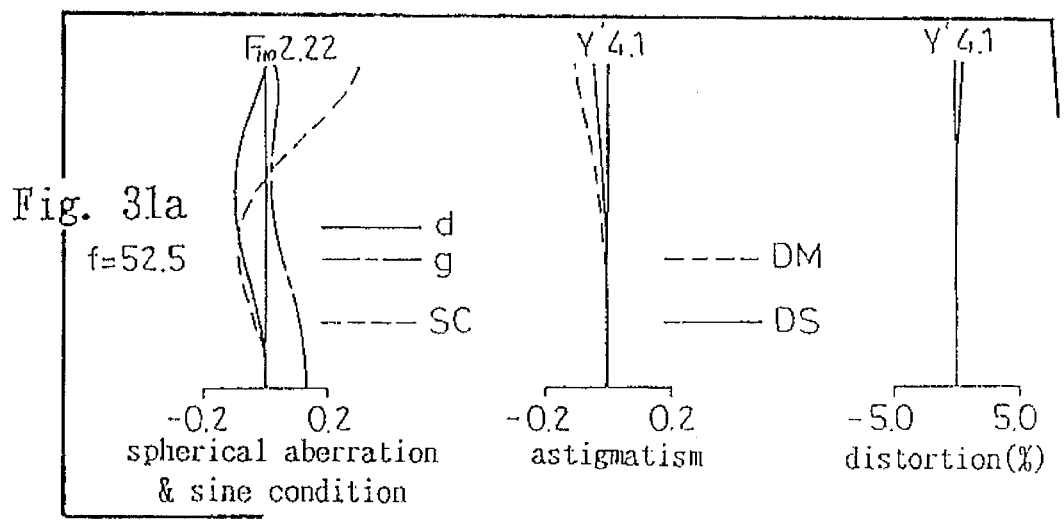
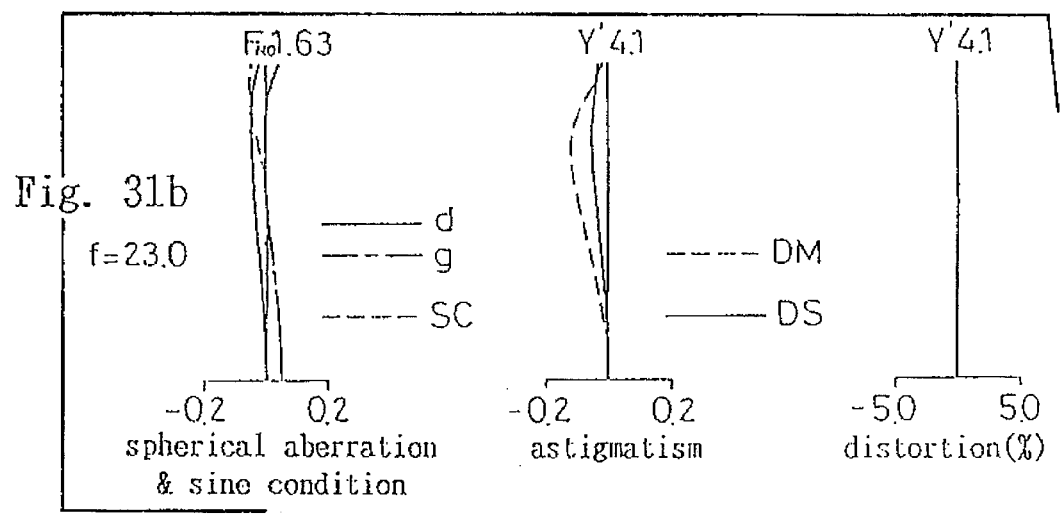
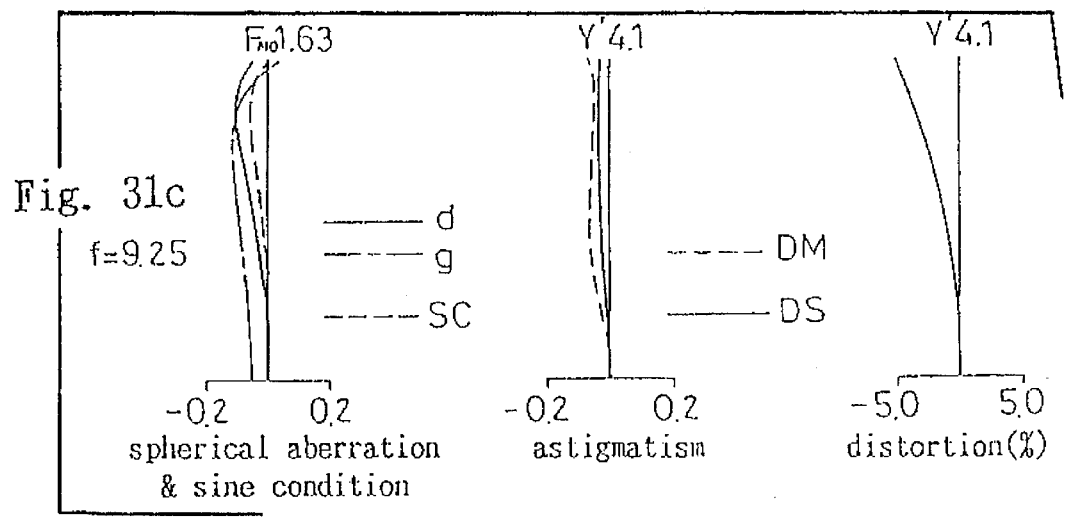

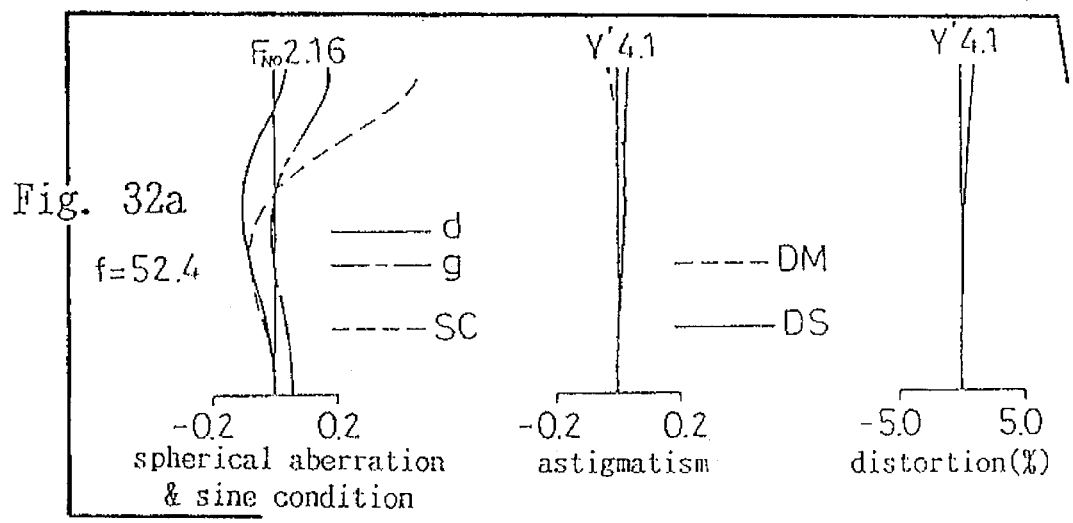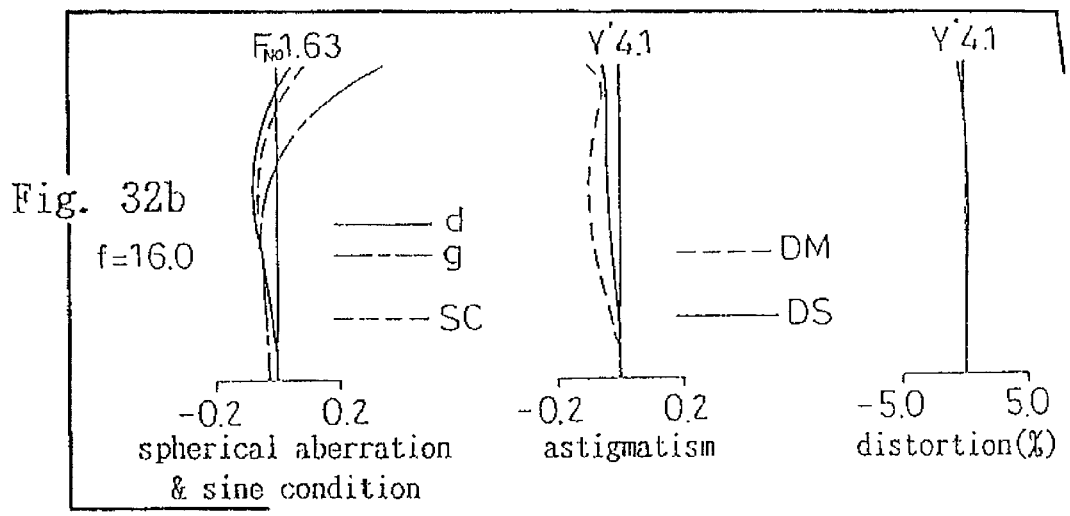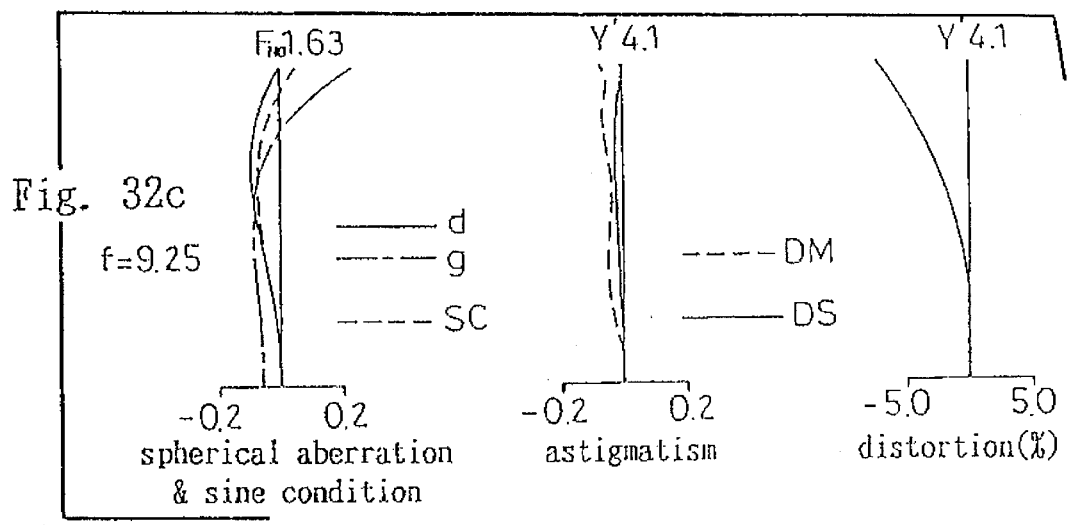

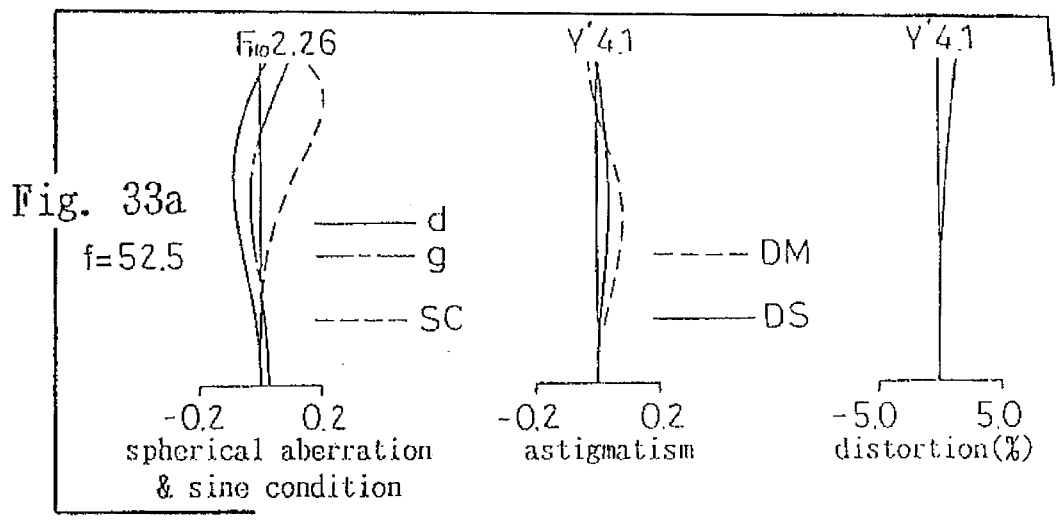
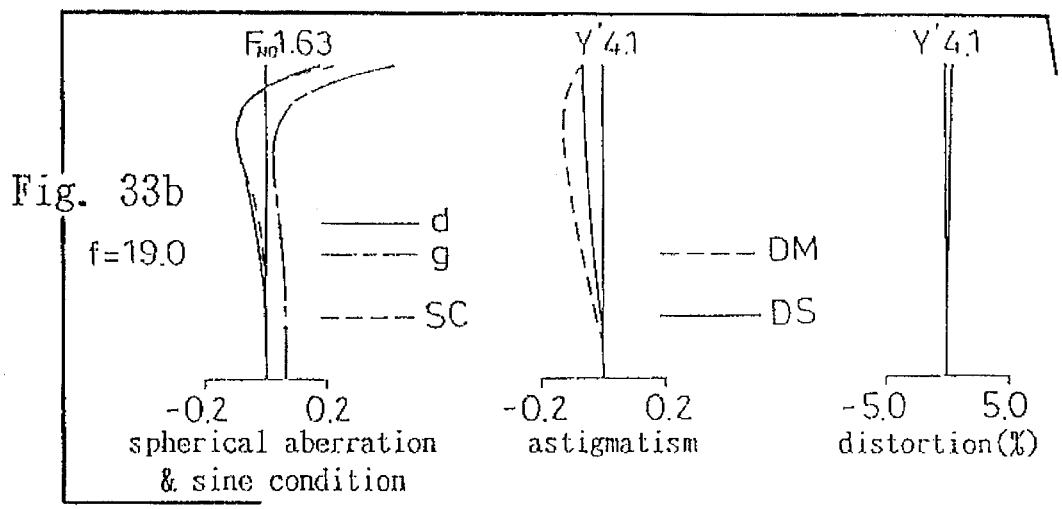
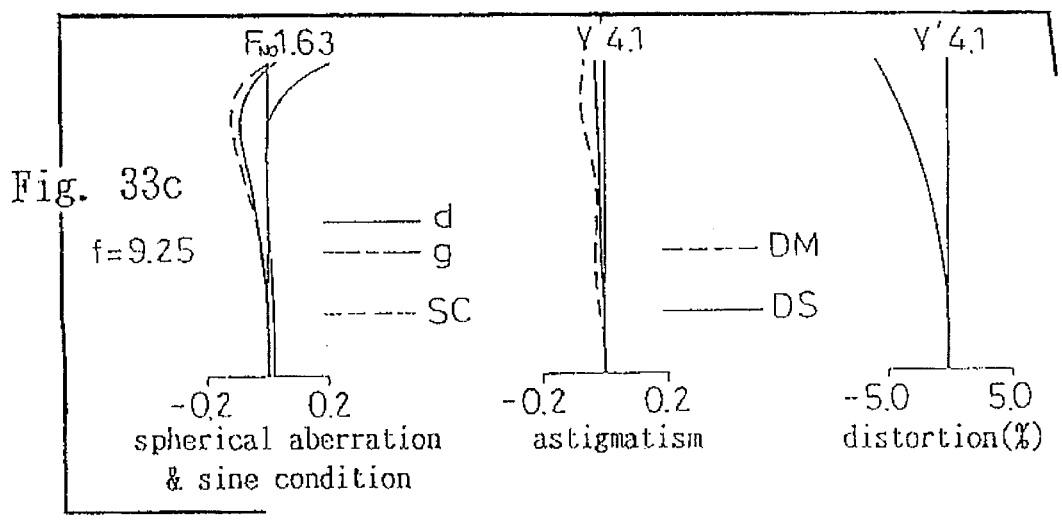

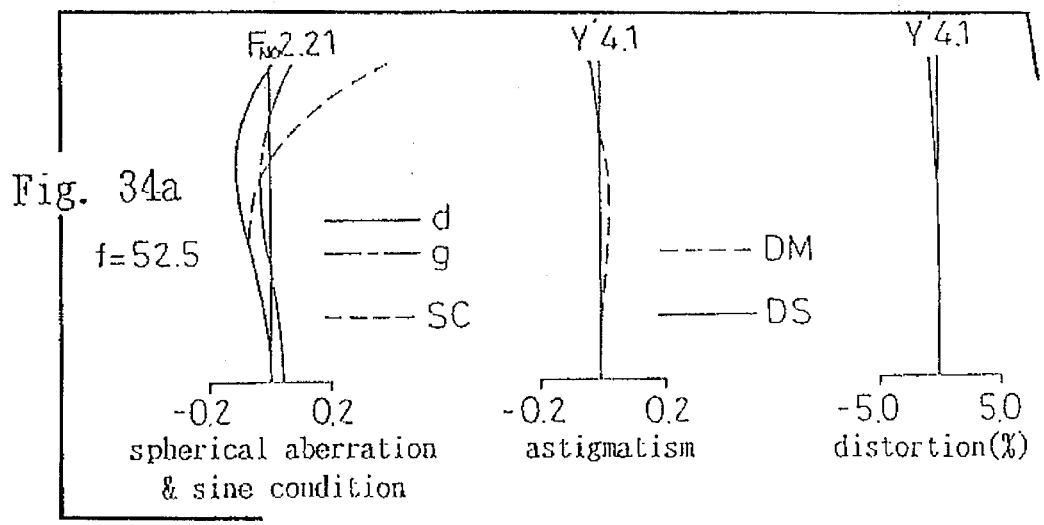
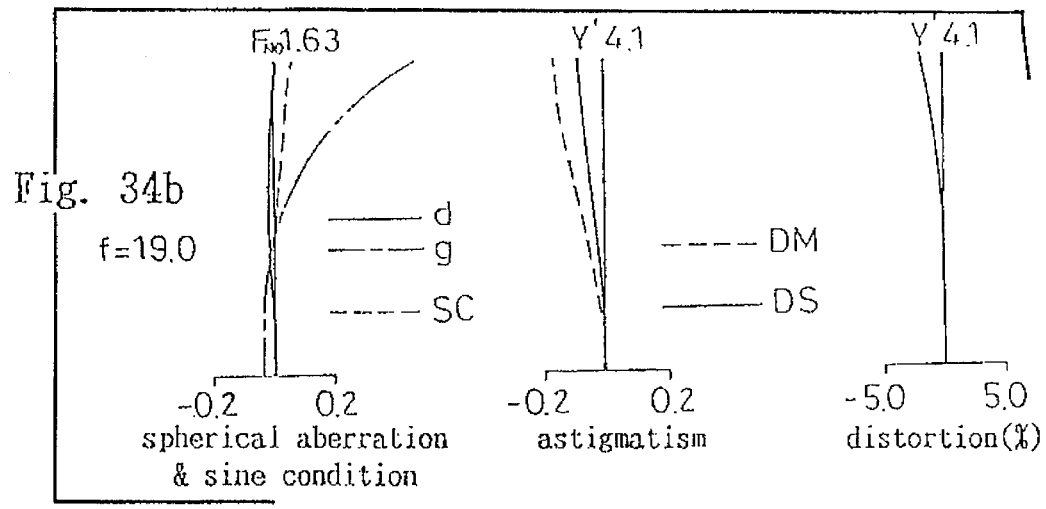
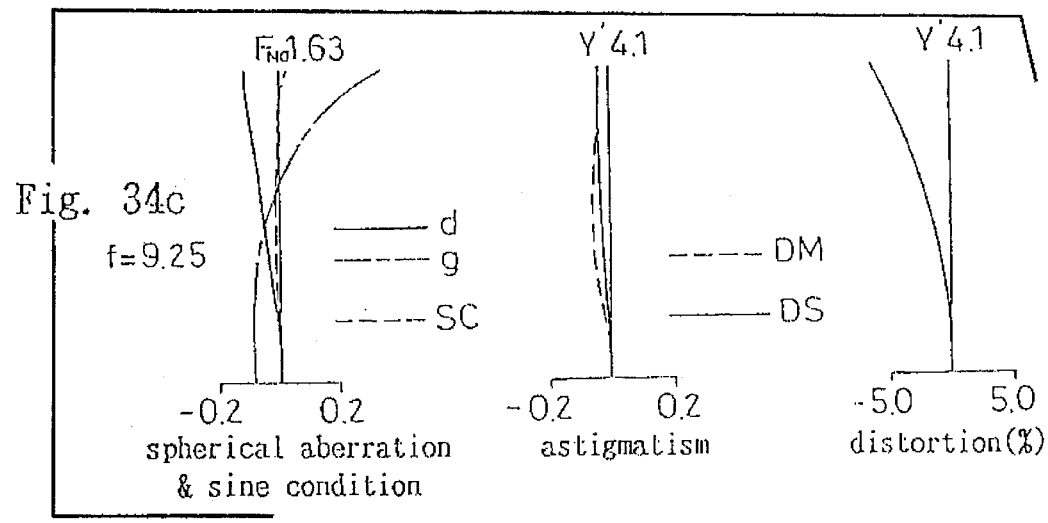

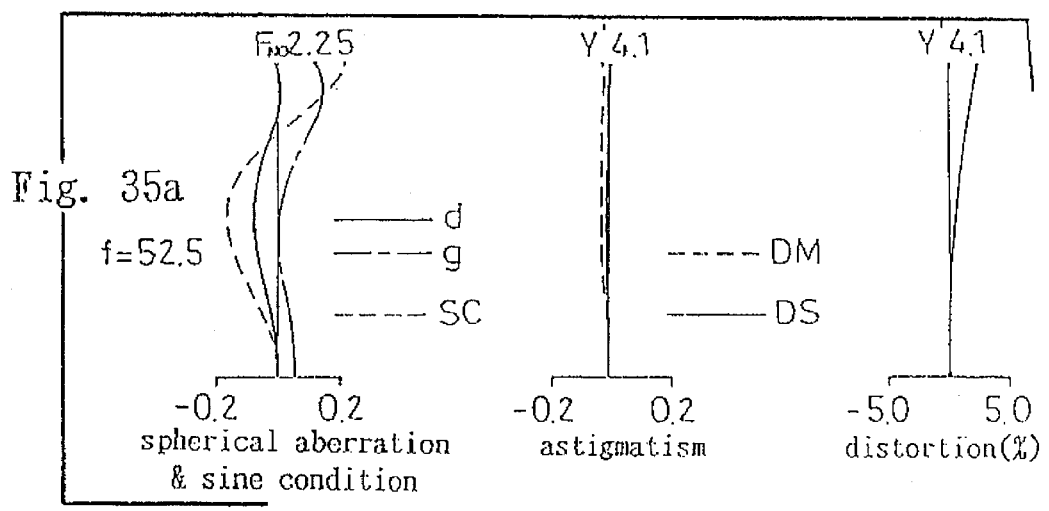
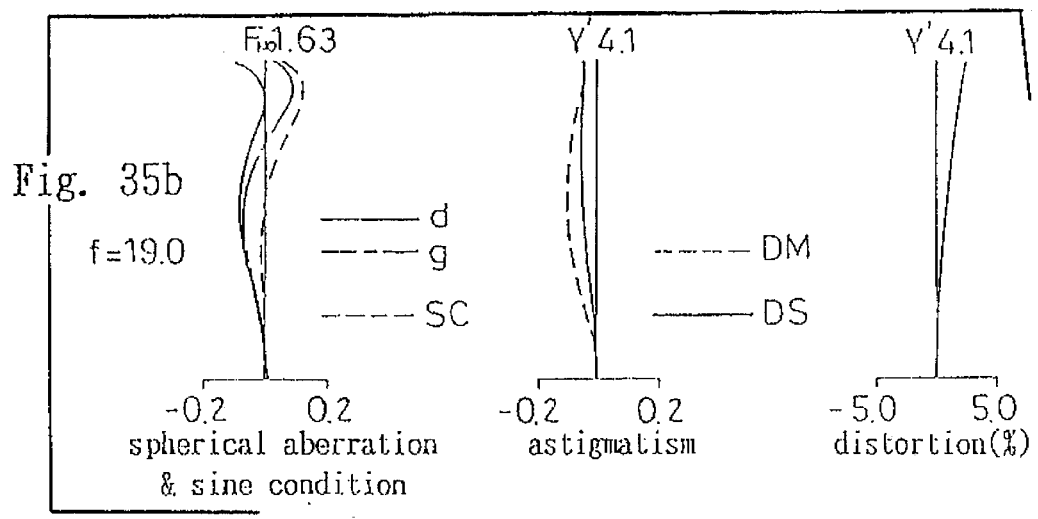
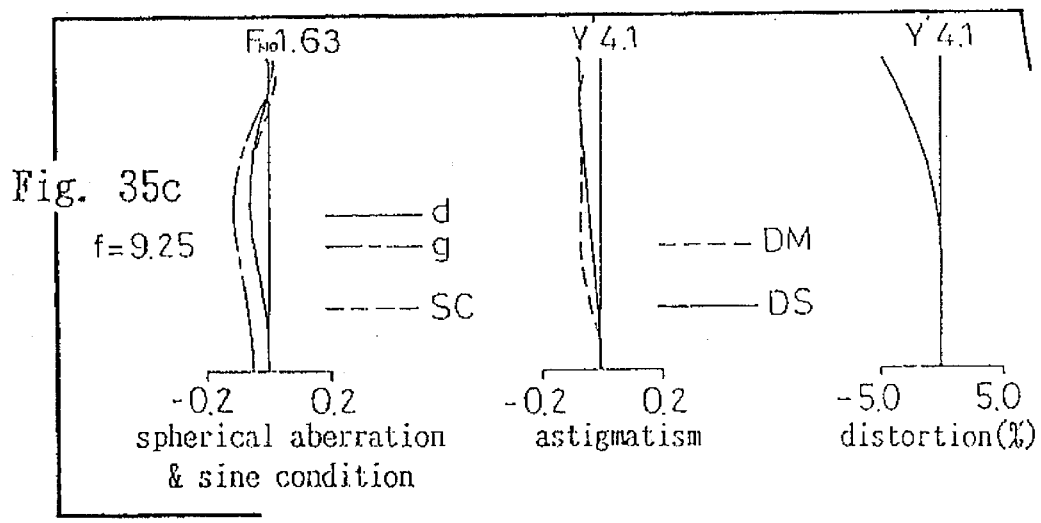

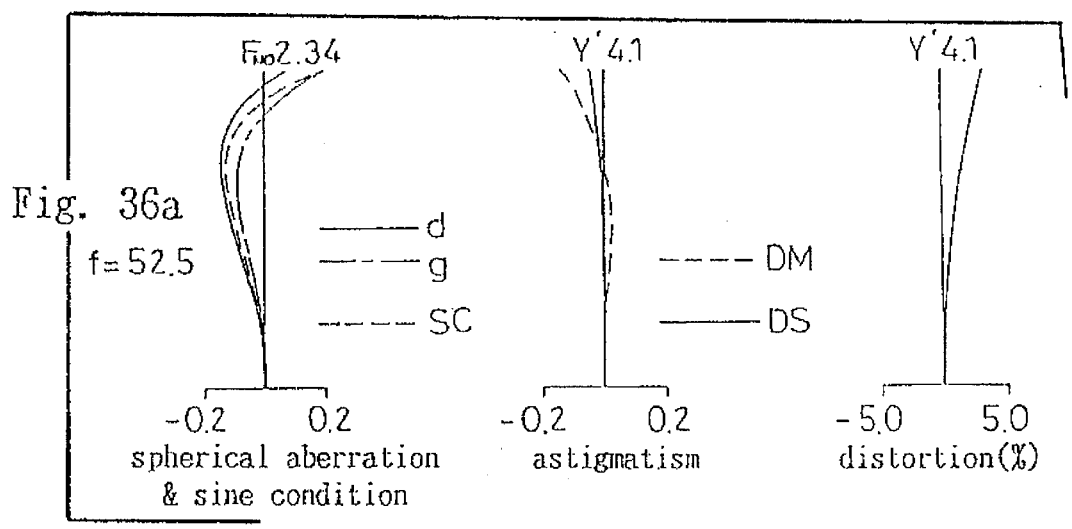
Fig. 36a  f=52.5
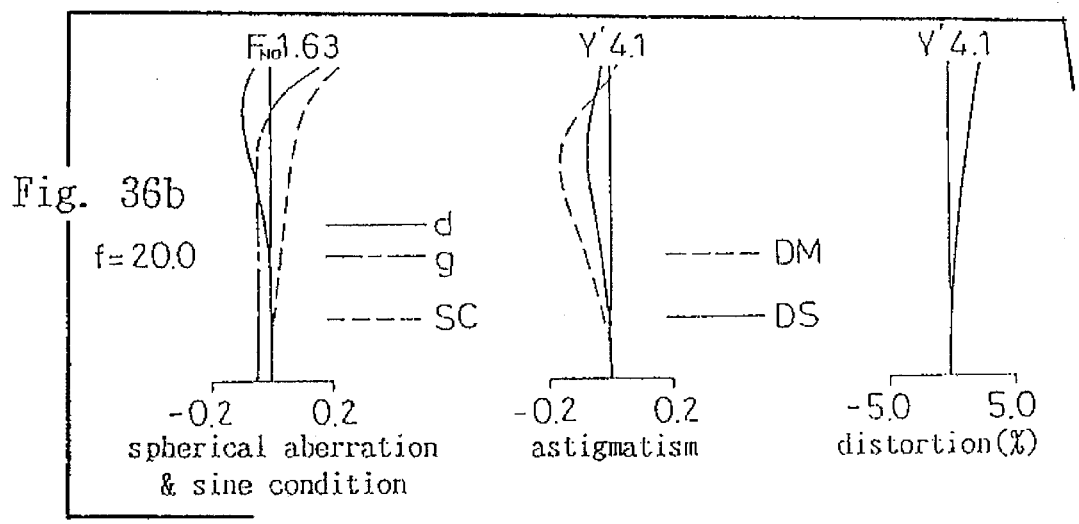
Fig. 36b  f=20.0
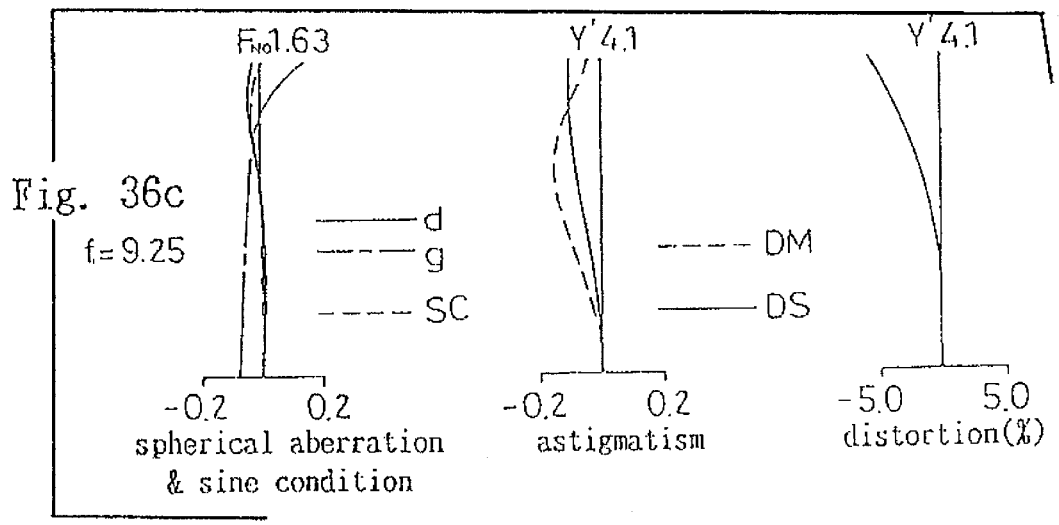
Fig. 36c  f=9.25

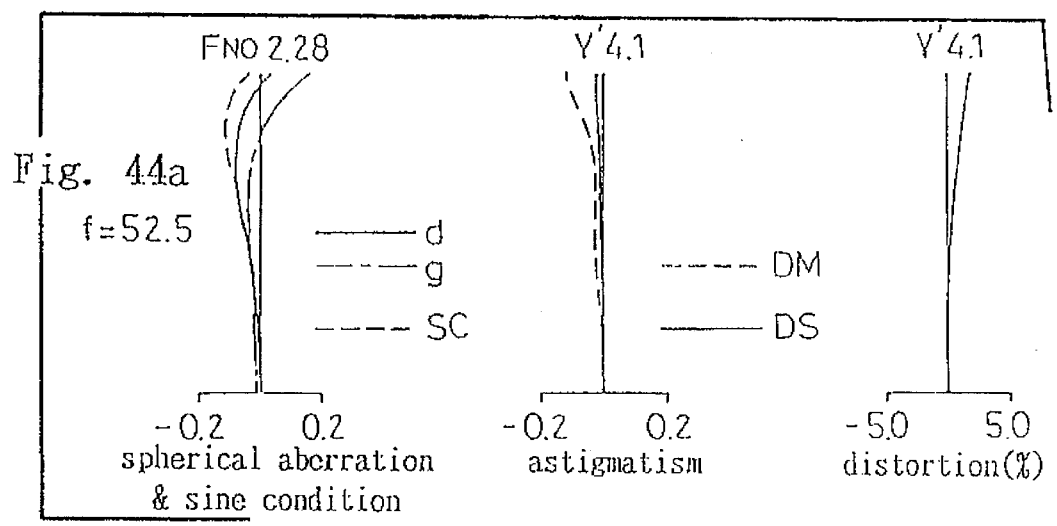
Fig. 44a f=52.5
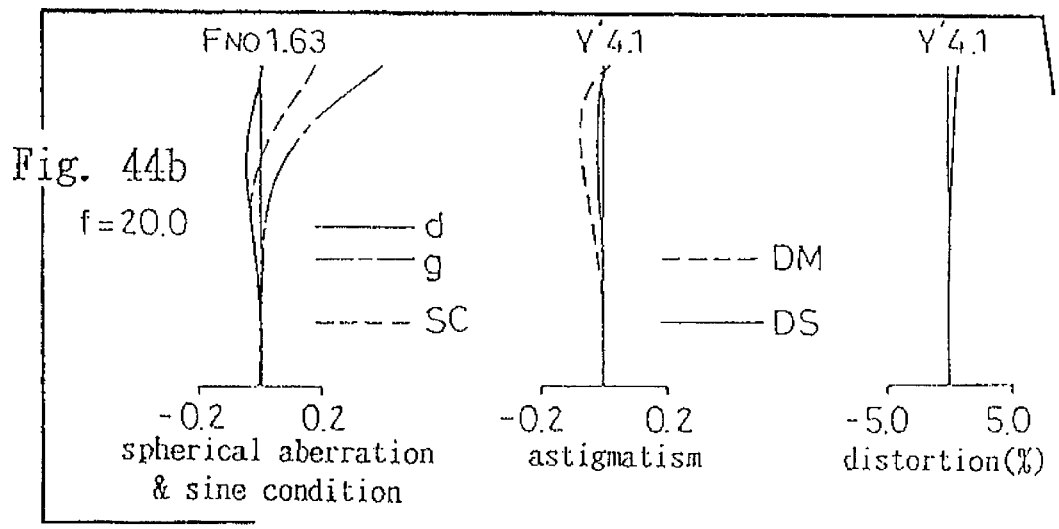
Fig. 44b f=20.0
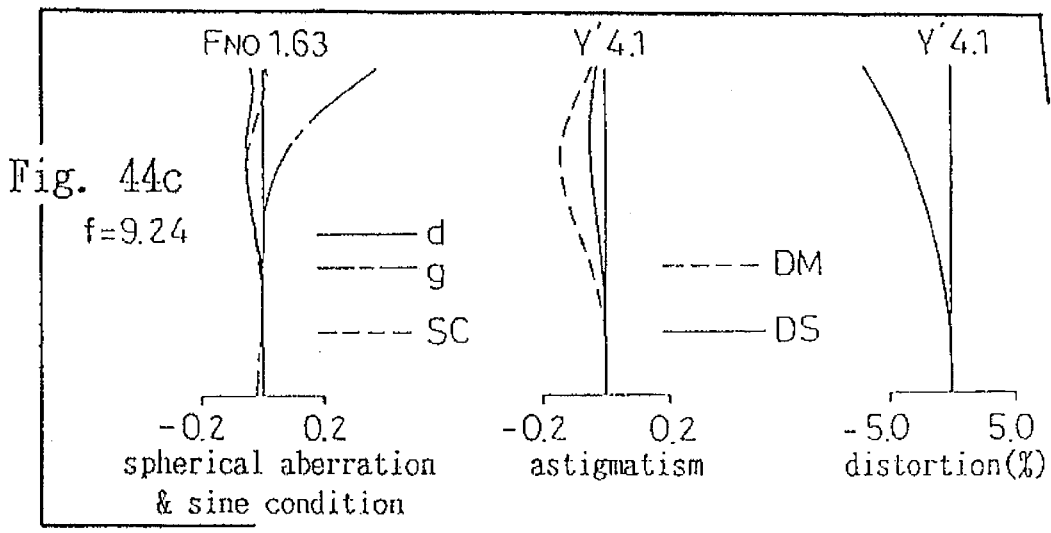
Fig. 44c f=9.24

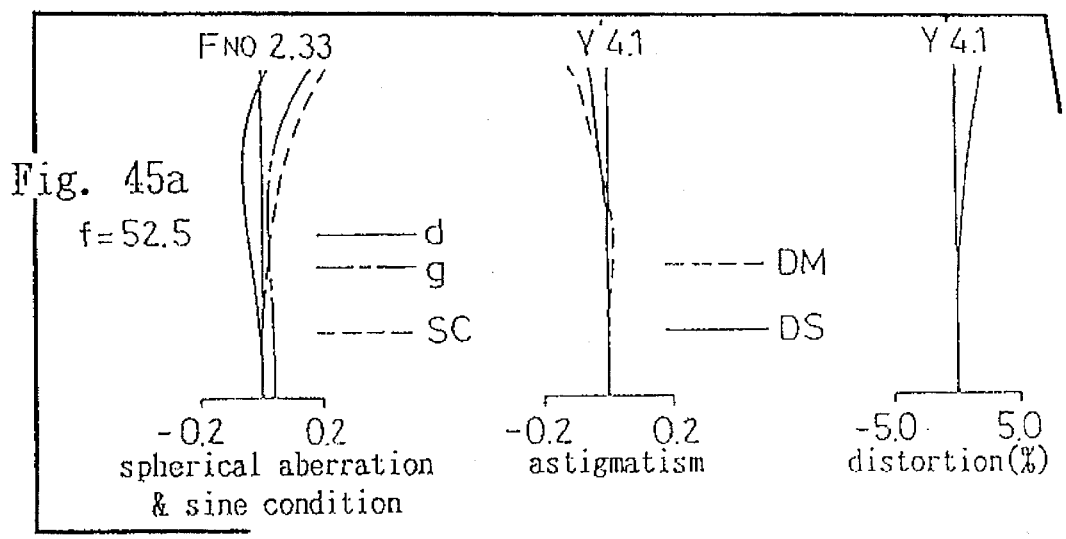
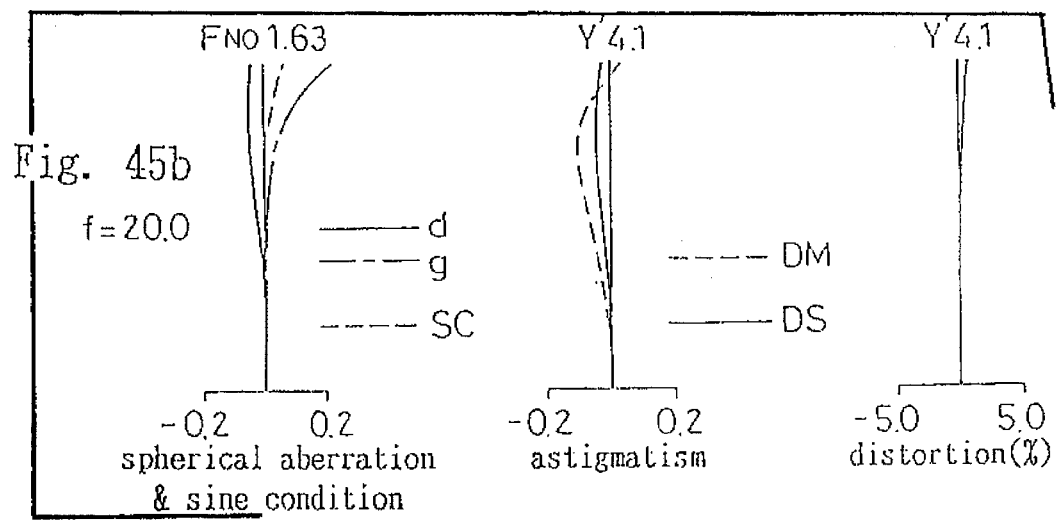
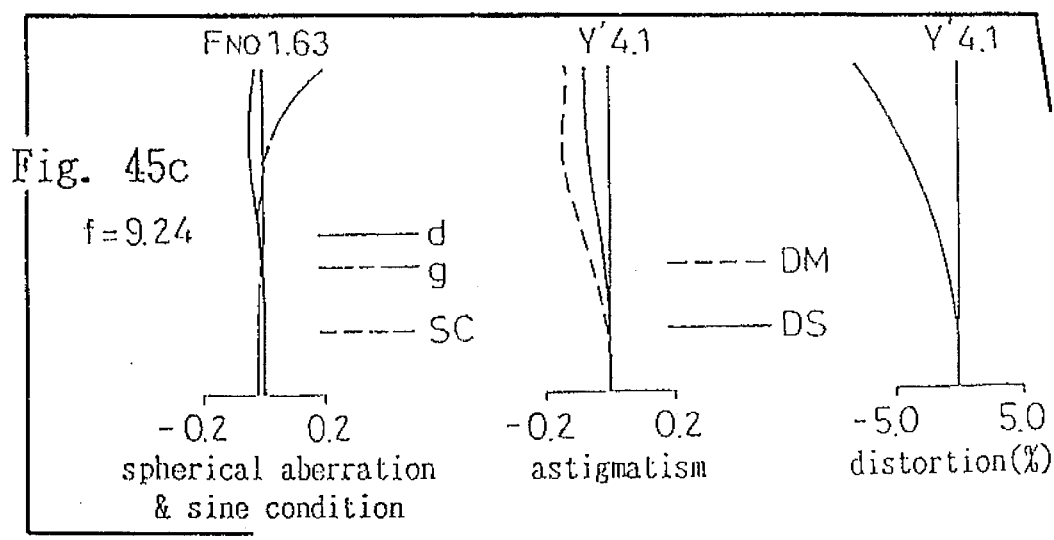

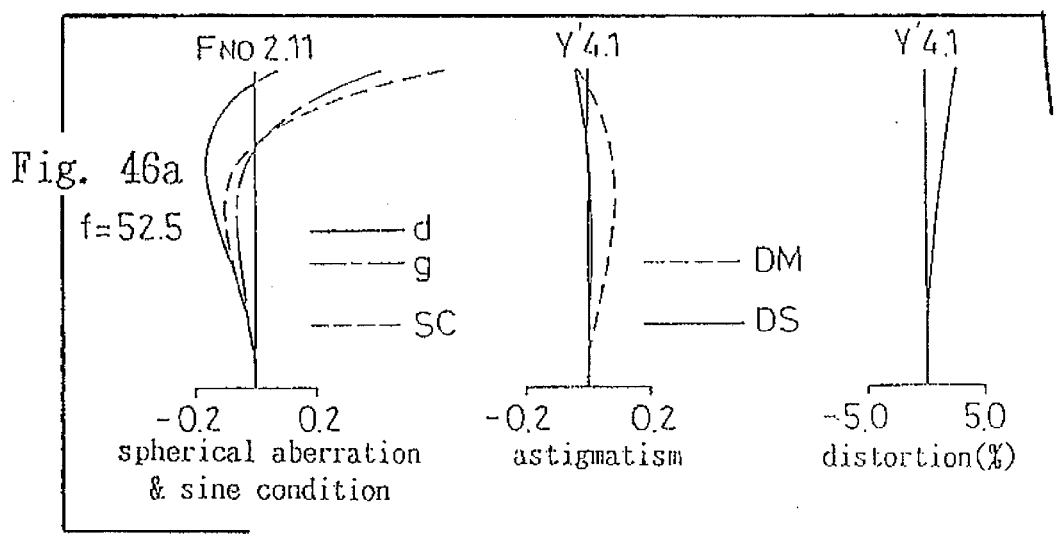
Fig. 46a  f=52.5
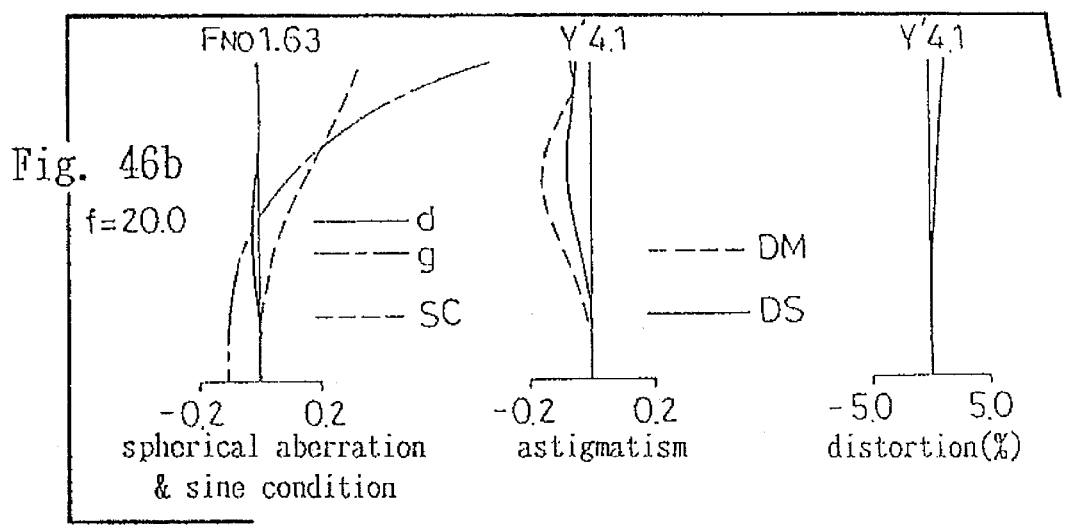
Fig. 46b  f=20.0
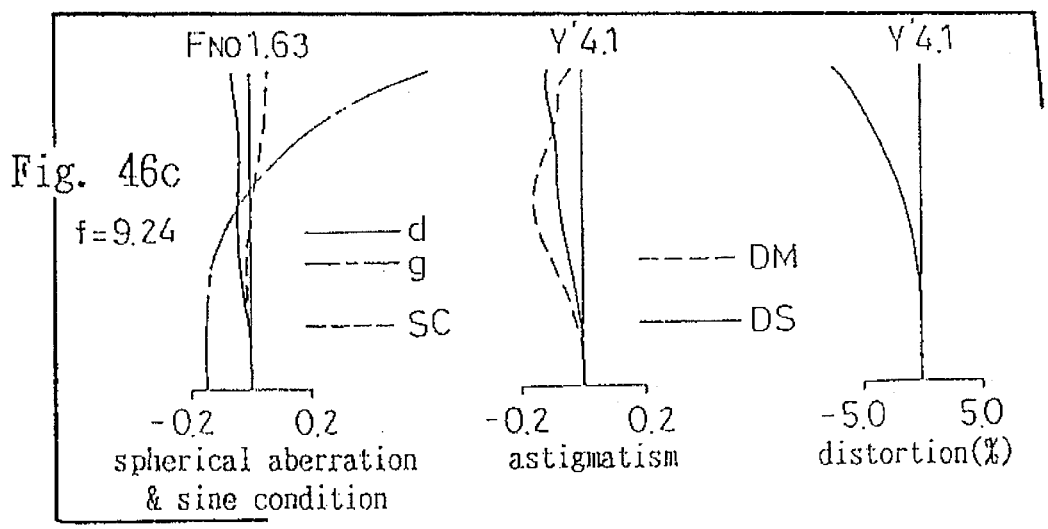
Fig. 46c  f=9.24 f=52.5 f=20.0 f=9.24

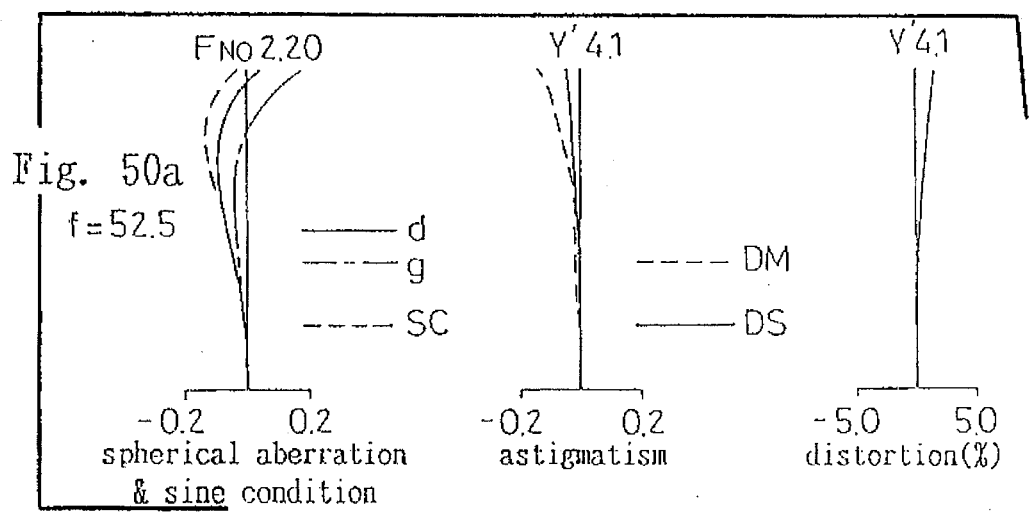
Fig. 50a  f=52.5
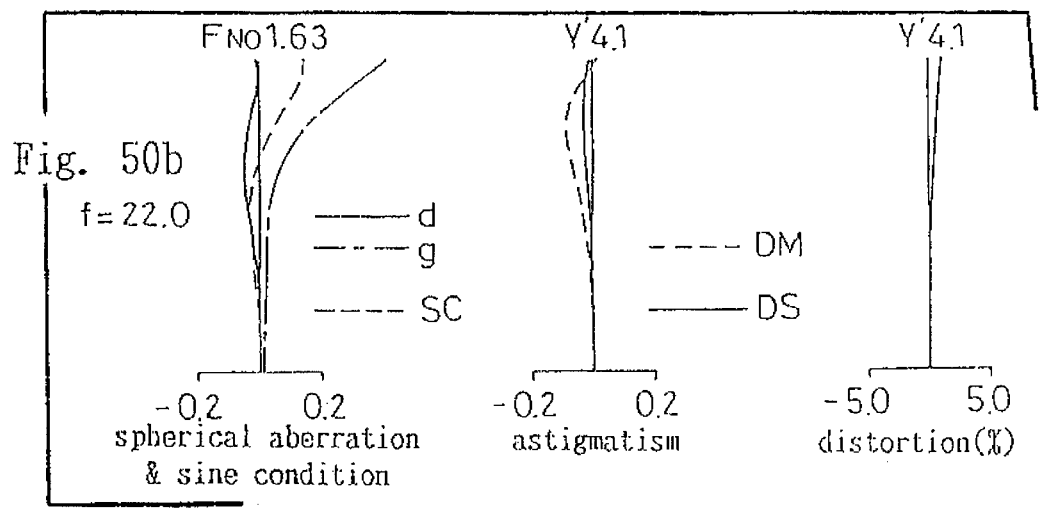
Fig. 50b  f=22.0
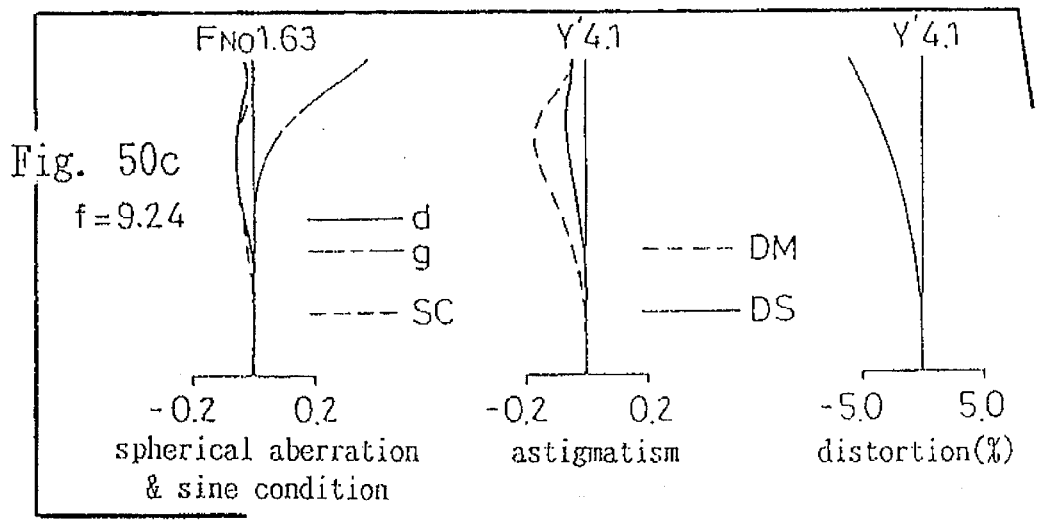
Fig. 50c  f=9.24

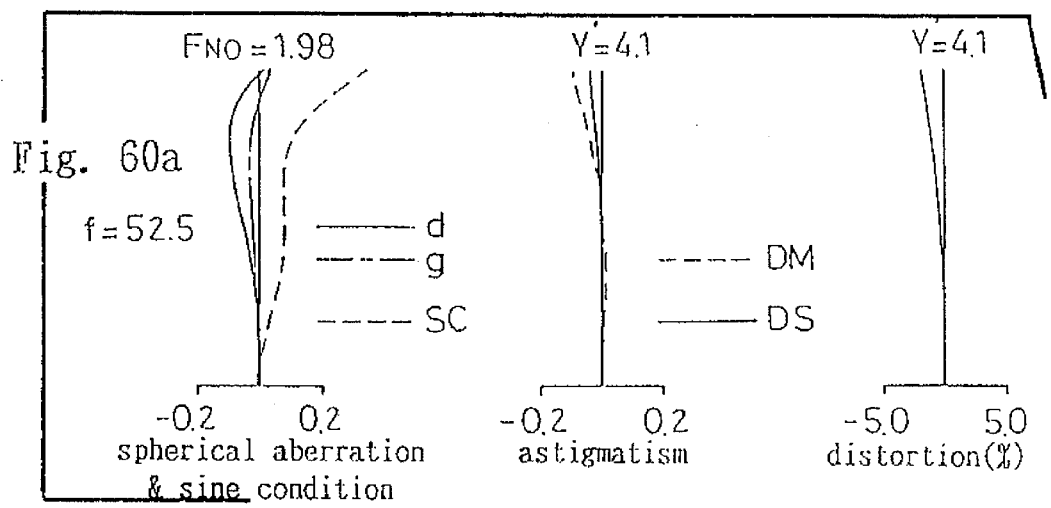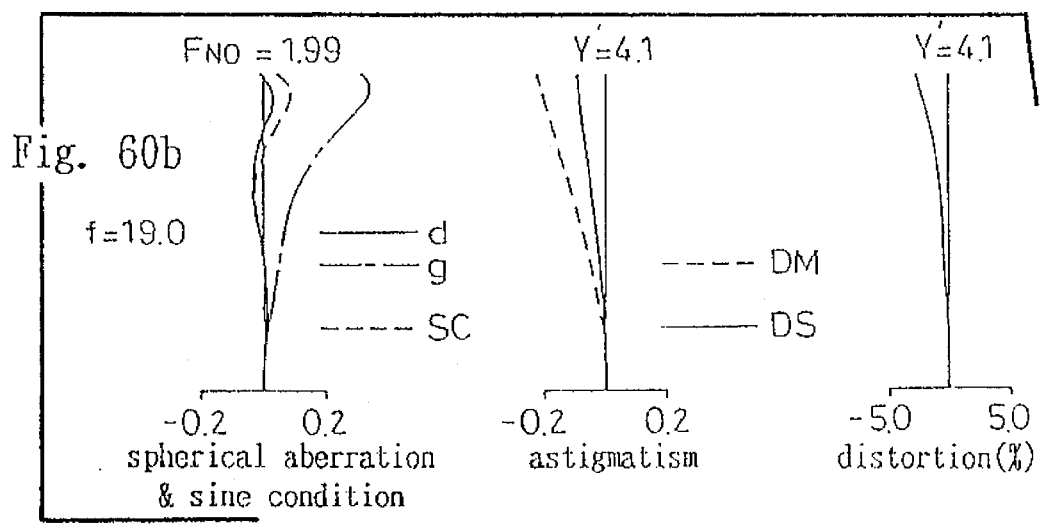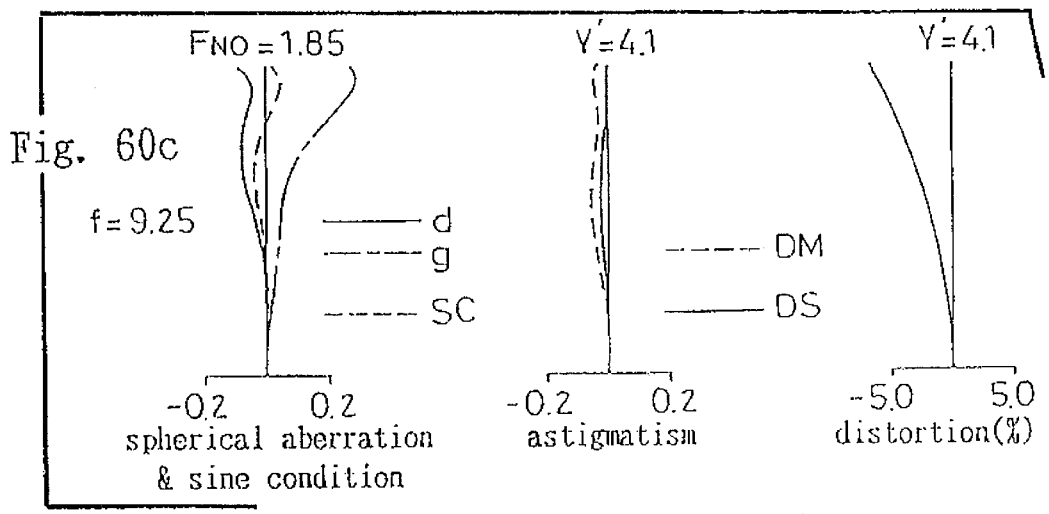

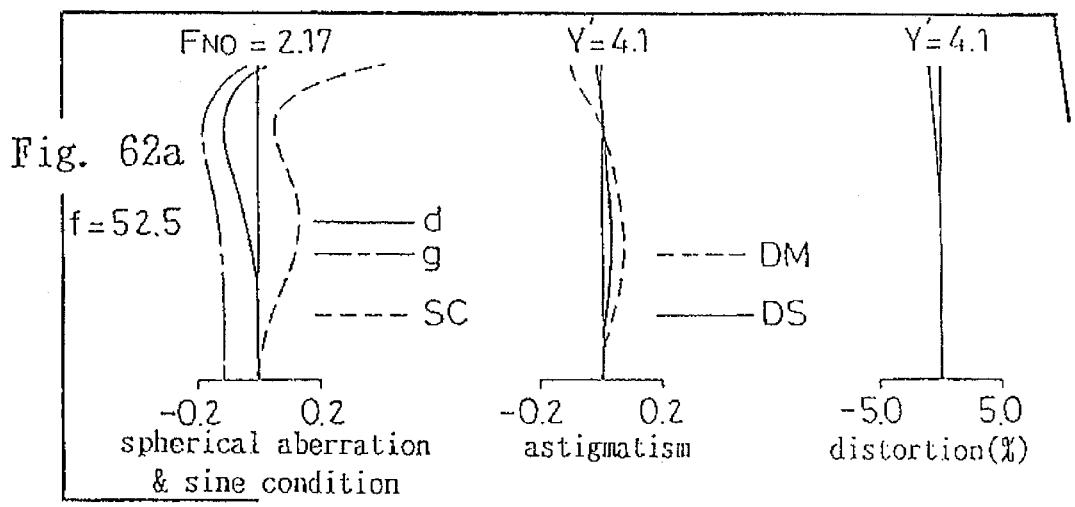
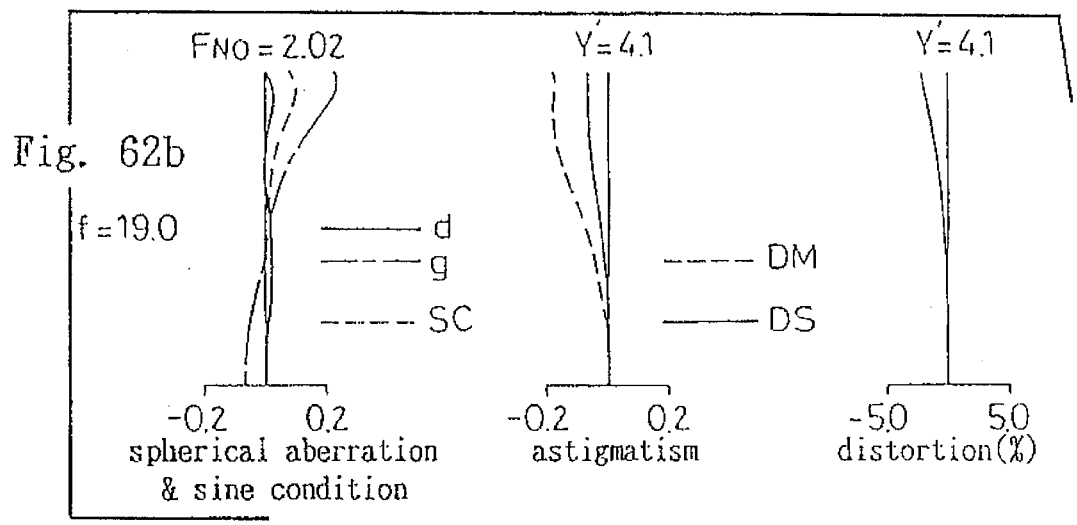
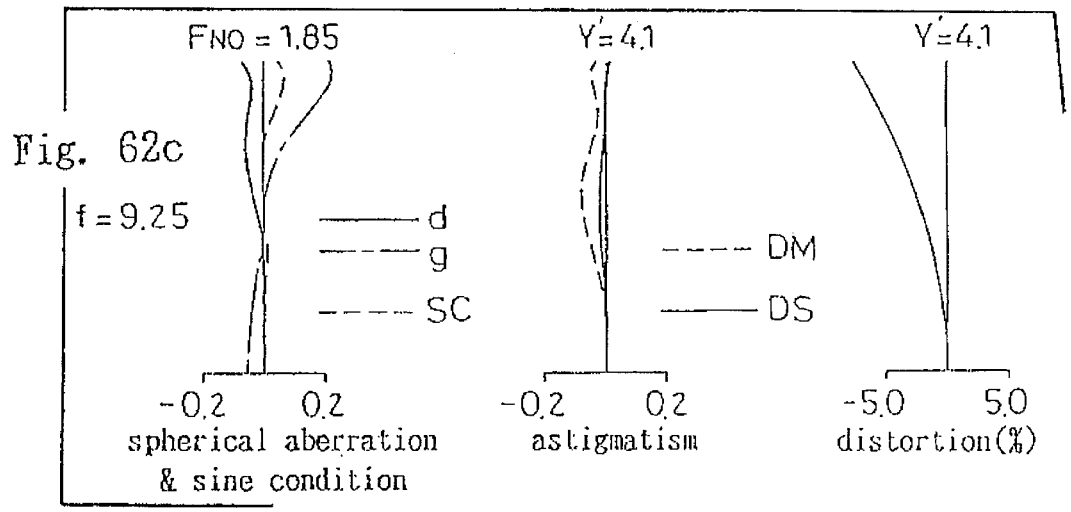

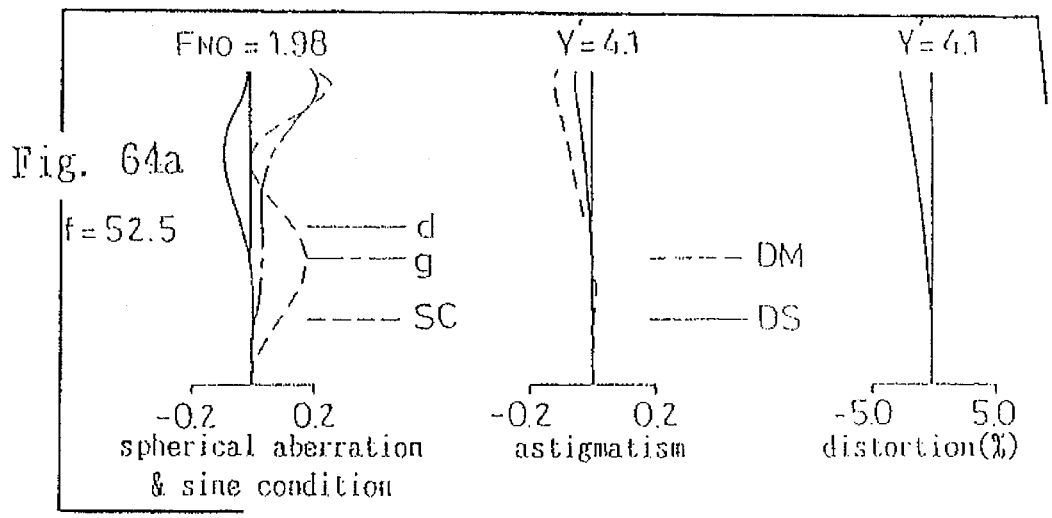
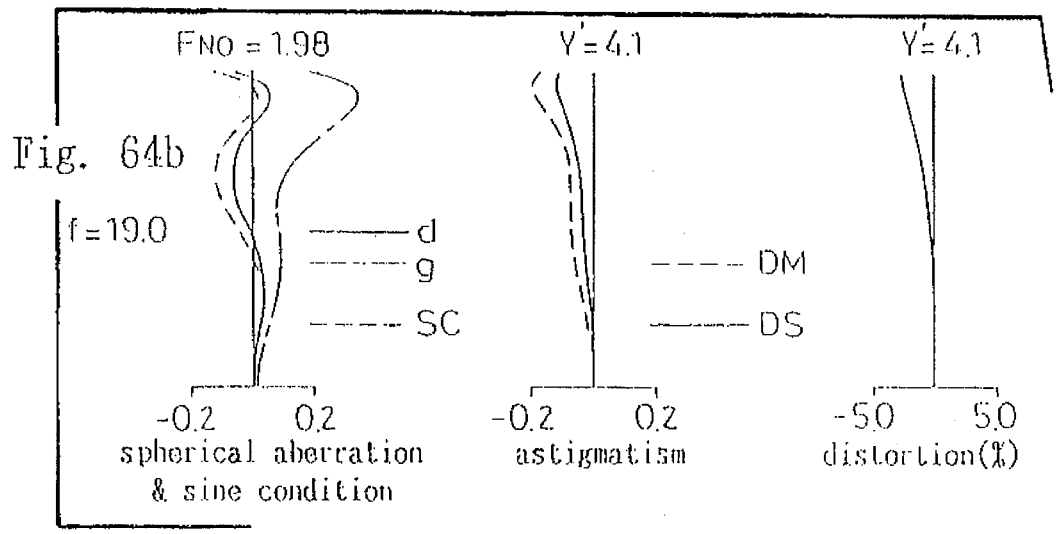
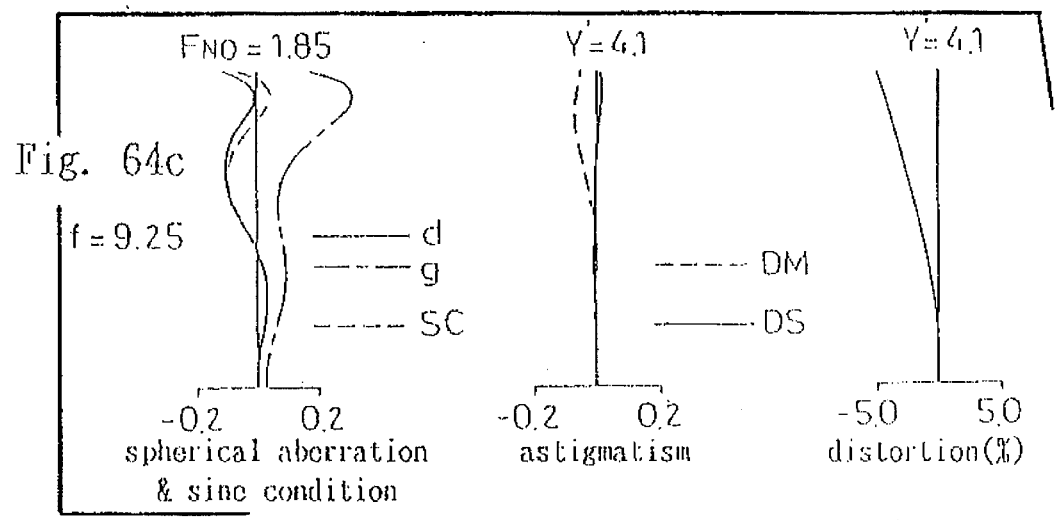

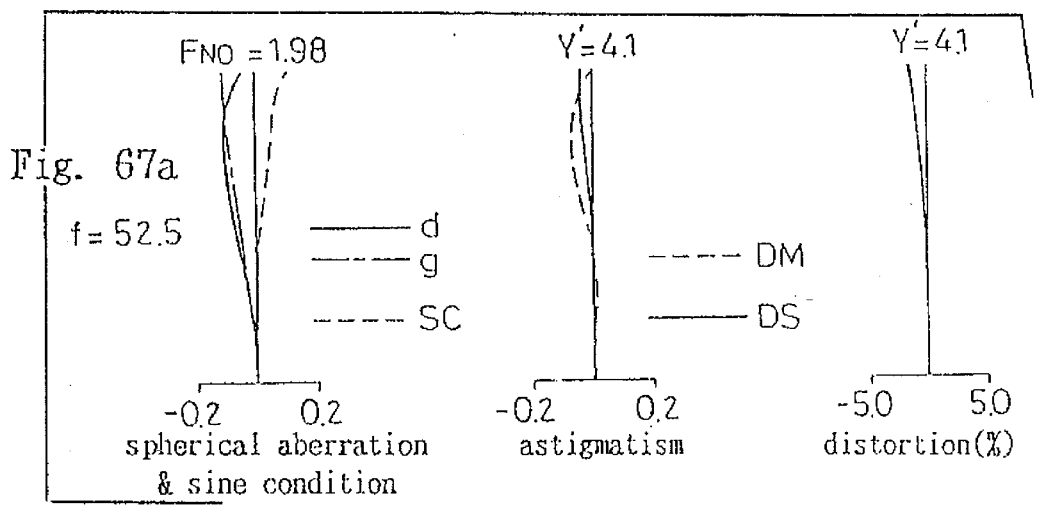
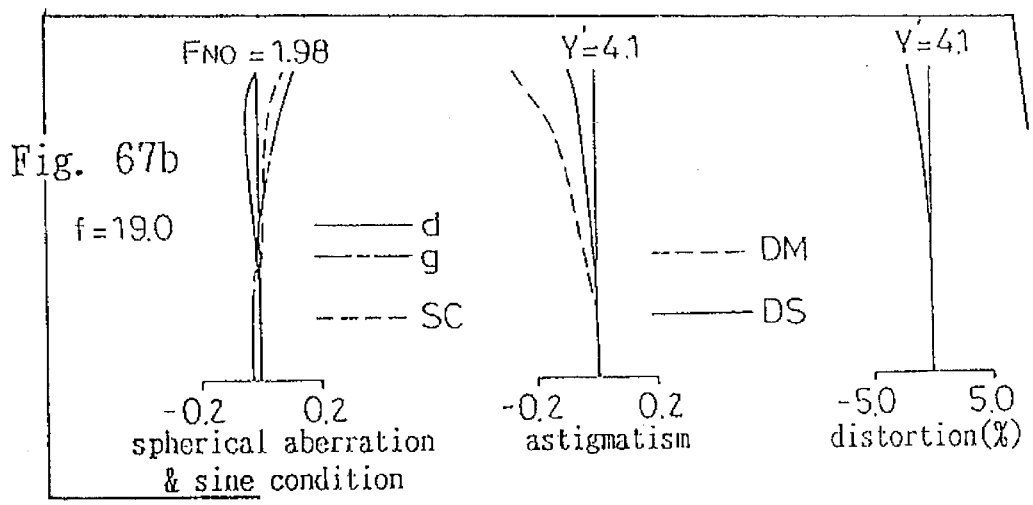
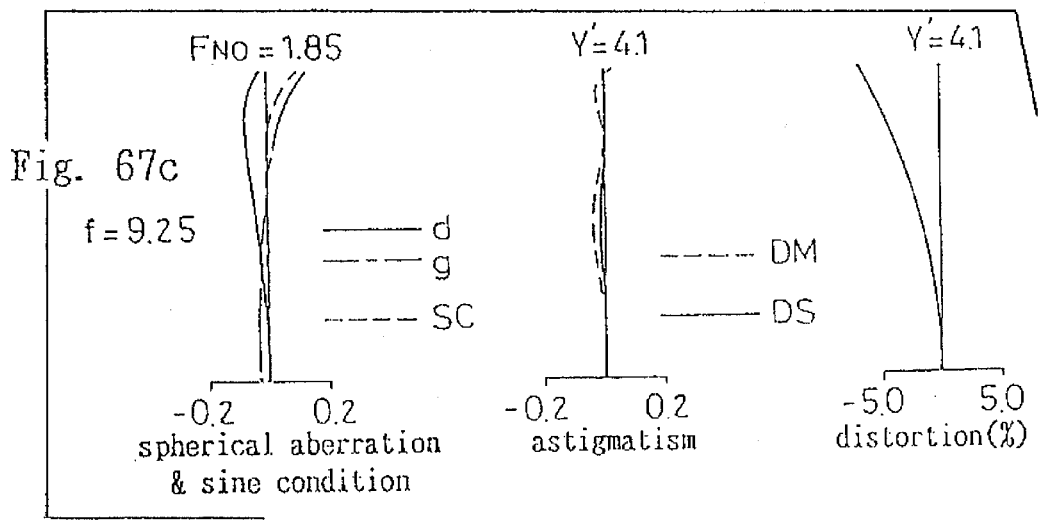

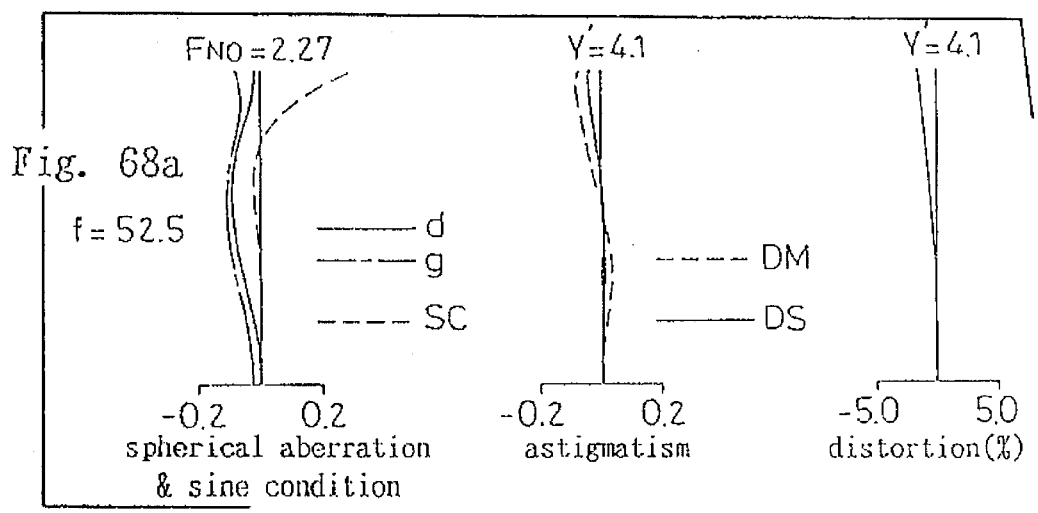
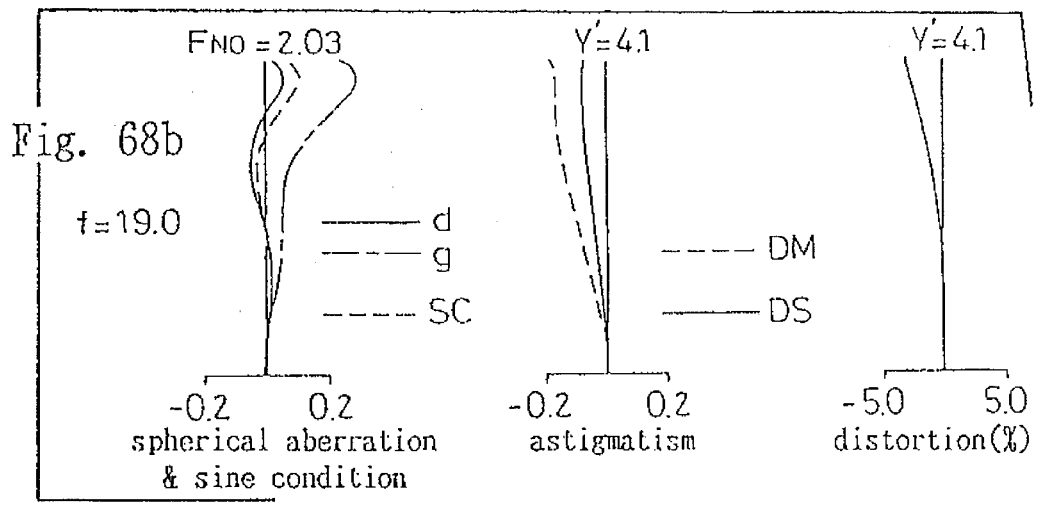
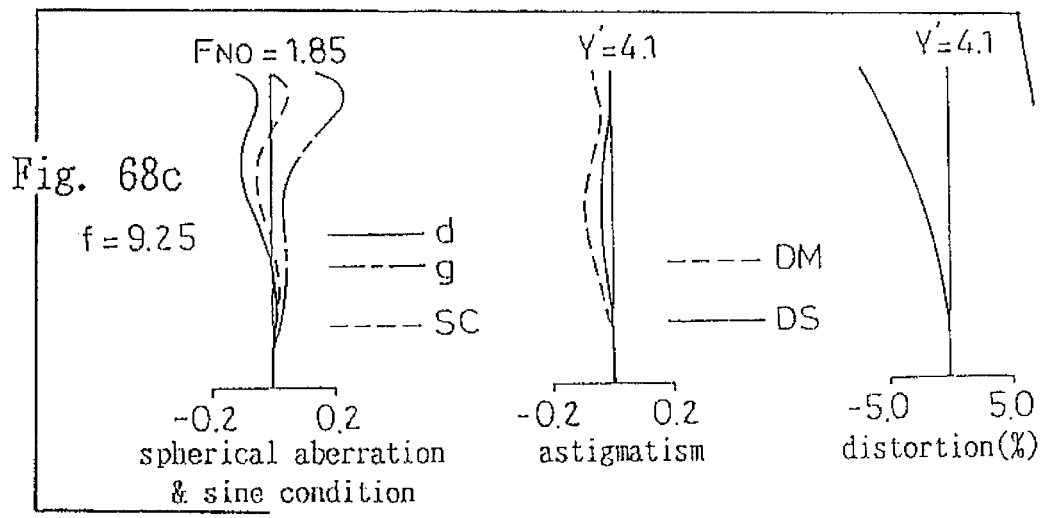

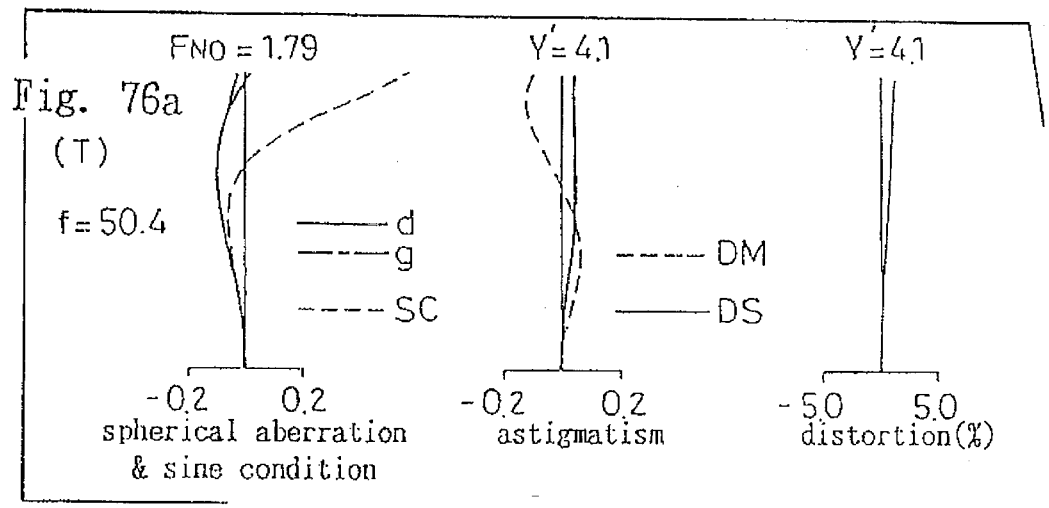
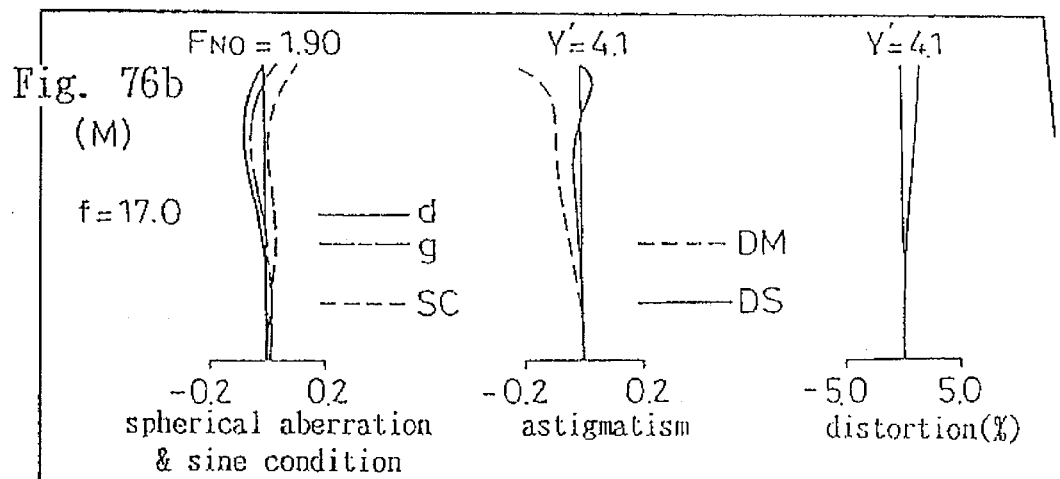
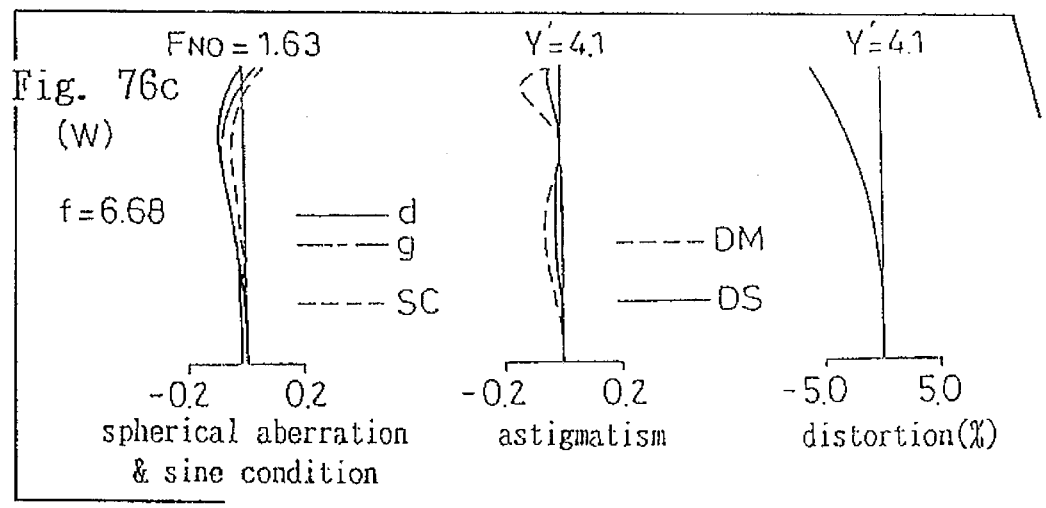

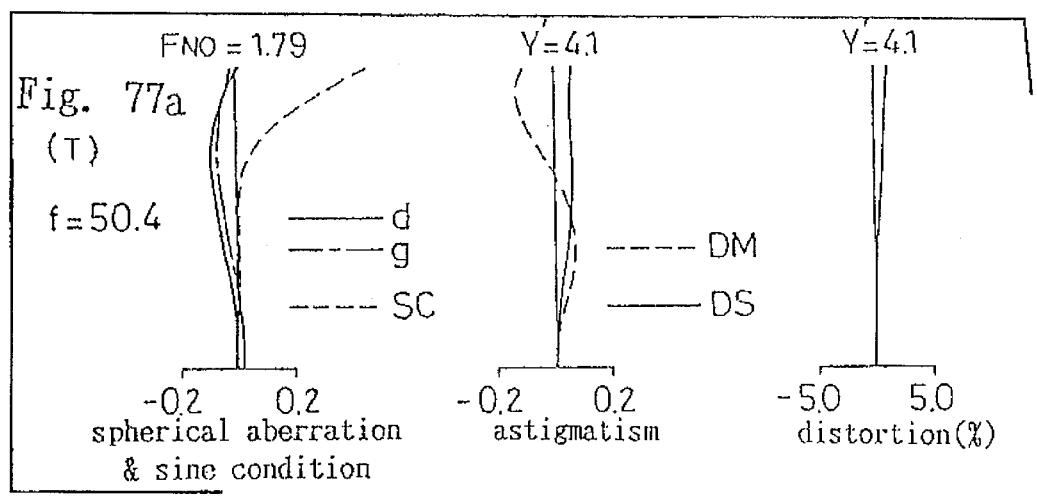
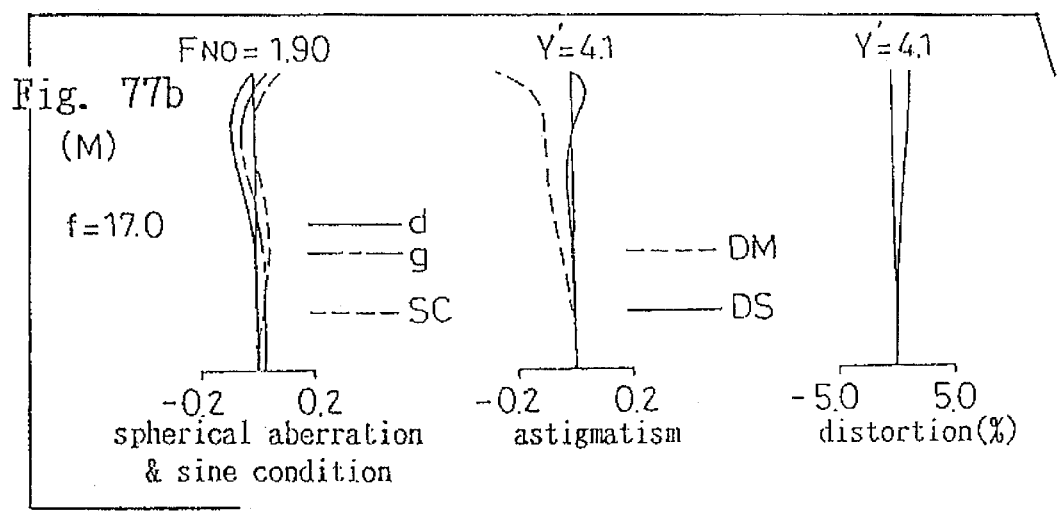
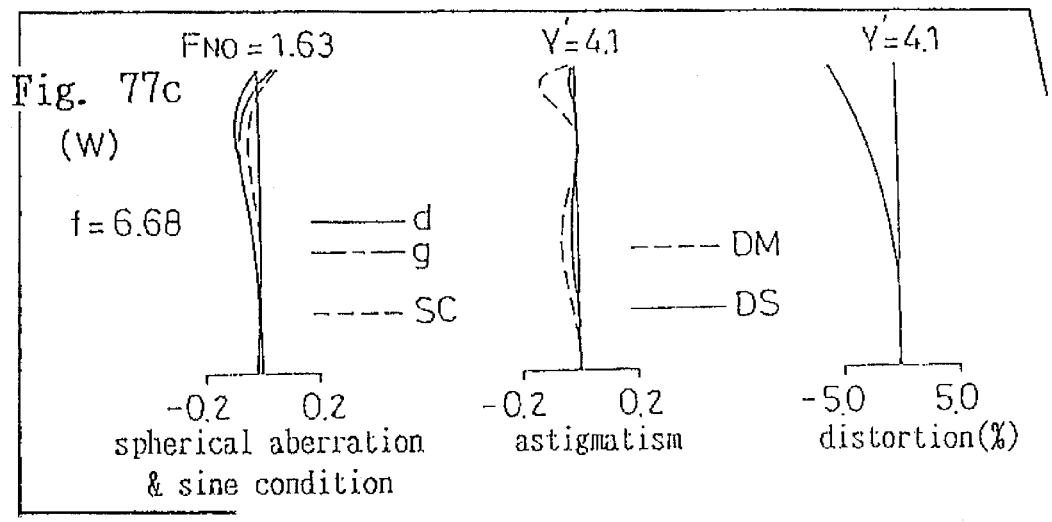

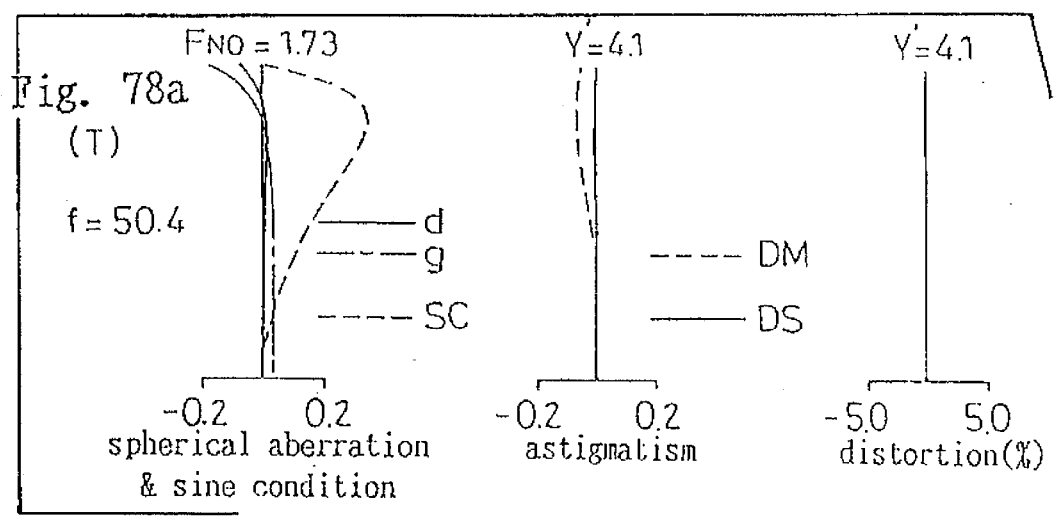
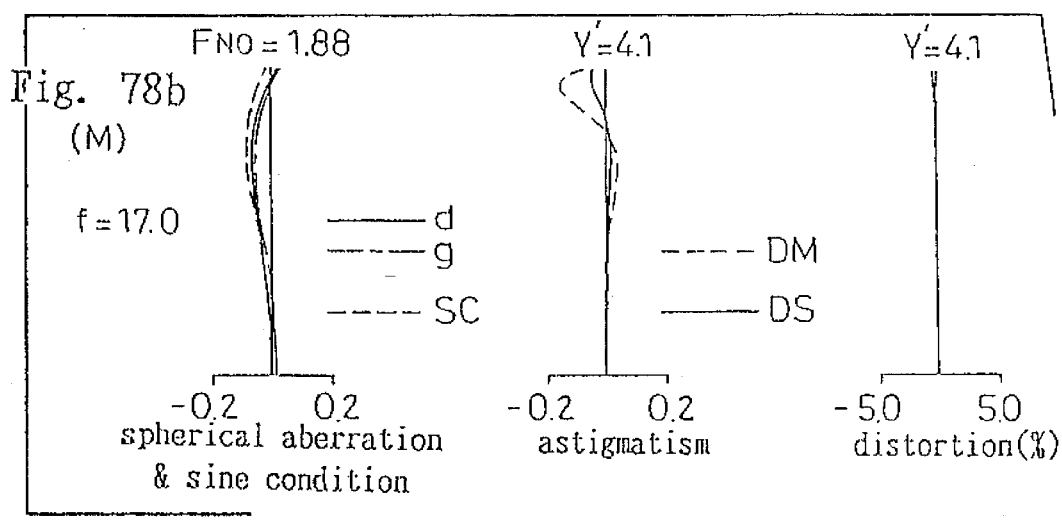
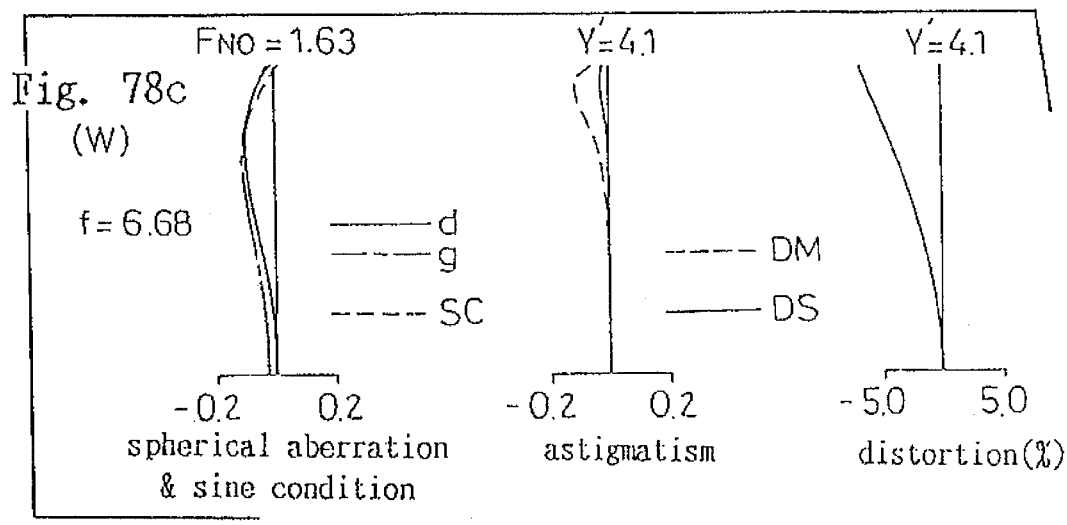

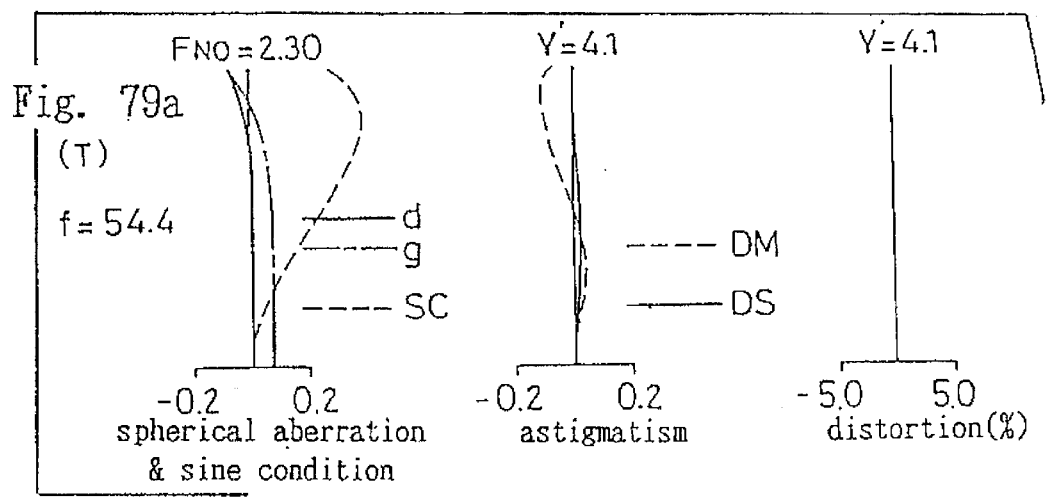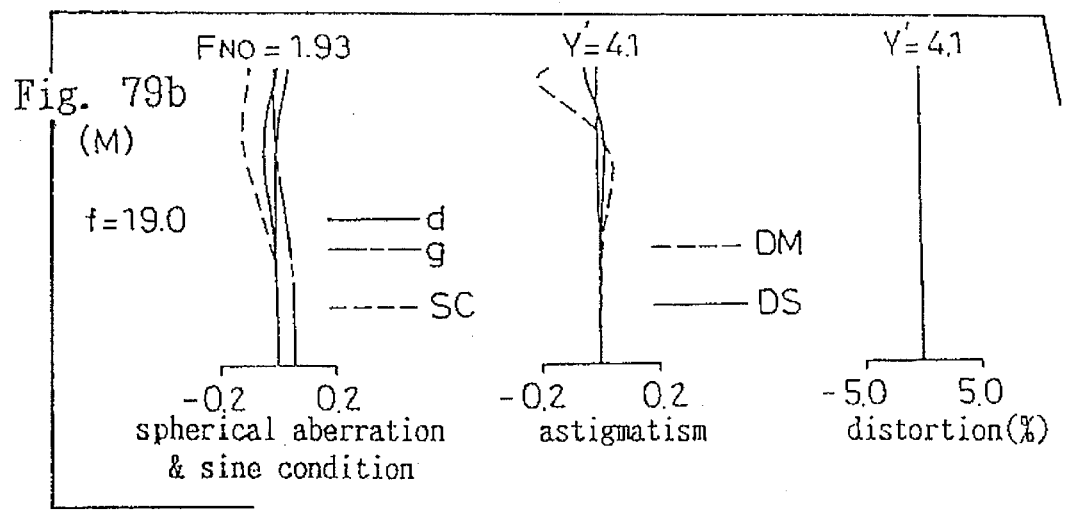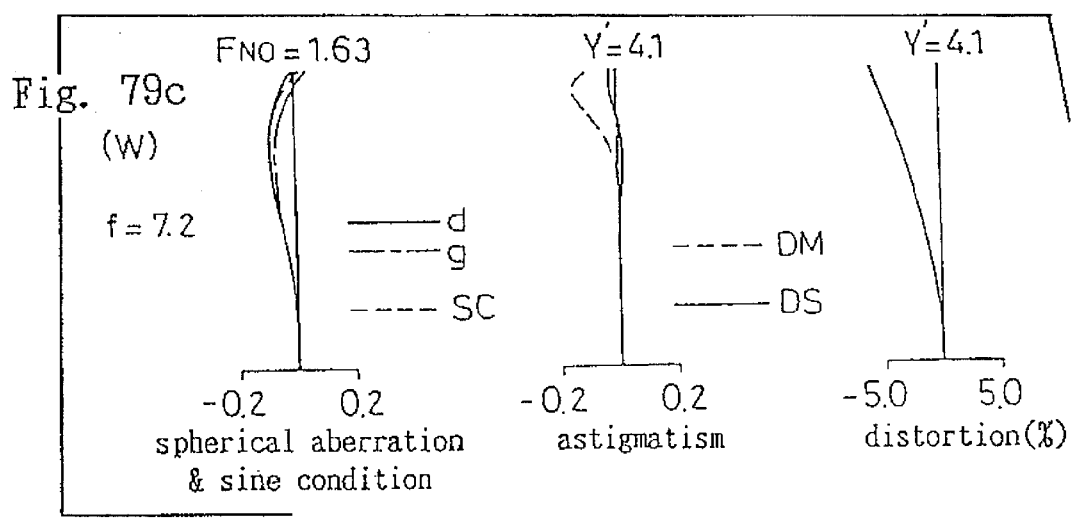

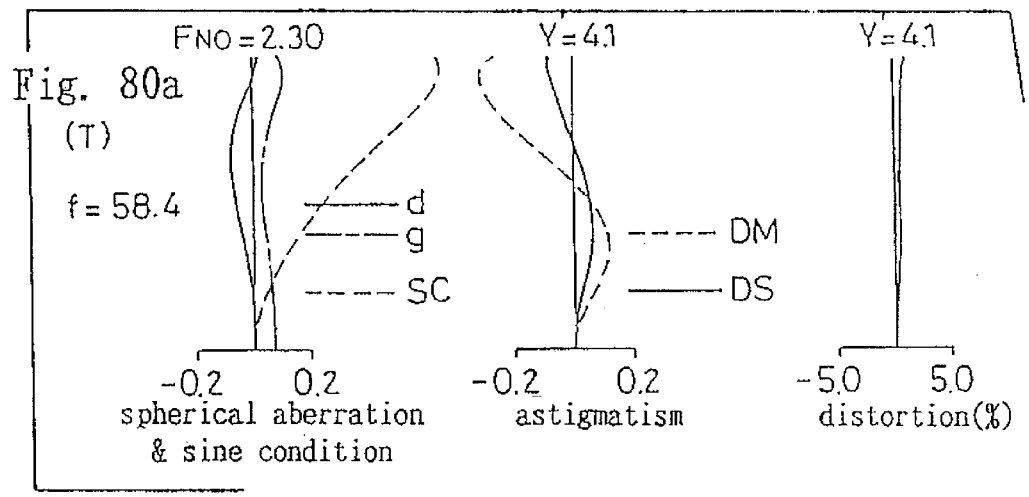
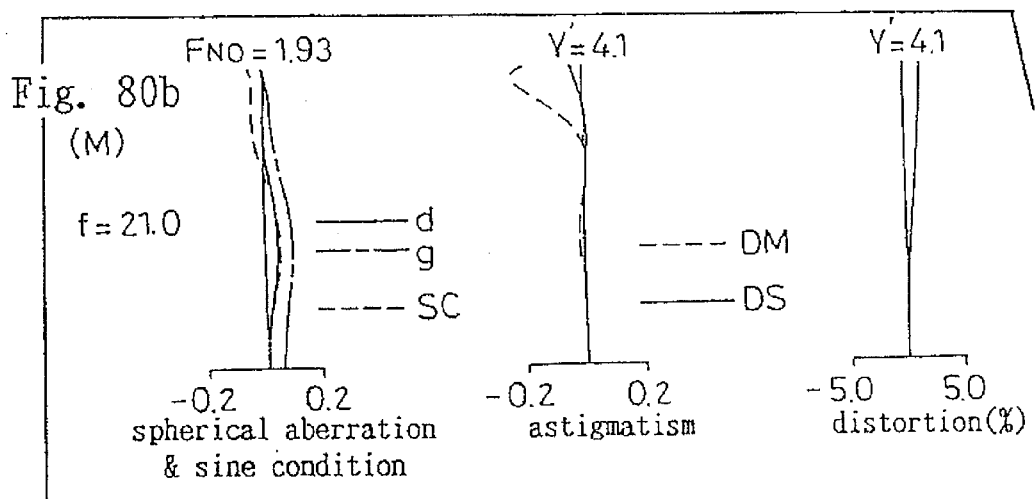
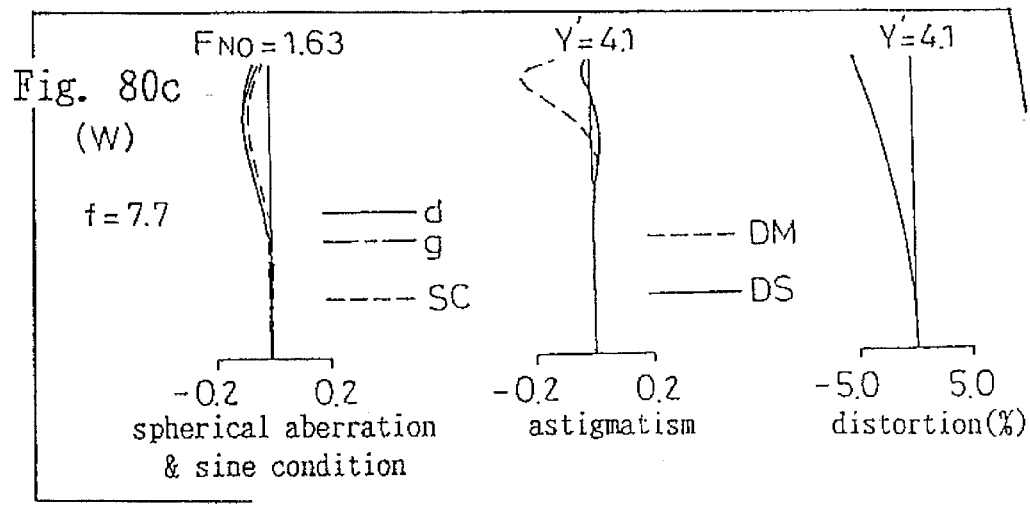

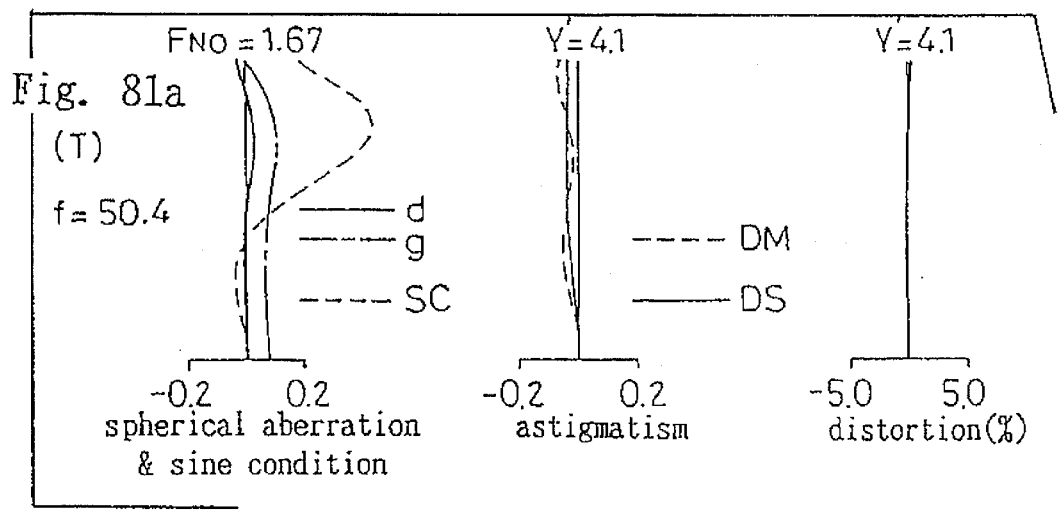
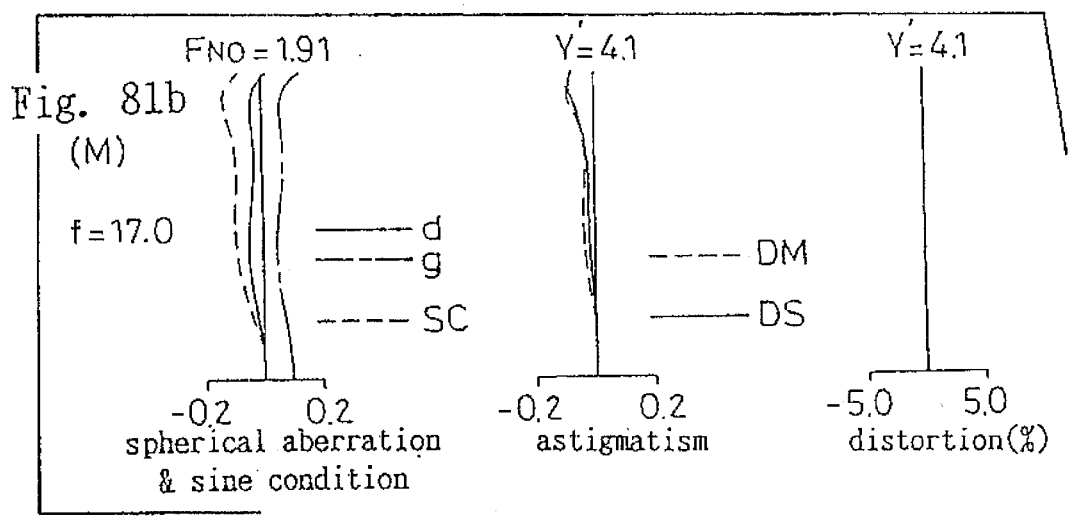
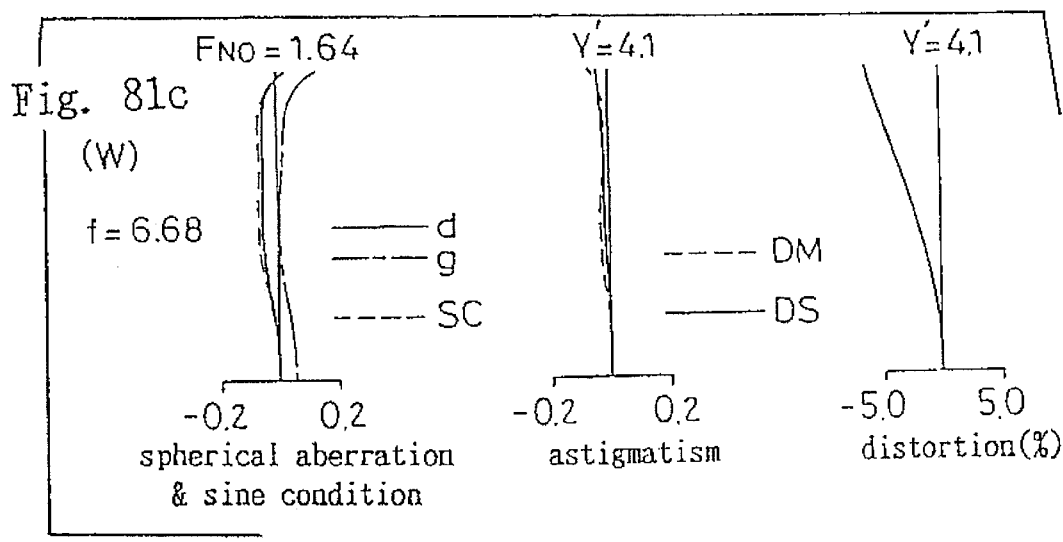

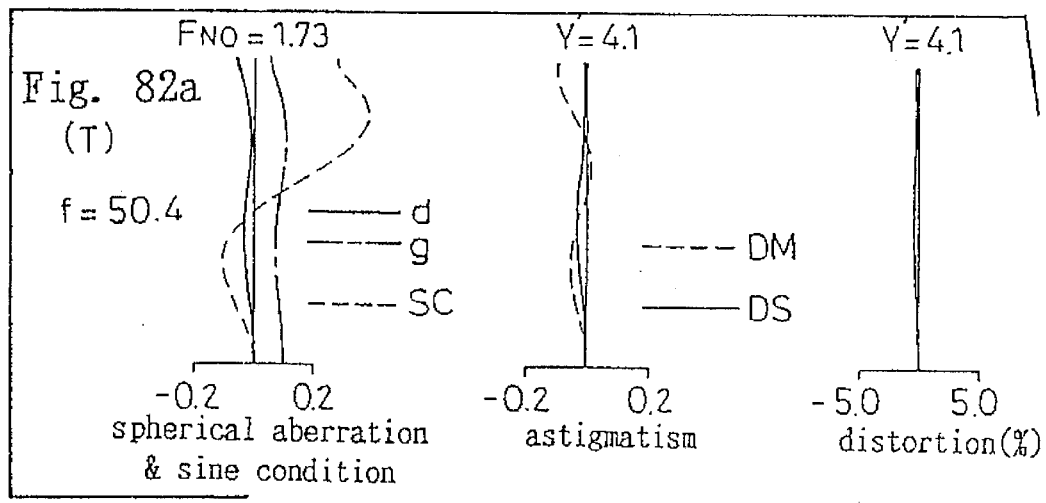
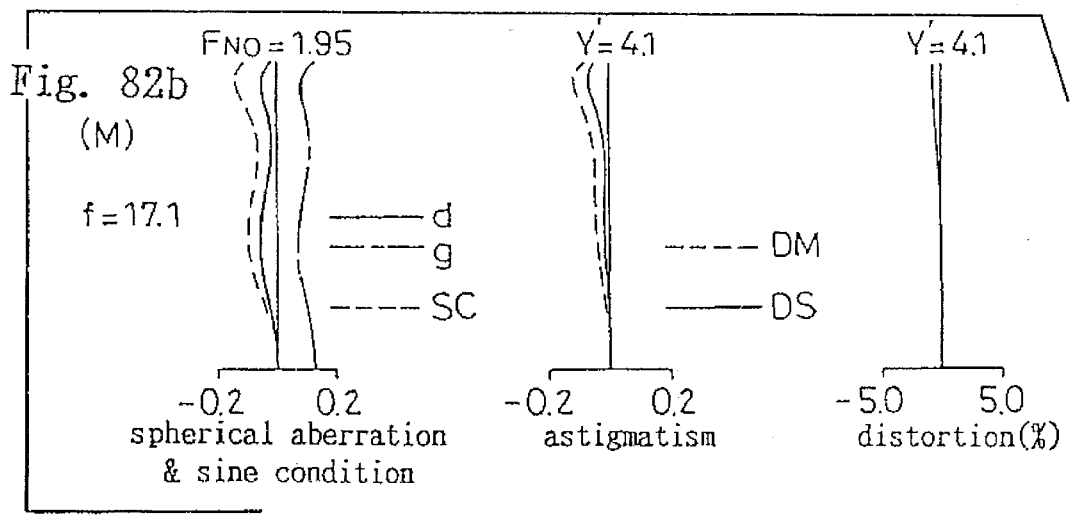
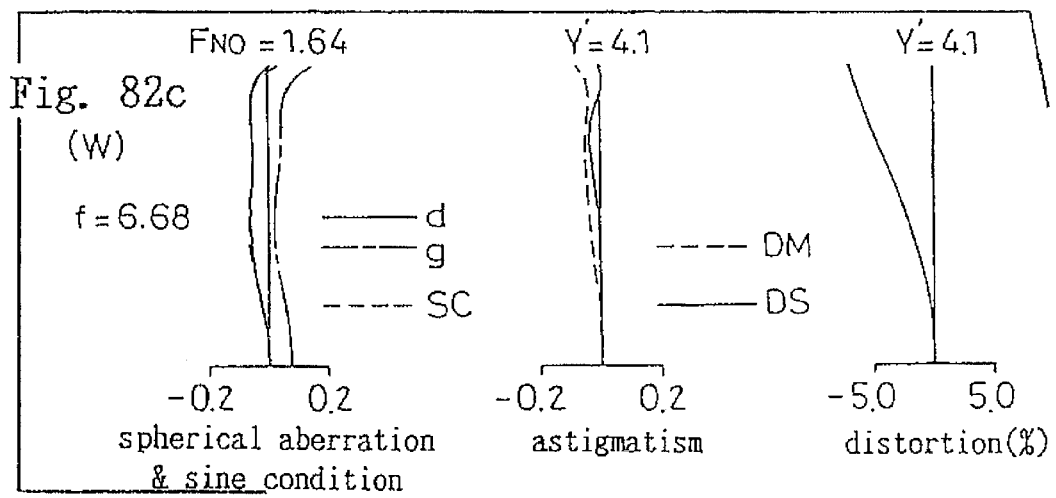

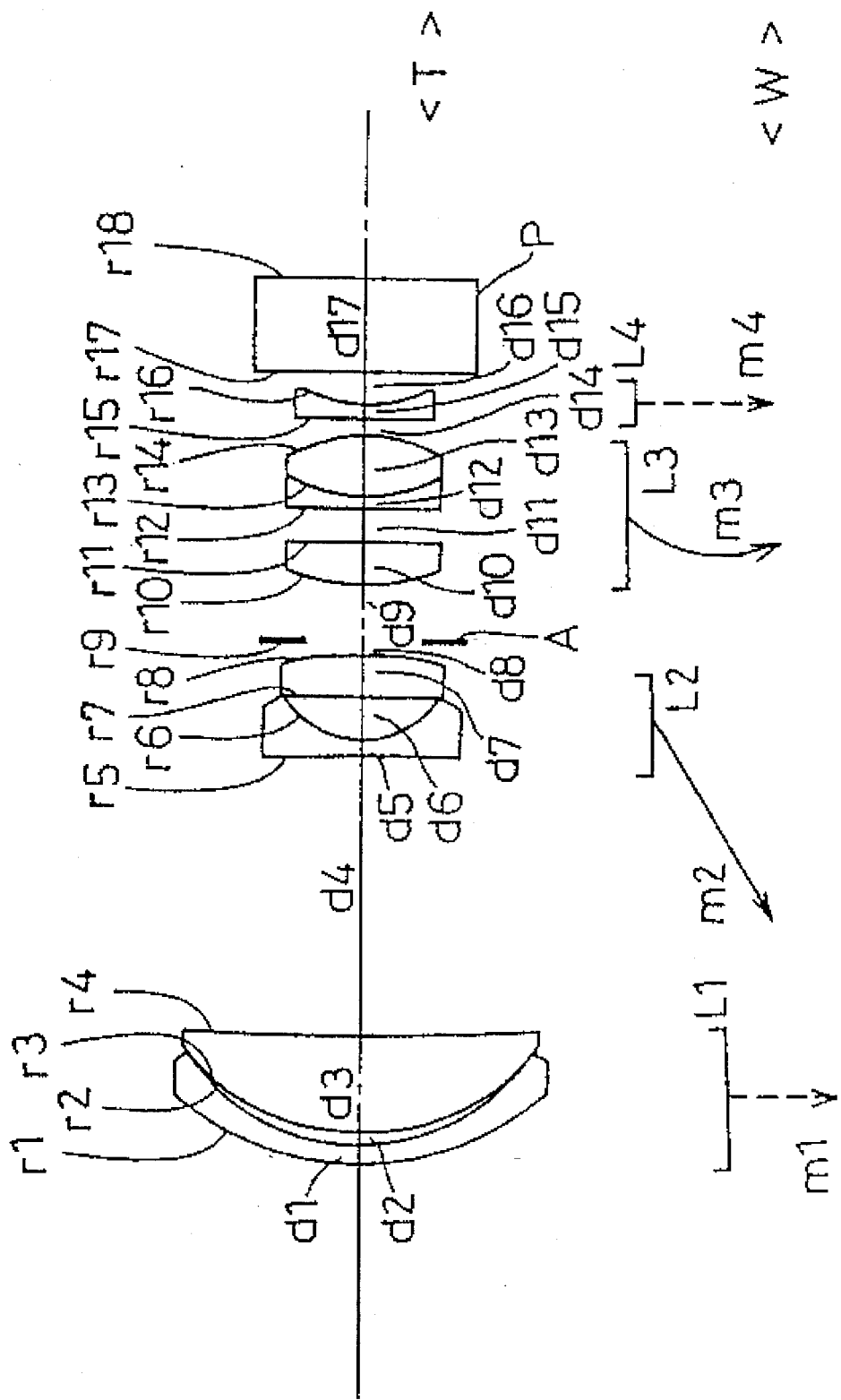

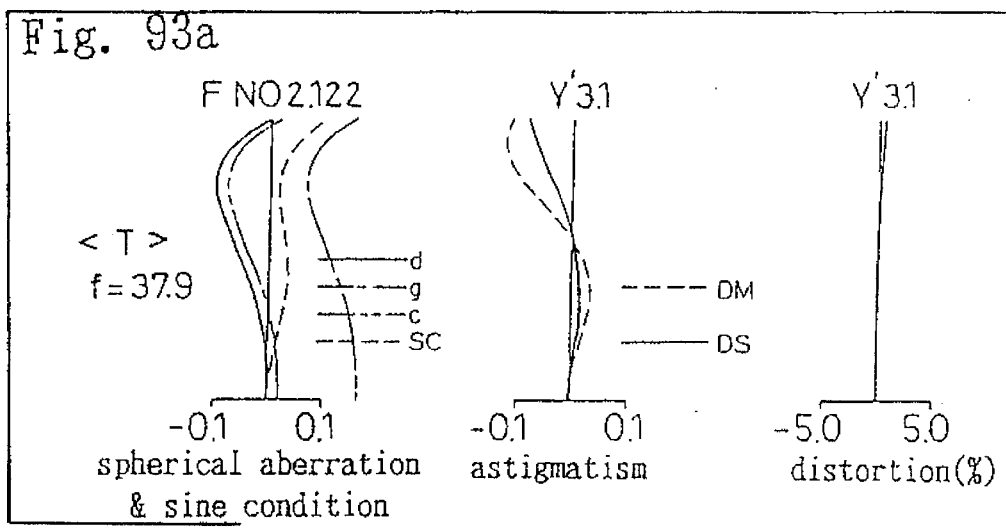
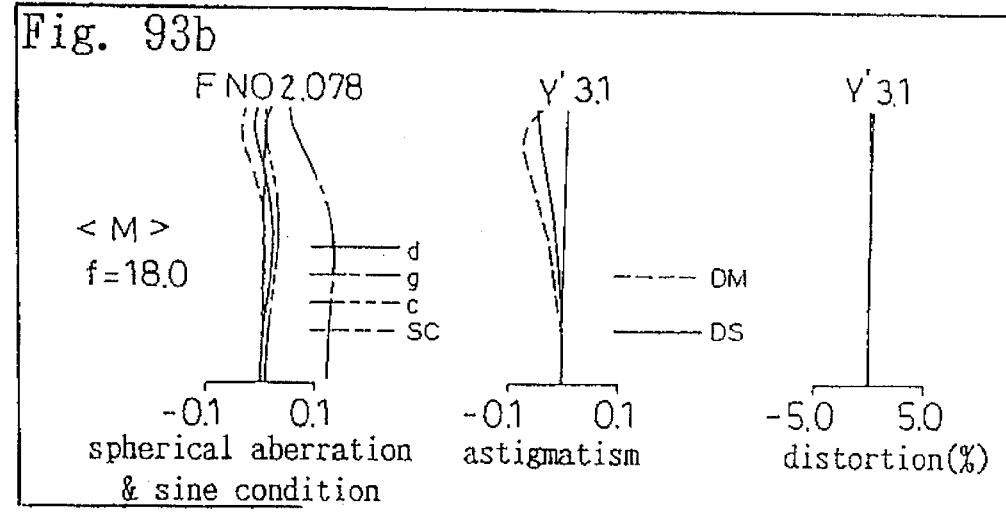
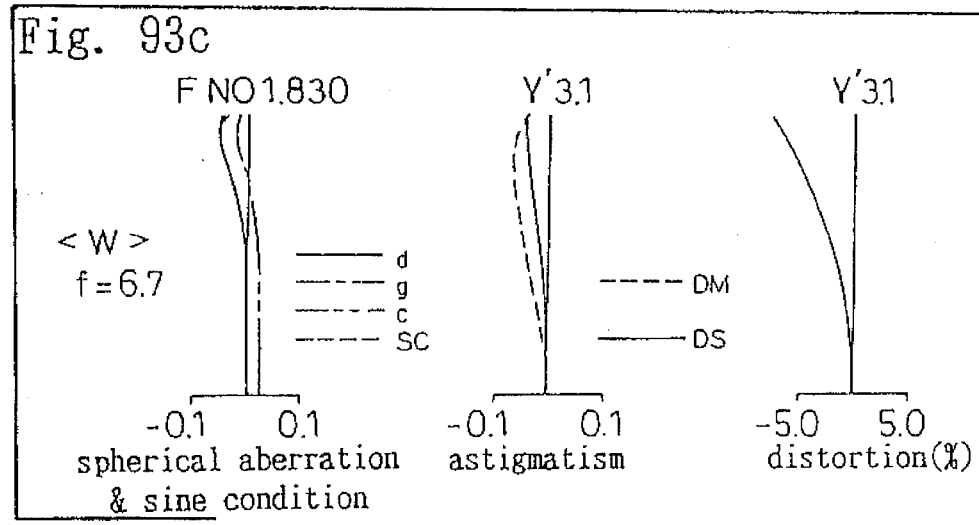

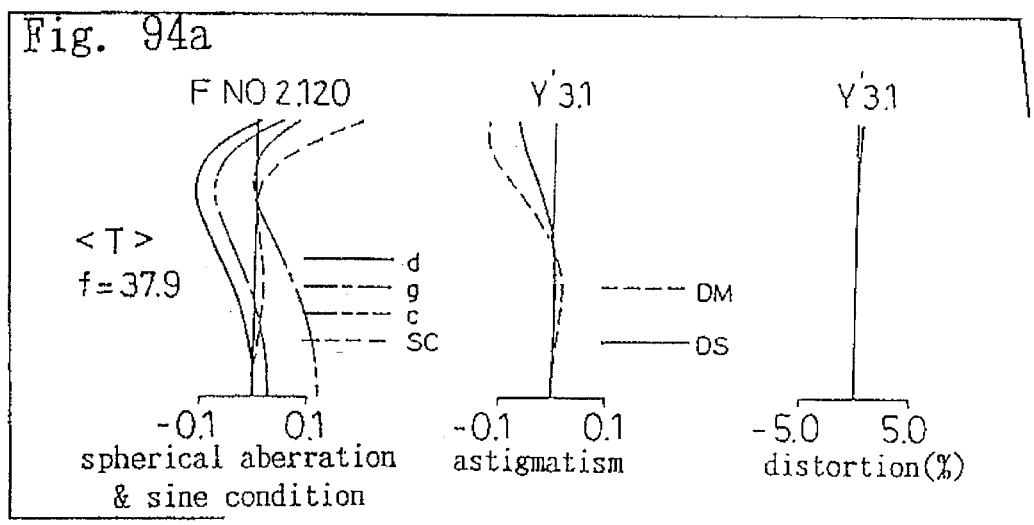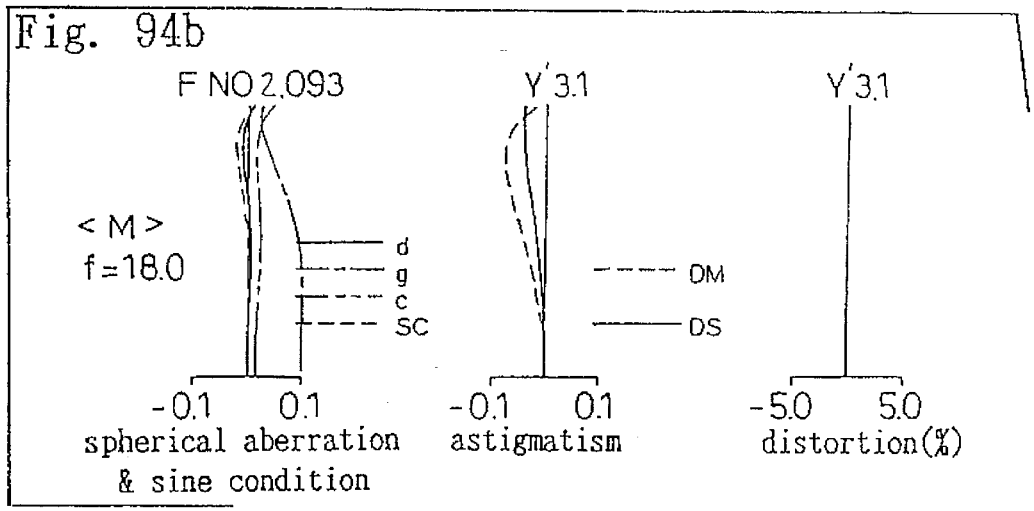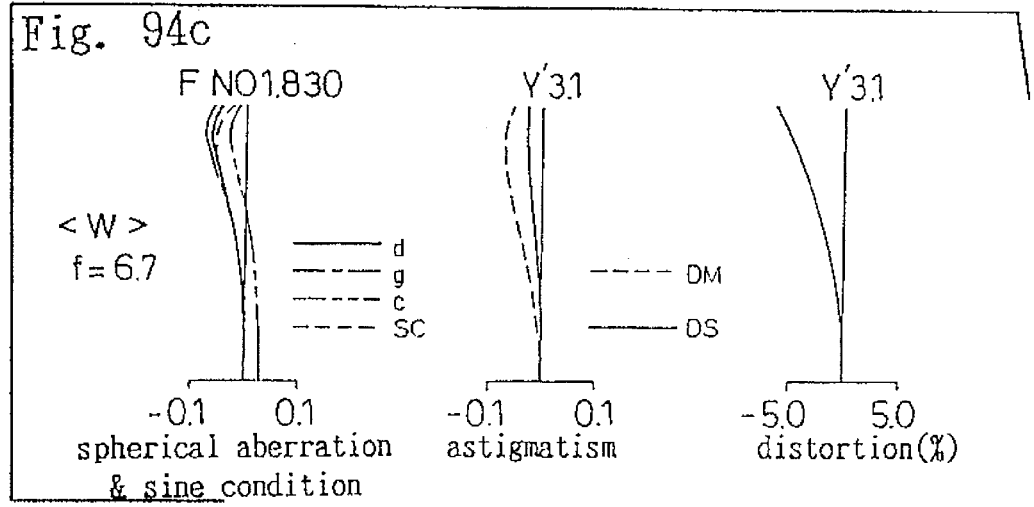

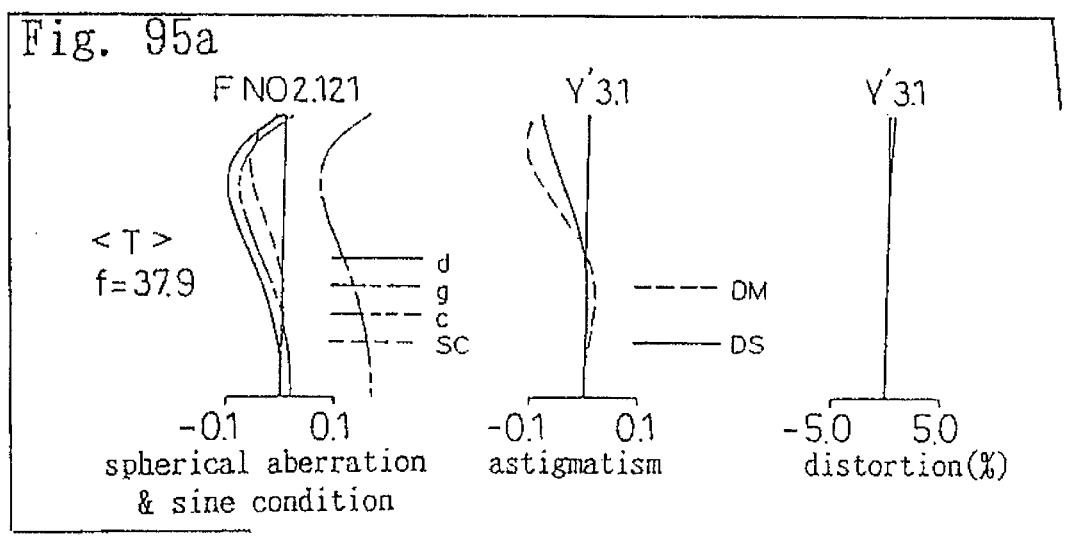
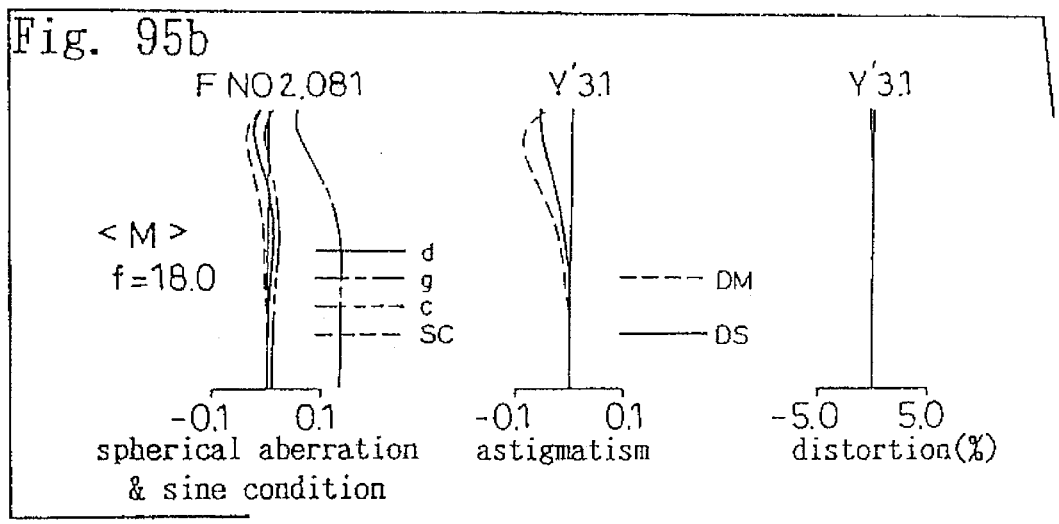
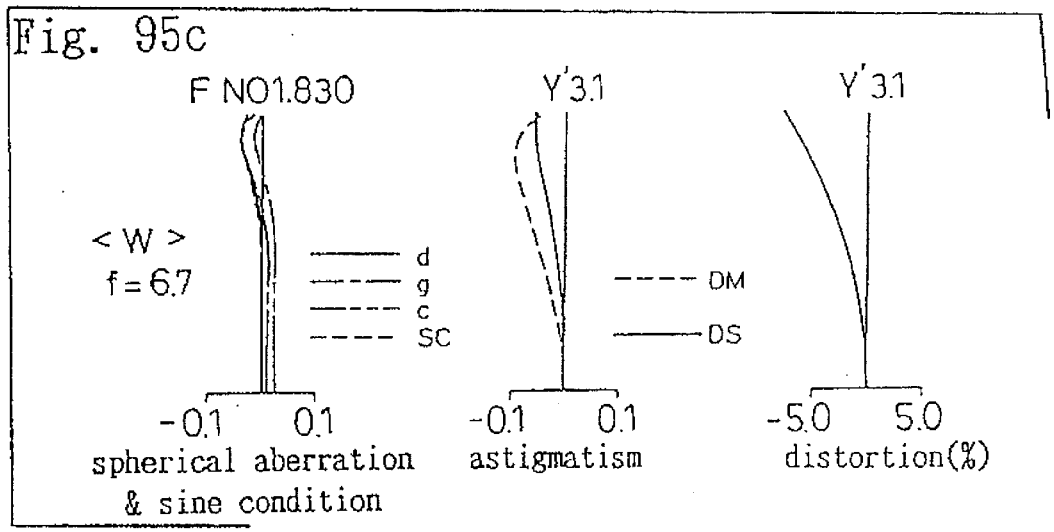

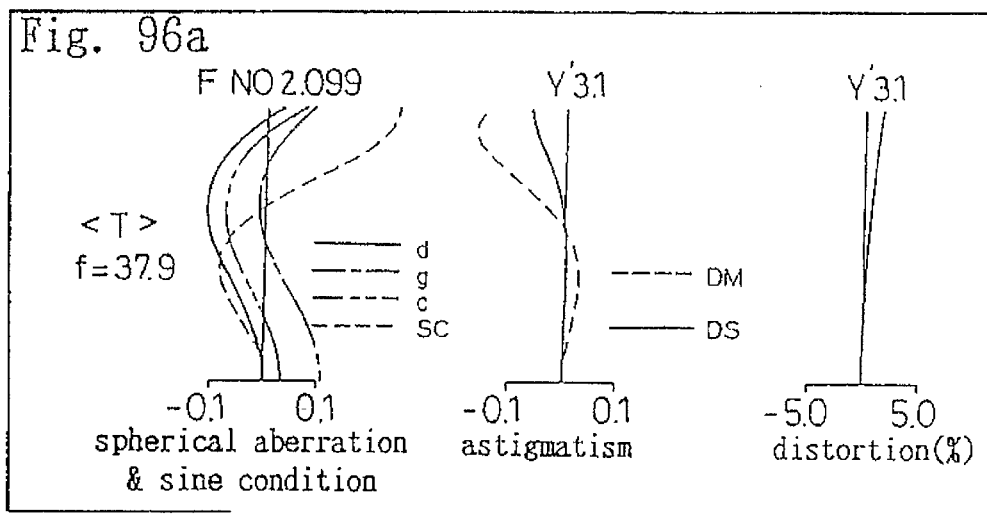
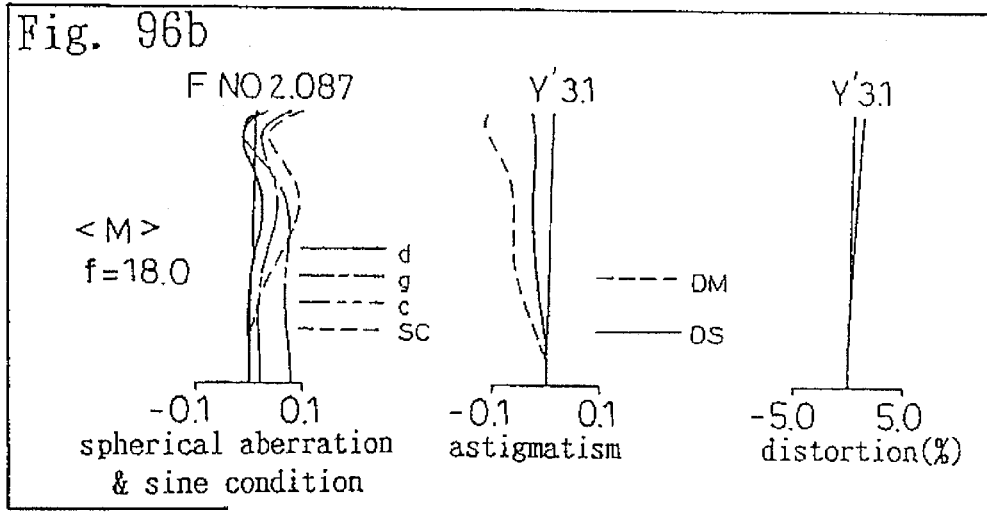
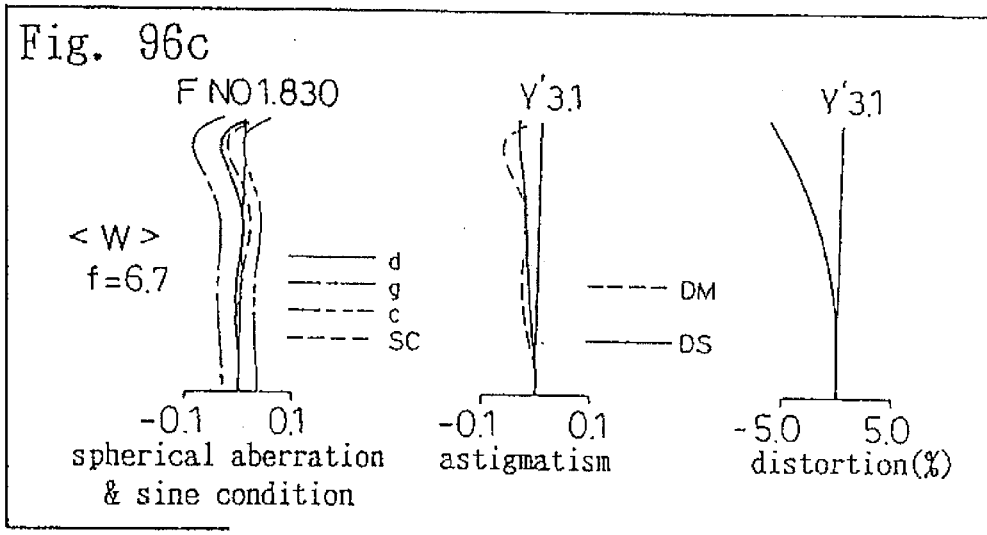

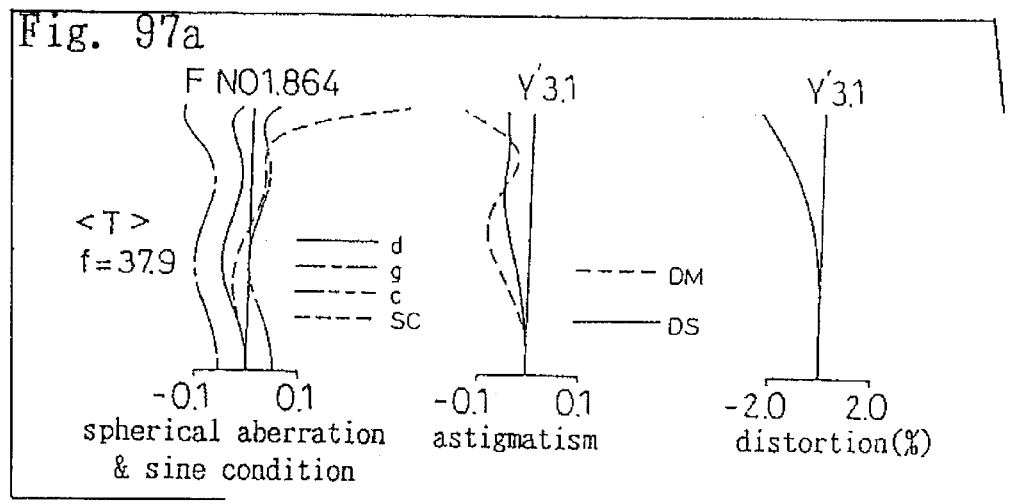
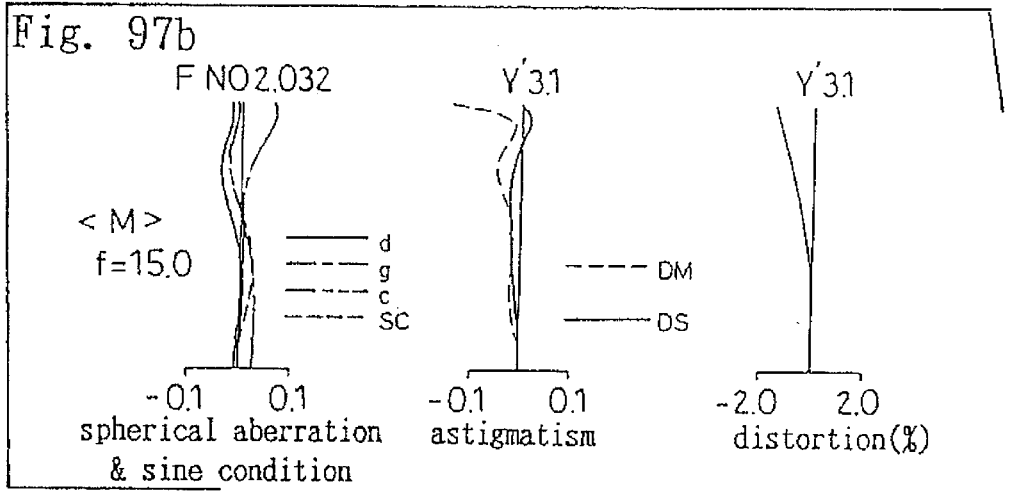
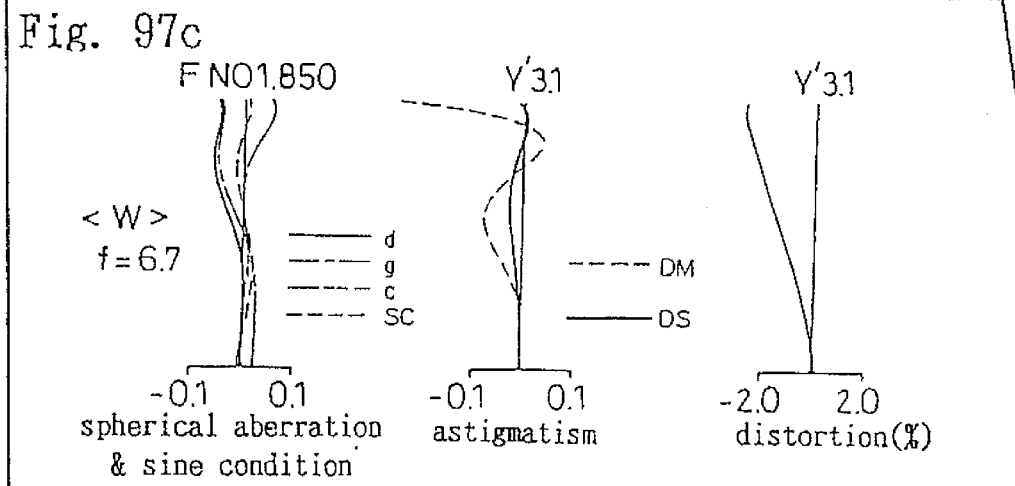

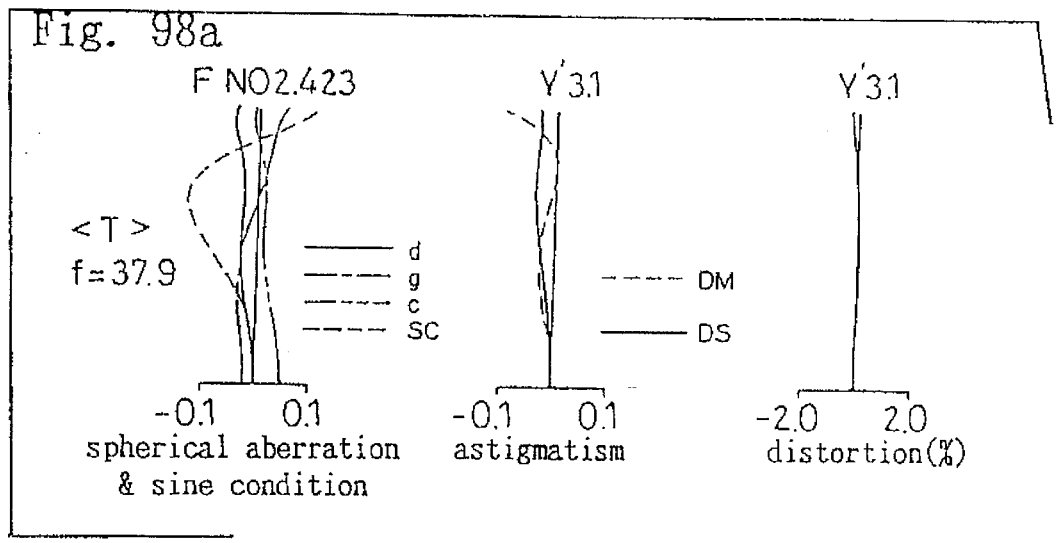
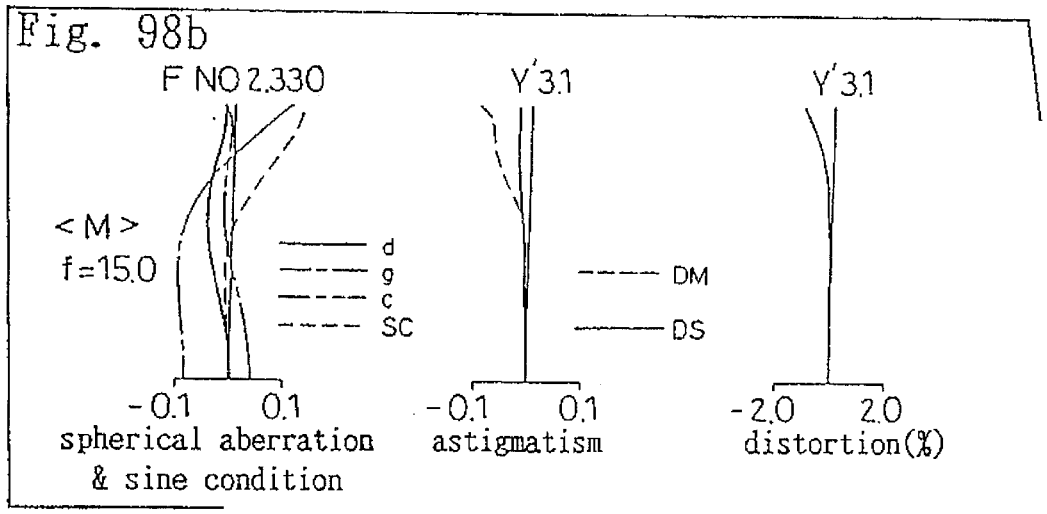
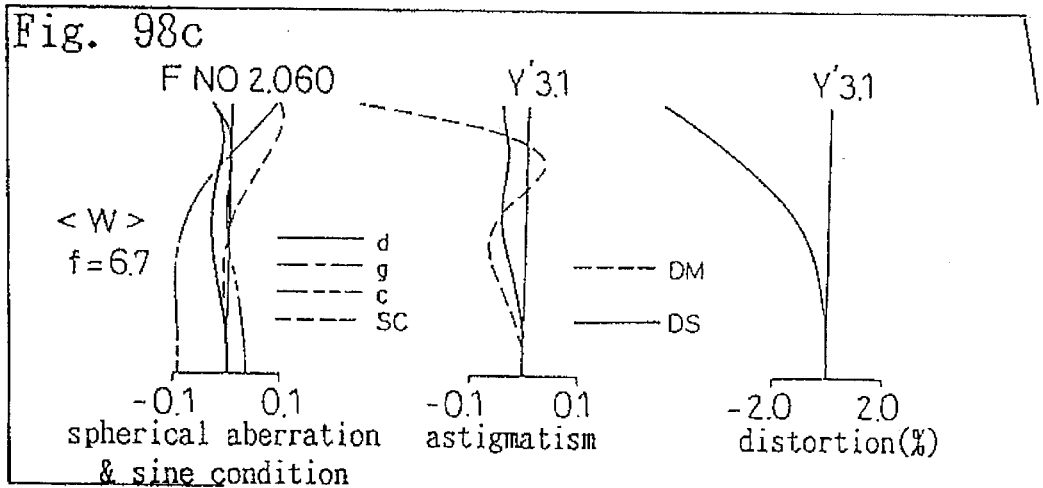

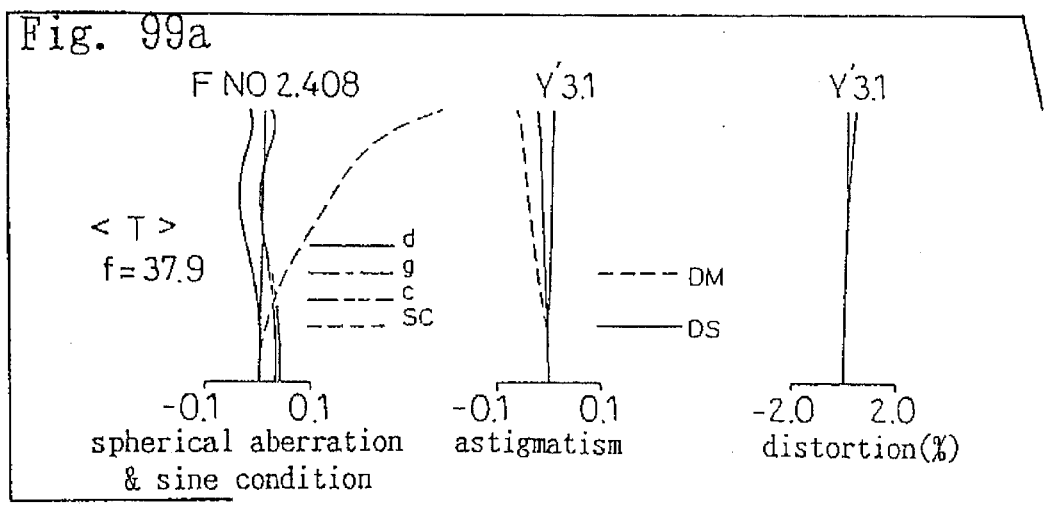
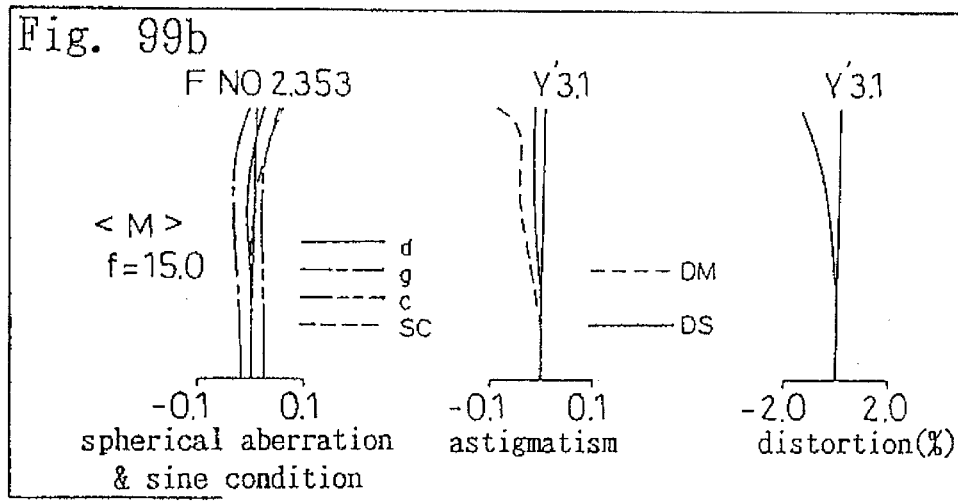
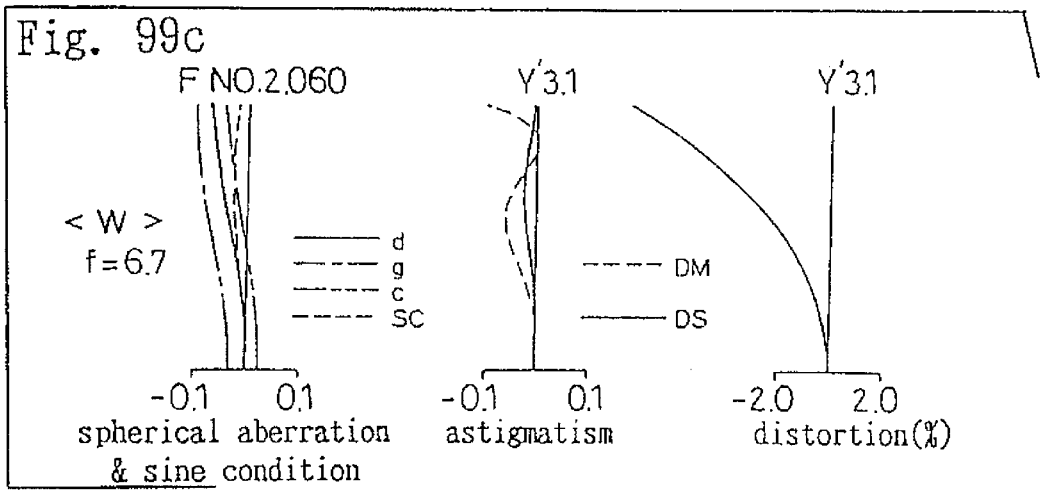

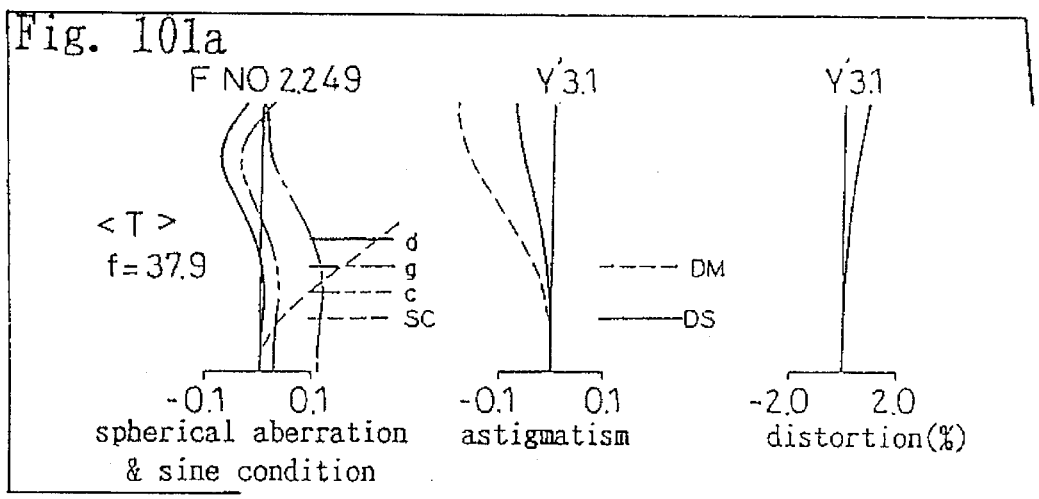
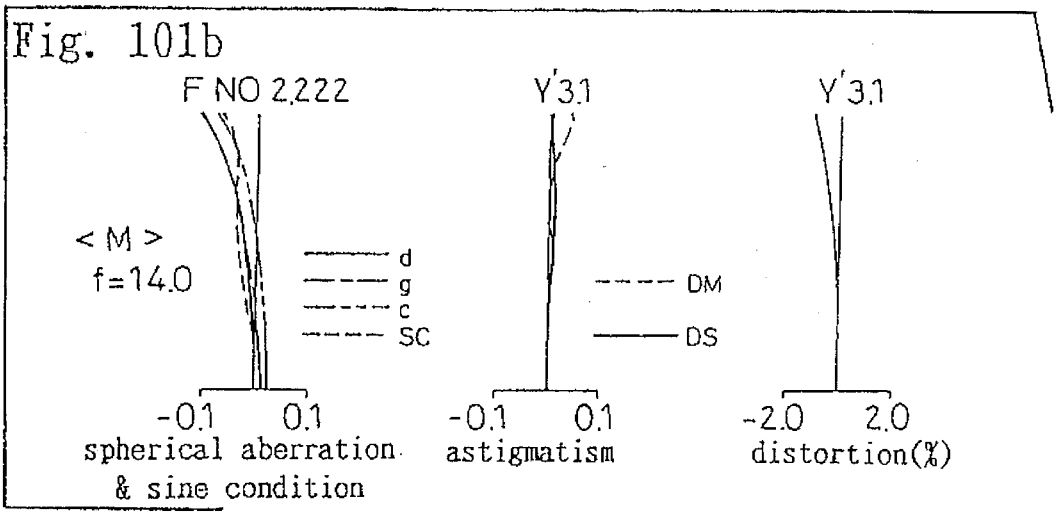
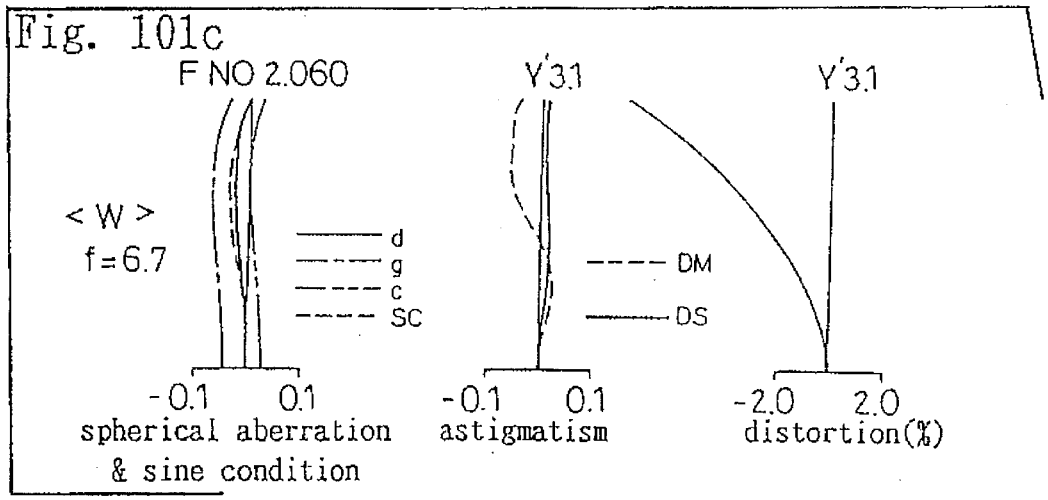

ZOOM LENS SYSTEM

This is a continuation of application Ser. No. 08/053,506, filed on Apr. 27, 1993 now abandoned, which is a continuation of U.S. Ser. No. 07/685,469, filed on Apr. 10, 1991 (now abandoned).

BACKGROUND OF THE INVENTION

1. Field of the Invention

The present invention relates to a zoom lens system. More particularly, the present invention relates to a zoom lens system having a large zoom ratio and applicable to a compact camera such as a video camera, an electronic still camera, etc.

2. Prior Arts

Recently, due to the packaged electronic parts and the improvement of the integration rate, more and more camera bodies such as those of video cameras have been made compact in both weight and volume. In addition, the price and cost of the camera have been rapidly decreasing. However, the relative rate of the weight, volume, and cost of a lens system to those of a camera system is increasing year by year although the absolute rate is decreasing little by little. Under such circumstances, a demand for a low-priced compact camera is increasing.

On the other hand, a lens system has been requested to have higher functions such as a large aperture ratio for compensating for a short of illumination due to a small-sized photographing device and an improved aberration performance for a high picture element and a high resolution.

Currently, a zoom lens system with a zoom ratio of approximately 6× is mainly used for a video camera. As a zoom lens system with such high zoom ratio and having a large aperture ratio with an F-number of approximately F1.6, various zoom lens systems with four or five lens units have been conventionally proposed. However, most of the zoom lens systems have 13 to 15 lens elements, which makes it impossible for them to meet the above-described demand for a low-priced compact camera.

To decrease the number of lens elements of a zoom lens system, an aspheric surface has been widely used recently.

For example, a zoom lens system disclosed in Japanese laid-open Patent Application S57-27219, which does not have a zoom ratio of 6×, consists of a positive, a negative and a positive lens units from the object side. In the zoom lens system consisting of twelve lens elements and having a zoom ratio of 3×, the first lens unit for compensating for a position of an image point (compensator) and the second lens unit for zooming (variator) move along an optical axis and each unit has an aspheric surface.

However, the configuration and arrangement of lens elements of the zoom lens system are not effective, and the number of the lens element is still too many. Also, it is impossible to increase the zoom ratio of the zoom lens system to approximately 6×, because of the following defect of the zoom lens system as well as the above-described inadequate configuration and arrangement of the lens elements.

That is, since the third lens unit does not move at a zooming operation, naturally the first lens unit is forced to move as a compensator lens unit. When a zoom ratio of approximately 6× is attained under above condition, the first lens unit largely moves toward the object side at a shortest and an intermediate focal length conditions. Because of this, the diameter of the front lens becomes larger than that of the front lens of a lens system having four or five lens units, resulting in that the entire lens system becomes considerably heavy.

On the contrary, Japanese laid-open Patent Application No. S61-110112 and Japanese laid-open Patent Application No. S60-107013 disclose four-unit zoom lens systems in which lens elements and aspheric surfaces are effectively arranged to largely reduce the number of lens elements constituting the zoom lens system.

In Japanese laid-open Patent Application No. S61-110112, a four-unit zoom lens system having a positive, a negative, a negative and a positive lens units, from the object side, which are simply arranged attains a zoom ratio of 6× with only eight lens elements by effectively using four aspheric surfaces.

Although having an excellent lens arrangement, it is difficult for the zoom lens system to meet the above-described demand because of its poor aberration performance.

In Japanese laid-open Patent Application No. S60-107013, a four-unit zoom lens system consisting of a positive, a negative, a positive and a positive lens units, form the object side, is shown. And the zoom lens system has eight lens elements in total. Although its performance and size cannot be judged since no numerical data are disclosed, it is obvious that the zoom lens system does not satisfy the current demand for a high zoom ratio and a large aperture ratio, because the lens system has a specification of a zoom ratio of 4× with an F-number of F2.0.

Japanese laid-open Patent Applications No. S63-304218, No. S64-44907 and No. H1-223408 propose three-unit zoom lens systems consisting of a positive, a negative and a positive lens units from the object side, where the first lens unit has one or two lens elements and the second lens unit has one lens element, and aspheric surfaces are employed to reduce the number of the lens elements. In the zoom lens systems, the second lens unit, which plays the most important role and moves along an optical axis at a zooming operation, consists of one single lens element having a negative refractive power. For reason of this, since the chromatic aberration is not corrected in the second lens unit in the zoom lens systems, the variation in chromatic aberration by a zooming is large, so that their performances cannot be guaranteed at a zooming with a high zoom ratio. These zoom lens systems realize zoom ratios of only 2× to 3× with F-numbers of only 2 to 4. It is impossible to prevent the above variation in chromatic aberration even by employing aspheric surfaces. Also, judging from the current required performance (including chromatic aberration), it is apparent that a zoom lens system having such lens arrangement can realize a zoom ratio of 3× at most; it is difficult to realize a zoom ratio of approximately 6×.

Japanese laid-open Patent Applications No. S64-91110 and No. H1-185608 disclose novel zoom lens systems.

Japanese laid-open Patent Application No. S64-91110 discloses a three-unit zoom lens system having almost the same lens configuration and arrangement as the zoom lens system which the Applicant of the present invention proposed in Japanese laid-open Patent Application No. S64-88511. Although the zoom lens system has only three lens units, it works as a four-unit zoom lens system since the second lens unit is divided into two lens group: negative lens group consisting of two negative lens elements and a positive lens group consisting of a positive lens element. It realizes a zoom ratio of 3× with only 8 to 11 lenses which are usually applied to a three-unit zoom lens system. A zooming operation is performed by the independent movements of the negative (substantial second unit) and the positive (substantial third unit) lens units. However, in the four-unit zoom lens system, since the chromatic aberration is not completely corrected in the second and third units which independently move, the variation in chromatic aberration can not be fully prevented at a high zoom ratio because of the change of the relative position of the second and third units. In this zoom lens system, the variation in chromatic aberration is prevented by specifying a zooming while maintaining a zoom ratio of 3×. However, it is considerably difficult to realize a zoom ratio of 6× in the zoom lens system.

Japanese laid-open Patent Application No. H1-185608 discloses a zoom lens system where a zoom ratio of 6× is realized while having a fewer number of lenses than the zoom lens system proposed in Japanese laid-open Patent Application No. S64-91110 by employing many aspherical surfaces. In the zoom lens system, the second lens unit consists of a negative single lens element and the third lens unit consists of a positive single lens element, and the fourth lens unit is also simplified. Even in this zoom lens system, it is difficult to realize a currently required performance since the chromatic aberration cannot be completely corrected due to a large variation in chromatic aberration even though a zooming is fully specified. In addition, to correct the chromatic aberration, the movement amount of the second and third movable lens units should be largely increased, which makes the total length of the lens system longer. Especially, the diameter of the front lens is larger than that of general zoom lens systems of the same specification. From this respect, the zoom lens system cannot achieve a compactness. The zoom lens system disclosed in Japanese laid-open Patent Application No. H1-185608 has achieved an object of reducing the number of lenses. However, it does not meet the current demand in compactness and chromatic aberration performance.

Japanese laid-open Patent Application No. H2-39011 discloses a four-unit zoom lens system having a positive, a negative, a positive and a positive lens units from the object side and where the variation in chromatic aberration is prevented. In this zoom lens system, three aspheric surfaces are employed, and a zoom ratio of 6× with a F-number of F1.4 is realized with eight lens elements. The zoom lens system possibly meets the current demand in cost, performance and size; however, it does not meet the demand in weight since the diameter of the front lens is not small enough. Also, in the zoom lens system, the coma in a sagittal direction which is not fully expressed in an aberration diagram is very large, and therefore the off-axial performance greatly deteriorates.

On the other hand, to attain a compactness and to reduce the number of lens elements in a zoom lens system, the Applicant proposed three-unit zoom lens systems (positive, negative and positive) having only eight lens elements where no aspheric surfaces are employed in Japanese laid-open Patent Applications No. S64-74519 and No. S64-74520. Although these zoom lens systems are very compact and have an excellent performance, the required zoom ratio is not realized; the zoom ratio achieved by the zoom lens systems is only 2× to 3×.

Japanese laid-open Patent Applications No. S54-30855, No. S54-80143 and No. H2-39116 disclose three-unit zoom lens systems (positive, negative and positive) for a single-lens reflex camera and a compact camera where each unit is moved to reduce the number of lens elements and to realize a high zoom ratio. The zoom ratio is 2.4× with ten lens elements in said S54-30855, 3× with eleven in said S54-80143, and 3× with twelve in said H2-39116. As described above, the required zoom ratio is not realized; especially, the second and third lens units are not fully simplified, and the demand for a low cost is not met.

By the way, users require a camera with a wide angle, a high zoom ratio and a large aperture ratio needless to say with a compactness and a low price.

A camera of a standard specification has a zoom lens system of 2ω=50° (at the shortest focal length condition) with a minimum F-number of 1.4 to 1.8. For consumer lens system, zoom lens systems with an F-number of approximately 1.2 or those with zoom ratios of 8×, 10×, 12× and 16× by increasing focal length at the longest focal length condition where lens elements are allowed to increase in size are also provided. However, these lens systems are large in size and a low cost is not realized.

With respect to a requirement for a wide angle, a zoom lens system having an angle of view of 2ω=60° which is very effective for an indoor photographing is strongly required since no such zoom lens system is provided for consumer.

The following are the reasons why a zoom lens system having a wide angle of view has not been proposed.

It is relatively easy to increase a zoom ratio of the above-mentioned zoom lens system of a standard specification (2ω=50°, a zoom ratio of 6×, and a minimum F-number of 1.4 to 1.8) by increasing the focal length at the longest focal length condition.

FIG. 1 shows a zoom lens system proposed in Japanese laid-open Patent Application No. S63-305317, which is enlarged to an adequate size. In FIG. 1, the movements of each lens unit from the longest (T) to the shortest (W) focal length conditions are shown by the arrows. The prior art shown in FIG. 1 is an 8× zoom lens system of 2ω=50° with an F-number of 1.7. It is not so much larger in size and number of lens elements than a 5× zoom lens system.

However, in the zoom lens system, it is very difficult to increase an angle of view at the shortest focal length condition because of the following reasons (a) and (b).

(a) Because of the wide angle of view, the off-axial light is eclipsed by the front lens to cause a short of illumination unless a comparatively large front lens is provided. To prevent the short of illumination, a very large front lens is required, so that the weight of the zoom lens system is largely increased.

(b) Since the off-axial light enters at a considerably large angle, the distortion and the field curvature greatly deteriorates. Therefore, a greater number of lens elements are required to correct the aberration, which increases the cost.

As a specific example, a zoom lens system of a little different specification is shown as there are no zoom lens system having a wide angle that can be shown as an example. FIG. 2 shows a zoom lens system proposed in Japanese laid-open Patent Application No. S54-17042. In FIG. 2, the arrows show the movements of each lens unit from the shortest (W) to the longest (T) focal length conditions. The zoom lens system has an angle of view of 2ω=56°, an F-number of 1.4 and a zoom ratio of 9.5×. With only a little wider angle of 2ω=56°, the size of the front lens apparently increases. What increases the size of the front lens is not so much an increased zoom ratio as a wider angle of view.

FIG. 3 shows a zoom lens system with a wider angle of view proposed in Japanese laid-open Patent Application No.

S62-153913. The zoom lens system has an angle of view of approximately 2ω=83° and a zoom ratio of 8×. This is a specification for professional use. Although such wide angle is not required for consumer use, the zoom lens system in FIG. 3 shows how difficult to realize a wide angle. In FIG. 3, the arrows show the movements of each lens unit from the shortest (W) to the longest (T) focal length conditions.

As described above, it is very difficult to achieve a wide angle of more than 2ω=50°. To realize a wide angle, it is inevitable that the size and the cost are largely increased. In video cameras for consumer use for which a compact size and a low price are required, such wide-angle zoom lens system has never been employed.

With respect to video cameras, no such compact and low-cost wide-angle zoom lens systems have been found in the patent gazettes. On the other hand, with respect to single lens reflex cameras, some wide-angle zoom lens systems of approximately 2ω=60° have been proposed, such as the zoom lens system proposed in Japanese laid-open Patent Application No. S62-270910 shown in FIG. 4. In FIG. 4, the arrows show the movements of each lens unit from the shortest (W) and the longest (T) focal length conditions.

However, even in such prior arts, a zoom cam is in such prior arts, required since the number of lens elements is quite large and four or more lens units non-linearly move along an optical axis at a zooming operation, which makes it impossible to reduce the cost and the size.

As described above, no compact and low-cost wide-angle zoom lens systems with a high zoom ratio have been proposed which meets the demand of users for a wider angle.

SUMMARY OF THE INVENTION

One object of the present invention is to provide a low-priced compact zoom lens system having a zoom ratio of approximately 6×, an F-number of approximately 1.6 to 1.8 and an improved aberration and consisting of a fewer number of lens elements.

Another object of the present invention is to provide a zoom lens system in which a zooming starts at a shortest focal length condition (2ω is approximately 60°) of a zoom ratio of approximately 8× while being compact and having a fewer number of lens elements.

BRIEF DESCRIPTION OF THE DRAWINGS

These and other objects and features of this invention will become clear from the following description taken in conjunction with the preferred embodiments with reference to the accompanied drawings in which:

FIGS. 21a, 21b, and 21c to 36a, 36b, and 36c show the aberrations of the above-described embodiments 1 to 16, respectively.

FIGS. 44a, 44b, and 44c to 50a, 50b, and 50c show the aberrations of the embodiments 17 to 23, respectively.

FIGS. 60a, 60b, and 60c to 68a, 68b, and 68c show the aberrations of the embodiments 24 to 32 of the present invention, respectively.

FIGS. 76a, 76b, and 76c to 82a, 82b, and 82c show the aberrations of the above-described embodiments 33 to 37, respectively.

FIGS. 83 to 92 are the cross sectional views of the lens arrangements corresponding to the embodiments 40 to 49 of the present invention, respectively.

FIGS. 93a, 93b, and 93c to 102a, 102b, and 102c show the aberrations of the above-described embodiments 40 to 49, respectively.

DETAILED DESCRIPTION OF THE PREFERRED EMBODIMENTS

Figure 1:
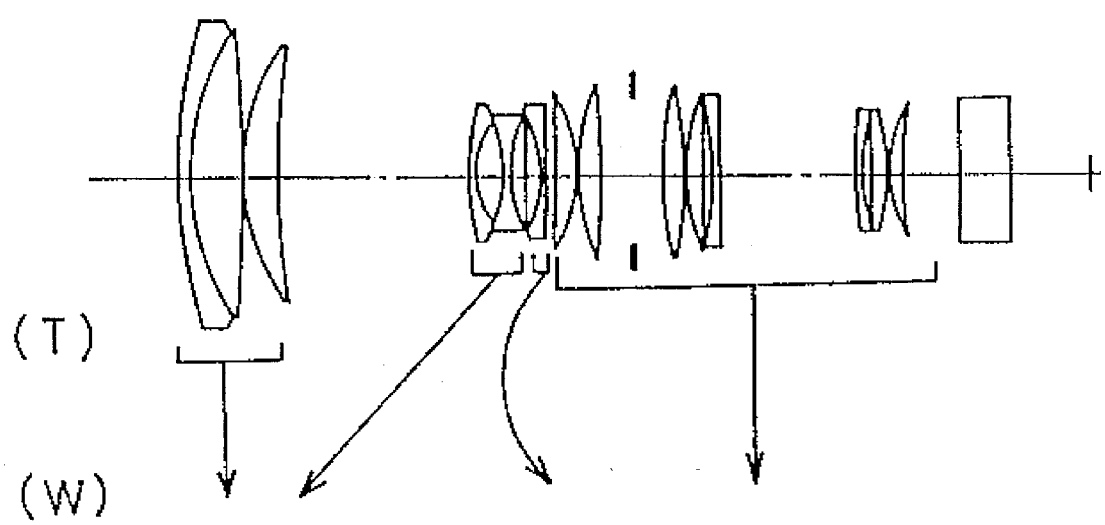
FIGS. 1 to 4 are cross sectional views of the lens arrangements of prior arts.
Figure 2:
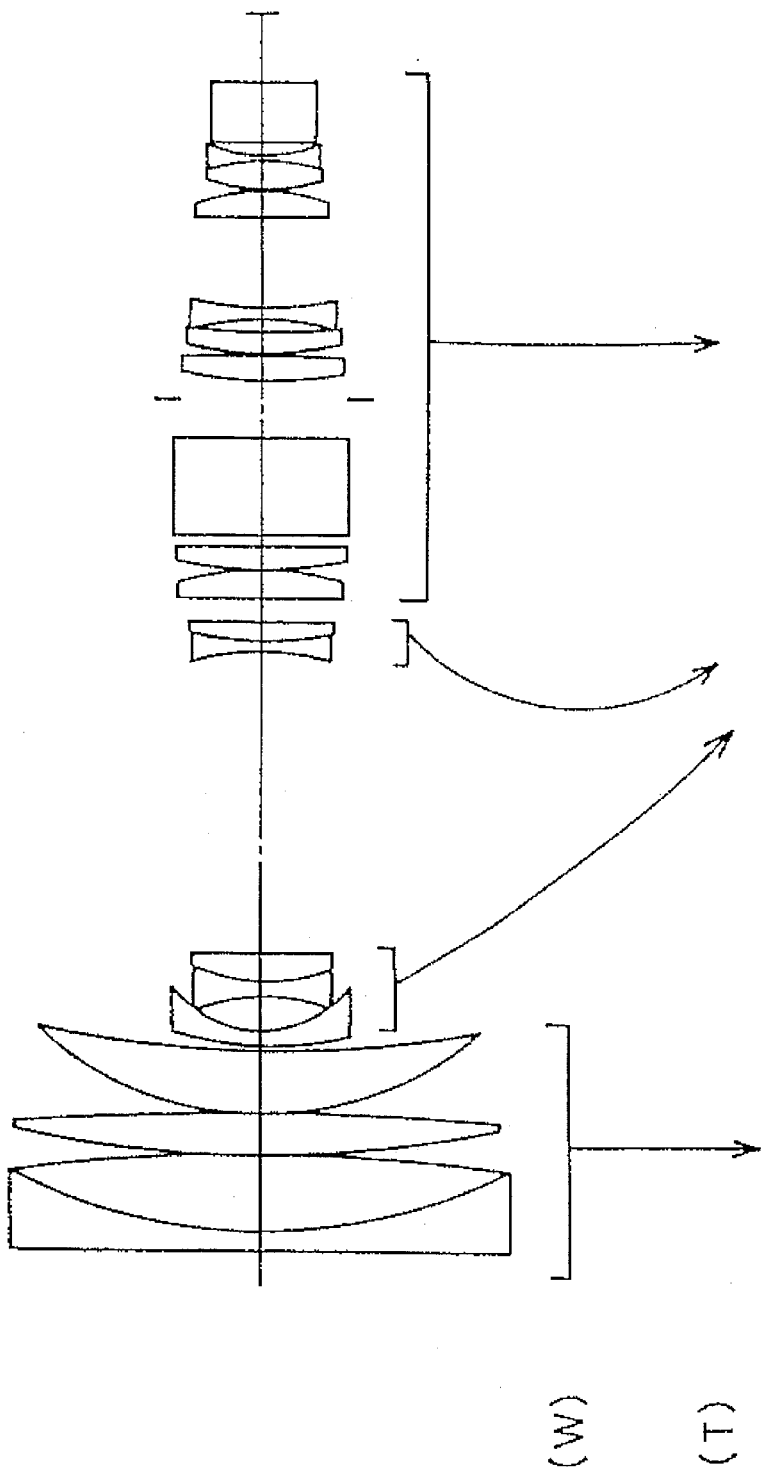
Figure 3:
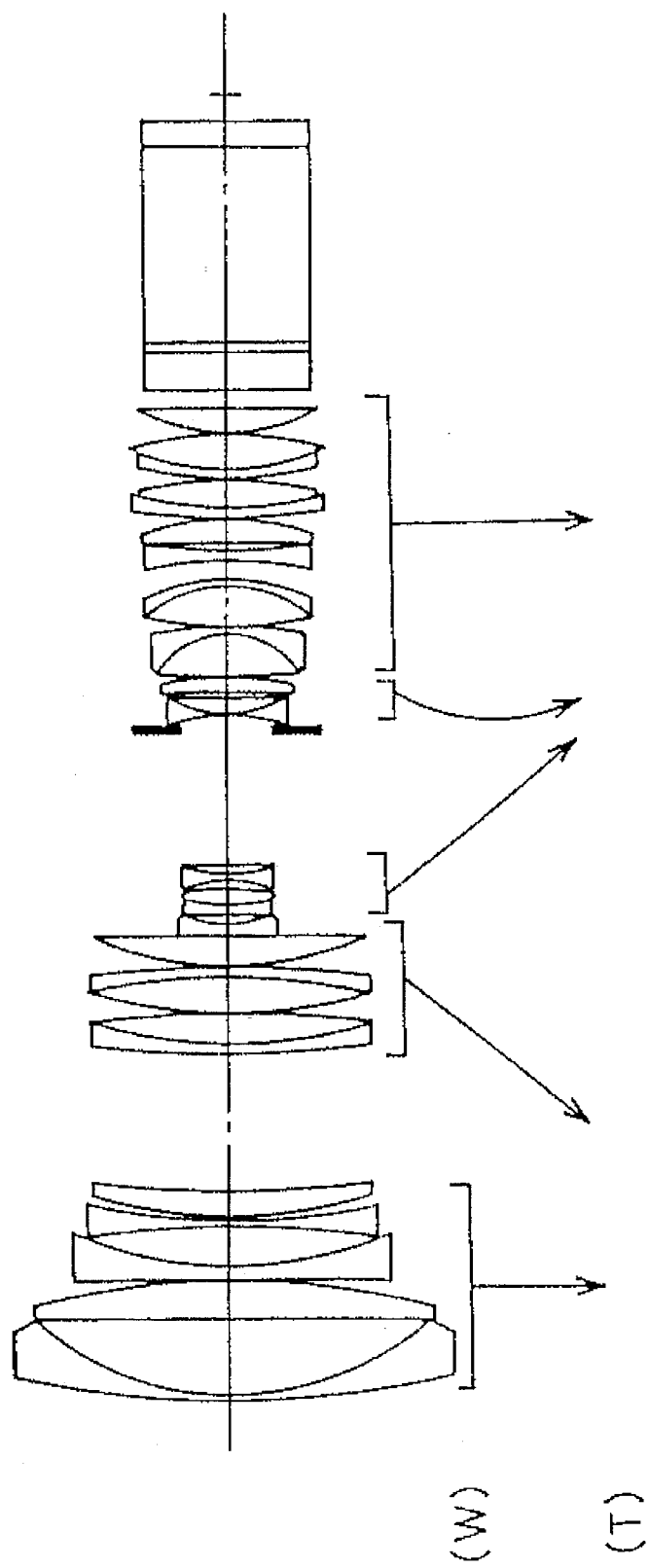
Figure 4:
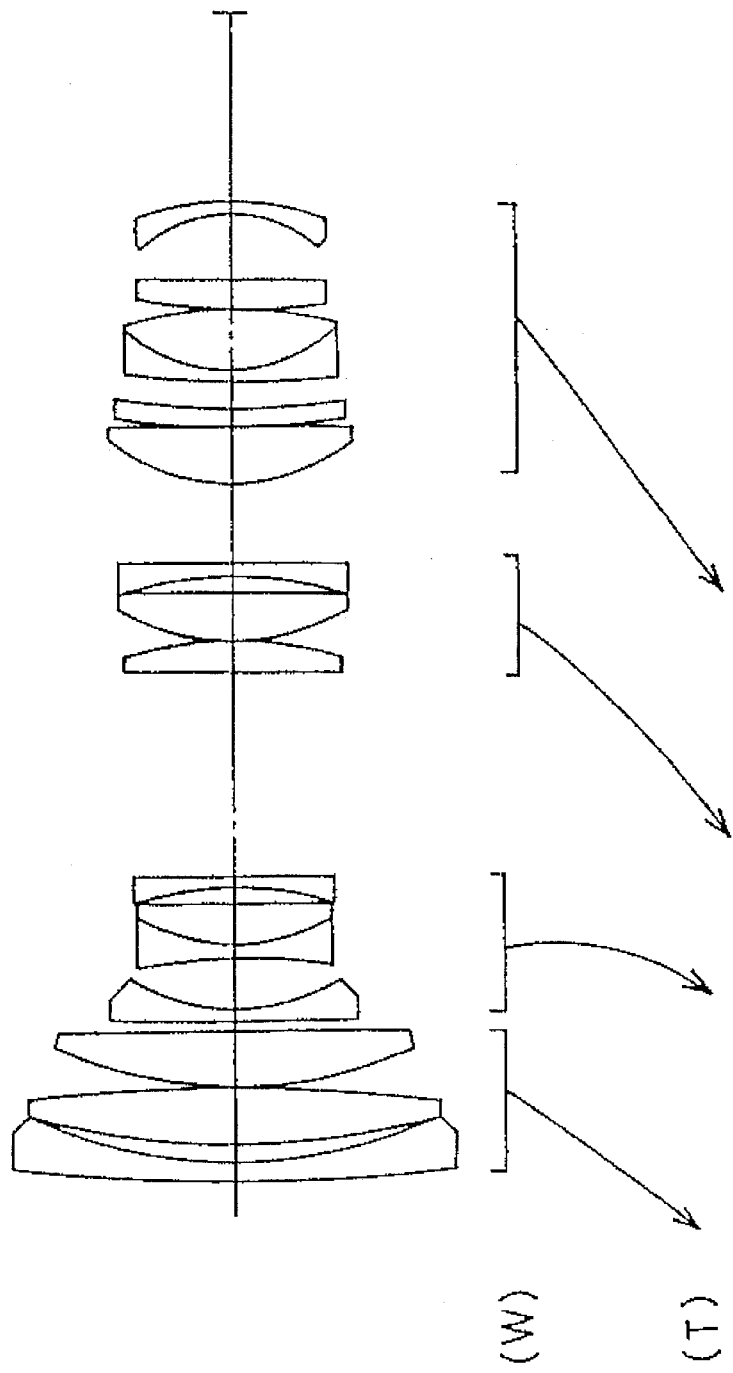

Generally, to realize a compact zoom lens system, it is required to decrease the total length of the lens system and the movement amount of lens elements. To make a lens system (including a lens barrel arrangement) compact and to secure a sufficient back focal length, the first type of the present invention basically employs a three-unit zoom lens system having a positive, a negative and a positive lens units from the object side.

The second lens unit, whose refractive power is increased, is moved along an optical axis to perform a zooming operation. In response to the zooming, at least the third lens unit having a positive refractive power is moved to prevent a change of an image point and further to realize a compact lens system.

The third lens unit can correct an image point position with less movement amount since it has a stronger refractive power than the first lens unit.

Therefore, in a three-unit zoom lens system, to realize a zoom ratio of approximately 6× to 8×, it is required that at least the third lens unit moves along an optical axis together with the second lens unit at zooming operation.

The more movable lens units a zoom lens system has, the compacter the zoom lens system becomes and the more excellent its aberration correction performance becomes. However, it must be noted that the cost increases due to the complex lens barrel arrangement.

To realize a compact lens system and to secure an excellent aberration correction when the increase of the cost must be prevented as much as possible and the number of movable lens units in the zoom lens system is limited to two, a lens arrangement is suitable where the first lens unit is fixed, the second and third lens units are moved at a zooming operation, and the third lens unit moves toward the object side and returns on the way at a zooming operation from the longest to the shortest focal length conditions.

In a zoom lens system where the first lens unit is fixed, if the third lens unit is also operated as a focusing lens in corporation with an auto focus system, it will have an advantage that a cam for deciding a relation with the movement of the second lens unit is unnecessary.

In addition, by making the third lens unit movable, as the zoom and focusing lens, it is possible to photograph an object which is extremely close to the camera.

On the contrary, when the third lens unit is fixed at a zooming operation, the first lens unit naturally works as a compensator. At this time, the movement of the first lens unit makes a convex curve toward the object side or the first lens unit largely moves toward the object side at the shortest to the middle focal length conditions. Consequently, the peripheral light is greatly eclipsed by the first lens units at the middle and the shortest focal length conditions, so that the diameter of the first lens unit (front lens) must be fairly large to secure a sufficient illumination. Because of this, the weight of the zoom lens system increases, which prevent a realization of a compact zoom lens system.

Next, a thickness of a zoom lens system will concretely be described. To give a zooming function mainly to the second lens unit, the diameters and angles of the light fluxes passing through the first and second lens unit are largely changed at a zooming operation. Because of this, the variation in aberration by a zooming operation is largely effected by whether the arrangement of the first and second lens units are suitable or not. Conventionally, most of the zoom lens systems consisted of the first and second lens units having three lens elements, respectively; however, recently, by employing aspheric surfaces to the lens element, it has become possible to correct a monochromic aberrations in a zoom lens system having a simpler lens arrangement. The above-described zoom lens system proposed in Japanese laid-open Patent Application No. H1-185608 corresponds to this. However, as described above, when the second (or the first) lens unit is composed of one lens element, the variation in chromatic aberration increases. To prevent this, a free for a design of the zoom lens system is limited, so that the size of the zoom lens system fairly increases.

To make the lens system compact, it is required that the first and second lens units respectively complete the chromatic aberration correction. That is, it is required that the positive first lens unit is provided with a negative high dispersion lens element, that the negative second lens unit is provided with a positive high dispersion lens element, and that each lens unit is composed of three or less lens elements.

Next, the third lens unit refracts the divergent luminous flux having passed through the second lens unit to form an image. Usually, in a zoom lens system having a zoom ratio of 6× and an F-number of approximately 1.6, the third lens unit is composed of five or six lens elements to completely correct a remainder of the aberrations. However, when aspheric surfaces are employed, the aberrations can be corrected even if the third lens unit is composed of five or less lens elements. In the present invention, the following lens arrangement for the third lens unit is required. To complete the chromatic aberration correction in the third lens unit, at least one negative high dispersion lens element is required to be employed. Because of its strong positive refractive power, the third lens unit generates a large amount of aberrations. To correct this large amount of aberrations in the third lens unit while decreasing the number of lens elements, the negative lens element of the third lens unit is preferably composed of a lens element having a strong refractive power. The negative lens element must carefully be arranged so that it becomes the main lens element which corrects the chromatic aberrations such as the axial chromatic aberration and the lateral chromatic aberration as well as the monochromic aberrations such as the spherical aberration, the coma, and the field curvature.

In addition, the third lens unit necessarily includes one or two positive lens elements on the object side of at least one of the above-mentioned negative high dispersion lens elements. By immediately refracting the divergent luminous flux having passed through the second lens unit with the positive lens element arranged on the object side, the increase of the size and the generation of aberration are suppressed. However, if three or more lens elements are arranged on the object side, the following problems are caused: (1) the number of lens elements in the zoom lens system increases; (2) since most of the positive refractive power is provided on the object side, most of the luminous flux is condensed after having passed through the positive lens elements arranged on the object side, so that a sufficient back focal length is not obtained; and (3) since a strong refractive power is required for the negative lens element to correct the axial chromatic aberration, too much higher-order aberration is generated.

In such zoom lens system, the following condition should be satisfied:

$$0.20 < \phi I/\phi III < 0.31 \tag{1}$$

where $\phi$ I represents the compound refractive power of the first lens unit, and $\phi$ II represents the compound refractive power of the second lens unit.

The zoom lens system proposed in Japanese laid-open Patent Application No. S64-74519 is three-unit lens system having the same lens arrangement as that of the zoom lens system according to the present invention. However, in the zoom lens system according to the present invention, the refractive power $\phi$ I of the first unit is weaker and the refractive power $\phi$ II of the second unit is relatively stronger than those of the above prior art, so that it becomes possible to design desirable feature in a 6× zoom lens system.

The condition (1) shows a balance of the refractive power of the first and second lens units. To allot most of the zooming function to the second lens unit while arranging the other lens units so that the zoom lens system maintains compactness and required performance, the condition (1) must be satisfied. If the lower limit is exceeded, the divergence extent of the divergent luminous flux having passed through the second unit increases, and the amount of the aberration generated in the second and third lens units extremely increases as well as the size of the third lens units increases, so that it becomes difficult to constitute each lens unit with a simple arrangement and the performance of the lens system largely deteriorates. On the other hand, if the upper limit of the condition (1) is exceeded, the third lens unit largely moves toward the object side at the shortest focal length condition at a zooming with a high zoom ratio. As a result, the distance between the second and third lens units at the shortest focal length condition should be fairly large, which also prevents the realization of a compactness. In addition, a diameter of the front lens unit should also be large.

Moreover, it is preferable that the above-mentioned third lens unit includes only one high dispersion lens element and consists of five or less number of lens elements as well as the condition (1) is satisfied.

An example of a compact zoom lens system which satisfies such condition and has an excellent aberration correction performance is a zoom lens system where the first lens unit consists of, from the object side, a negative meniscus lens element whose object-side surface is convex to the object side and a positive lens element whose object-side surface has a stronger refractive power. In the zoom lens system, to further simplify the entire arrangement of the system, the second lens unit preferably consists of, from the object side, a negative lens element whose object-side surface has a stronger refractive power and a positive lens element arranged at a certain distance from the negative lens element. By arranging a negative lens element in front of a positive lens element in the first and second lens units as described above, it becomes possible to decrease the passing angle made by an off-axial luminous flux and the lens system, and thereby to decrease the off-axial aberration. Simultaneously, it becomes unnecessary to provide a front lens with a large diameter. The lens arrangement described above is similar to that proposed in Japanese laid-open Patent Application No. S64-74519. However, in the zoom lens system of the prior art, the aberration amount of the second unit extremely increases since the relative ratio of the refractive power of the second lens unit to that of the first lens unit is high and the zoom ratio increases. Therefore, the zoom lens system cannot be put into practical use. To overcome this problem, aspherical surfaces are employed for the second lens unit in the present invention. By employing a plurality of aspherical surfaces for the second lens unit, and preferably by employing aspherical surfaces also for the first lens unit, the amount of aberration generated at a zooming can be reduced to a desirable amount. Here, it should be noted that by employing at least one aspherical surface for the second lens unit, the aberration amount can also be reduced.

Moreover, while the first lens unit consists of two lens elements, the following condition (2) is preferably satisfied:

$$v_2 - v_1 > \quad (2)$$

where $v_1$ represents the Abbe number to the d-line of the first lens element having a negative power in the first lens unit, and $V_2$ represents the Abbe number to the d-line of the second lens element with a positive power in the first lens unit.

Further, while the second lens unit consists of two lens elements as described above, the following conditions (3) and (4) should be satisfied:

$$-0.4 < r_6/r_7 < 1.0 \quad (3)$$

$$v_3 - v_4 > 16 \quad (4)$$

where $r_6$ represents the paraxial radius of curvature of the image-side surface of the negative lens element in the second lens unit, $r_7$ represents the paraxial radius of curvature of the object-side surface of the positive lens element in the second lens unit, $v_3$ represents the Abbe number to the d-line of the negative lens element in the second lens unit, and $v_4$ represents the Abbe number to the d-line of the positive lens element in the second lens unit.

The conditions (2) and (4) determine the dispersion difference of the two lens elements in the first and second lens units, respectively. To realize a chromatic aberration correction in respective lens units, high dispersion lens elements are employed for the negative lens element of the first lens unit and for the positive lens element of the second lens unit. The above two lens elements have the refractive power respectively opposite to compound refractive power of each lens unit. However, since only one lens element having a refractive the same as that of each lens unit is provided in each lens unit, a sufficient amount of dispersion difference between the two lens elements should be taken. If the lower limit is exceeded with respect to the conditions (2) and (4), to correct the chromatic aberration, a considerably strong refractive power is required for each lens element. Because of the consequent generation of a large amount of aberration, it becomes impossible to correct the aberration even if aspherical surfaces are employed.

The condition (3) shows a balance of the facing surfaces of the two lens elements of the second lens unit. In other word, it decides the configuration of an air lens between the two lens elements. This air lens greatly effects the off-axial light at the shortest focal length condition and the axial light at the longest focal length condition. If the lower limit is exceeded with respect to the condition (3), distortion is largely generated and an image plane characteristic extremely deteriorates especially at the shortest focal length condition. On the other hand, if the upper limit is exceeded, spherical aberration and coma deteriorate especially at the longest focal length condition, so that it becomes difficult to realize a required performance even if aspherical surfaces are employed.

Further, the following condition (5) should be satisfied:

$$fw \cdot \omega \: I > 0.15 \quad (5)$$

where fw represents a compound focal length of the entire zoom lens system at the shortest focal length condition.

The condition (5) decides the lower limit of the refractive power of the first lens unit. In a three-unit lens system having a positive, a negative and a positive lens units from the object side, the refractive power of the first lens unit mainly determines the size of the entire zoom lens system. If the lower limit of the condition (5) is exceeded, the movement amount of the second lens unit and the diameter of the front lens increase. Therefore, to realize a compact zoom lens system, the refractive power of the first lens unit should be so decided as to satisfy the above condition (5).

Examples of a third lens unit for attaining the object of the present invention with a fewer number of lens elements are a lens unit having three or four lens elements: one positive, one negative, and one or two positive lens elements from the object side, a lens unit having four lens elements: two positive, one negative and one positive lens elements from the object side, and a lens unit having three lens elements: two positive and one negative lens elements from the object side. The third lens unit having such lens arrangement has an excellent ability to correct aberration and to secure a back focal length.

Of the above-described lens arrangements for the third lens unit, the former two arrangements are similar to that proposed in Japanese laid-open Patent Application No. S64-74519. However, even with such arrangements, it is difficult to realize a required performance in a zoom lens system of the desired specification. That is, in a zoom lens system with a zoom ratio of 6× and an F-number of 1.6 the aberration which cannot be corrected in the first and second lens units and the aberration generated in the third lens unit cannot be corrected, which means spherical aberration and field curvature remarkably deteriorate. The increase of the movement amount of the third lens unit due to the zoom ratio higher than that proposed in Japanese laid-open Patent Application No. S64-74519 also accelerates this deterioration.

To effectively solve these problems, the present invention employs at least one aspherical surface for the third lens unit, so that the ability of the third lens unit to correct aberration, especially spherical aberration is largely improved. Although an aspherical surface naturally corrects the other off-axial aberrations, it is the most effective to improve the ability and degree of freedom of the aspherical surface to control spherical aberration, because it enables the other surfaces to concentrate on the correction of off-axial aberrations.

To correct spherical aberration mainly, the aspherical surface is preferably arranged as close to the object as possible, whereas to correct the other off-axial aberrations as well as spherical aberration, as close to the image as possible. Since, basically, the problem is the aberration generated by a positive lens element in the third lens unit, it is preferable to arrange at least one of the aspherical surfaces for a positive lens element in the third lens unit. Further, it is preferable that the aspherical surface has a configuration in which the amount of the shift from the reference surface corresponding to paraxial radius of curvature increases as the aspherical surface goes away from an optical axis. When a plurality of aspherical surfaces are employed for the third lens unit, such configuration is not always required to be taken. As described above, to realize a third lens unit having the required abilities, at least one aspherical surface must be employed for the third lens unit.

Next, an arrangement of an iris in the zoom lens system of the present invention will be described.

To improve aberration correction performance, an iris should be arranged at the center of a lens system. In the three-unit zoom lens system according to the present invention, it is the most desirable to arrange an iris between the second and third lens units which is the center of the lens system. It can be fixed, or to pursue a further compactness, it can be moved at a zooming operation.

Moreover, in the three-unit zoom lens system according to the present invention, a focusing operation can be performed by the first lens unit or the third lens unit. In photographing an object which is extremely close to the camera, it is effective to move the third lens unit or a part of the third lens unit.

Further, it is effective to give the third lens unit a floating function for suppressing a variation in aberrations at a focusing operation by dividing the third lens unit into some small units and by slightly changing the relative positional relation among the small units while using the third lens unit also for focusing. Similarly, at a zooming operation, it is effective to slightly change the relative positional relation among the small units to sufficiently suppress a variation in aberrations.

For an aberration correction which requires higher accuracy such as a correction of spherical aberration at the longest focal length condition and that of subtle coma, etc., it is very effective to arrange an aspherical surface in the first lens unit.

Next, a zoom lens system in which a second lens unit has three lens elements (a negative meniscus lens element whose image-side surface has a stronger refractive power, a negative bi-concave lens element, and a high dispersion lens element whose object-side surface has a stronger refractive power) will be explained. The above lens arrangement is preferable because the second lens unit largely moves along an optical axis at a zooming operation as well as has a strong refractive power to generate a great amount of aberration.

At that time, it is preferable that the third lens unit arranged behind the second lens unit comprises, from the object side, an object-side unit having one or two positive lens elements and a strong positive refractive power for refracting the divergent luminous flux having passed through the second lens unit to form a convergent luminous flux and an image-side unit having a negative high dispersion lens element and one or two positive lens elements, and satisfies the following condition (6):

$$1.3 < \phi III^A / \phi I < 6.0 \qquad (6)$$

wherein $\phi III^A$ represents the compound refractive power of the object-side unit of the third lens unit.

If the lower limit of the condition (6) is exceeded by decreasing the compound refractive power $\phi III^A$ of the object-side unit, the divergent luminous flux cannot be sufficiently condensed. Consequently, the image-side unit arranged behind the object-side unit is required to increase in size, which increases the aberration amount in the image-side unit. Also, the back focal length becomes unnecessarily long, so that it becomes difficult to shorten the total length of the lens system. On the other hand, if the upper limit is exceeded by excessively increasing the compound refractive power of the object-side unit, even the negative high dispersion lens element of the image-side unit for correcting chromatic aberration cannot sufficiently correct chromatic aberration (especially axial chromatic aberration). Also, the back focal length becomes too short.

Conventionally, the third lens unit, which refracts the divergent luminous flux having passed through the second lens unit to form an image in the end, consists of five or more number of lens elements. However, in the present invention, the third lens unit consists of five or less number of lens elements by adopting the above-described lens arrangement. The object-side unit strongly refracts the divergent luminous flux having passed through the second lens unit to form a convergent luminous flux, and introduces the convergent luminous flux to the image-side unit, so that the image-side unit can be made compact. Also, the image-side unit corrects mainly off-axial aberrations as well as chromatic aberration.

In conventional four- or five-unit zoom lens systems, the third or fourth lens unit or a part of either of them receives the divergent luminous flux having passes through the second lens unit as the object-side unit of the third lens unit does in the zoom lens system of the present invention. These lens units refract the luminous flux to an afocal condition at most, so that the lens units arranged behind them are required to have a size larger than that of the present invention.

Similar to the above-described lens unit, the first lens unit preferably consists of a negative high dispersion meniscus lens element whose object-side surface is convex to the object side and a positive lens element whose object-side surface has a stronger refractive power.

Next, an example of the above-described third lens unit consisting of three or four lens elements will be explained.

In the first three-element arrangement, the third lens unit comprises, from the object side, an object-side unit having a positive lens element and an image-side unit having a negative and a positive lens elements.

In the second three-element arrangement, the third lens unit comprises, from the object side, an object-side unit having a positive lens element and an image-side unit having a positive lens element and a negative meniscus lens element whose image-side surface is convex.

In the third lens unit with either of the above-described effective three-element lens arrangements, two or more aspherical surfaces are preferably employed.

Next, in the first four-element arrangement, the third lens unit comprises, from the object side, an object-side unit having two positive lens elements and an image-side unit having a negative lens element whose image-side surface has a stronger refractive power and a positive lens element.

In the second four-element arrangement, the third lens comprises, from the object side, an object-side lens unit having a positive lens element and an image-side lens unit having a negative hi-concave lens element and two positive lens elements.

With the above-described effective four-element lens arrangement, only one aspherical surface is required for the third lens unit.

Next, an example of a third lens unit comprising two lens elements (a positive and a negative lens elements from the object side) while having at least one aspherical surface will be explained.

In this case, it is preferable that the second lens unit comprises, from the object side, a negative lens element whose image-side surface has a stronger refractive power and a positive lens element while having at least one aspherical surface, and satisfies the following conditions (7) to (10):

$$\phi \text{ I} \cdot f_T > 0.7 \tag{7}$$

$$0.21 < \phi \text{ I} / \phi \text{ III} < 0.33 \tag{7}$$

$$-0.3 < r \text{ II}_N^R / r \text{ II}_N^F < 0.2 \tag{9}$$

$$-3.0 < r \text{ III}_F / r \text{ III}^R < -0.5 \tag{10}$$

where $\phi$ I represents the compound refractive power of the first lens unit, $\phi$ II represents the compound refractive power of the second lens unit, $f_T$ represents the compound focal length of the entire zoom lens system at the longest focal condition, $r \text{ II}_N^F$ represents the paraxial radius of curvature of the object-side surface of a negative lens element of the second lens unit, $r \text{ II}_N^R$ represents the paraxial radius of the image-side surface of the negative lens element of the second lens unit, $r \text{ III}^F$ represents the paraxial radius of curvature of the lens surface of the third lens unit closest to the object, and $r \text{ III}^R$ represents the paraxial radius of curvature of the lens surface of the third lens unit closest to the image.

When the third lens unit comprises a doublet lens element made by putting a negative and a positive lens elements together from the object side and both of the surfaces of the doublet lens are aspherical surfaces, it is preferable that the second lens unit comprises, from the object side, a negative lens element whose image-side surface has a stronger refractive power and a positive lens element while having at least one aspherical surface, and satisfies the above-mentioned conditions (7) to (9) and the following condition (11):

$$-1.0 < r \text{ III}^F / r \text{ III}^R < 0.2 \tag{11}$$

The condition (7) determines the lower limit of the refractive power of the first lens unit. With respect to a three-unit zoom lens system comprising, from the object side, a positive, a negative and a positive lens units, the size of the entire lens system is decided mainly by the refractive power of the first lens unit. If the lower limit is exceeded, the movement amount of the second lens unit at a zooming operation and the diameter of the front lens increase. Therefore, to realize a compactness and a zoom ratio of approximately 6×, the refractive power of the first lens unit is preferably determined so as to satisfy the condition (7).

The condition (8) shows a balance of the refractive power of the first and second lens units. The meaning of the condition (8) and of the upper and lower limits have already been described.

As has already been described, in a three-unit zoom lens system comprising a positive, a negative and a positive lens units, to satisfactorily suppress a variation of chromatic aberration at a zooming operation with a zoom ratio of 6×, chromatic aberration is required to be sufficiently corrected in each lens unit. To achieve the chromatic aberration correction, at least one high dispersion lens element having a refractive power opposite to that of the lens unit is required for each lens unit of the zoom lens system. If chromatic aberration is not fully corrected in each lens unit, a variation in chromatic aberration is caused when a relative distance between each lens unit changes at a zooming operation, so that the aberration correction performance remarkably deteriorates especially in a zoom lens system with a zoom ratio of 6×. Therefore, each lens unit must be arranged with at least two lens elements.

The condition (9) shows how the strong refractive power of the second lens unit should be allotted to each surface of the negative lens element of the second lens unit to concentrate the refractive power on the negative lens element. If the lower limit is exceeded, that is, if the strong negative refractive power is allotted to the object-side surface, an excessive amount of distortion is caused on the surface, which makes it impossible to put the zoom lens system into a practical use. If the upper limit is exceeded, that is, if a strong negative refractive power is concentrated on the image-side surface, an excessive amount of spherical aberration and coma are generated on the surface at the longest focal condition, which makes it difficult to achieve the required performance. Further, it is preferable that the condition $r \text{ II}_N^R > 0$ is satisfied in the condition (9).

The third lens unit refracts the divergent luminous flux having passed through the second lens unit to form an image as well as moves for a zooming operation. Conventionally, the third lens unit comprises five or more lens units as described above. However, by employing at least one aspherical surface for mainly correcting spherical aberration, it can be constituted by only two lens elements. And, it is preferable to employ one more aspherical surface for the third lens unit to correct off-axial aberrations.

The here-described two lens arrangements are the concrete examples of the third lens units. Each arrangement has a different preferable configuration, respectively. That is, when the third lens unit comprises, from the object side, a positive lens element and a high dispersion lens element, the surface of the third lens unit which is closest to the object and that which is closest to the image preferably satisfy the above-mentioned condition (10).

That the above two surfaces are well-balanced is essential to maintain an adequate balance of spherical aberration and off-axial coma or field curvature on condition that aspherical surfaces are employed. The above-described two types of lens arrangements of the third lens unit have different adequate balances of the two surfaces, because the adequate balance means an adequate condition including a balance of correction of axial chromatic aberration and lateral chromatic aberration.

If the lower limit of the condition (10) is exceeded, although the lens unit still has an ability to correct off-axial aberrations, it becomes difficult for the lens unit to satisfactorily perform the correction even with aspherical surfaces, because an excessive amount of spherical aberration is generated on the image side of the third lens unit. On the other hand, if the upper limit of the condition (11) is exceeded, although the lens unit has a sufficient ability to correct spherical aberration, it becomes difficult for the lens unit to satisfactorily correct off-axial coma and field curvature.

Further, if the upper limit of the condition (10) is exceeded when third lens unit has, from the object side, a positive and a negative lens elements, it becomes very difficult to correct axial chromatic aberration with the negative high dispersion lens element on the image side because the axial luminous flux is refracted too far due to the positive refractive power of the positive lens element on the object side. If the axial chromatic aberration is forcefully corrected, too much amount of higher-order aberration is generated by the negative lens element on the image side as well as lateral chromatic aberration is excessively corrected, which prevents a realization of the required performance.

On the other hand, if the lower limit of the condition (11) is exceeded when the third lens unit has, from the object side, a negative and a positive lens elements, the lateral chromatic aberration is not satisfactorily corrected compared to axial chromatic aberration, so that the third lens unit is required to increase in size.

In the third lens unit with an arrangement satisfying the above-described conditions, the aberration sensitivity, in manufacturing, of the two lens elements such as eccentric error is often very large since the refractive power of the two lens elements is fairly strong. To decrease the relative eccentricity of the two lens elements, it is effective to employ a doublet lens element made by putting the two lens elements together. The employment of a doublet lens element makes the assembling work easier. Further, if aspherical surfaces are introduced on both sides of the doublet lens element employed for the third lens unit, a higher aberration correction performance is obtained.

Next, a lens arrangement of a three-unit zoom lens system in which a zooming operation starts at the shortest focal length condition ($2\omega$ is approximately 60°).

A zoom lens system having such lens arrangement comprises, from the object side, the first lens unit having a positive refractive power, the second lens unit having a negative refractive power and the third lens unit having a positive refractive power, wherein at least the second and third lens units move along the optical axis at a zooming operation, the first lens unit has a plurality of lens elements including a negative meniscus lens element whose object-side surface is convex to the object side, the second lens unit has a plurality of lens elements including at least one positive high dispersion lens element, the third lens unit has positive lens elements on the object and image sides of the lens unit and includes at least one aspherical surface, and the following conditions (12) and (13) are satisfied:

$$1.8 < |\phi II| \cdot Z \cdot Y' < 3.6 \quad (12)$$

$$13 < (|\phi II|/|\phi I|) \cdot (Y'/f_w) \cdot Z < 28 \quad (13)$$

where $\phi I$ represents the compound refractive power of the first lens unit, $\phi II$ represents the compound refractive power of the second lens unit, fw represents the compound focal length of the entire system at the shortest focal length condition, Y' represents the effective image height, and Z represents the zoom ratio.

By arranging a zoom lens system so that it satisfies the above conditions (12) to (13), a compact high-zoom-ratio zoom lens system having only three lens units where a wide-angle zooming is performed is realized.

The condition (12) basically shows an adequate refractive power range for the second lens unit. A zooming operation is performed mainly by the second lens unit. Therefore, the refractive power of the second lens unit directly determines the amount of lens movement at a zooming operation and the diameter of the front lens. Since aberration extremely increases due to the increase of angle of view, an appropriate refractive power in accordance with the angle of view must be chosen.

To effectively realize a compactness of a zoom lens system, the refractive power should be as strong as possible, while to facilitate the aberration correction, the refractive power should be as weak as possible. The condition (12) shows an adequate balance of the above two contradicting conditions.

If the lower limit of the condition (12) is exceeded, the zoom lens system is not compact enough. If the upper limit is exceeded, more lens elements are required to correct aberration, which increases the cost.

The condition (13) indicates that the balance of the refractive power of the first and second lens units should appropriately be determined in accordance with the angle of view and the zoom ratio. As well as the refractive power shown by the condition (12), the balance of the refractive power shown by the condition (13) affects the contradicting relation between the realization of a compactness and the aberration correction performance. It further affects the movement of the third lens unit at zooming operation. When the condition (13) is satisfied, the movement of the third lens unit from the longest to the shortest focal length conditions is such that it moves toward the object side at first and returns on the way. With such movement of the third lens unit, not only the space required for the movement of the third lens unit is easily decreased but also the effect by the variation in aberration is reduced.

If the lower limit of the condition (13) is exceeded, the diameter of the front lens should be fairly large. Also, the third lens unit moves far toward the object side at the middle and the shortest focal length conditions, which increases the size of the zoom lens system and the variation in aberration. On the contrary, if the upper limit is exceeded, the off-axial aberration generated by the second lens unit largely deteriorates and the third lens unit moves far toward the image side at the shortest focal length condition, which also increases the size of the lens system and the variation in aberration.

As described above, to facilitate an aberration correction and the realization of a compact zoom lens system, it is the most important that a zoom lens system comprises three lens units: a positive, a negative and a positive lens units from the object side, and that the refractive power of the first and second lens units satisfies the conditions (12) and (13). It is preferable that the third lens unit arranged behind the first and second lens units has a front lens component with a positive refractive power and a rear lens component including a negative high dispersion lens element, and satisfies the following condition:

$$1.6 < \phi^\wedge \cdot f_T/F_W < 3.5 \quad (14)$$

where $\phi^\wedge$ represents the compound refractive power of the front lens component of the third lens unit, $f_T$ represents the compound focal length of the entire zoom lens system at the longest focal length condition, and $F_W$ is a minimum F-number at the shortest focal length condition.

The front lens component of the third lens unit consists of one or plural positive lens elements. The luminous flux refracted by the strong refractive power of the second lens unit is fairly divergent. Therefore, to reduce the size of a zoom lens system, it is required that the divergent luminous flux is immediately refracted by a strong positive refractive power.

To realize a compactness, it is preferable to increase the refractive power of the front lens component of the third lens unit. However, if it is too strong, the correction of spherical aberration and axial chromatic aberration becomes difficult. Therefore, it should be limited as shown in the condition (14) according to the minimum F-number.

If the lower limit of the condition (14) is exceeded, the size of a zoom lens system is not satisfactorily reduced; if the upper limit is exceeded, the aberration correction becomes difficult.

Next, the lens arrangement will concretely be described.

It is preferable that the second lens unit, which is the most important for an aberration correction, has, from the object side, a negative lens element whose image-side surface has a stronger refractive power, a bi-convex lens and a positive lens element whose object side-element surface has a stronger refractive power, and satisfies the following condition (15):

$$0.05 < r_B/|r_A| < 0.8 \qquad (15)$$

where $r_A$ the paraxial radius of curvature of the object-side surface of the bi-convex lens element which is the second lens element from the object side in the second lens unit ($r_A<0$), $r_B$ represents the paraxial radius of curvature of the image-side surface of the bi-convex lens element which is the second lens element from the object side in the second lens unit.

Since, with a fairly large angle, the off-axial light enters into the second lens unit which has the strong negative refractive power, a large amount of off-axial aberration is generated. Especially, the negative distortion at the shortest focal length condition is extremely large in such wide-angle zoom system. To prevent this, the angle of the off-axial entering luminous flux to the normal line of each lens surface should be reduced as much as possible. In other words, it is preferable that the strong negative refractive power is allotted on image-side surfaces. For this reason, the negative lens element of the second lens unit has a strong negative refractive power on its image-side surface. Further, the first negative lens element of the second lens unit preferably has a negative meniscus configuration. Moreover, the second negative lens element of the second lens unit is preferably arranged so that the refractive power of the object-side surface is weak as the condition (15) shows.

If the upper limit of the condition (15) is exceeded, the deterioration of distortion caused by an object-side surface is extremely large at the shortest focal length condition, so that only a barrel form image is obtained. On the other hand, if the lower limit is exceeded, the distortion decreases. However, field curvature and coma by the image side surface and spherical aberration at the longest focal length condition remarkably deteriorate. To achieve a more excellent aberration correction performance, it is effective to employ aspherical surfaces for the second lens unit or to construct the second lens unit with four lens elements.

With respect to the first lens unit, to effectively correct distortion at the shortest focal length condition, it is preferable that the object-side surface closest to the object is convex Also, to effectively correct spherical aberration, field curvature and coma, it is preferable that the first lens element is a negative lens. Therefore, the first lens element of the first lens unit should be a negative meniscus lens element whose object-side surface is convex to the object side. Behind the first lens element, one or two positive lens elements should be arranged. When the angle of view is approximately $2\omega=56°$, only one positive lens element is required, while when the angle of view exceeds $2\omega=60°$, two positive lens elements are desirably required to be arranged. By arranging two positive lens elements, the correction of coma and spherical becomes easier. Needless to say, the above-described range of angle of view increases when aspherical surfaces are employed for the first lens unit.

To effectively correct aberration, these positive lens elements of the first lens unit should have a stronger refractive on their object-side surfaces. Especially, when two positive lens elements are used at a very wide angle of view, the two lens elements are preferably positive meniscus lens elements whose object-side surfaces are convex to the object side.

At this time, it is preferable that a front lens component having a strong positive refractive power on the object side is arranged in the third lens unit as described above. The front lens component preferably has one or two positive lens elements whose object-side surface has a strong refractive power. The rear lens component preferably has a negative lens, by which chromatic aberration and off-axial aberrations are mainly corrected, on the object side and a positive lens for forming an image on the image side. To effectively correct off-axial aberrations, the above negative and positive lens elements should be arranged so that a strong negative refractive surface of the negative lens faces toward a strong positive refractive surface of the positive lens. That is, the rear lens component preferably has a negative lens element whose image-side surface has a strong negative power and a positive lens element whose object-side surface has a strong positive refractive power.

With respect to the third lens unit, to correct negative distortion remarkably generated especially at the shortest focal length condition, it is preferable that an aspherical surface which decreases the positive refractive power or increases the negative refractive power as a distance from the optical axis becomes larger is arranged as close to the image as possible. The aspherical surface should be given a considerable amount of displacement from the spherical surface to correct distortion, by which a considerable amount of positive spherical aberration is generated. Although the third lens unit, which originally has a positive refractive power, generates a large amount of negative spherical aberration, the generated positive spherical aberration is too large to be countervailed by the negative spherical aberration. To overcome this problem, the above-mentioned one or two positive lens elements have a strong positive refractive power on their object-side surfaces to generate a large amount of negative spherical aberration with the first surface.

Therefore, with respect to the third lens unit, it is preferable that at least one surface of the lens element closest to the image is an aspherical surface, and the following condition (16) is satisfied:

$$-0.2 < f_w/r_D < 0.3 \qquad (16)$$

where $r_D$ represents the paraxial radius of curvature of the surface closest to the image.

If the lower limit of the condition (16) is exceeded, negative distortion is excessively generated by the last surface. If the upper limit is exceeded, although there is no problem in distortion, coma greatly deteriorates, which results in a performance deterioration.

Further, it is preferable to employ aspherical surfaces for the negative lens of the second lens unit.

Moreover, when the front lens component of the third lens unit consists of one positive lens element, the lens configuration of the negative lens element of the rear lens component of the third lens unit which is important for the correction of chromatic aberration and off-axial aberrations preferably satisfies the following condition (17):

$$-0.2 < r_R/r_F < 0.5 \qquad (17)$$

where $r_R$ represents the paraxial radius of curvature of the image-side surface of the negative lens element of the third lens unit, and $r_F$ represents the paraxial radius of curvature of the object-side surface of the negative lens element of the third lens unit.

If the lower limit of the condition (17) is exceeded, off-axial aberrations, especially coma at the longest focal length condition, remarkably deteriorate, so that the lens back is extended as well as the performance deteriorates, which results in an increase in size. If the upper limit is exceeded, it becomes difficult to excellently correct lateral chromatic aberration, which deteriorates the performance.

When the first lens unit consists of one positive lens element, it is preferable that the third lens unit comprises, from the object side, a front lens component having two positive lens elements whose object-side surfaces have a strong refractive power and a rear lens component having a negative lens element whose image-side surface has a strong refractive power and a positive lens elements whose object-side surface has a strong refractive power. In addition, it is preferable that at least one of the surfaces of the lens element of the third lens unit which is closest to the object is an aspherical surface as well as the condition (16) is satisfied.

The object of the present invention is also achieved with the following lens arrangement.

That is, a zoom lens system comprises, from the object side, the first lens unit having a positive refractive power, the second lens unit having a negative refractive power and other lens units, wherein the second lens unit has, from the object side, a negative lens element whose image-side surface has a strong refractive power and a positive lens element. In the above second lens unit, both of the surfaces of the negative lens element are aspherical, and at least one of the surfaces of the positive lens element is aspherical.

As is understood from the above-described prior art, it is required to sufficiently correct variation in chromatic aberration to realize a high-zoom-ratio zoom lens system. To complete chromatic aberration correction in respective lens units, each lens unit should have at least one positive and at least one negative lens elements. When such lens system has only spherical surfaces, each lens unit is required to have three or more lens elements to realize a high-performance lens system.

That is, in a lens system having only spherical surfaces, each lens unit must have at least three lens elements. Of course, there are some exceptions. For example, in a general four-unit lens system, a compensator lens unit can be composed of one or two lens elements. However, in a lens system where the first lens unit has a positive refractive power and the second lens unit has a negative lens unit, each unit is required to have at least three lens elements. The refractive power of each lens unit and zoom type determine the minimum number of lens elements required for each unit, which determines the total length of the lens system and the diameter of the front lens.

To make the zoom lens system more compact, the required number of lens elements is reduced to less than three by employing aspherical surfaces. The aberration correction ability of an aspherical surface depends on for which surface it is employed. Unless it is appropriately used, not only the number of required lens elements cannot be reduced but also aberration which cannot be corrected by other surface is generated.

When an aspherical surface is employed for a negative lens element of the second lens unit, it is preferable that the second lens unit has, from the object side, a negative lens element whose image-side surface has a strong refractive power and both of whose surfaces are spherical and a positive lens element at least one of whose surfaces are aspherical.

That is, the chromatic aberration of the second lens unit is corrected by a negative and a positive lens elements. Various kinds of aberrations such as curvature of field distortion, chromatic aberration, coma are effectively corrected by the aspherical surfaces employed for the positive lens element. When an aspherical surface is employed for the negative lens element of the second lens unit, monochromic aberration is corrected less effectively than when an aspherical surface is employed for the positive lens element. In this case, the aberrations is corrected by a certain amount, but still coma is too large to be corrected by other lens elements. Especially in a lens system where the refractive power of each lens unit is increased to realize a compact lens system, coma remarkably deteriorates.

Next, the above lens arrangement of a zoom lens system according to the present invention satisfies the following condition (18):

$$0.00012 < |\delta/fS| < 0.075 \tag{18}$$

where $\delta$ represents the amount of a shift from the reference spherical surface in a direction parallel to the optical axis at an effective diameter of the aspherical surface of the positive lens element of the second lens unit, and fS represents the focal length of the entire lens system at the shortest focal length condition.

If the lower limit of the condition (18) is exceeded to decrease the amount of aspherical surfaces, the zoom lens system cannot have a function of satisfactorily correcting aberration. If the upper limit is exceeded to increase the amount of aspherical surfaces, the configuration of the aberration correction is wound and the processability of the aspherical surface of the lens element extremely deteriorates.

The first lens unit may be composed of two lens elements. When at least one surface of the positive lens element of the second lent unit is aspherical as described above, not only various aberration correction becomes possible but also the aberration generated by the first lens unit can excellently be corrected since the height of the luminous flux entering the aspherical surfaces is varied according to a focal length at a zooming operation.

In this case, therefore, aberration is sufficiently corrected if the first lens unit consists of two lens elements.

At this time, the first lens unit preferably has, from the object side, a negative lens element whose image-side surface has a strong refractive power and a positive lens element. With such lens arrangement, the aberration generated by the first lens unit can sufficiently be reduced, so that the first lens unit having two lens elements and the second lens unit having two lens elements.

A zoom lens system preferably comprises three lens units: the first lens unit having a positive refractive power, the second lens unit having a negative refractive power and the third lens unit having a positive refractive power.

Needless say, to the less lens elements a zoom lens system comprises, the easier it becomes to manufacture it, because less trouble of adjustment and less number of parts are required. Nevertheless, for a compact zoom lens system such as that of a video camera, four-unit lens systems having a positive, a negative, a negative and a positive lens units or a positive, a negative, a positive and a positive lens units have conventionally been used. This is because four lens units were required to realize a compact lens system having a high zoom ratio with respect to the conventional type of lens systems where the first and second lens units consist of three lens elements, respectively. However, with the first and second lens unit having the above described lens arrangements, a three-unit zoom lens system having a zoom ratio of 6× which is as compact as the conventional four-unit systems is realized.

By employing aspherical surfaces, the number of lens elements can be reduced not only in the second lens unit but also in the other lens units. As described above with respect to aspherical surfaces employed for the second lens unit, if the aspherical surfaces are adequately employed at an appropriate position, various aberrations are effectively corrected; however, unless it is employed at the appropriate position, even though some aberrations are corrected, other aberrations are deteriorated too much to be corrected even aspherical surfaces are employed.

To prevent this, a zoom lens system according to the present invention may comprise a plurality of lens units including at least two lens units movable backward and forward along the optical axis to perform a zooming operation, where at least one of the movable lens unit has a negative refractive power, at least one of the negative lens units has a positive lens element on the image side, at least two lens units including the negative lens unit have aspherical surfaces, and the aspherical surfaces are provided on positive lens elements.

Further, another zoom lens system according to the present invention comprises, from the object side, the first lens unit having a positive refractive power and the second lens unit having a negative refractive power, where the second lens unit is movable backward and forward along the optical axis to perform a zooming operation and includes a positive single lens having at least one aspherical surface.

Still another zoom lens system according to the present invention may comprise a plurality of lens units including at least two lens units movable backward and forward along the optical axis to perform a zooming operation, where at least one of the movable lens units has a negative refractive power, the negative lens unit includes at least one positive single lens element, at least two of the plural lens units have aspherical surfaces and the aspherical surfaces are provided on positive lens elements.

In a lens unit having a positive refractive power in a zoom lens system, all the aberrations must satisfactorily be corrected since the entire zoom lens system has a positive refractive power. When an aspherical surface is employed for such negative lens element of the lens unit having a positive refractive power, although monochromic aberrations such as distortion, field curvature and spherical aberration can be corrected, chromatic aberrations are deteriorated. This is because a negative lens element in a positive lens unit affects chromatic aberrations, especially higher-order chromatic aberrations, more largely than in a positive lens element positive lens unit.

The lens unit having a negative refractive power is not designed to reduce aberrations thereof as much as the positive lens unit is designed; the aberration correction of the entire lens system is helped by the aberration generated by the negative lens unit. In this case, as described above, if aspherical surfaces are employed for a negative lens element, chromatic aberrations are deteriorated too much to satisfactorily be corrected by other surfaces.

It indicates that the employment of aspherical surfaces for a negative lens element does not always decrease the number of lens elements in the zoom lens system.

In a zoom lens system having a positive refractive power as a whole, the negative lens unit originally has a function of correcting aberrations, and therefore a comparatively large refractive power is given on the negative lens unit. At this time, the negative lens unit generates the aberrations which greatly vary at a zooming operation. To suppress variation in aberration at the zooming operation as much as possible, it is preferable that a negative lens unit includes a positive lens element. In addition, it is more effective to arrange the positive lens element on the position closest to the image in the negative lens unit. This is because the higher-order aberrations generated by the negative lens element can be reduced even when the negative lens element has a large refractive power since the luminous flux passes through the negative lens element along the course adjacent to the optical axis. Further, the positive lens element corrects the aberrations generated by the negative lens unit more easily since the luminous flux passes through the positive lens unit along a course higher than the optical axis.

As a lens arrangement of the entire zoom lens system, it is preferable that a zoom lens system comprises, from the object side, the first lens unit having a positive refractive power, the second lens unit having a negative refractive power and the third lens unit having a positive refractive power, where at least one surface of the positive lens elements of the second lens unit and at least one surface of the positive lens elements of the third lens unit are aspherical.

The aspherical surfaces employed for the second unit are effective mainly for chromatic aberration and distortion. The aspherical surfaces employed for the third lens unit are effective for various aberrations such as spherical aberration and field curvature in accordance with the position where it is arranged.

It is also preferable that a zoom lens system comprises, from the object side, the first lens unit having a positive refractive power and the second lens unit having a negative refractive power, where at least the second lens unit is movable along the optical axis at a zooming operation and includes a negative single lens element and a positive single lens element having at least one aspherical surface.

The aspherical surfaces employed for the second lens unit are effective for uniforming the aberration varied at a zooming operation. The aspherical surfaces employed for the third lens unit are effective for reducing the aberration generated at all the focal length conditions.

When aspherical surfaces are employed to reduce the number of lens elements, it is effective that each aspherical surface corrects a different aberration, respectively. If a plurality of aspherical surface is employed to correct the same aberration, the aberration is not further corrected; the aberration correction is allotted to each aspherical surface and total amount of corrected aberration becomes substantially the same as that by a single aspherical surface.

Further, it is preferable that the first lens unit is stationary at a zooming operation and that the second and third lens units are movable backward and forward along the optical axis to perform a zooming operation.

With respect to a compact zoom lens system for a video camera, etc., not only the lenses but also the peripheral parts are required to be compact. If the weight of the movable lens units is reduced as much as possible, the driving system for the movable lens units becomes compact to enable an easy correct control. In the above-described zoom lens system, the first lens unit is fairly heavy; it covers nearly half the weight of the entire zoom lens system, so that the load of the driving system becomes large and then the driving system thereof works less effectively, which decreases an accuracy of the control.

With respect to lens units arranged close to the image side of a zoom lens system, a lens unit arranged behind the iris conventionally has the largest number of lens elements. This is because an optical system having an F-number of 1.6 to 1.8 is required for a zoom lens system for a video camera. That is, to obtain a small F-number, the aberration must be corrected by the lens unit arranged behind the iris.

The lens units arranged in front of the iris include a lens unit which largely moves at a zooming operation. If these lens units are constructed with the lens elements as few as possible, generally, only variation in aberration is corrected and a considerable amount of aberration are left without being corrected. To correct this uncorrected aberration, the number of lens elements in the lens unit behind the iris naturally increases.

To prevent this, a zoom lens system according to the present invention comprises the third lens unit, behind the second lens unit, which has, from the object side, a positive single lens element and an integrated lens element made with a negative and a positive lens elements which has a positive refractive power as a whole, and where at least one surface of the single lens element or the integrated lens element is aspherical.

For example, the third lens unit has, from the object side, positive meniscus lens element whose object-side surface is convex to the object side and an integrated lens element made with a negative and a positive lens elements whose image-side surface has a strong negative refractive power.

Especially, it is preferable that a zoom lens system comprises, from the object side, the first lens unit having a positive refractive power, the second lens unit having a negative refractive power and the third lens unit having a positive refractive power, where the third lens unit has, from the object side, a positive lens element, an integrated lens element made with a negative lens element both of whose surfaces are spherical and a positive lens element, or the separated latter two lens elements, at least one surface of the positive lens element is aspherical and the following condition (19) is satisfied:

$$0.15 < \phi 31/\phi 33 < 0.95 \tag{19}$$

where $\phi 31$ represents the refractive power of the positive lens element arranged on the object side of the third lens unit, and $\phi 33$ represents the refractive power of the positive lens element arranged on the image side of the third lens unit.

If the upper limit of the condition (19) is exceeded to increase the refractive power of the positive lens element on the object side of the third lens unit, the lens back is shortened to reduce the total length of the lens system. However, spherical aberration deteriorates at all the focal length conditions, and particularly a great number of coma is generated at the shortest focal length condition, so that both axial and off-axial aberrations are not satisfactorily corrected.

If the lower limit of the condition (19) is exceeded to decrease the refractive power of the positive lens element on the object side of the third lens unit, not only the lens back is lengthened to remarkably increase the total length of the lens system but also lateral chromatic aberration cannot be corrected at all the focal length conditions, so that off-axial aberrations cannot sufficiently be corrected.

By employing at least one aspherical surface for the positive lens elements of the third lens unit, the number of lens elements of the third lens unit can be reduced. At this time, a zoom lens system having a small F-number is realized with only three lens elements.

At a zooming operation, it is preferable that the first lens unit is stationary, and the second and third lens units are movable along the optical axis to perform the zooming operation. The weight of the first lens unit covers half the weight of the entire lens system. If the heavy first lens unit is made to be movable, the driving system needs greater power, so that the larger driving system is required. A product in which a compactness is required such as a video camera requires not only a compact zoom lens system but also a compact driving system to drive the zoom lens system. By making the light-weighted second and third lens units movable, it is possible to reduce the size of the driving system.

With respect to the arrangement of each lens units, the first and second lens units preferably consist of two lens elements, respectively.

To be more specific, it is preferable that the first lens unit has, from the object side, a negative lens element whose image-side surface has a strong negative refractive power and a positive lens element, and the second lens unit has, from the object side, a negative lens element whose image-side surface has a strong negative refractive power and a positive lens element at least one of whose surfaces is aspherical. When only spherical surfaces are employed for the first and second lens units, three lens elements are required for each lens unit, because chromatic aberration must be corrected in respective lens units and a video camera requires a high performance and a high zoom ratio. To reduce the number of lens elements, aspherical surfaces must be employed. When aspherical surfaces are employed, the following must be considered: if an aspherical surface is employed for a surface which most effectively corrects aberration, the number of lens elements can be reduced with maintaining almost the same performance; however, if as aspherical surface is employed on the other surfaces, various aberrations can deteriorate. Also, by employing an aspherical surface for a surface which effectively corrects aberration, the total number of aspherical surfaces of the zoom lens system can be reduced. This is very important in a zoom lens system having a plurality of aspherical surfaces where aberration are largely deteriorated by a slight effect of an error in manufacturing of the aspherical surface.

With such lens arrangement, the number of lens elements of the first and second lens units is reduced. In addition, the number of aspherical surfaces can be reduced as much as possible.

Another zoom lens system according to the present invention comprises behind the second lens unit, from the object side, the third lens unit having a positive refractive power and the fourth lens unit having a negative refractive power, where the third lens unit has at least one negative lens element and at least one positive lens element having an aspherical surface.

In an optical system for a video camera, since a low pass filter and a face plate are inserted in front of an image plane, an enough length of lens back is required. The lens back more than enough for these optical devices including the amount for an error adjustment of the lens back increases the total length of the lens system.

To reduce the total length of the lens system with maintaining a high performance, it is more effective to shorten the lens back than to increase the refractive power of all the lens units. By constructing a zoom lens system with four lens units of a positive, a negative, a positive and a negative lens units, the excessive lens back can be reduced as much as possible. By varying a relative position of the third and fourth lens units, a zooming effect is given to the lens system, so that the movement amount of the second lens unit decreases, which further reduces the total length of the zoom lens system. By employing at least one negative lens element and at least one positive aspherical lens element for the third lens unit, a satisfactory performance is obtained with a third lens unit having a simple lens arrangement.

Another zoom lens system according to the present invention comprises behind the second lens unit, from the object side, the third lens unit having a positive refractive power, the fourth lens unit having a positive refractive power and the fifth lens unit having a negative refractive power, where the third and fourth lens units has at least one positive lens element at least one of whose surface is aspherical.

As described above, the negative lens unit is arranged at a position closest to the image to shorten the lens back to reduce the total length of the lens system, and to decrease the movement amount of the second lens unit by giving a zooming effect by varying a relative position of the fourth and fifth lens units to reduce the total length of the lens system. By moving the third and fourth lens units having a positive refractive power away from each other, a ray of light passes through the third and fourth lens units along a lower course. Therefore, the aberrations generated by positive lens units can be reduced, which enables a realization of a relatively bright optical system. By varying the distance between the third and fourth lens units, the variation in aberration at a zooming operation is easily corrected, which enables the zoom lens system to cope with a brighter optical system. By employing positive aspherical lens elements for the third and fourth lens units, an aberration can sufficiently corrected with a simple lens arrangement.

Data of embodiments 1 to 16 of a zoom lens system according to the present invention will be shown in Tables 1 to 16.

In each embodiment, ri (i=1,2,3 ... ) represents a radius of curvature of the ith lens surface counted from the object side, di (i=1, 2, 3 ... ) represent the ith axial distance counted from the object side, Ni (i=1,2,3 ... ) and ν (i=1, 2, 3 ... ) represent a refractive index and an Abbe number to the d-line of the ith lens counted from the object side, respectively, f represents a focal length of the entire zoom lens system, and $F_{NO}$ represents an F-number.

In the embodiments, the surfaces whose radius of curvature has * mark indicates that the surfaces are aspherical, and are defined by the following equation:

$$X_o = (h^2/r)/[1+\{1-\epsilon \cdot (h^2/r^2)\}^{1/2}] + \Sigma A_i h^i$$

where $X_o$ represents a shift amount from the reference lens surface in a direction parallel to the optical axis, r represents a paraxial radius of curvature, h represents a height in a direction perpendicular to the optical axis, Ai represents an aspherical coefficient of the ith order, and ε represents a quadric curved surface parameter.

Next, data of embodiments 17 to 23 of a zoom lens system according to the present invention will be shown in Tables 17 to 23.

Next, data of embodiments 24 to 32 of a zoom lens system according to the present invention will be shown in Tables 24 to 34.

Next, data of embodiments 33 to 39 of a zoom lens system according to the present invention will be shown in Tables 35 to 47.

Next, data of embodiments 40 to 49 of a zoom lens system according to the present invention will be shown in Tables 48 to 57.

In each embodiment, 2ω represents an angle of view at the shortest focal length condition. |δ/fS| and ø31/ø33 of conditions (18) and (19) are also shown.

In the embodiments, the surfaces whose radius of curvature has * mark indicates that the surfaces are aspherical, and are defined by the following equation:

$$X = (C \cdot Y^2)[1+\{1-\epsilon \cdot C^2 \cdot Y^2\}^{1/2} + \Sigma A_i Y^i$$

where $X_o$ represents a shifting amount from the top of a surface to an aspherical surface in a direction parallel to the optical axis, Y represents a height from the optical axis, C represents a paraxial radius of curvature, Ai represents an aspherical coefficient of the ith order, and ε represents a quadric curved surface parameter.

Figure 5:
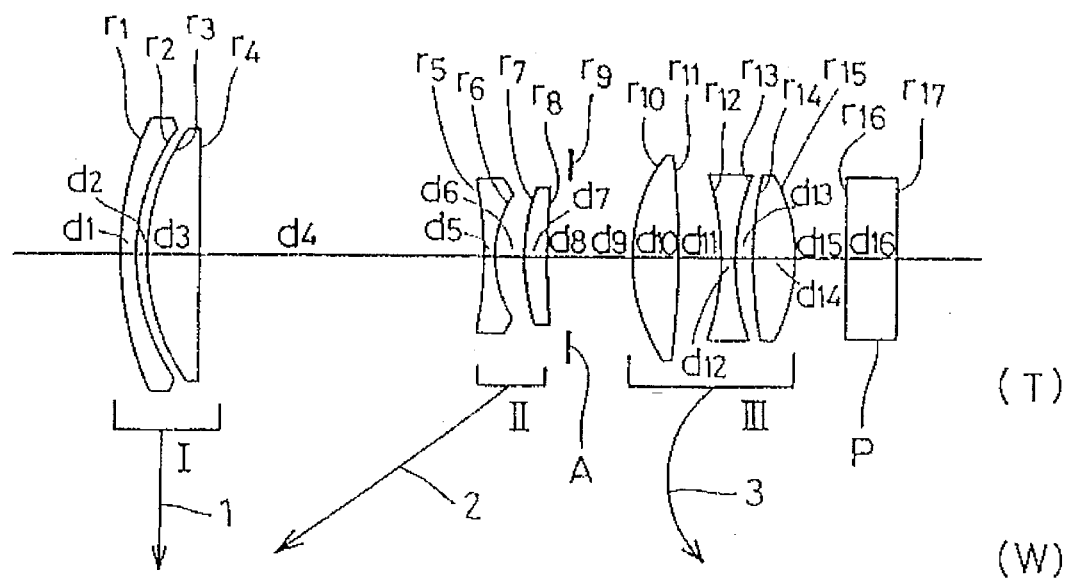
FIGS. 5 to 20 are the cross sectional views of the lens arrangements corresponding to the embodiments 1 to 16 of the present invention, respectively.
Figure 6:
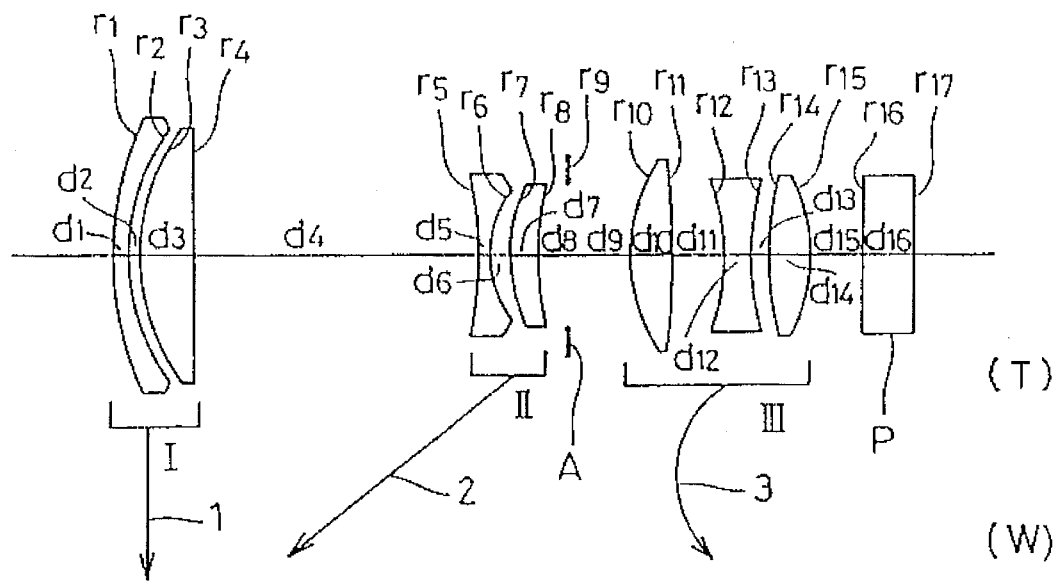
Figure 7:
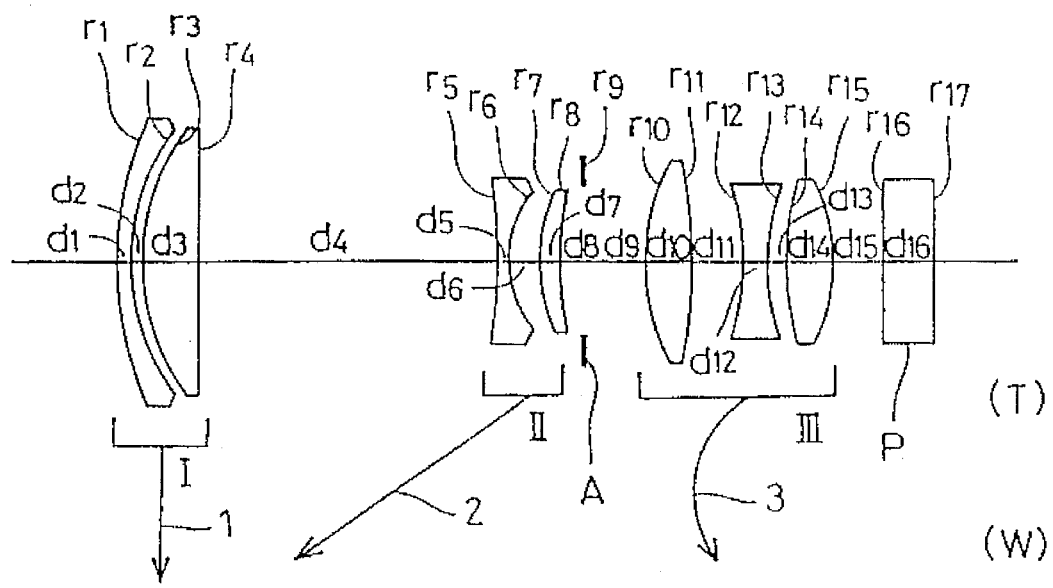
Figure 8:
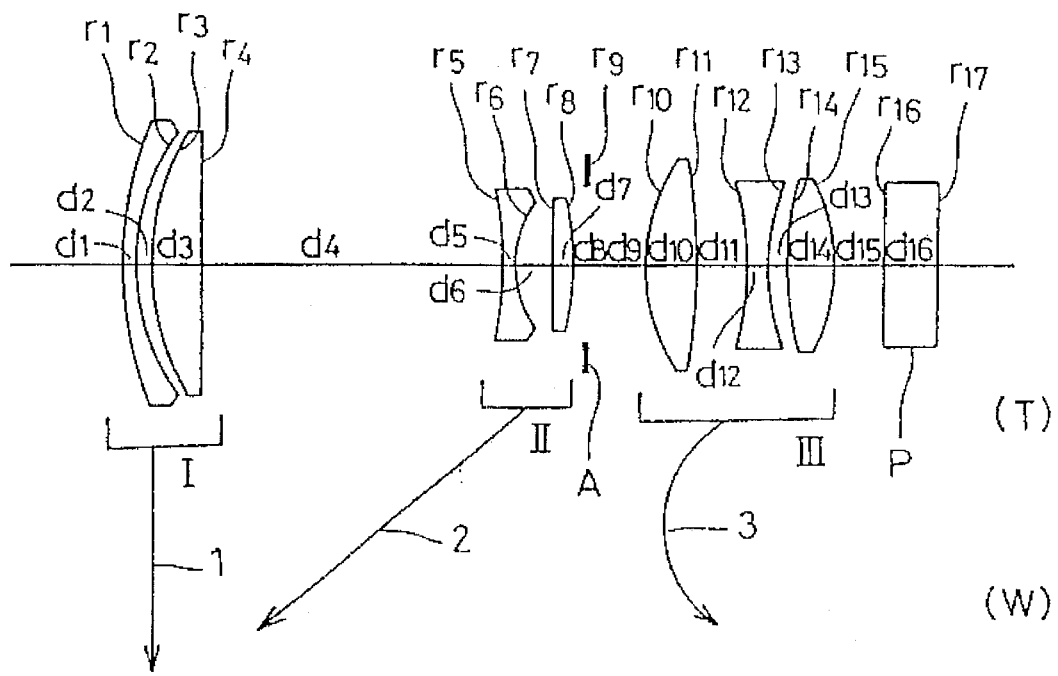
Figure 9:
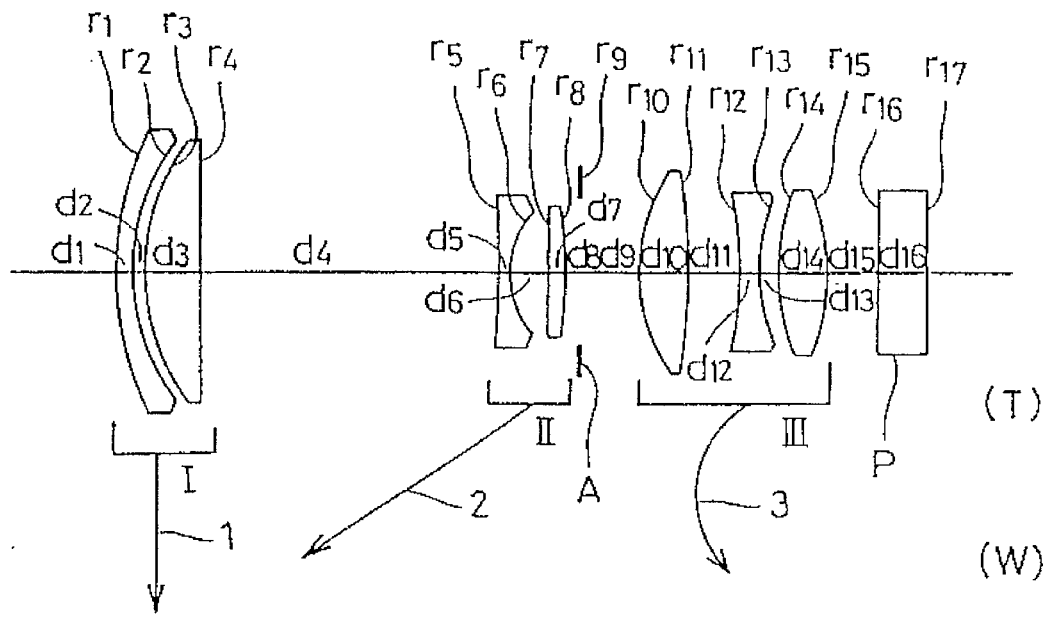
Figure 10:
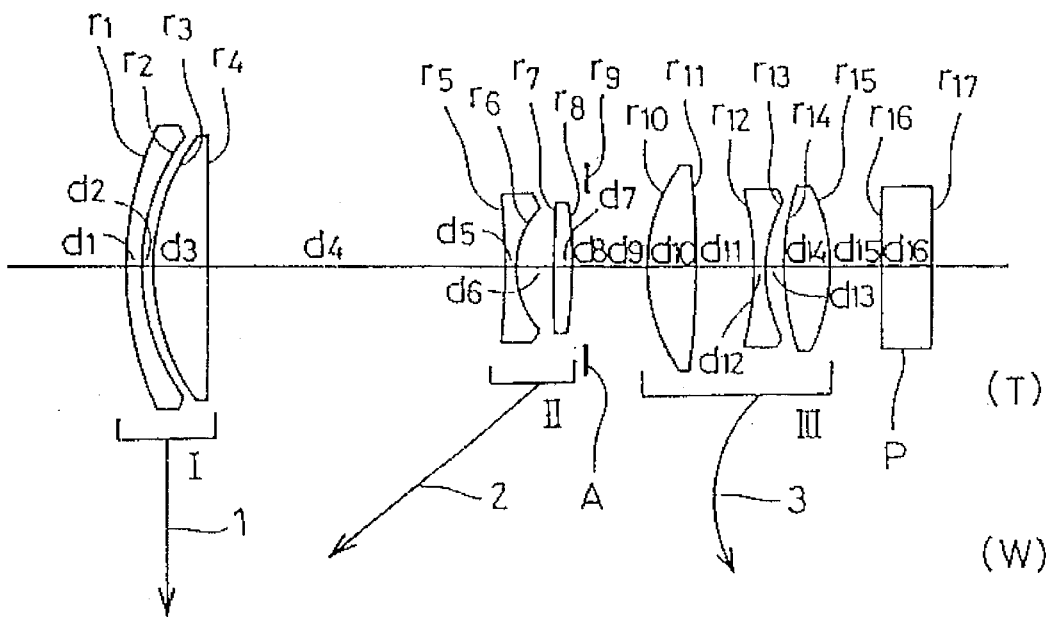
Figure 11:
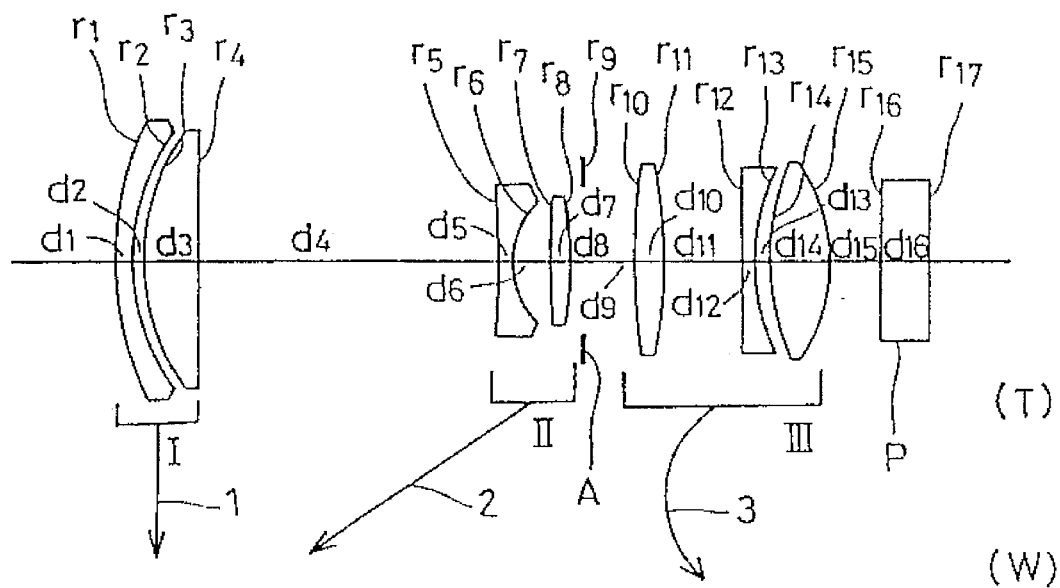
Figure 12:
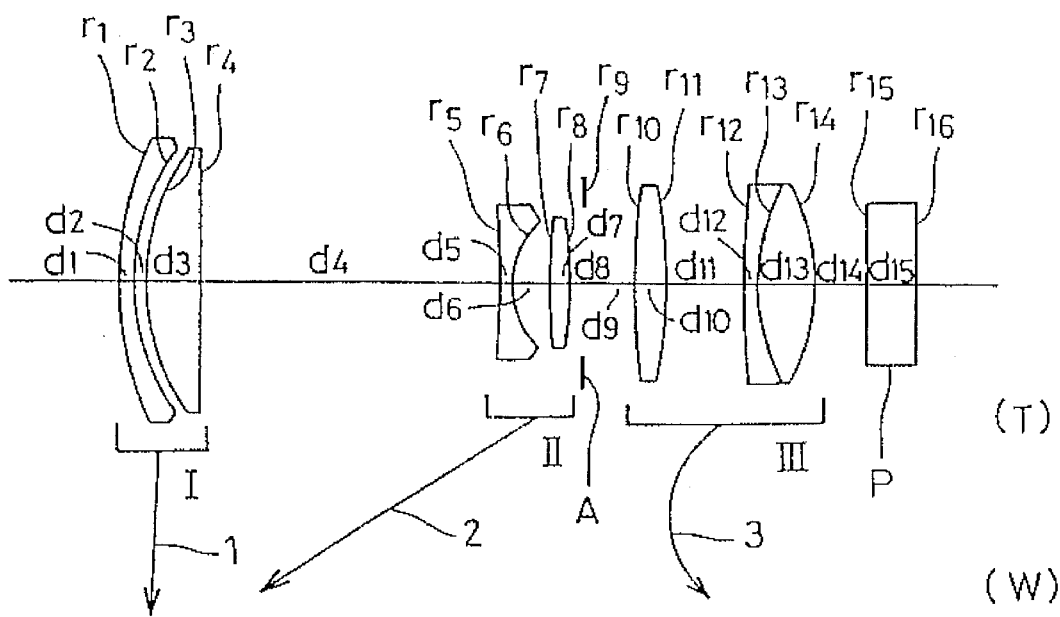
Figure 13:
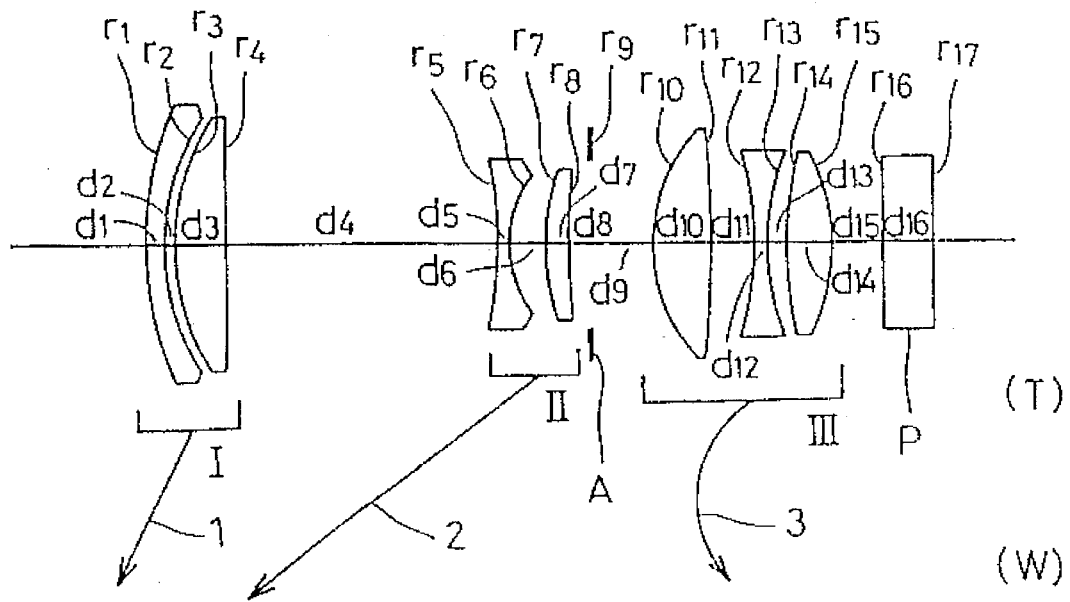
Figure 14:
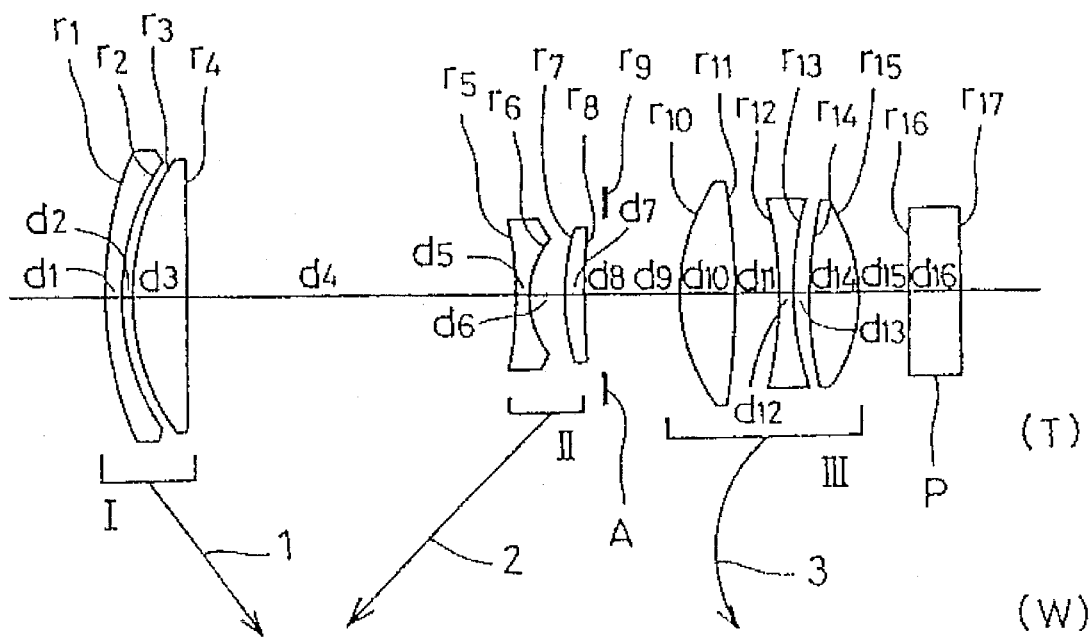
Figure 15:
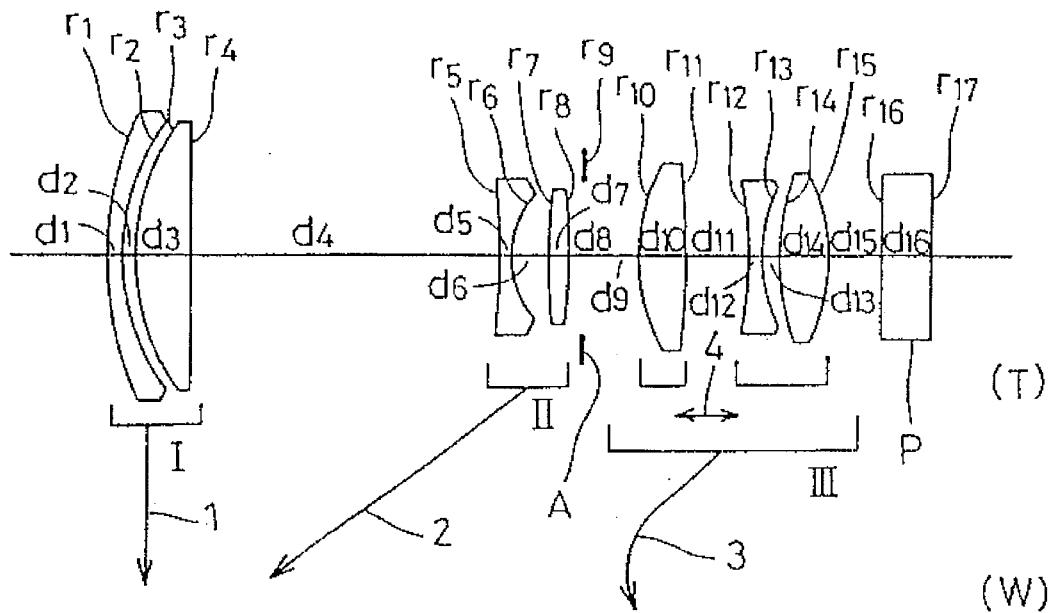
Figure 16:
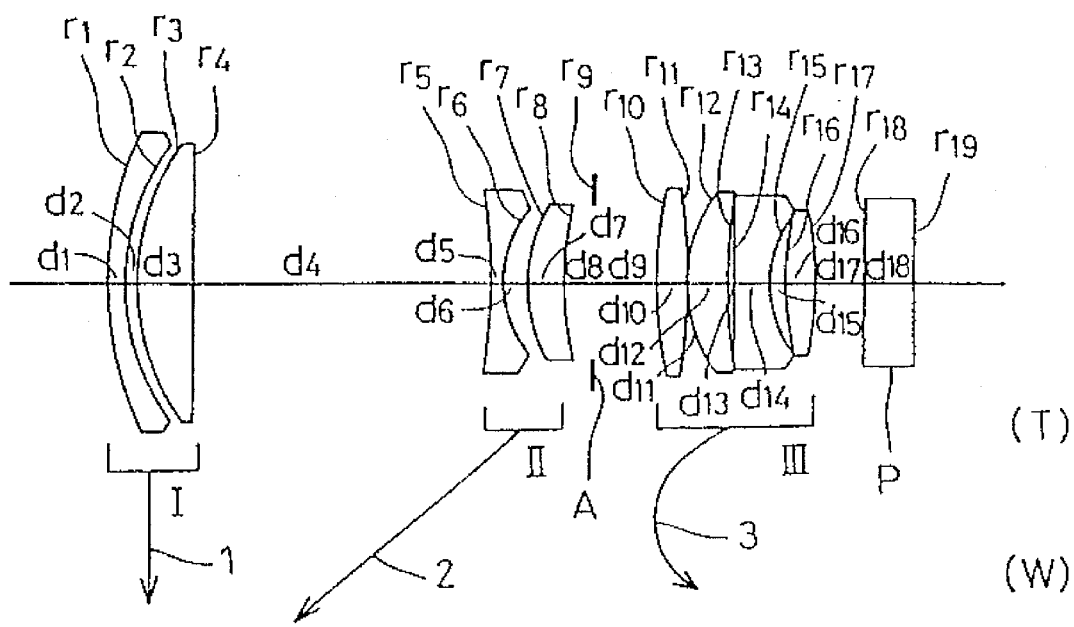
Figure 17:
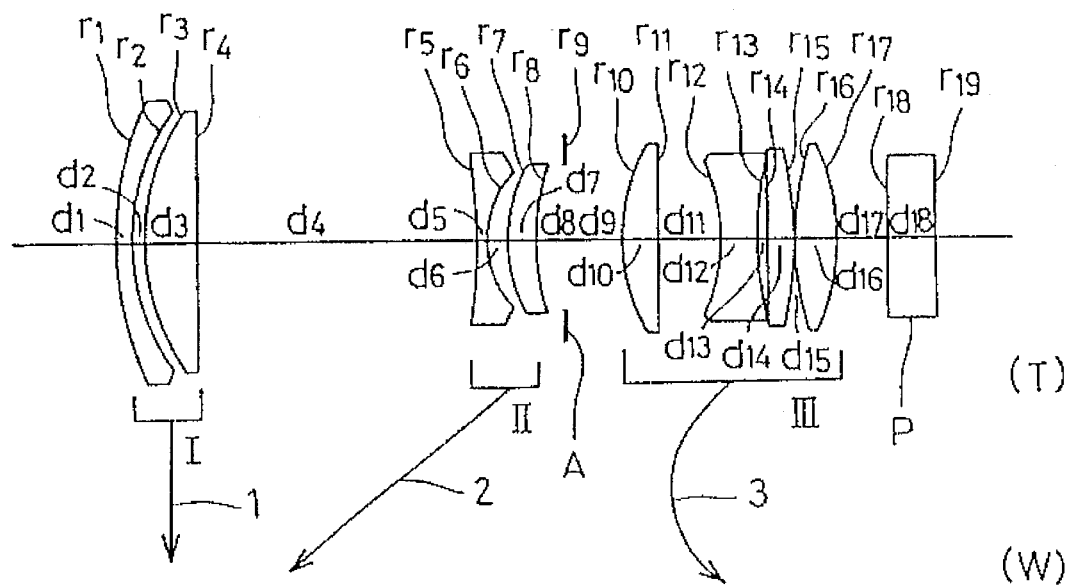
Figure 18:
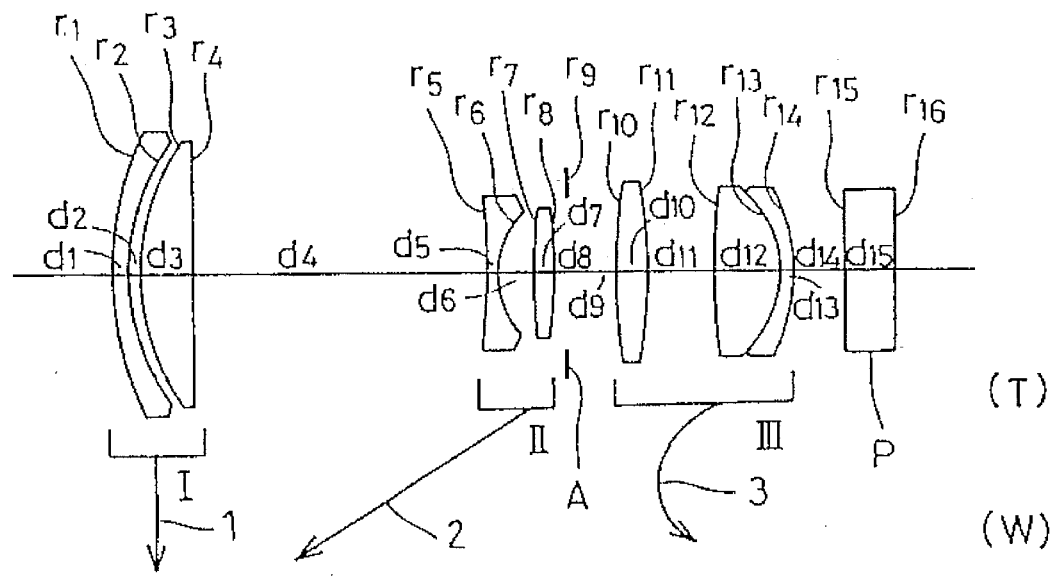
Figure 19:
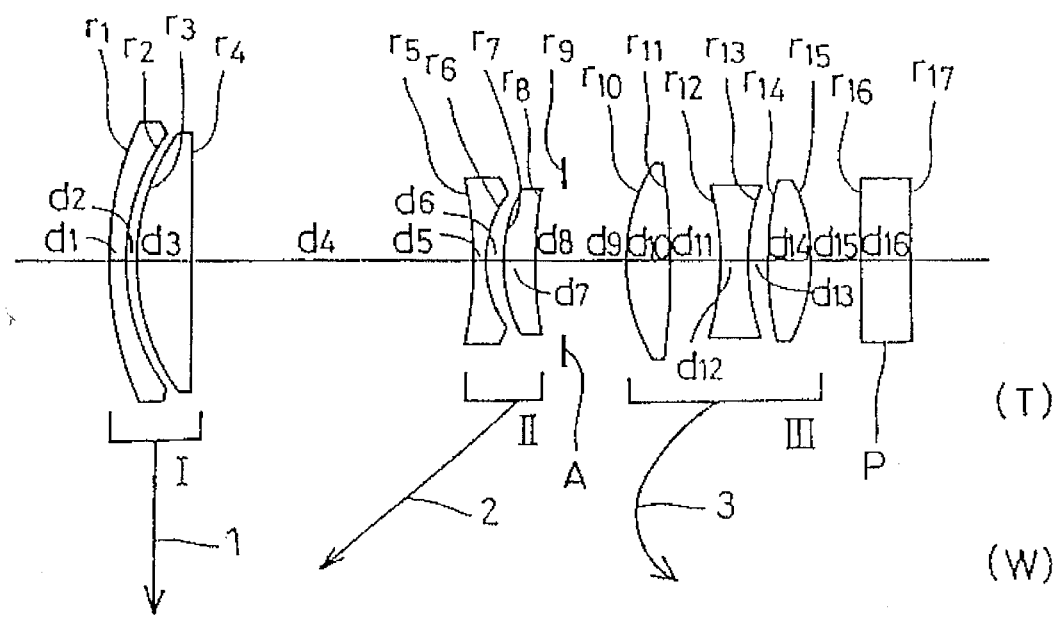
Figure 20:
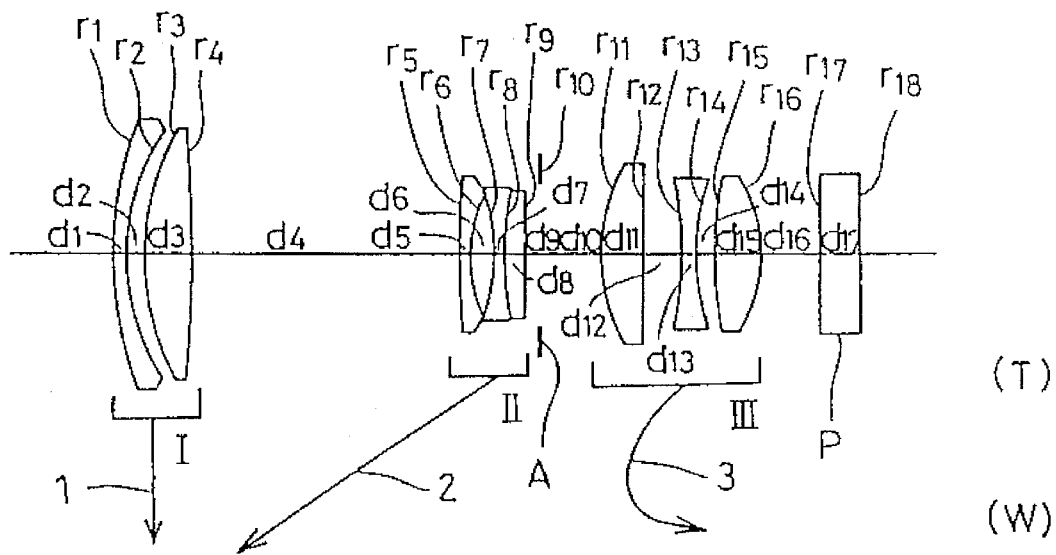

FIGS. 5 to 20 are the cross sectional views of the lens arrangements corresponding to the above-described embodiments 1 to 16, respectively, wherein the arrows 1, 2 and 3 show a movement of the first, second, third lens units I, II and III from the longest focal length condition (T) to the shortest focal length condition (W).

An iris A is provided between the second lens unit II and the third lens unit III. Aberrations are corrected in the condition where a plate P which corresponds to a low pass filter and a face plate is inserted at a position closest to the image.

In each embodiment, at a zooming from the longest to the shortest focal length conditions, the second lens unit moves toward the object side along the optical axis, and the third lens unit moves toward the object side and returns on the way. In the embodiments 1 to 8, and 11 to 16, the first lens unit does not move. In the embodiments 9 and 10, all the lens units move; in the embodiment 9, the first lens unit moves toward the object side and in the embodiment 10, toward the image side.

The embodiments 1 to 11 consist of seven lens elements; the first and second lens units having two lens elements respectively and the third lens unit having, from the object side, a positive, a negative and a positive lens elements. The embodiment 11 has a floating function where the third lens unit has, from the object side, a front lens component having a positive lens and a rear lens component having a negative and a positive lens elements, and the relative positions of the two lens components are slightly changed (shown by the arrow 4) at a zooming operation.

The embodiment 12 and 13 consist of eight lens elements; the first and second lens units having two lens elements respectively and the third lens unit having, from the object side, a positive, a positive, a negative whose object-side surface has a strong refractive power and a positive lens elements, and the third lens unit having, from the object side, a positive, a negative bi-concave lens, a positive and a positive lens elements.

The embodiment 14 consists of seven lens elements; the first and second lens units having two lens elements, respectively, and the third lens units having, from the object side, a positive, a positive and a negative lens elements.

The above-described embodiments 1 to 14 have aspherical surfaces for the second and third lens units.

The embodiment 15 has a lens arrangement similar to that of the embodiment 1. However, it employs an aspherical surface for the first lens unit to obtain a higher performance.

The embodiment 16 consists of eight lens elements; the first lens unit having two lens elements, the second lens unit having three lens elements, and the third lens unit having three lens elements. Aspherical surfaces are employed for the second and third lens units.

The aspherical surfaces employed for the present invention can be made from pressed or re-processed saltpeter, or from thin layers of resin plastered together.

Figure 22A:
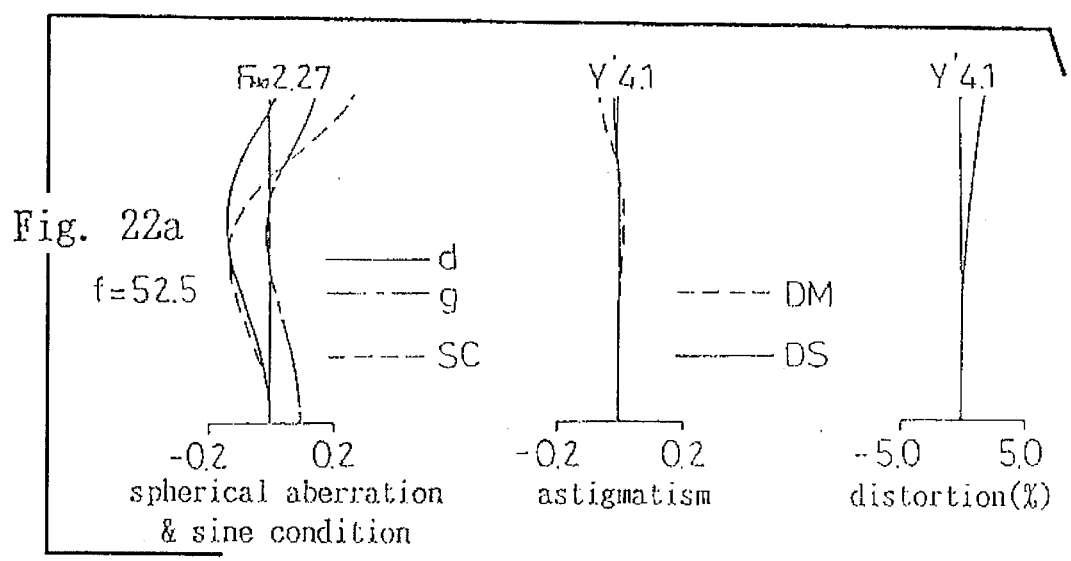
Figure 22B:
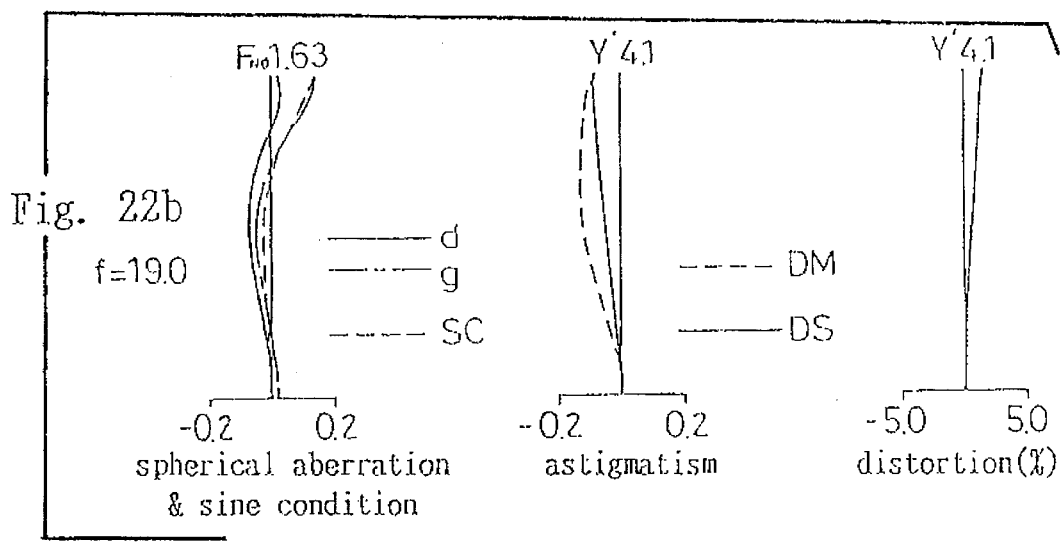
Figure 22C:
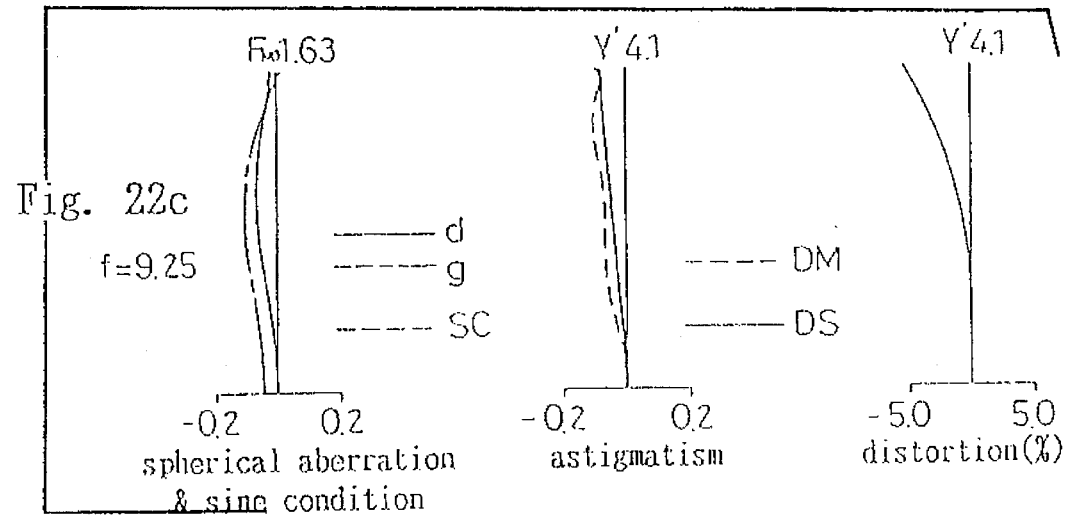
Figure 25A:
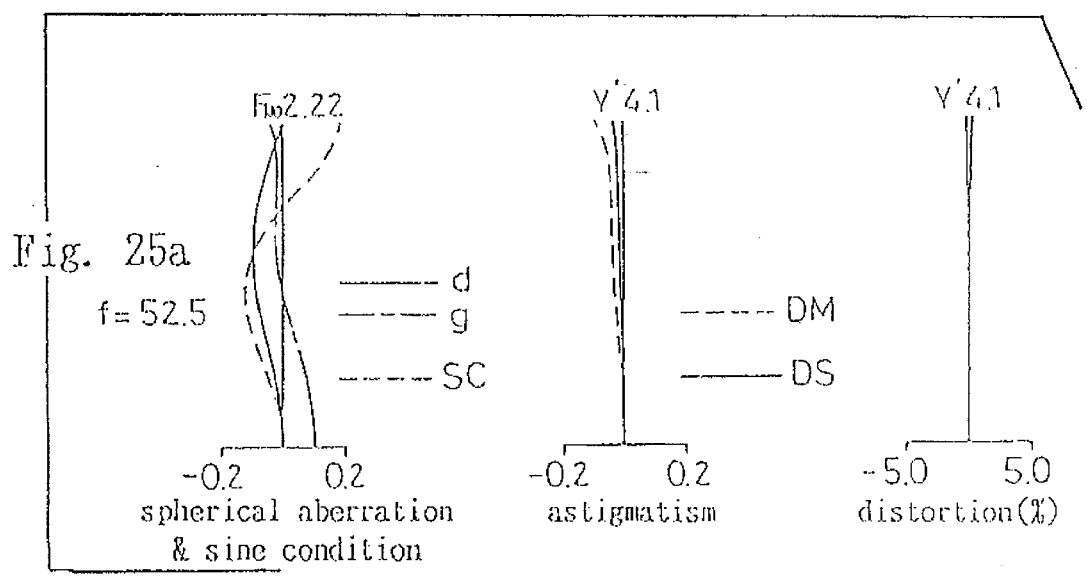
Figure 25B:
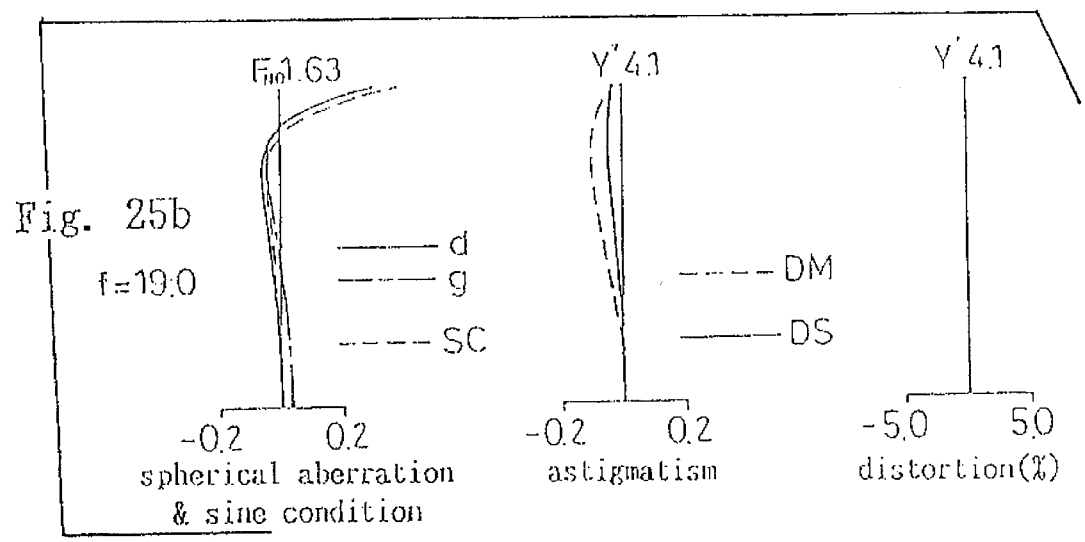
Figure 25C:
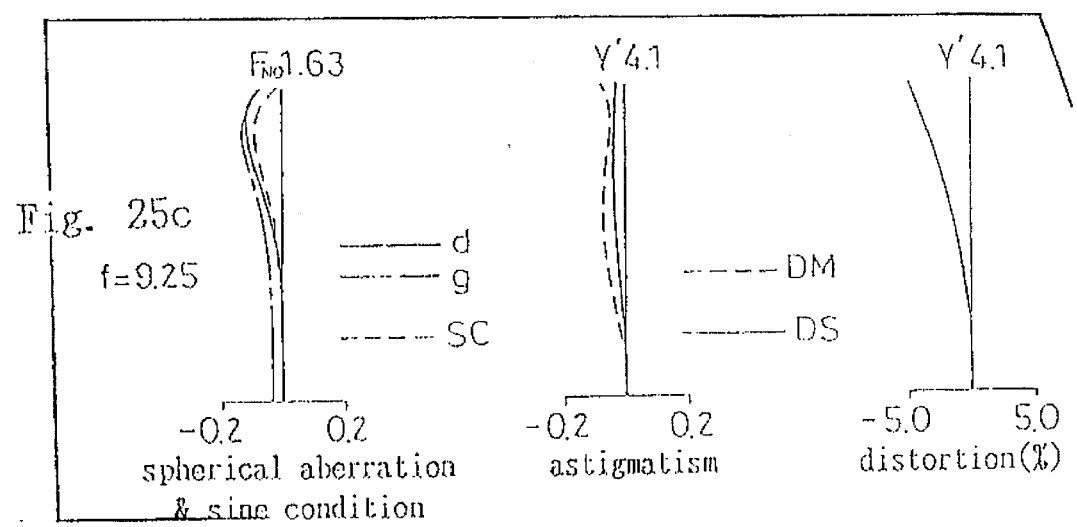
Figure 26A:
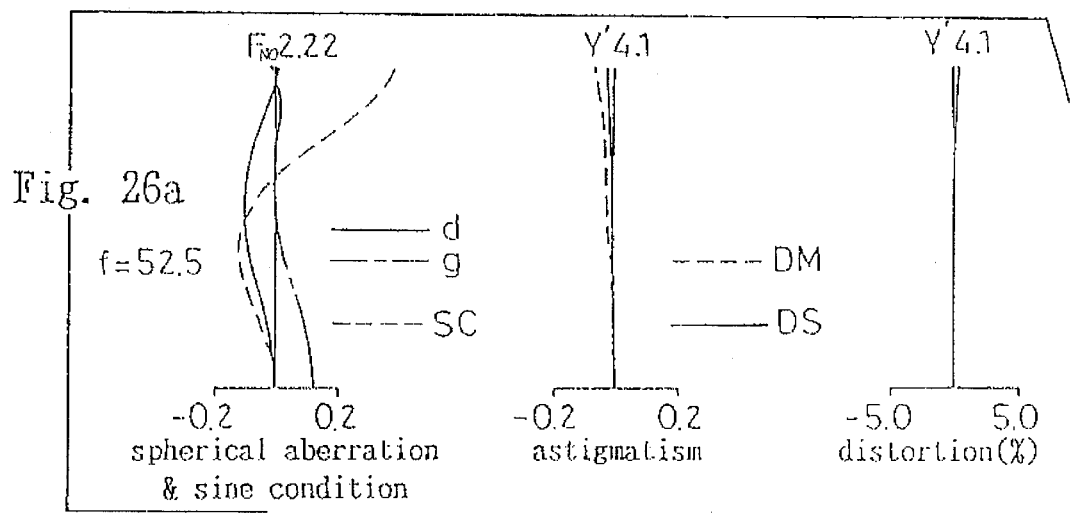
Figure 26B:
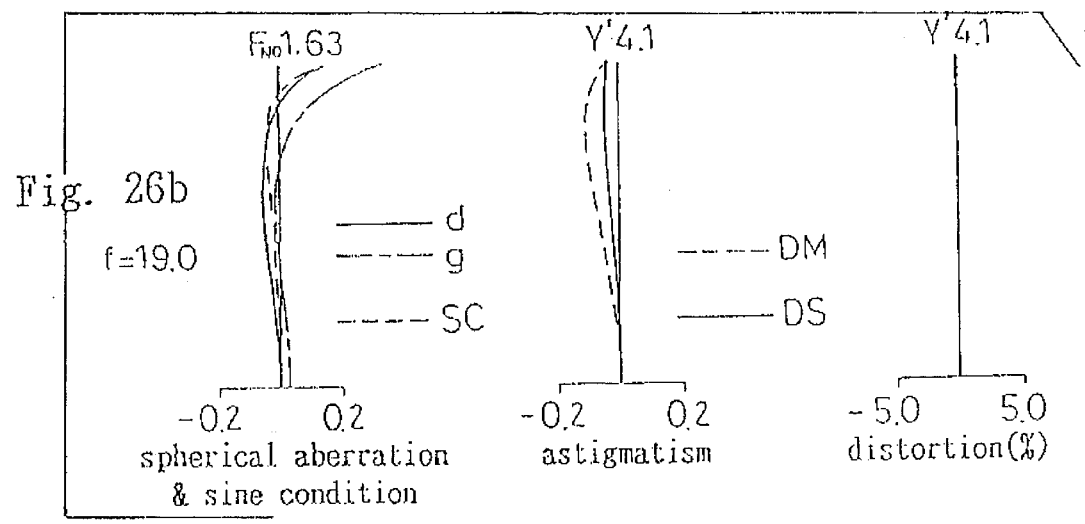
Figure 26C:
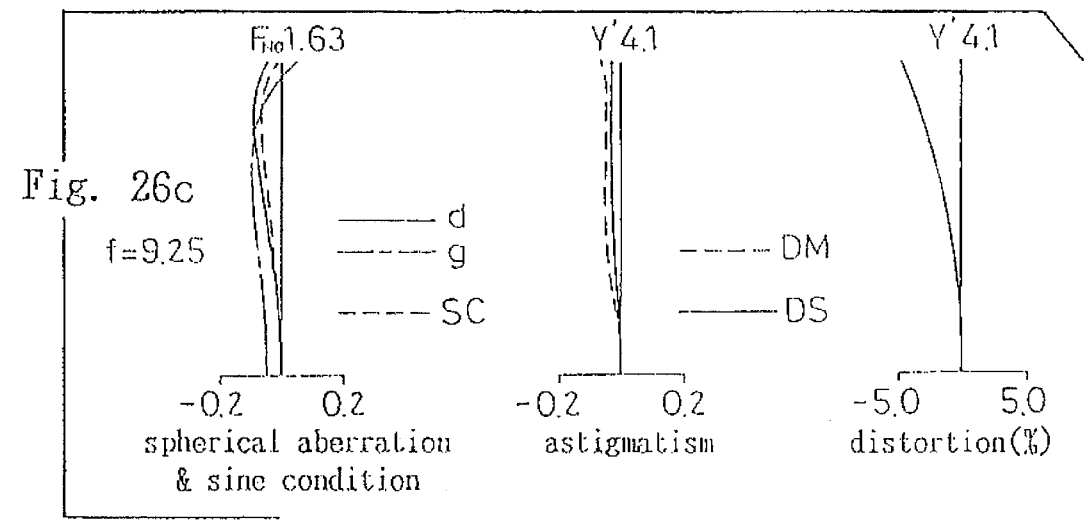
Figure 30A:
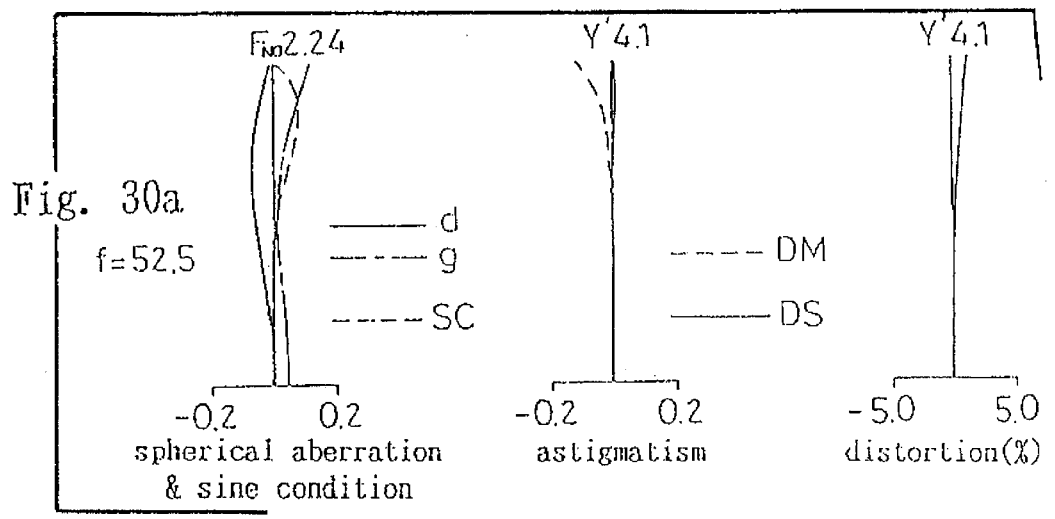
Figure 30B:
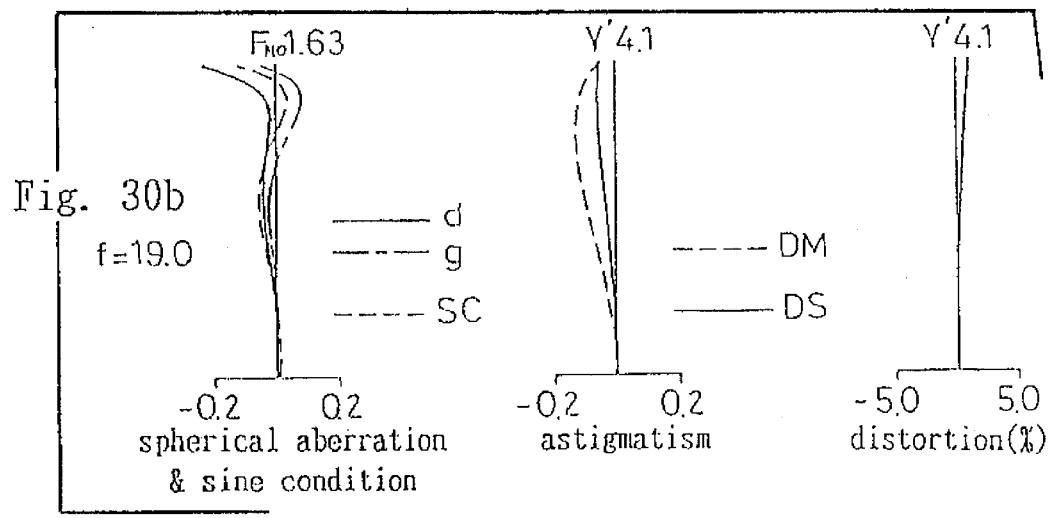
Figure 30C:
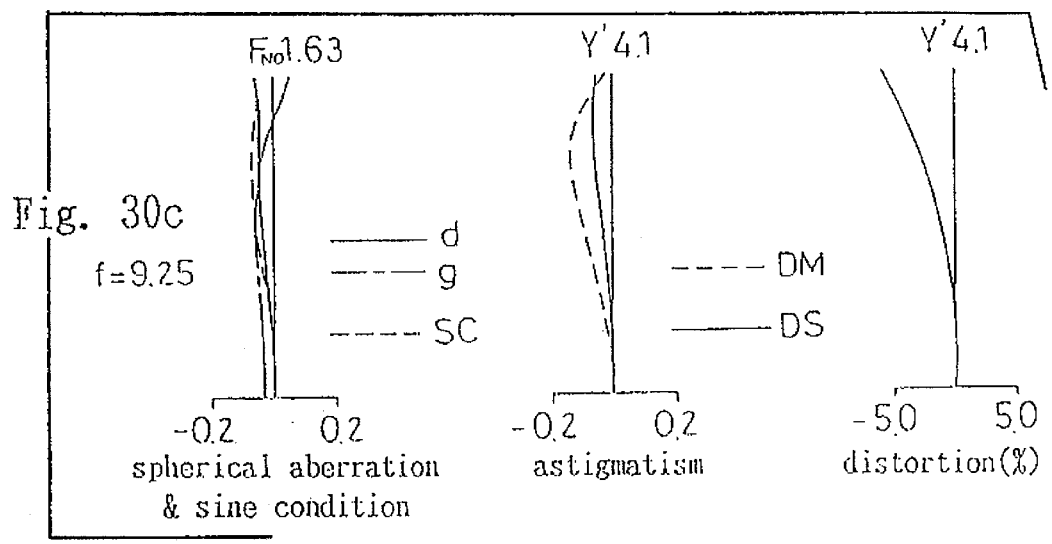

FIGS. 21a, 21b, and 21c to 36a, 36b, and 36c show the aberrations of the above-described embodiments 1 to 16, respectively. a, b and c of each FIG. show the aberrations at the longest, the middle and the shortest focal length conditions, respectively. A solid line d shows the aberration to the d-line. A dotted line SC shows a sine condition. A dotted line DM and a solid line DS show the astigmatism at the meridional and sagittal image planes, respectively.

The above-described embodiments have a satisfactory performance with only three lens units having seven or eight lens elements in spite of having a very high zoom ratio of 6× and a large aperture ratio of F1.6, where a required compactness is achieved in the total length and the diameter of the front lens. The object of the present invention is fully attained.

Figure 37:
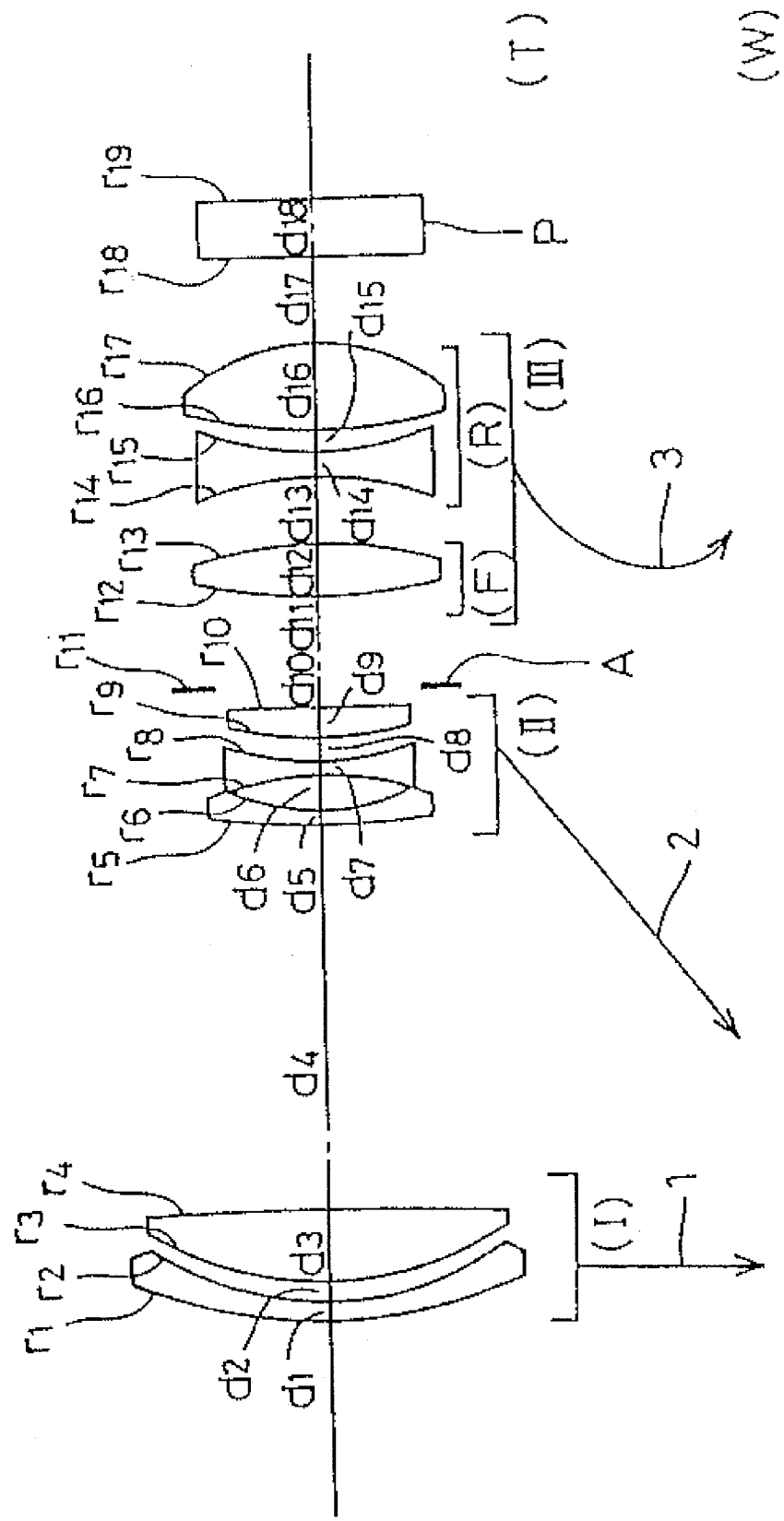
FIGS. 37 to 43 are the cross sectional views of the lens arrangements corresponding to the embodiments 17 to 23 of the present invention, respectively.
Figure 38:
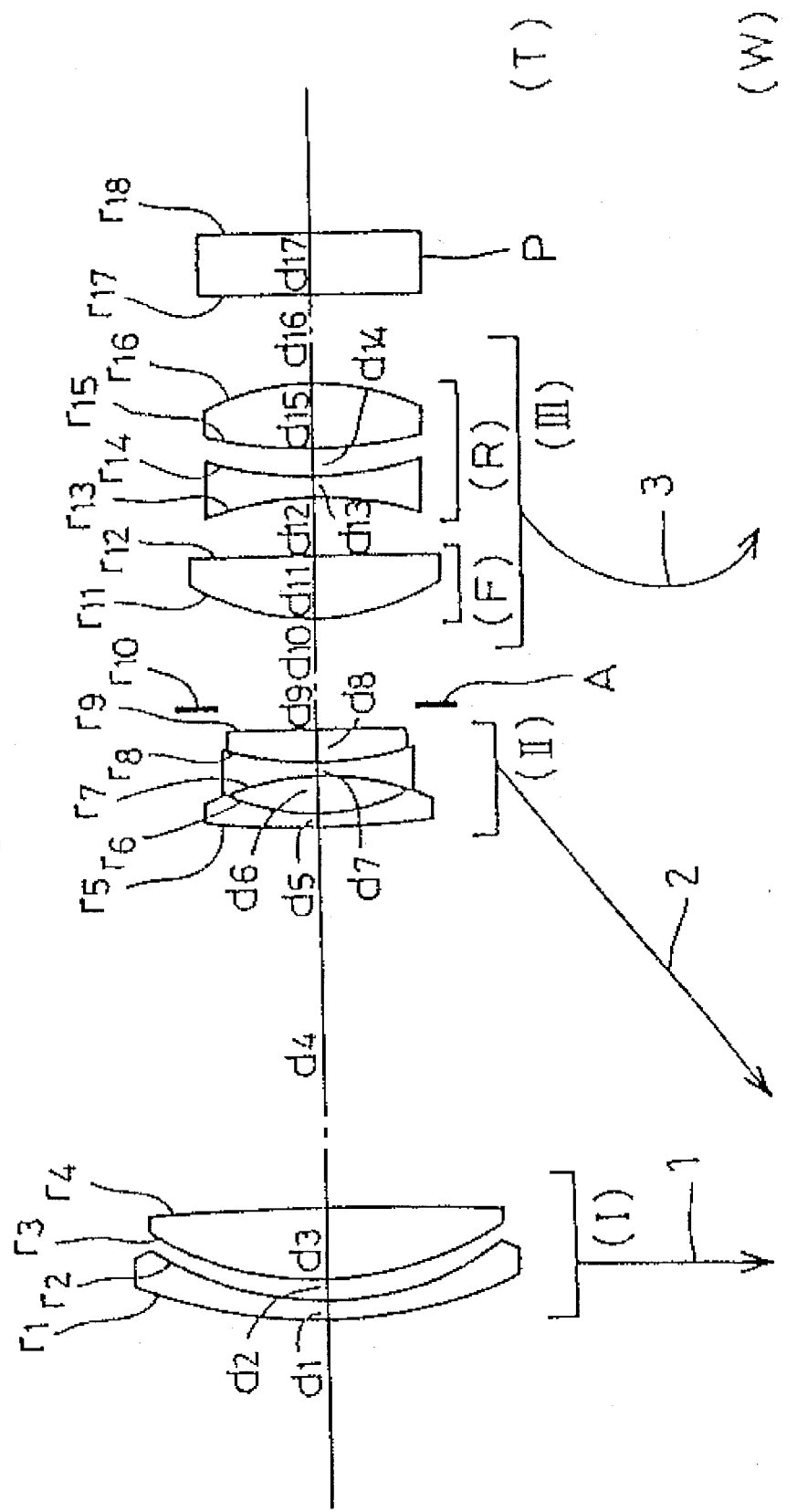
Figure 39:
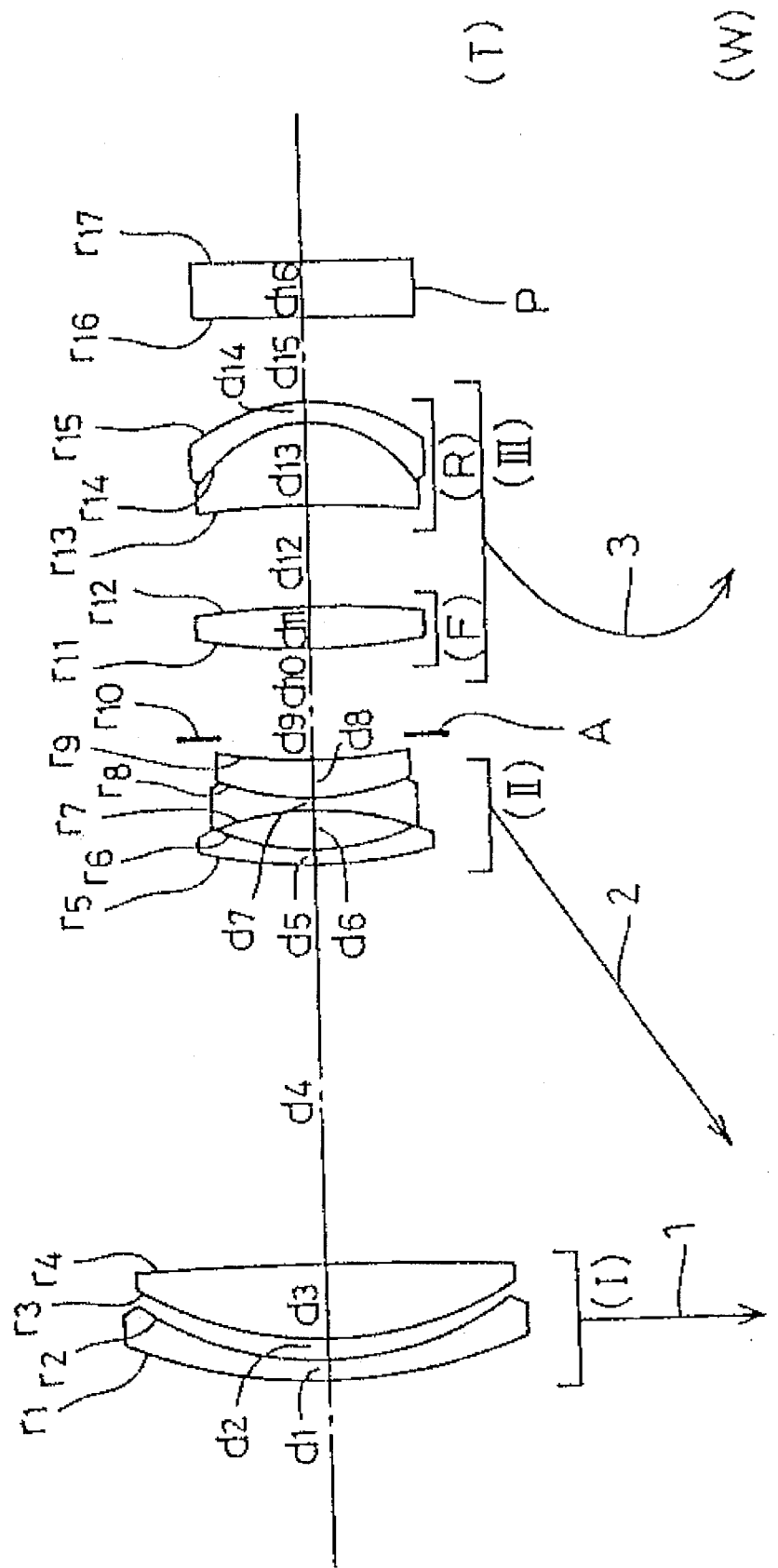
Figure 40:
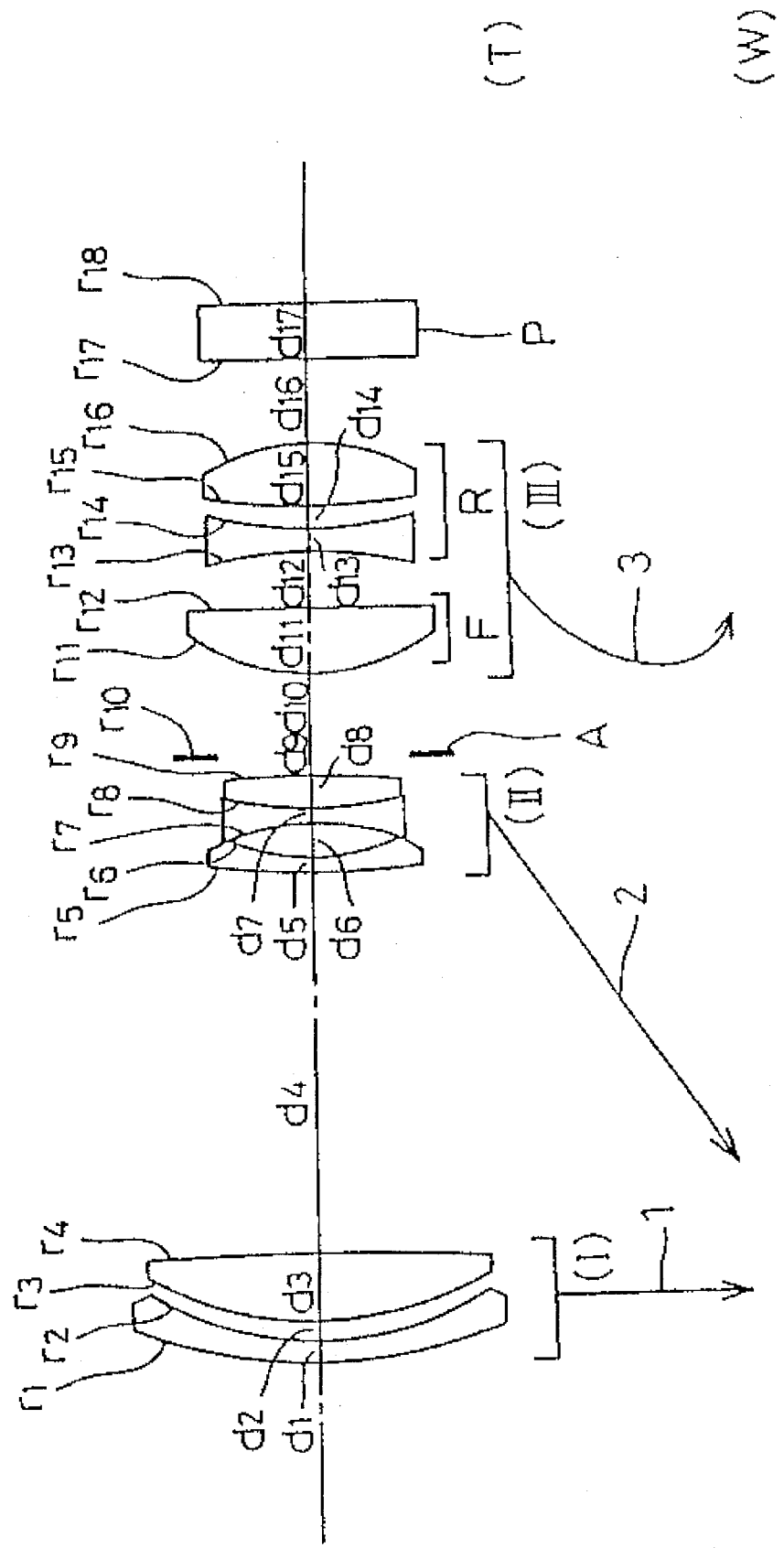
Figure 41:
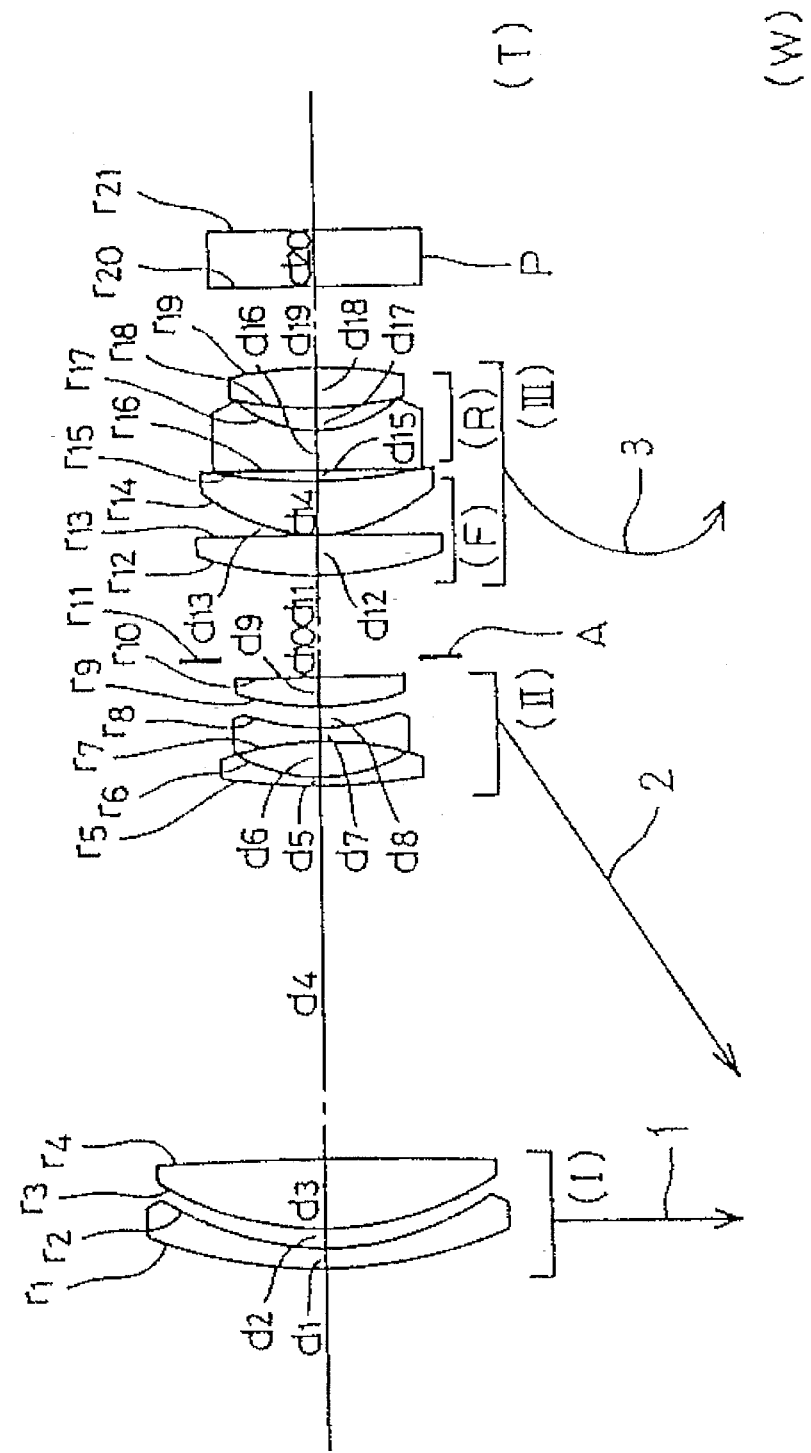
Figure 42:
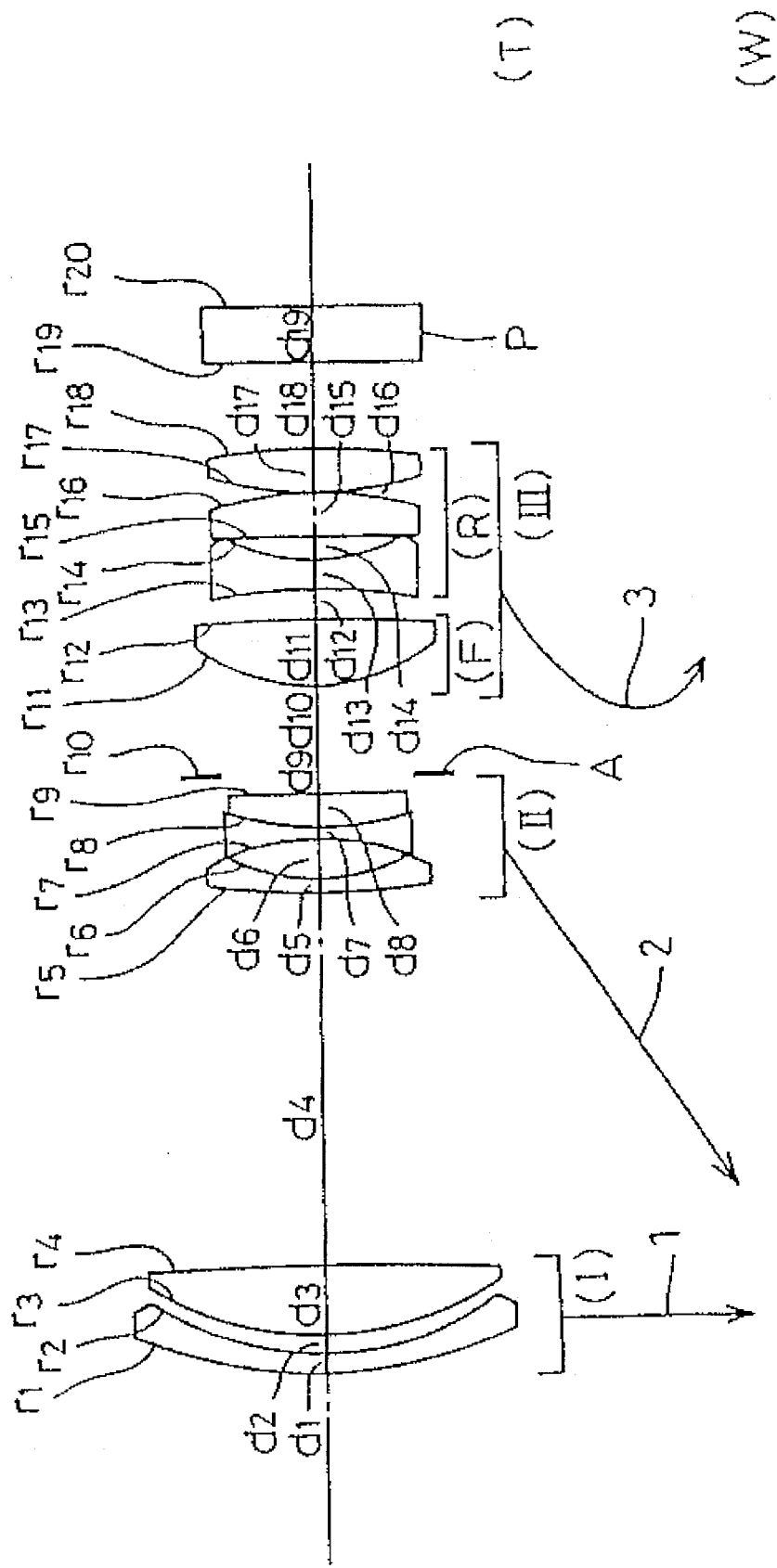
Figure 43:
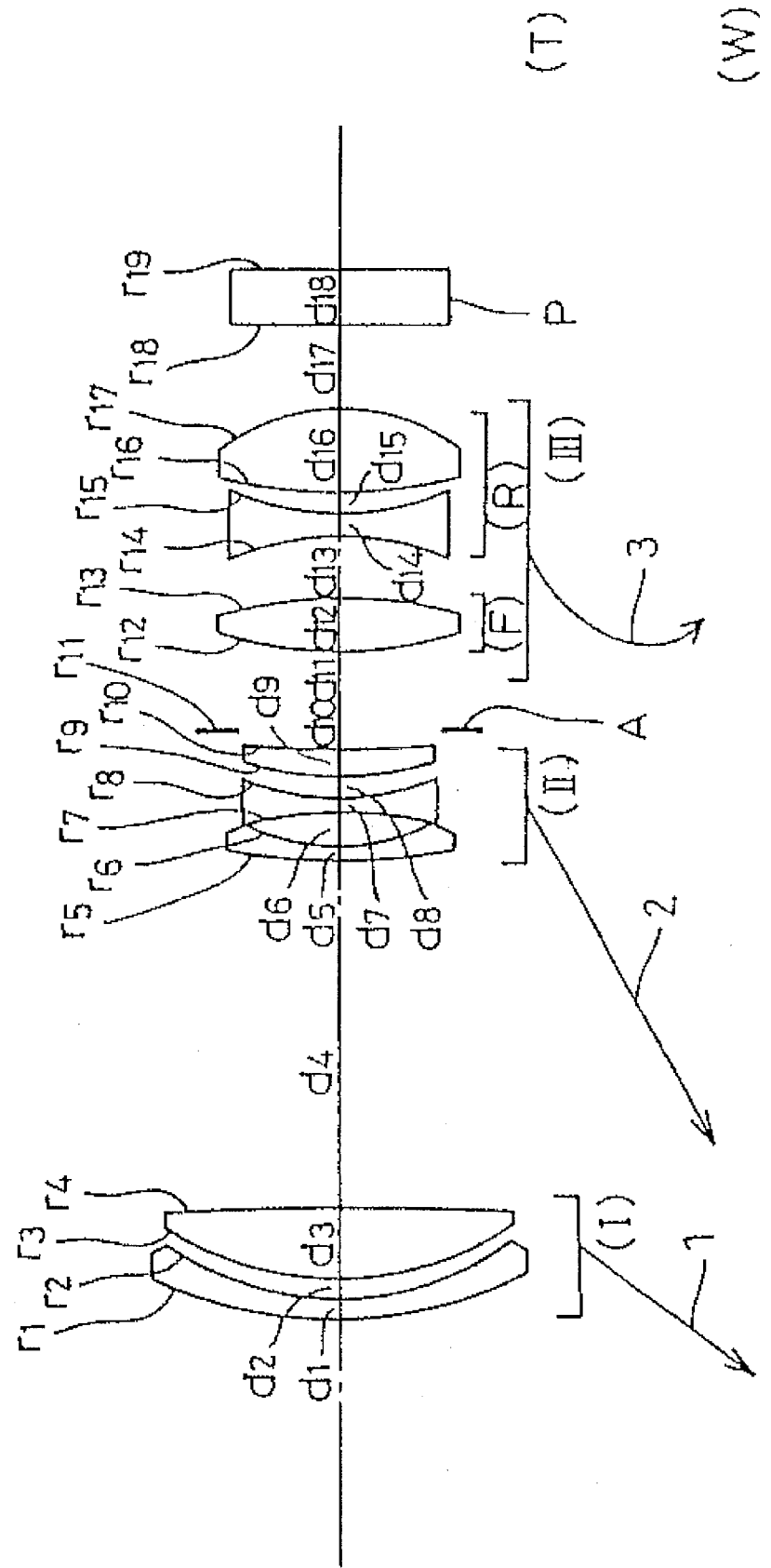

FIGS. 37 to 43 are the cross sectional views of the lens arrangements corresponding to the above-described embodiments 17 to 23, respectively, wherein the arrows 1, 2 and 3 show a movement of the first, second, third lens units I, II and III from the longest focal length condition (T) to the shortest focal length condition (W).

An iris A is provided between the second lens unit II and the third lens unit III. Aberrations are corrected in the condition where a plate P which corresponds to a low pass filter and a face plate is inserted at a position closest to the image.

In each embodiment, at a zooming from the longest to the shortest focal length conditions, the second lens unit moves toward the object side along the optical axis, and the third lens unit moves toward the object side and returns on the way. In the embodiments 17 to 22, the first lens unit does not move. In the embodiments 23, all the lens units move; the first lens unit moves toward the object side.

In each embodiment, a slight variation in aberration can be corrected by slightly changing the distance between the object-side unit F and the image-side unit R of the third lens unit at a zooming operation.

In the embodiments 17 and 18, the third lens unit has, from the object side, the object-side unit F having a positive lens element and the image-side unit R having a negative and a positive lens elements.

In the embodiment 19, the image-side unit R has a positive lens element and a negative meniscus lens element whose image-side surface is convex.

In the embodiment 20, an aspherical surface is employed for the second unit E to obtain a higher performance.

In the embodiments 17 to 20, a zoom ratio of 6× with an F-number of F1.6 is realized with only eight lens elements (with the third lens unit having only three lens elements) by employing two or three aspherical surfaces.

In the embodiment 21, the object-side unit F of the third lens unit III has two positive lens elements, and the image-side unit R of the third lens unit has a negative lens element whose image-side surface has a strong refractive power and a positive lens element.

In the embodiment 22, the object-side unit F of the image-third lens unit has a positive lens element, and the side unit R has a negative bi-concave lens element and two positive lens elements.

In the embodiments 21 and 22, a zoom ratio of 6× with an F-number of F1.6 with only nine lens elements by employing only one aspherical surface.

In the embodiment 23, all the lens units (the first, second and third lens units) move.

The aspherical surfaces employed for the present invention can be made from pressed or re-processed saltpeter, or from thin layers of resin plastered together.

Figure 47A:
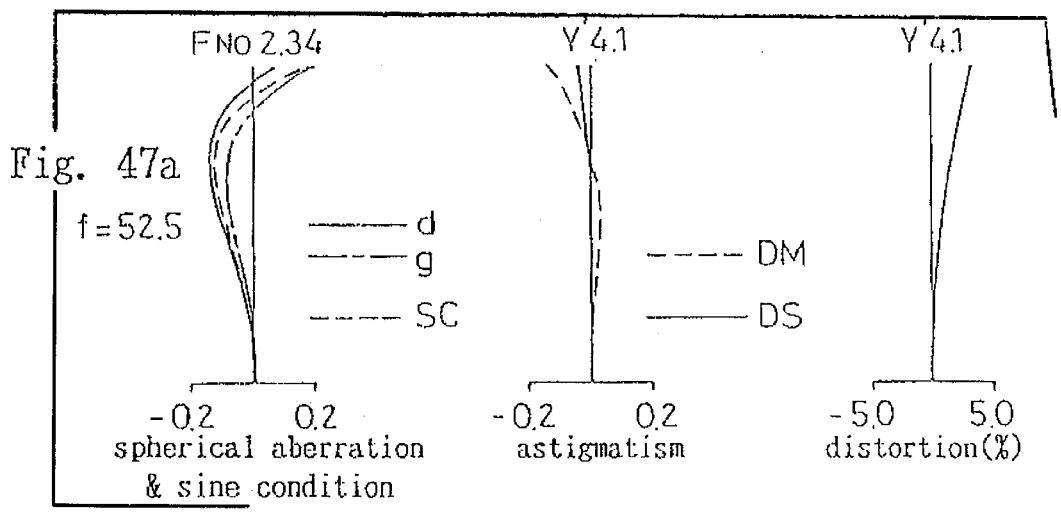
Figure 47B:
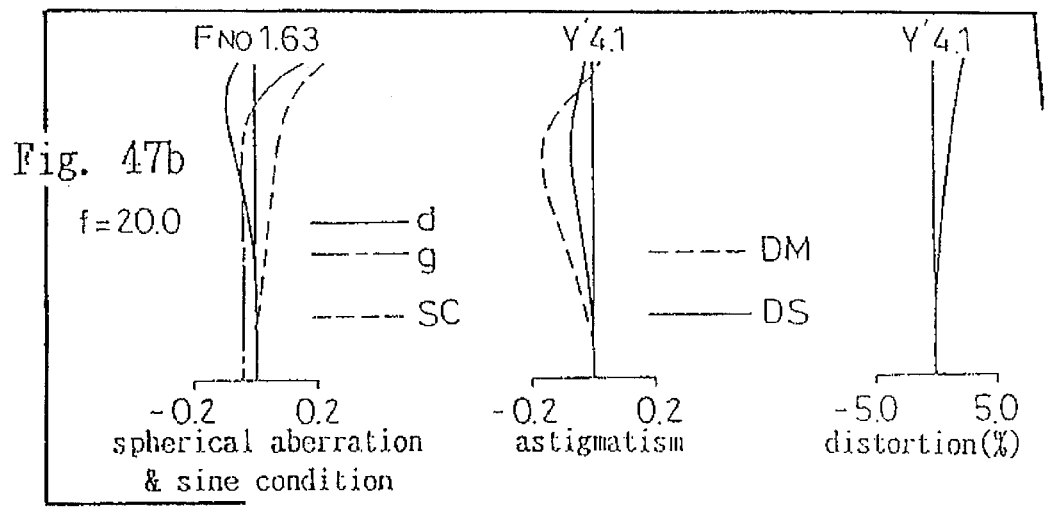
Figure 47C:
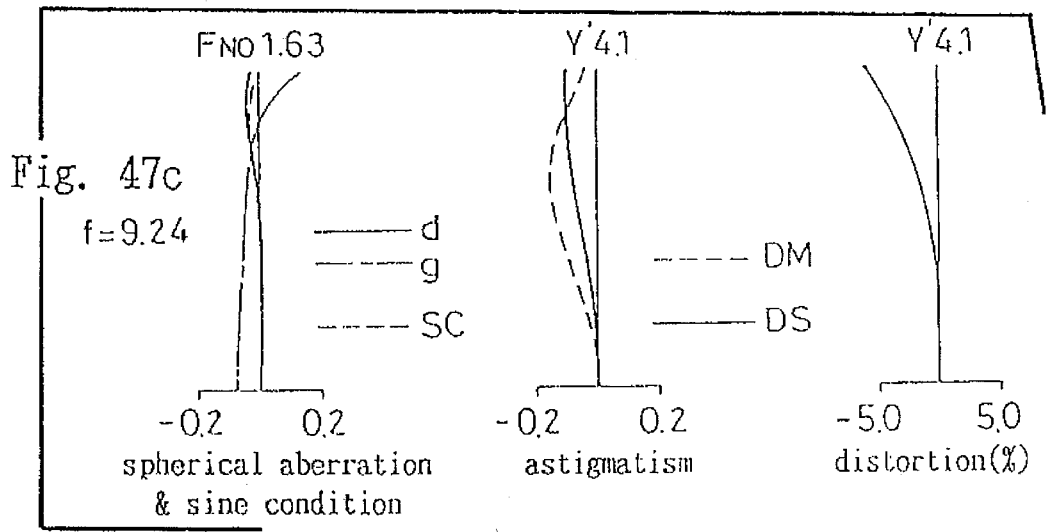
Figure 48A:
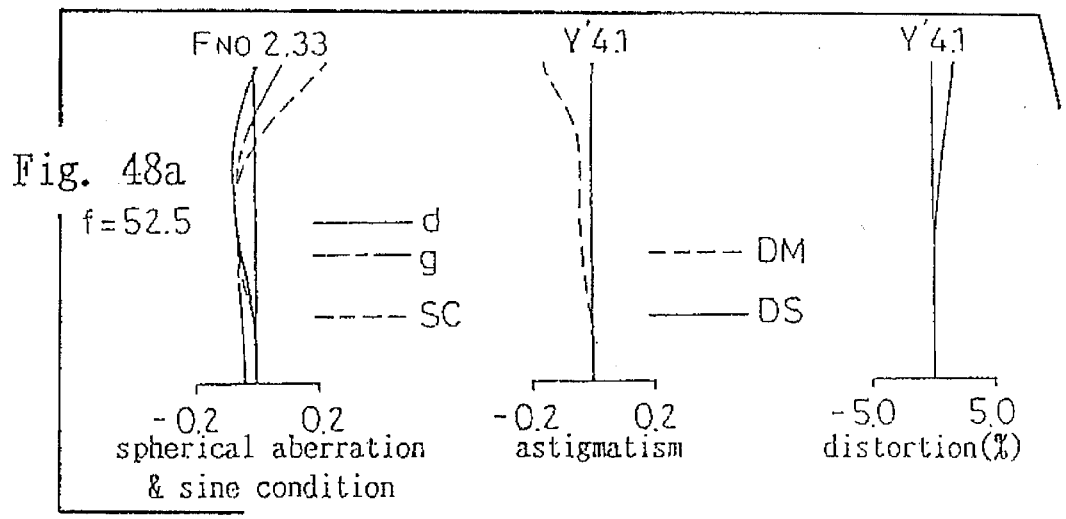
Figure 48B:
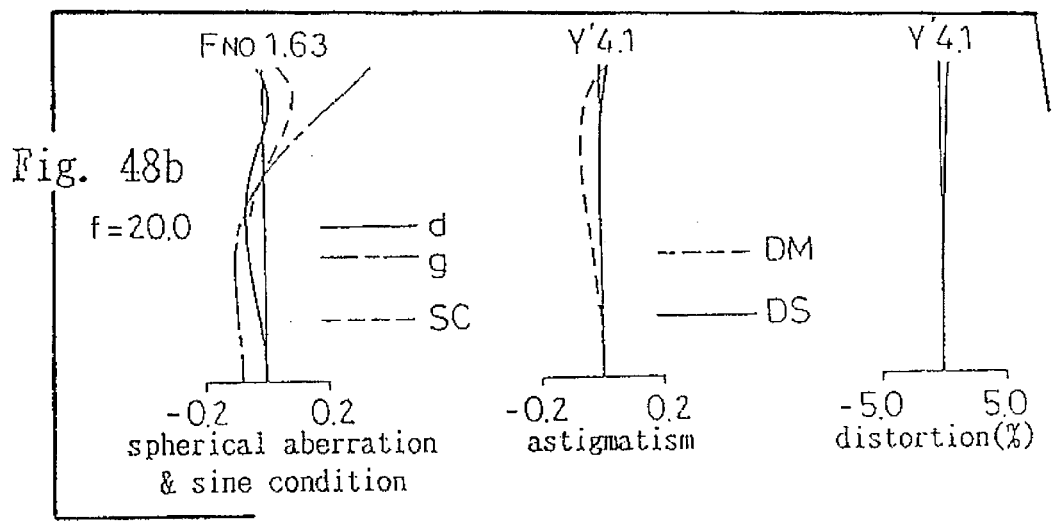
Figure 48C:
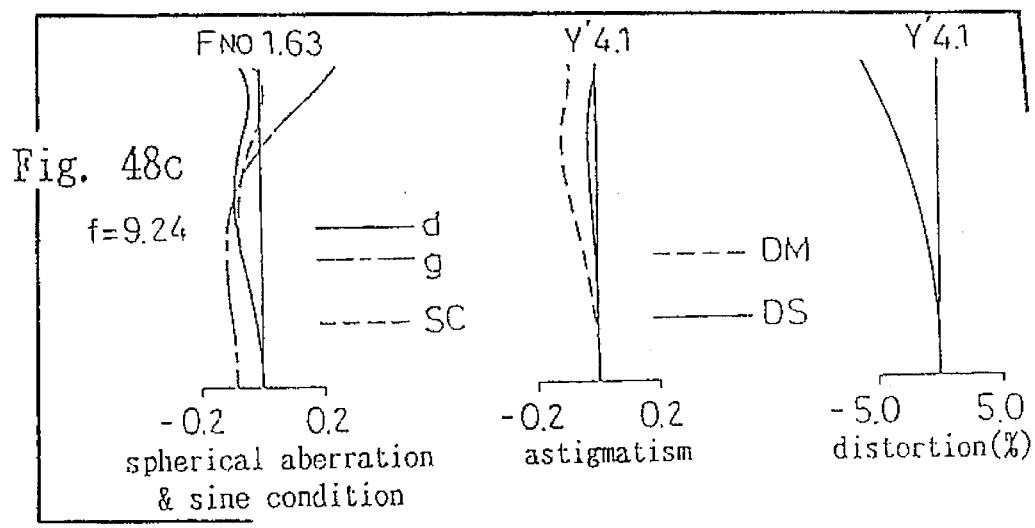
Figure 49A:
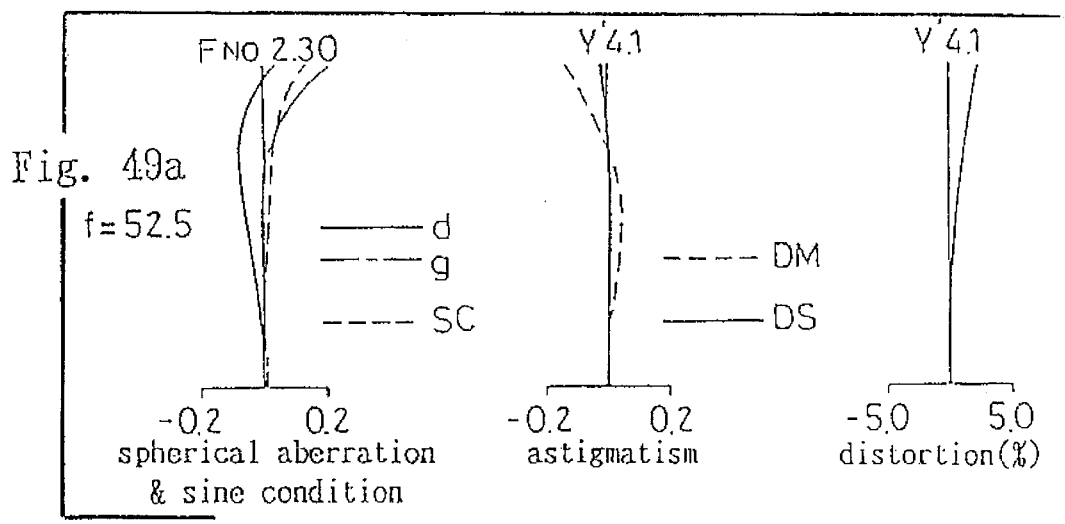
Figure 49B:
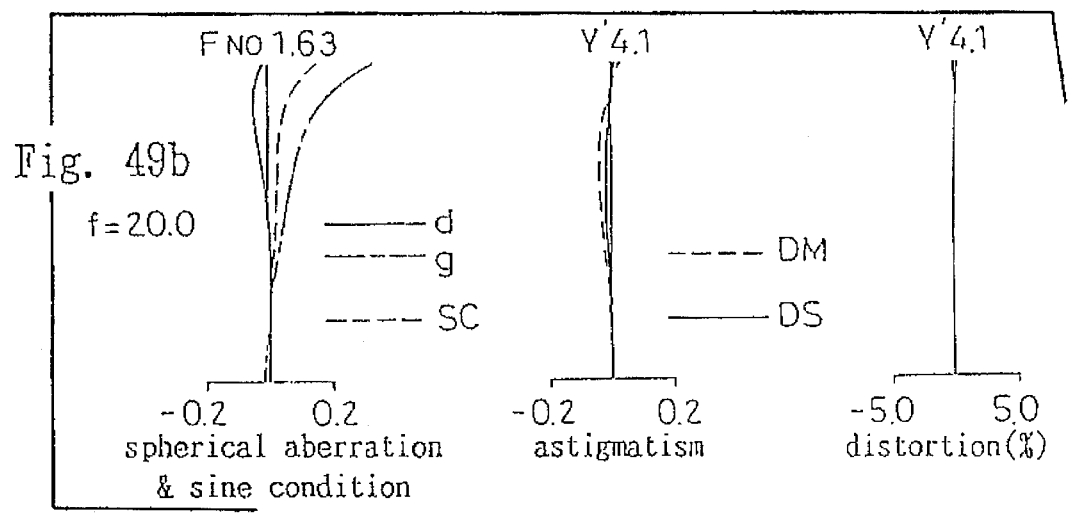
Figure 49C:
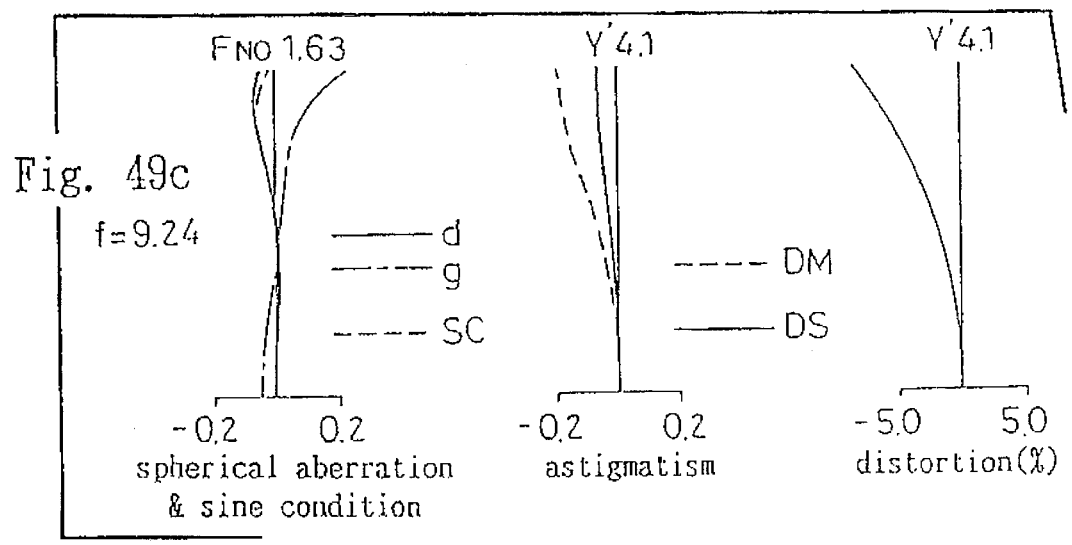

FIGS. 44a, 44b, and 44c to 50a, 50b, and 50c show the aberrations of the above-described embodiments 17 to 23, respectively. a, b and c of each FIG. show the aberrations at the longest, the middle and the shortest focal length conditions, respectively. A solid line d shows the aberration to the d-line. A dotted line SC shows a sine condition. A dotted line DM and a solid line DS show the astigmatism at the meridional and sagittal image planes, respectively.

The above-described embodiments have a satisfactory performance with only three lens units having seven or eight lens elements in spite of having a very high zoom ratio of 6× and a large aperture ratio of F1.6, where a required compactness is achieved in the total length and the diameter of the front lens. The object of the present invention is sufficiently attained.

Figure 51:
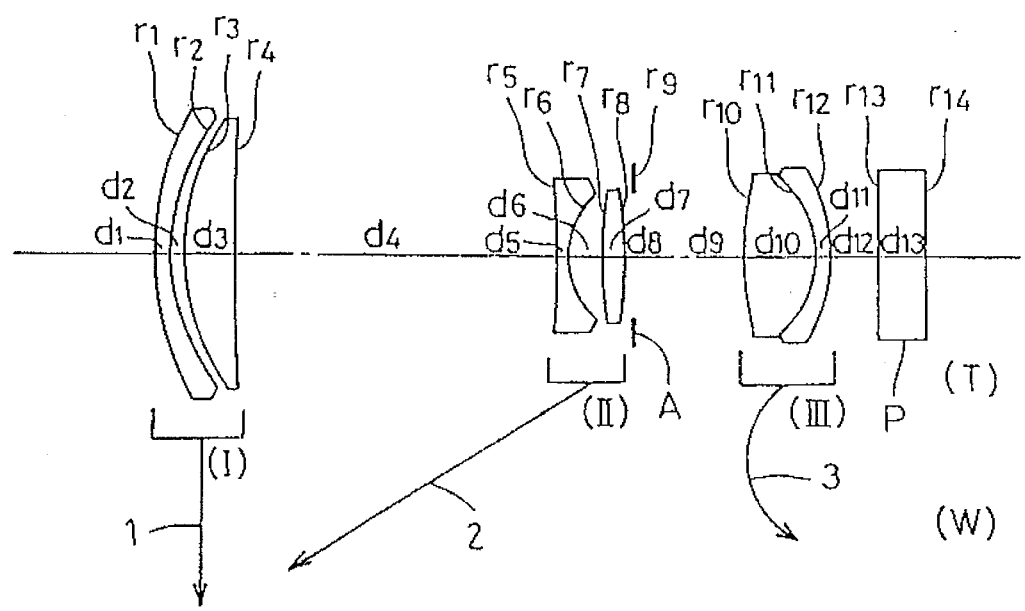
FIGS. 51 to 59 are the cross sectional views of the lens arrangements corresponding to the above-described embodiments 24 to 32, respectively.
Figure 52:
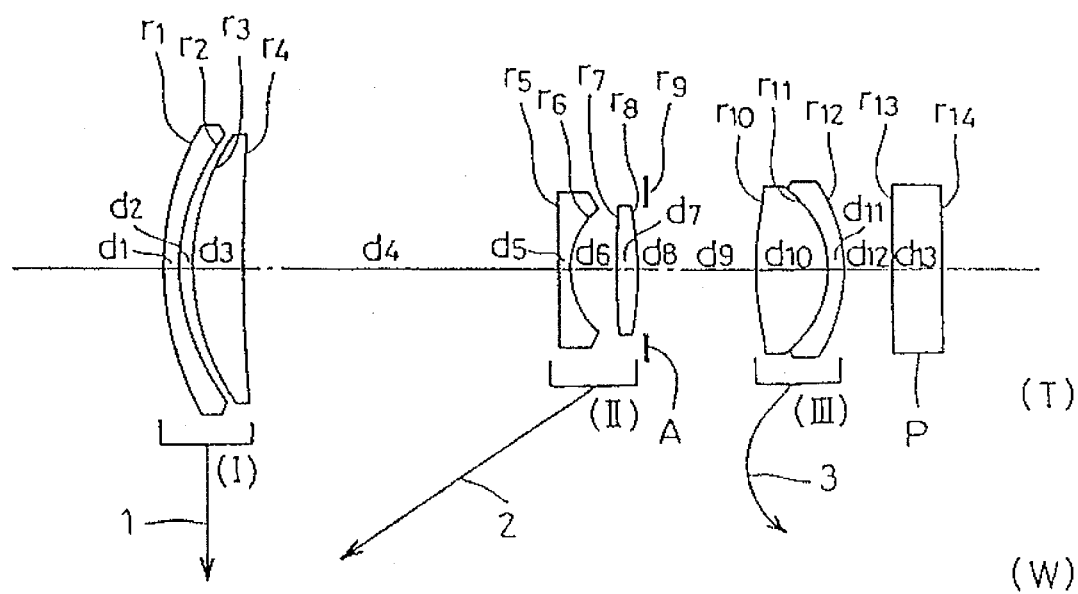
Figure 53:
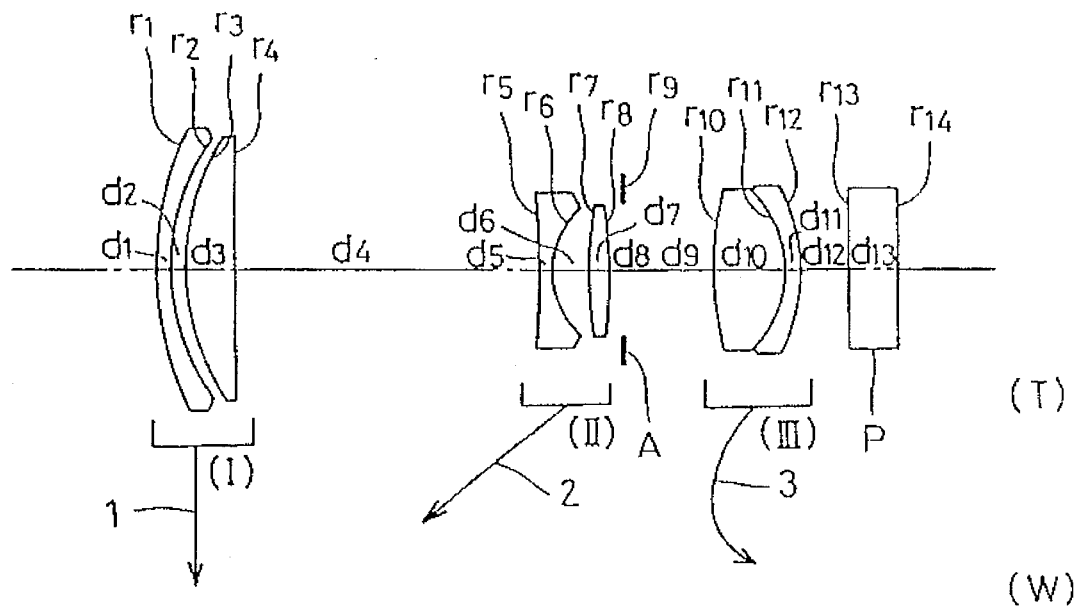
Figure 54:
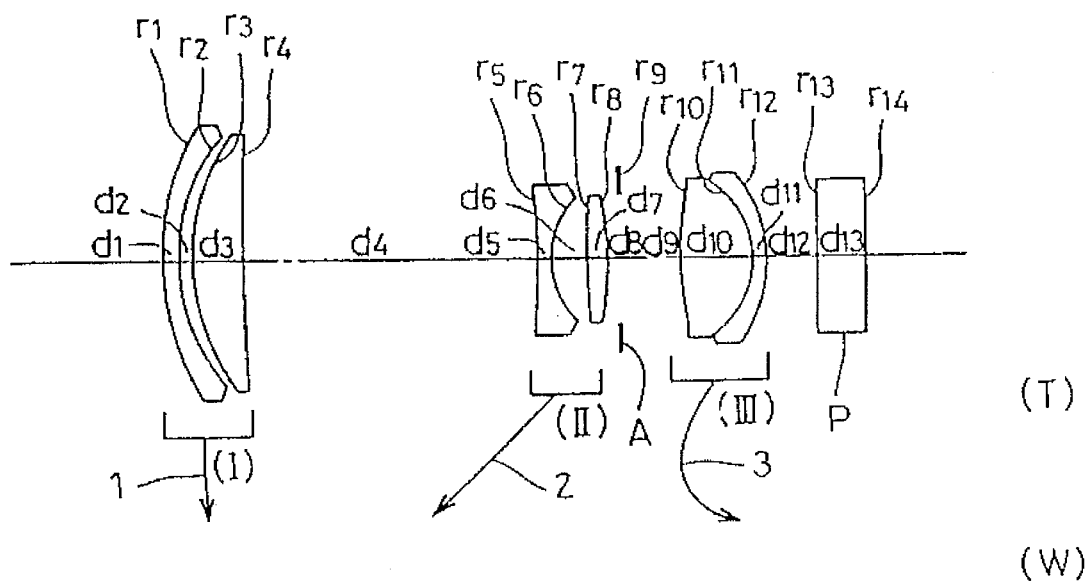
Figure 55:
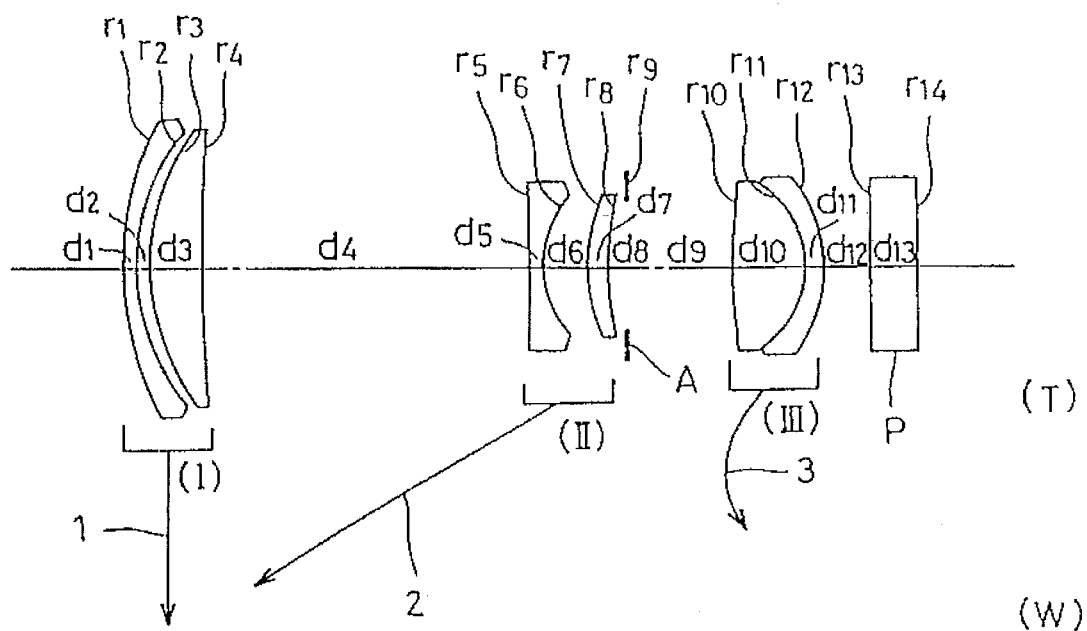
Figure 56:
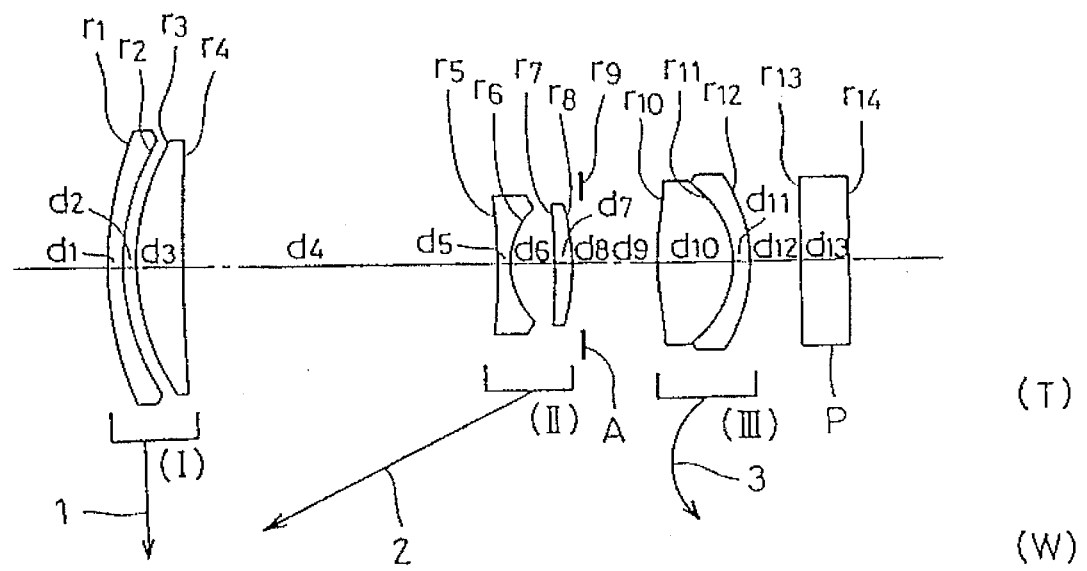
Figure 57:
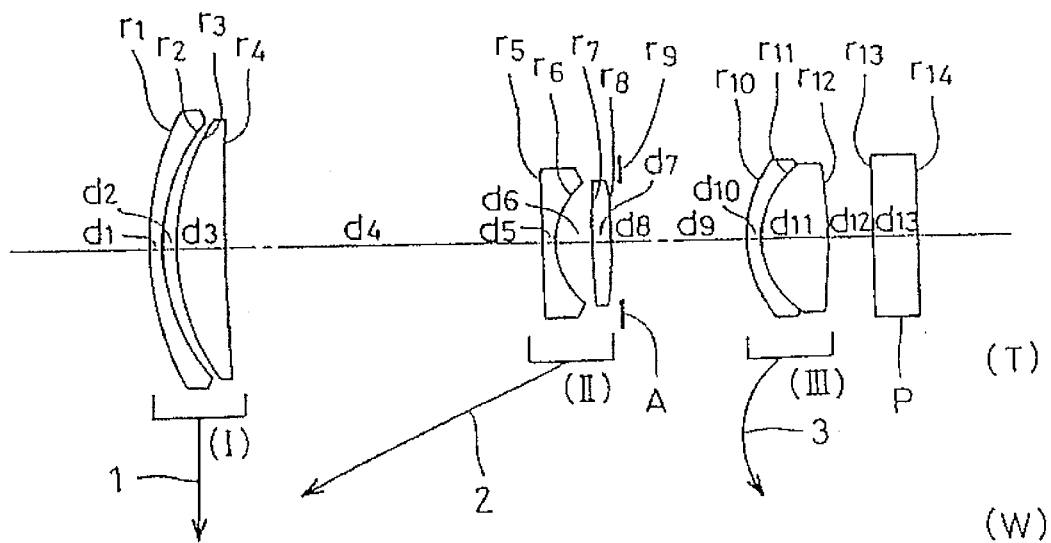
Figure 58:
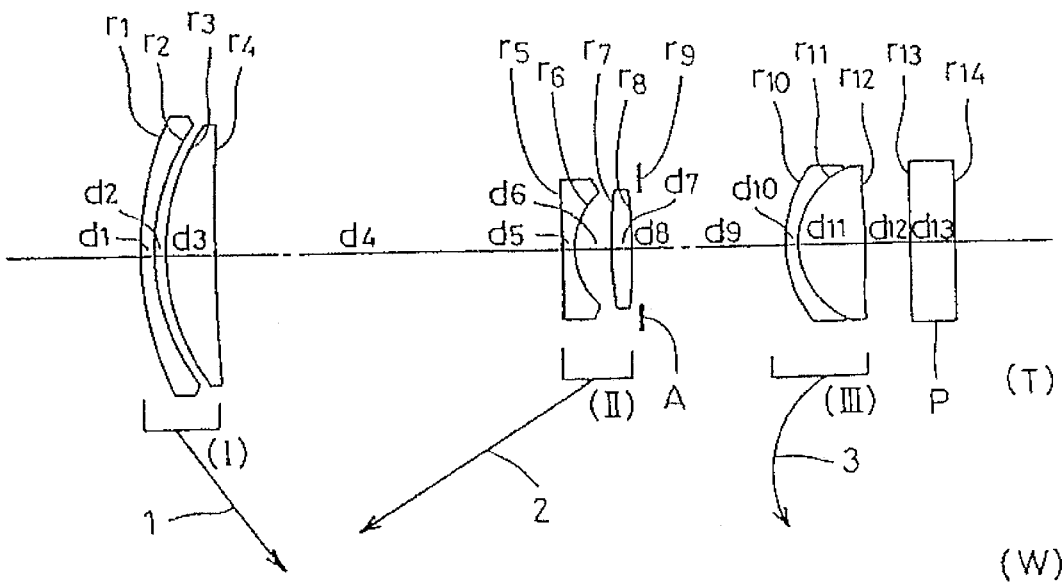
Figure 59:
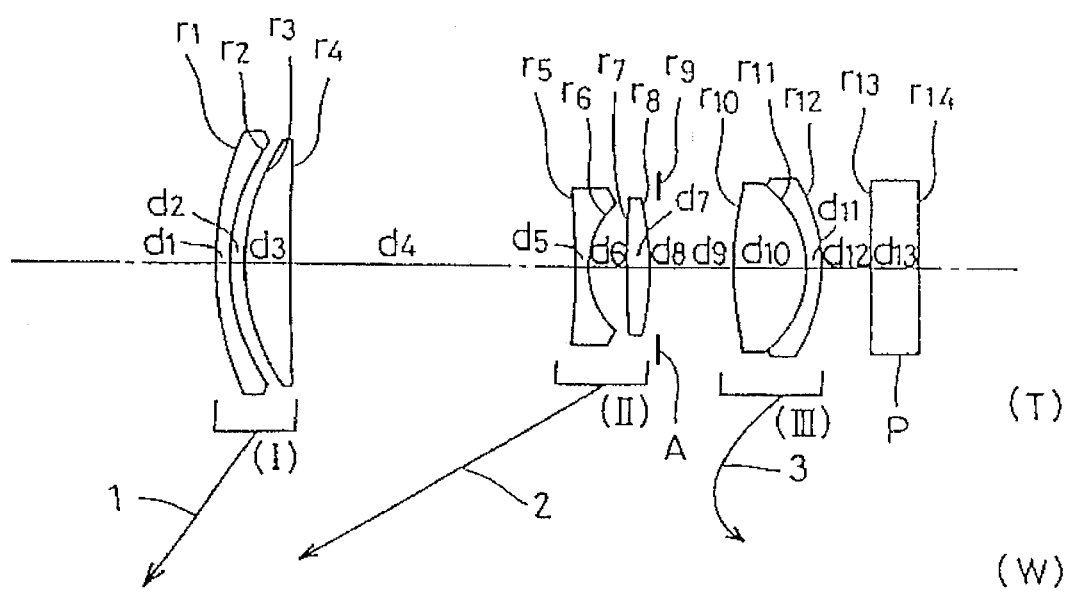

FIGS. 51 to 59 are the cross sectional views of the lens arrangements corresponding to the above-described embodiments 24 to 32, respectively, wherein the arrows 1, 2 and 3 show a movement of the first, second, third lens units I, II and III from the longest focal length condition (T) to the shortest focal length condition (W).

An iris A is provided between the second lens unit II and the third lens unit III. Aberrations are corrected in the condition where a plate P which corresponds to a low pass filter and a face plate is inserted at a position closest to the image.

In each embodiment, at a zooming from the longest to the shortest focal length conditions, the second lens unit moves toward the object side along the optical axis, and the third lens unit moves toward the object side and returns on the way. In the embodiments 24 to 30, the first lens unit does not move. In the embodiments 31, all the lens units move; the first lens unit moves toward the image side. In the embodiments 32, all the lens unit move; the first lens unit moves toward the object side.

In the embodiments 24, 26, 27 and the first lens unit with a positive refractive power has a negative meniscus lens element whose image-side surface is concave and a positive lens element whose object-side surface is convex, the second lens unit with a negative refractive power has a negative bi-concave lens element and a positive bi-convex lens element, and the third lens unit with a positive refractive power has a positive bi-convex lens element and a negative meniscus lens element whose object-side surface is concave. In the embodiments 24, 26, and 27, the image-side surface of the positive lens element of the second lens unit, the object-side surface of the positive lens element of the third lens unit, and the image-side surface of the negative lens element of the third lens unit are aspherical. In the embodiment 32, the object-side surface of the positive lens element of the first lens unit, the image-side surface of the positive lens element of the second lens unit, the object-side surface of the positive lent element of the third lens unit, and the image-side surface of the negative lens element of the third lens unit are aspherical.

In the embodiment 25, the first lens unit with a positive refractive power has a negative meniscus lens element whose image-side surface is concave and a positive meniscus lens element whose object-side surface is convex, the second lens unit with a negative refractive power has a negative meniscus lens element whose image-side surface is concave and a positive bi-convex lens element, and the third lens unit with a positive refractive power has positive bi-convex lens element and a negative meniscus lens element whose object-side surface is concave. The image-side surface of the positive lens element of the second lens unit, the object-side surface of the positive lens of the third lens unit and the image-side surface of the negative lens element of the third lens unit are aspherical.

In the embodiment 28, the first lens unit with a positive refractive power has a negative meniscus lens element whose image-side surface is concave and a positive meniscus lens element whose object-side surface is convex, the second lens unit with a negative refractive power has a negative bi-concave lens element and a positive meniscus lens element whose object-side surface is convex, and the third lens unit has a positive bi-convex lens element and a negative meniscus lens element whose object-side surface is concave. The image-side surface of the negative lens element of the second lens unit, the object-side surface of the positive lens element of the third lens unit and the image-side surface of the negative lens element of the third lens unit are aspherical.

In the embodiment 29, the first lens unit with a positive refractive power has a negative meniscus lens element whose image-side surface is concave and a positive meniscus lens element whose object-side surface is convex, the second lens unit with a negative refractive power has a negative bi-convex lens element and a positive meniscus lens element whose image-side surface is convex, and the third lens unit with a positive refractive power has a positive bi-convex lens and a negative meniscus lens element whose object side surface is concave. The object-side surface of the positive lens of the first lens unit, the image-side surface of the positive lens unit of the second lens unit, the object-side surface of the positive lens unit of the third lens unit and the image-side surface of the negative lens element of the third lens unit are aspherical.

In the embodiments 30 and 31, the first lens unit with a positive refractive power has a negative meniscus lens element whose image-side surface is concave and a positive meniscus lens element whose object-side surface is convex, the second lens unit with a negative refractive power has a negative bi-concave lens element and a positive bi-convex lens element, and the third lens unit with a positive refractive power has a negative meniscus lens element whose image-side surface is concave and a positive bi-convex lens element. In the embodiments 30 and 31, the image-side surface of the positive lens of the second lens unit, the object-side surface of the negative lens element of the third lens unit and the image-side surface of the positive lens element of the third lens unit are aspherical.

As described above, in the embodiments 26 to 29, and 32, the third lens unit has, from the object side, a positive and a negative lens elements. In the embodiments 30 and 31, the third lens unit has, from the object side, a negative and a positive lens elements. In the embodiments 26 to 28, aspherical surfaces are employed for the second and third lens units. In the embodiment 29, aspherical surfaces are employed for all the lens units.

The aspherical surfaces employed for the present invention can be made from pressed or re-processed saltpeter, or from thin layers of resin plastered together.

Figure 61A:
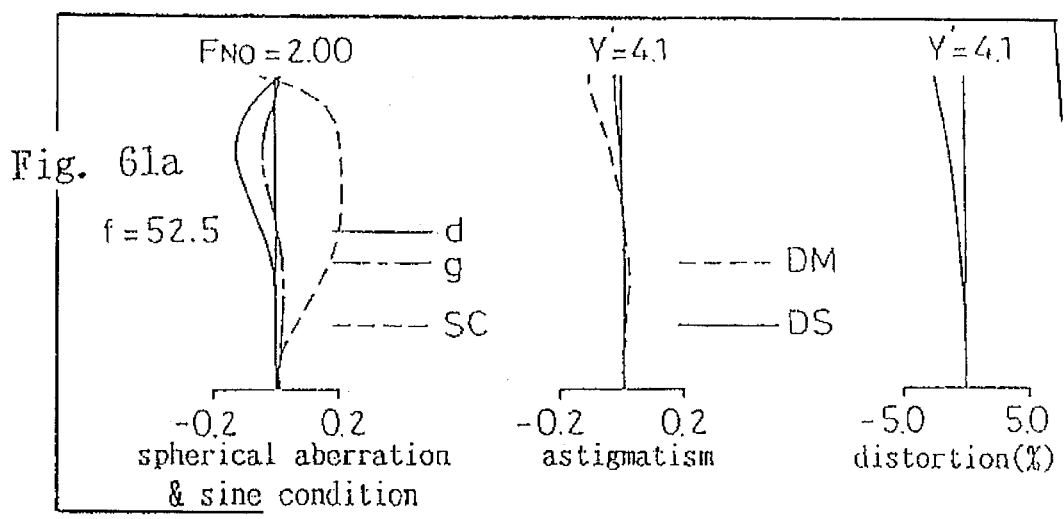
Figure 61B:
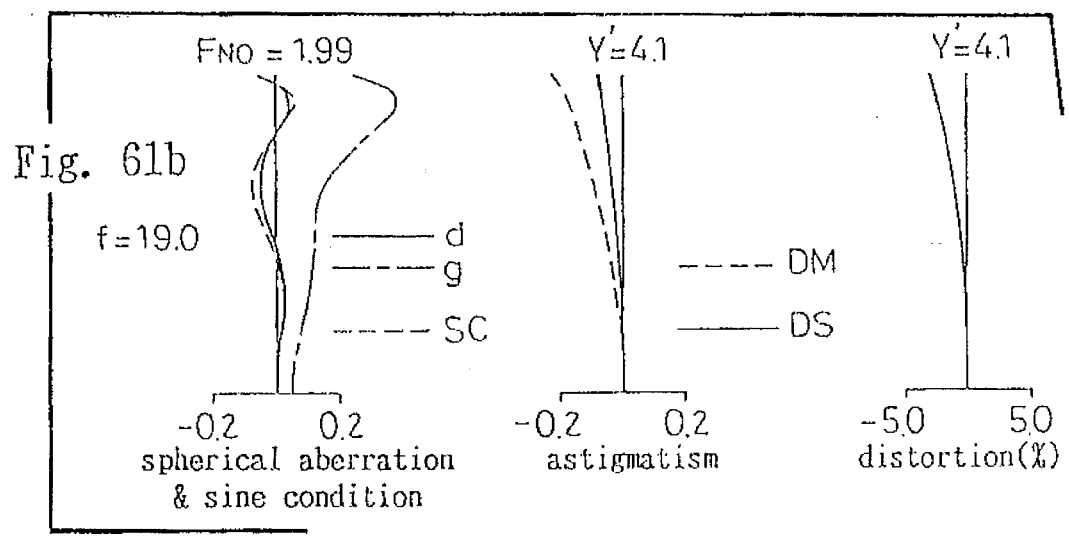
Figure 61C:
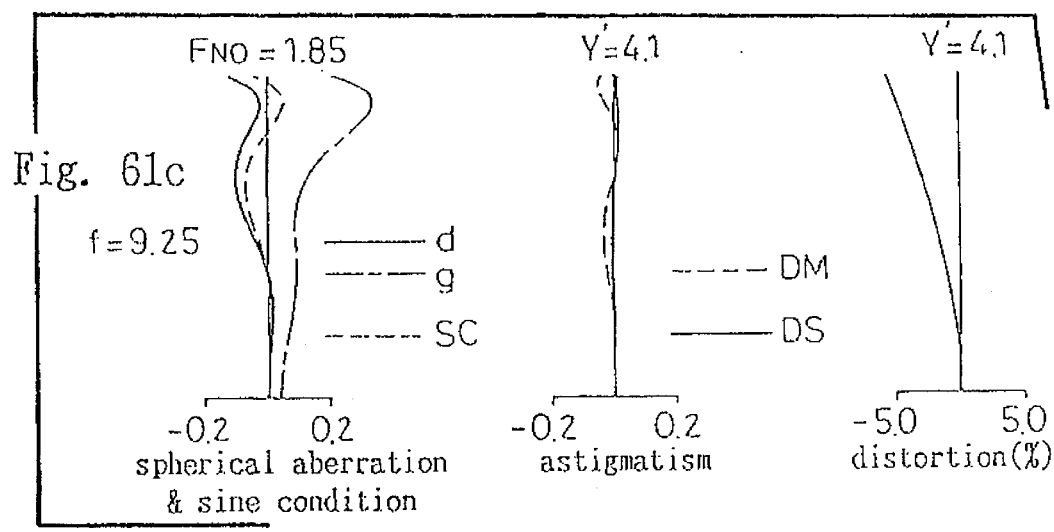
Figure 63A:
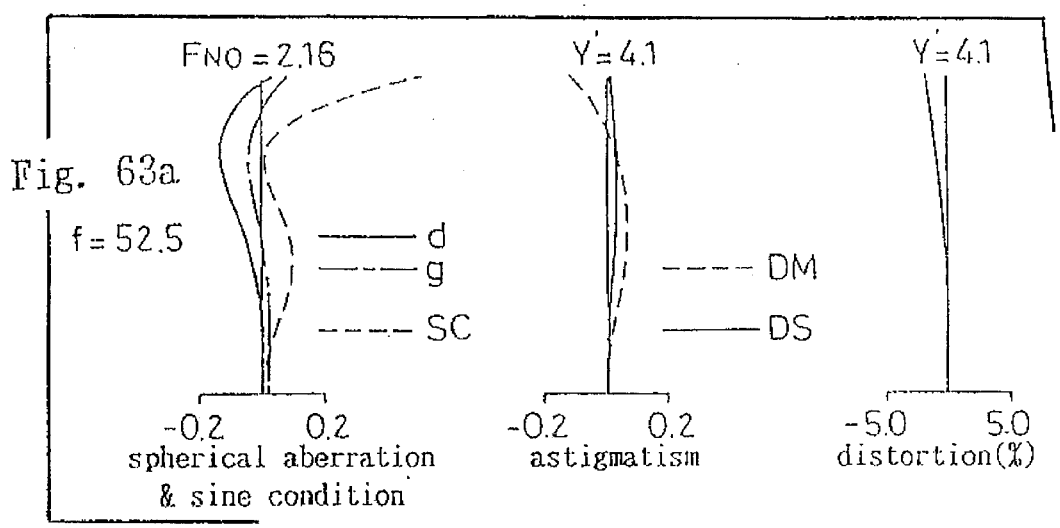
Figure 63B:
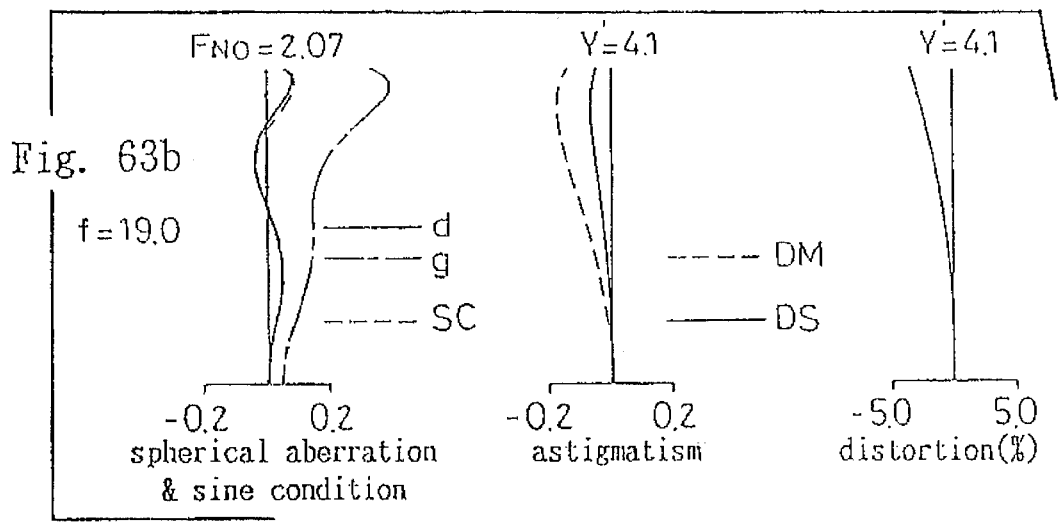
Figure 63C:
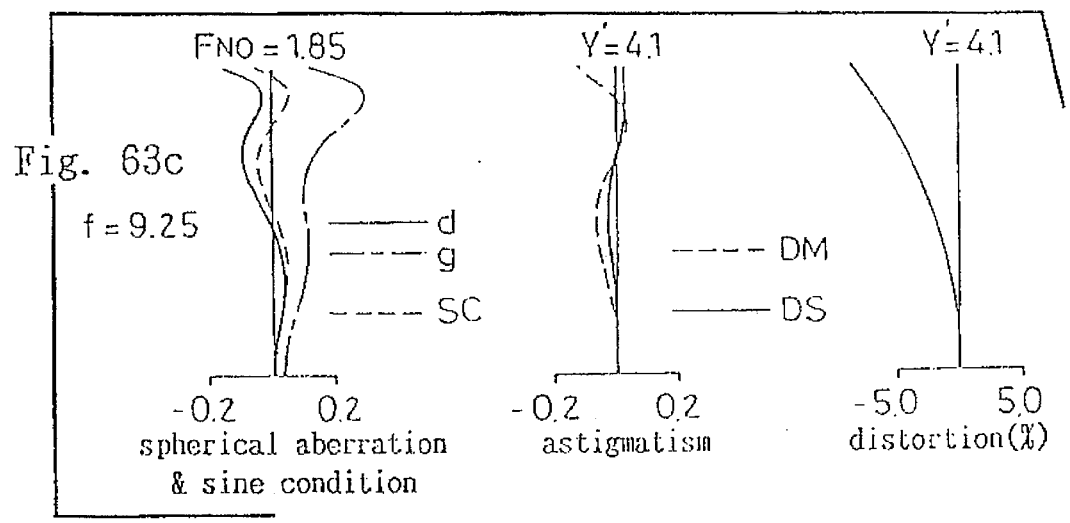
Figure 65A:
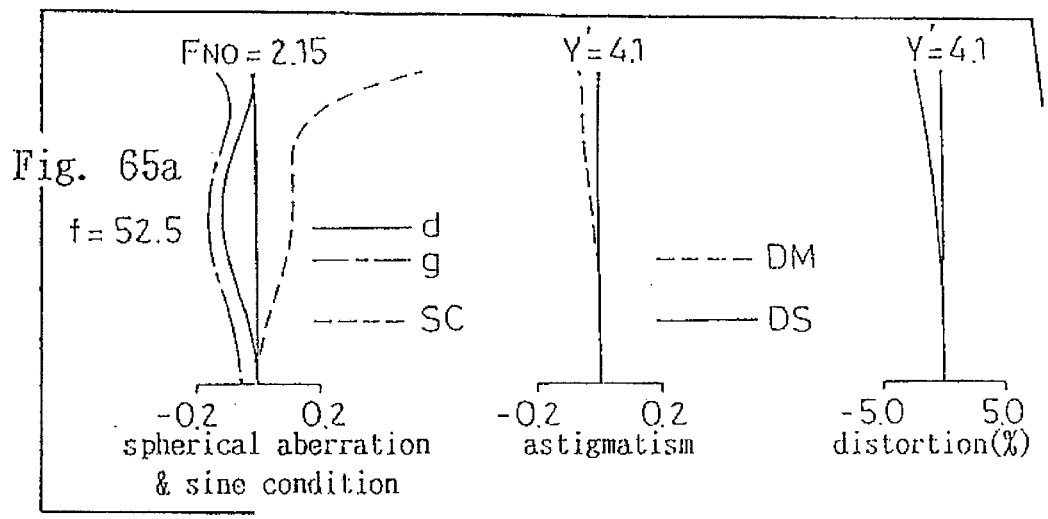
Figure 65B:
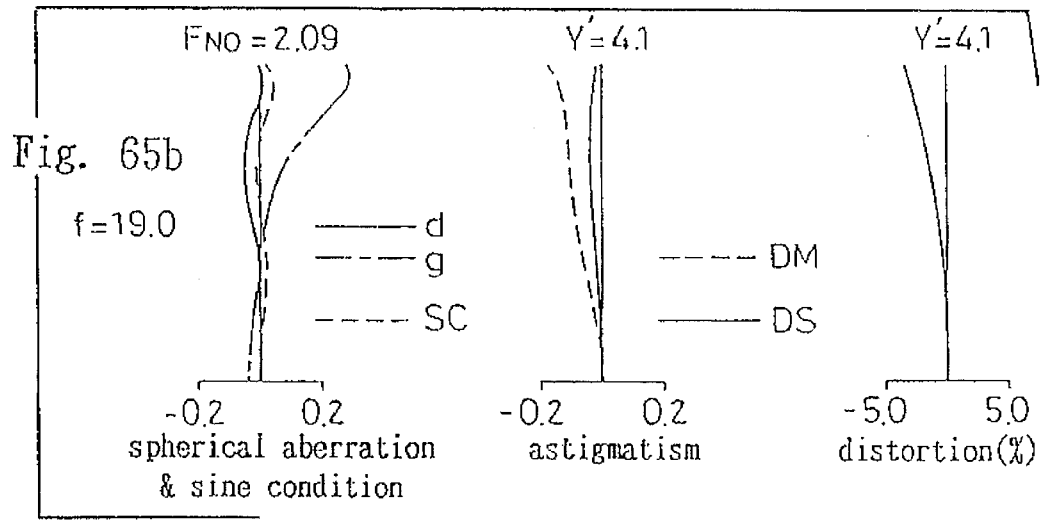
Figure 65C:
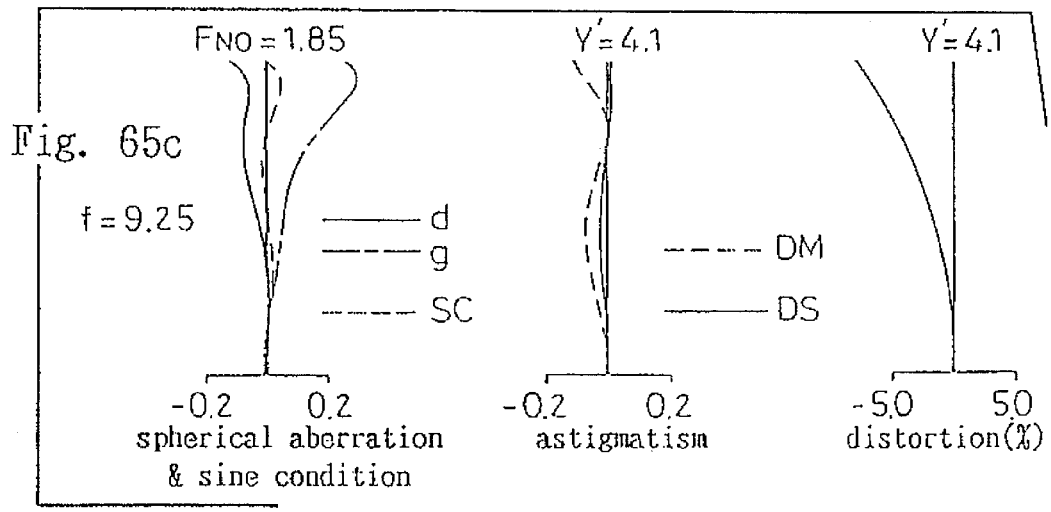
Figure 66A:
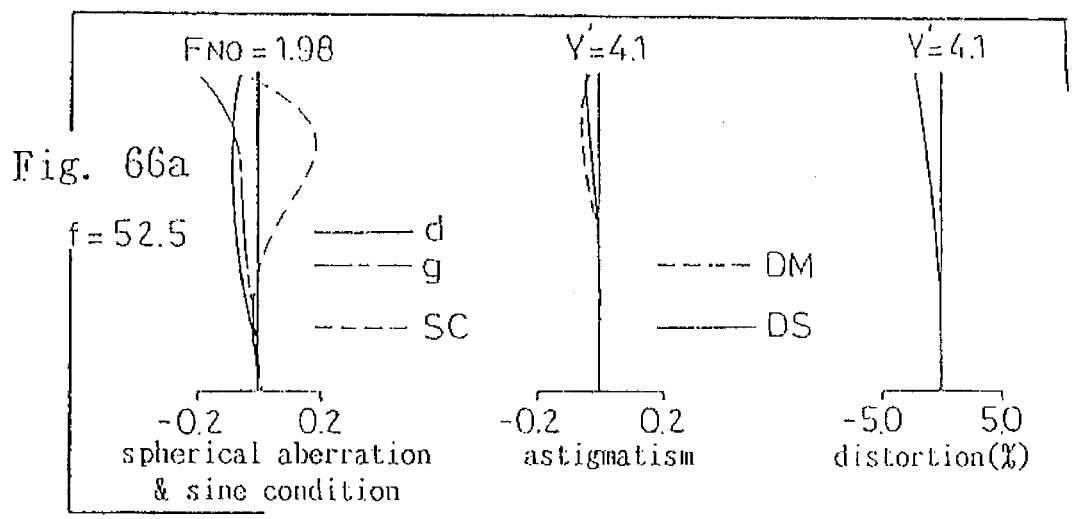
Figure 66B:
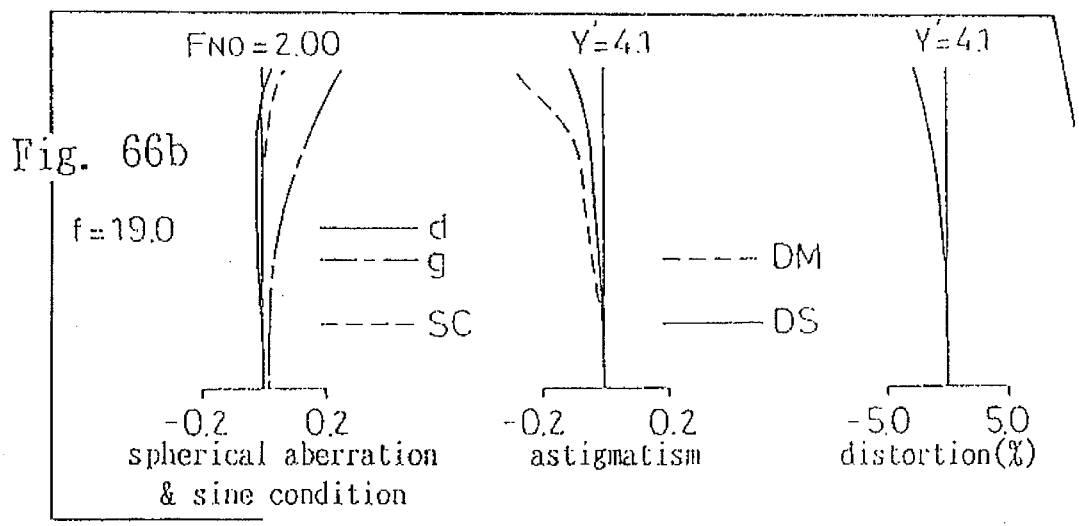
Figure 66C:
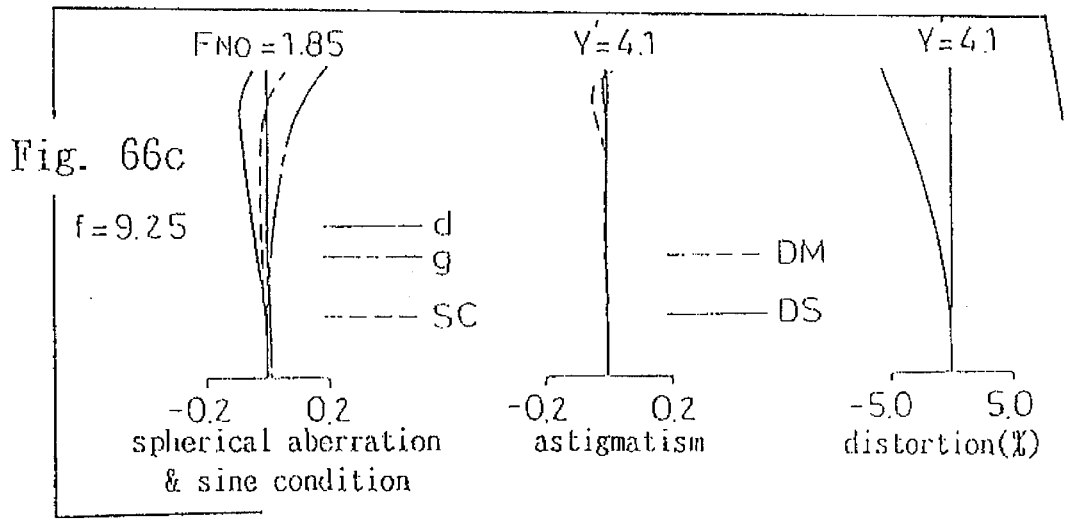

FIGS. 60a, 60b, and 60c to 68a, 68b, and 68c show the aberrations of the above-described embodiments 24 to 32, respectively. a, b and c of each FIG. show the aberrations at the longest, the middle and the shortest focal length conditions, respectively. A solid line d shows the aberration to the d-line. A dotted line SC shows a sine condition. A dotted line DM and a solid line DS show the astigmatism at the meridional and sagittal image planes, respectively.

The above-described embodiments have an excellent aberration correction performance with three lens units having only six lens elements in spite of having a very high zoom ratio of 6× and a large aperture ratio of F1.8. Also, they are compacter than conventional zoom lens systems in total length and diameter of the front lens. The object of the present invention is sufficiently attained.

Tables 33 and 34 show the values of $\phi I \cdot f_T$ of the condition (7), $\phi I/\phi III$ of the condition (8), $rII_N{}^R/r_N{}^F$ of the condition (9) and $r III^F/r III^R$ of the conditions (10) and (11) in the embodiments 24 to 32.

Figure 69:
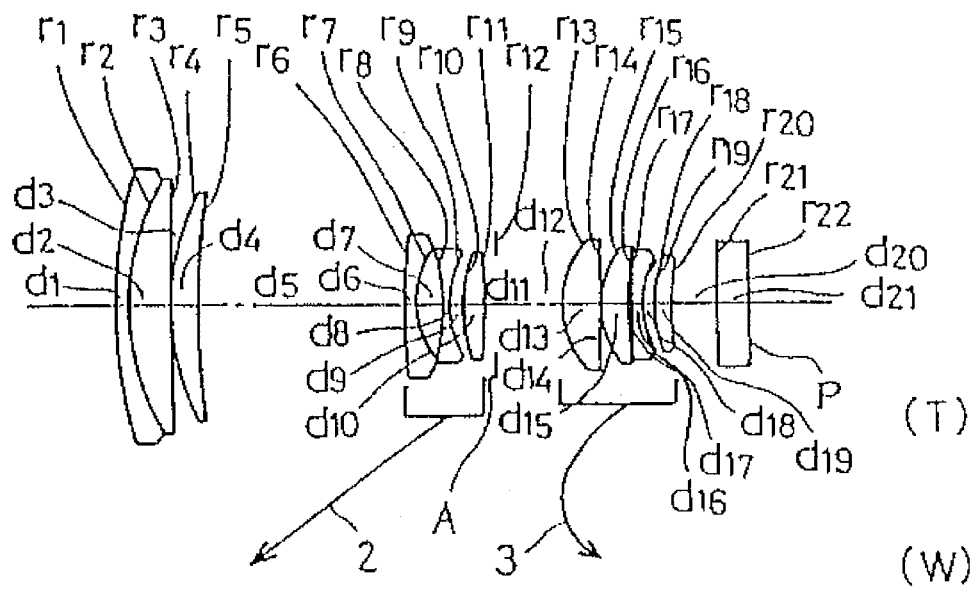
FIGS. 69 to 75 are the cross sectional views of the lens arrangements corresponding to the embodiments 33 to 39, respectively.
Figure 70:
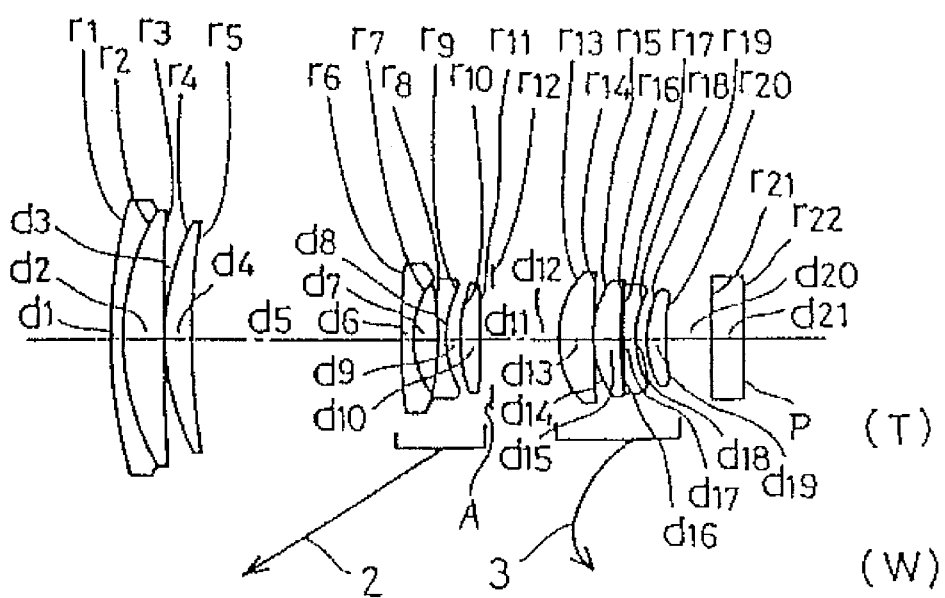
Figure 71:
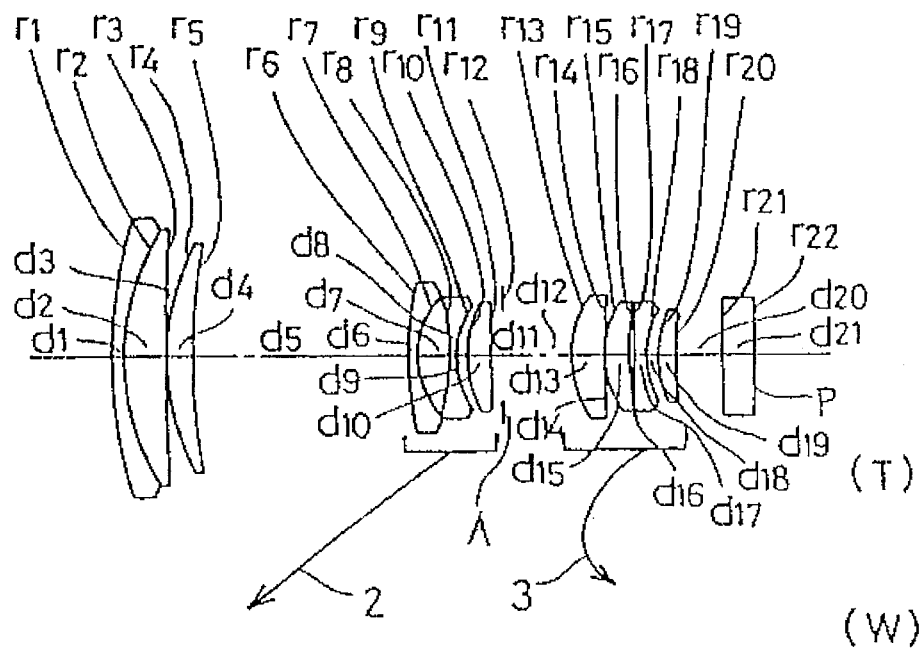
Figure 72:
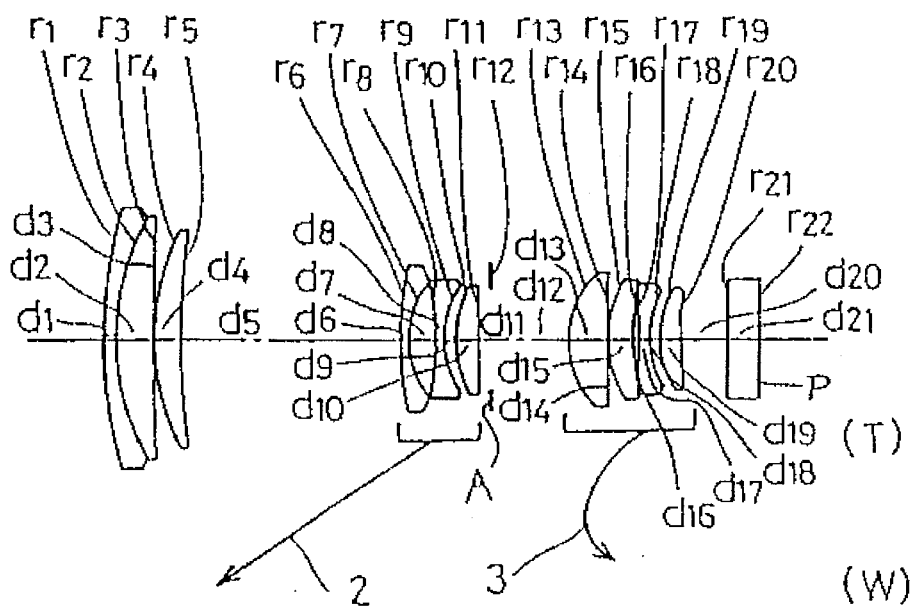
Figure 73:
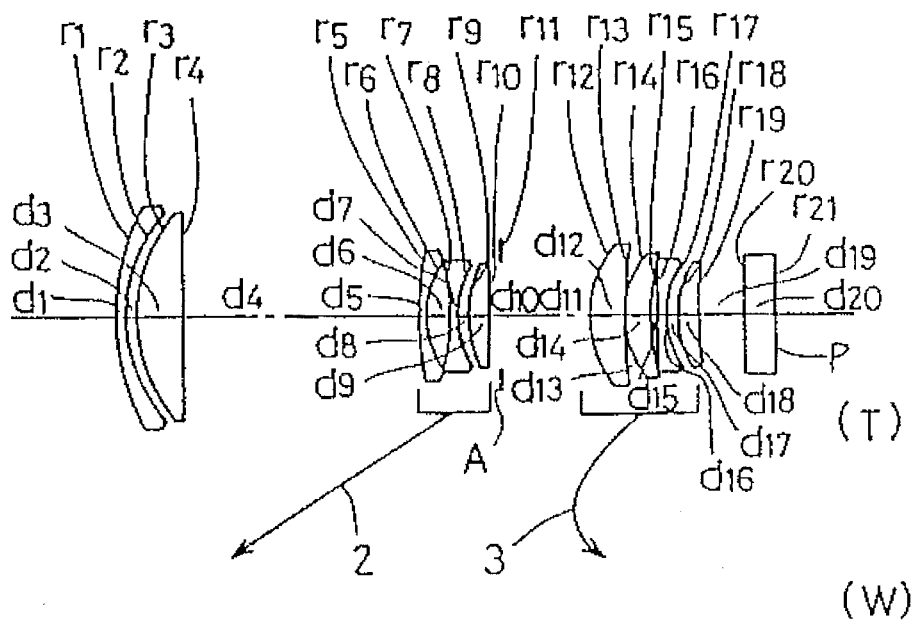
Figure 74:
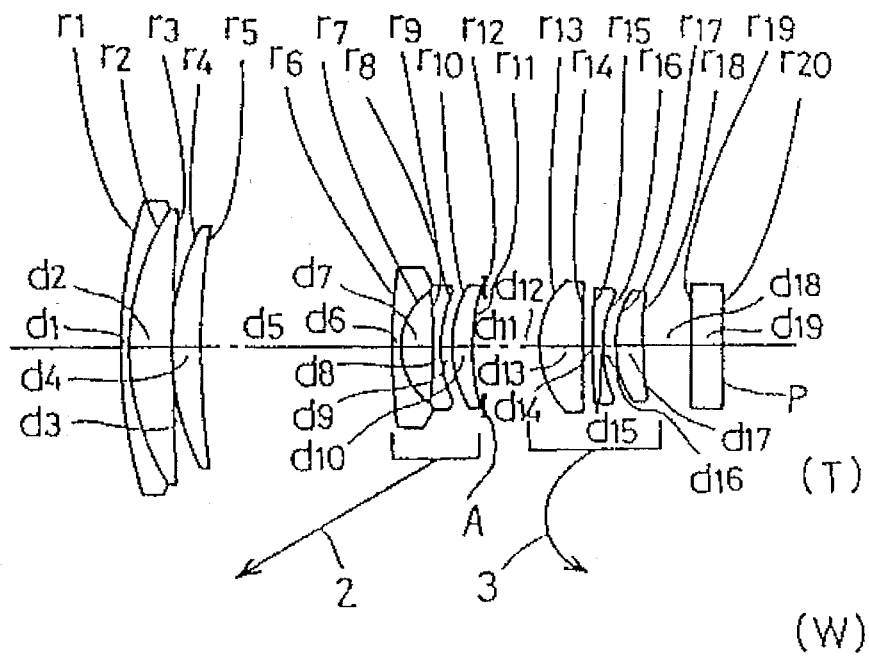
Figure 75:
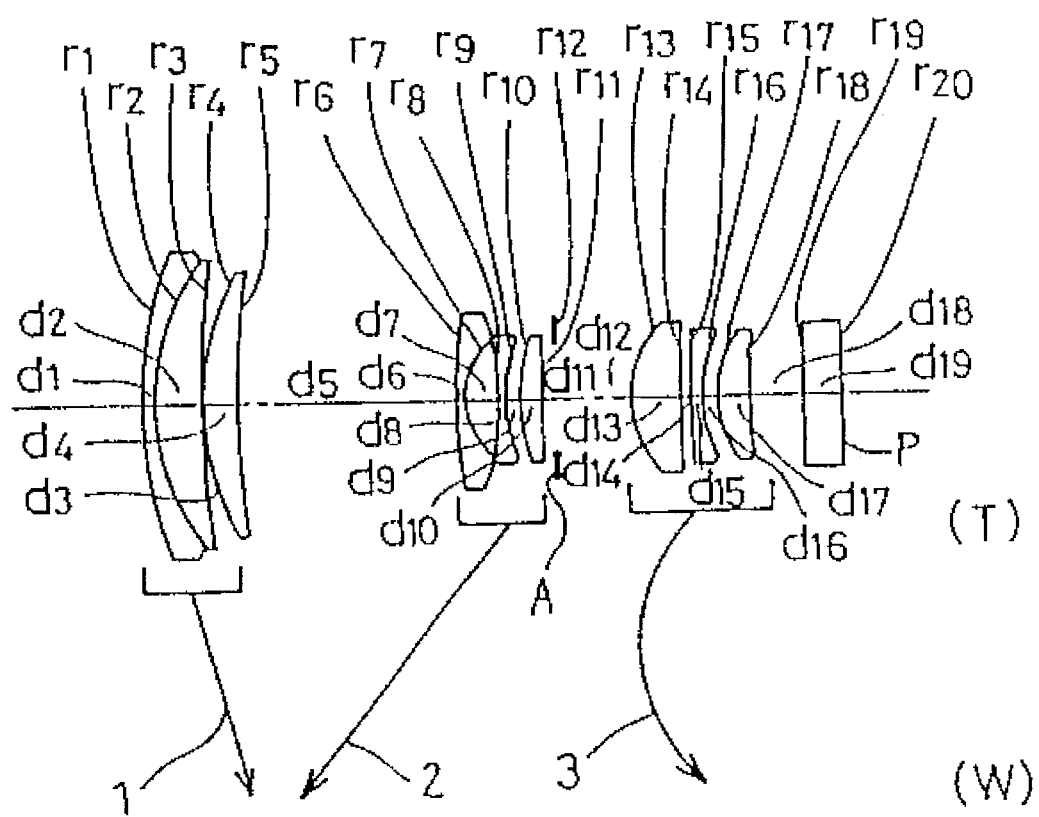

FIGS. 69 to 75 are the cross sectional views of the lens arrangements corresponding to the above-described embodiments 33 to 39, respectively, wherein the arrows 1, 2 and 3 show a movement of the first, second, third lens units I, II and III from the longest focal length condition (T) to the shortest focal length condition (W).

An iris A is provided between the second lens unit and the third lens unit III. Aberrations are corrected in the condition where a plate P which corresponds to a low pass filter and a face plate is inserted at a position closet to the image. In each embodiment, the iris A and the plate P are fixed, and do not move at a zooming operation.

In the embodiments 33 to 38, at a zooming from the longest to the shortest focal length conditions, the second lens unit II which performs a zooming operation moves toward the object side along the optical axis, and the third lens unit III moves toward the object side and returns on the way. The first lens unit I does not move.

In the embodiment 39, at a zooming from the longest (T) to the shortest (W) focal length conditions, the second lens unit II which performs a zooming operation moves along the optical axis toward the object side, and the first and third lens units I III move to correct a shift of an image point by a zooming. The first unit I moves along the optical axis toward the image side, and the third lens unit III moves along the optical axis and returns on the way.

The embodiments 33 and 34 have, from the object side, the first lens unit I with a positive refractive power having a negative meniscus lens element whose image-side surface is concave and two positive meniscus lens elements whose object-side surfaces are convex, the second lens unit II with a negative refractive power having a negative meniscus lens element whose image-side surface is concave, a negative bi-concave lens element and a positive bi-convex lens element, and the third lens unit with a negative refractive power having two positive meniscus lens element whose object-side surfaces are convex, a negative meniscus lens element whose image-side surface is concave and a positive meniscus lens element whose object-side surface is convex. In the embodiments 33 and 34, the first and second lens elements of the first lens unit are integrated lens elements. In the embodiments 33 and 34, the object-side surface of the second lens element of the second lens unit and the image-side surface of the fourth lens of the third lens unit III are aspherical.

The embodiments 35 and 36 have, from the object side, the first lens unit I with a positive refractive power having a negative meniscus lens element whose image-side surface is concave and two positive meniscus lens elements whose object-side surface is convex, the second lens units with a negative refractive power having a negative meniscus lens element whose image-side surface is concave, a negative bi-concave lens element and a positive meniscus lens element whose object-side surface is convex, and the third lens unit III with a negative refractive power having two positive lens elements whose object-side surfaces are convex, a negative meniscus lens element whose image-side surface is concave and a positive meniscus lens element whose object-side surface is convex. In the embodiments 35 and 36, the first and second lens elements of the first lens unit I are integrated lens elements. In the embodiments 35 and 36, the image-side surface of the fourth lens of the third lens unit III is aspherical.

The embodiment 37 has, from the object side, the first lens unit I with a positive refractive power having a negative meniscus lens element whose image-side surface is concave and a positive bi-convex lens element, the second lens unit II with a negative refractive power having a negative meniscus lens whose image-side surface is concave, a negative bi-concave lens element and a positive bi-convex lens element, and the third lens unit III with a negative refractive power having two positive meniscus lens elements whose image-side surfaces are convex, a negative meniscus lens element whose image-side surface is concave and a positive meniscus lens element whose object-side surface is convex. In the embodiment 37, the image-side surface of the fourth lens element of the third lens unit III is aspherical.

The embodiments 38 and 39 has, from the object side, the first lens unit I with a positive refractive power having a negative meniscus lens element whose image-side surface is concave and two positive meniscus lens elements whose object-side surfaces are convex, the second lens unit II with a negative refractive power having a negative meniscus lens element whose image-side surface is concave, a negative bi-concave lens element and a positive meniscus lens element whose object-side surface is convex, and the third lens unit III with a negative refractive power having a positive meniscus lens element whose object-side surface is convex, a negative meniscus lens element whose image-side surface is concave and a positive bi-convex lens element. In the embodiments 38 and 39, the first and second lens elements of the first lens unit I are integrated lens elements. In the embodiments 38 and 39, the object-side surface of the first lens element of the third lens unit III and the image-side surface of the third lens element of the third lens unit III are aspherical.

FIGS. 76a, 76b, and 76c to 82a, 82b, and 82c show the aberrations of the above-described embodiments 33 to 37, respectively. a, b and c of each FIG. show the aberrations at the longest, the middle and the shortest focal length conditions, respectively. A solid line d shows the aberration the d-line. A dotted line SC shows a sine condition. A dotted line DM and a solid line DS show the astigmatism at the meridional and sagittal image planes, respectively.

Tables 42 to 44 show the values of $\phi I$, $\phi II$, $\phi III$, $\phi_A$, $f_T$, $f_T$, Z, Y' and $F_W$ of the conditions (12) to (17) in in the embodiments 33 to 39.

Table 45 shows the values of $|\phi III|\cdot Z\cdot Y'$ of the condition (12) and $(|\phi III|/\phi I)\cdot(Y'/f_W w)\cdot Z$ of the condition (13) in the embodiments 33 to 39.

Table 46 shows the values of $\phi_A\cdot f_T/F_W$ of the condition (14) and $r_B/|r_A|$ of the condition (15) in the in the embodiments 33 to 39.

Table 47 shows the value of $f_W/r_D$ of the condition (16) and $r_R/r_F$ of the condition (17) in the embodiments 33 and 39.

Figure 83:
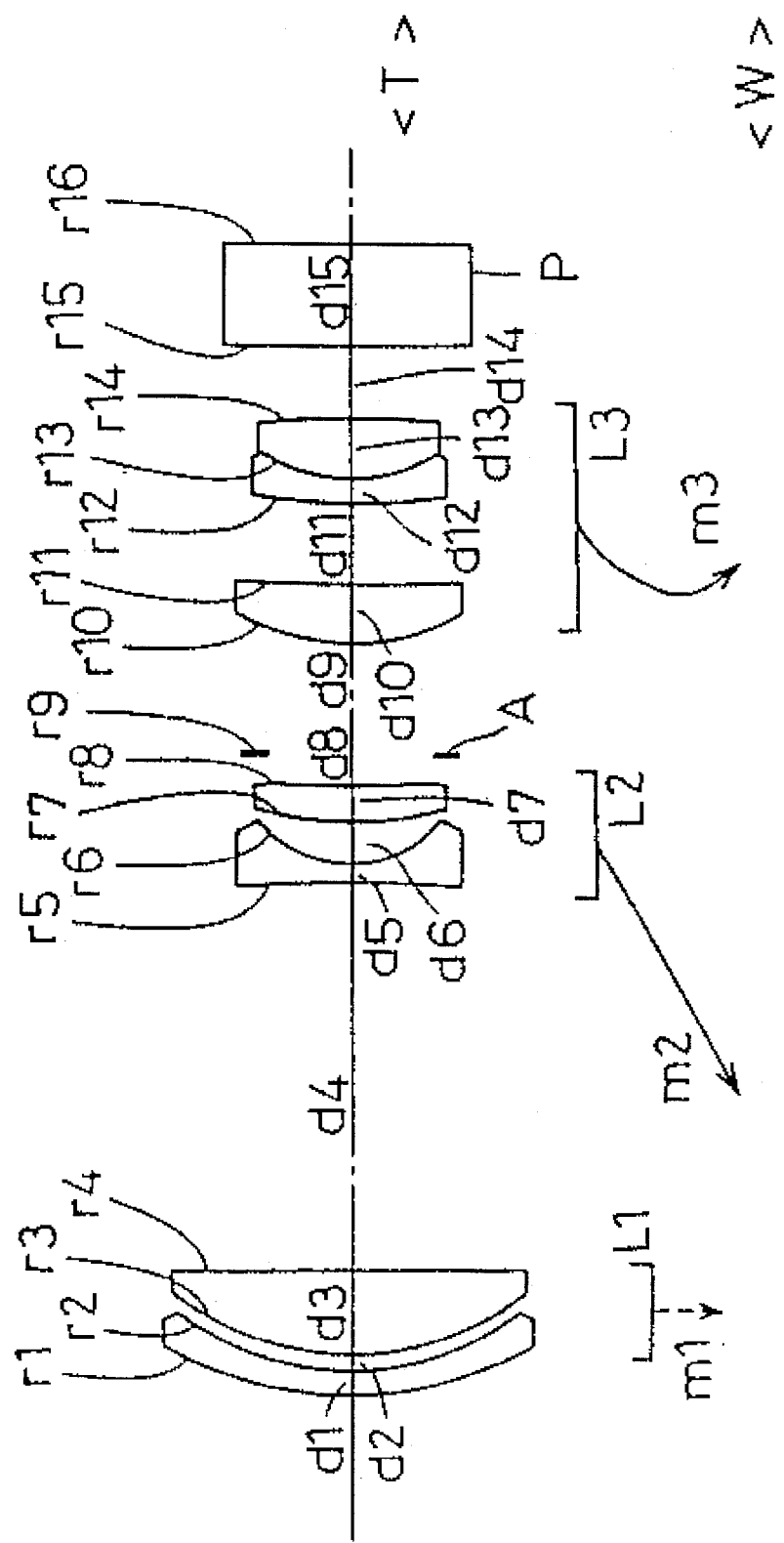
Figure 84:
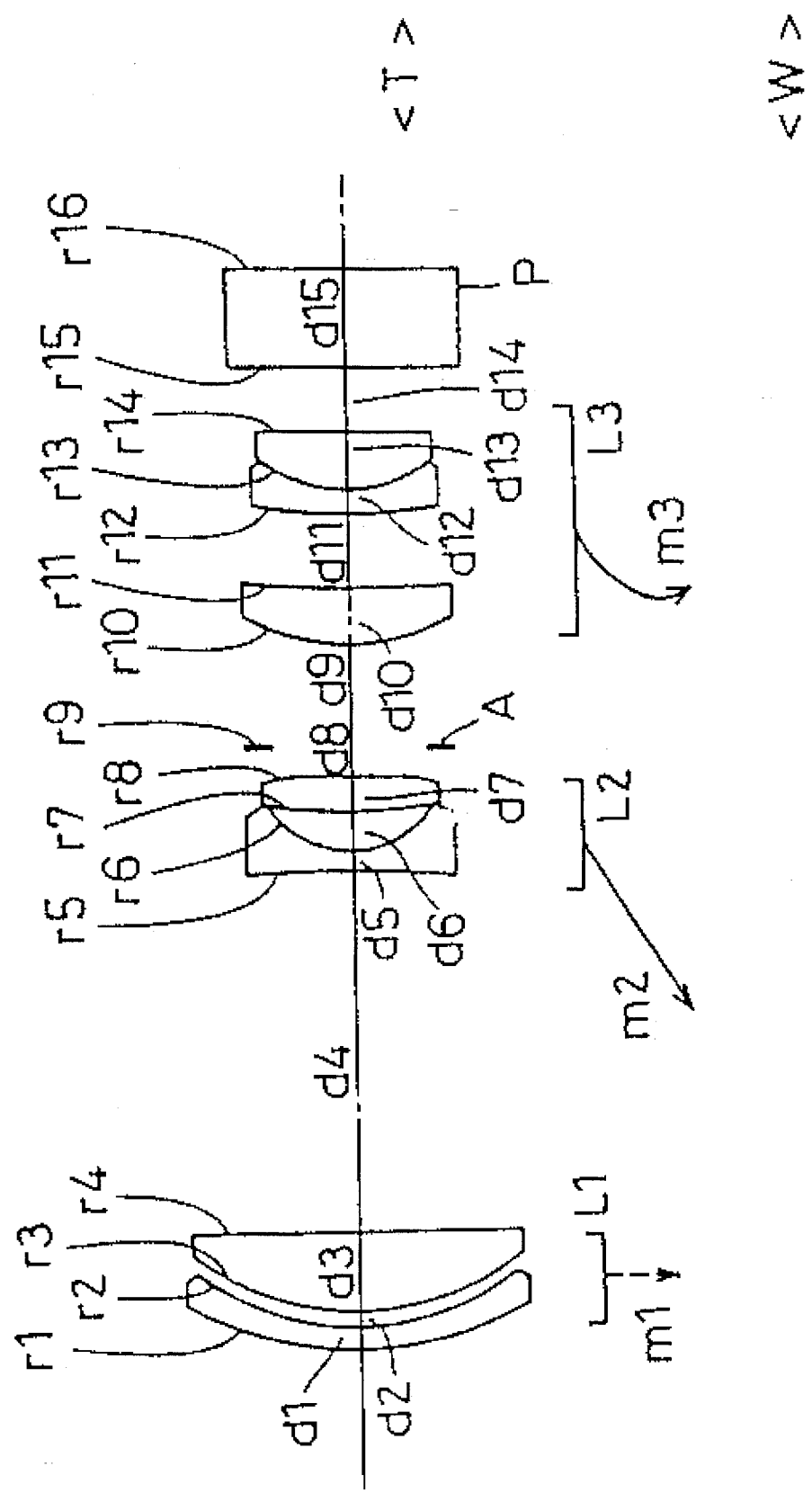
Figure 85:
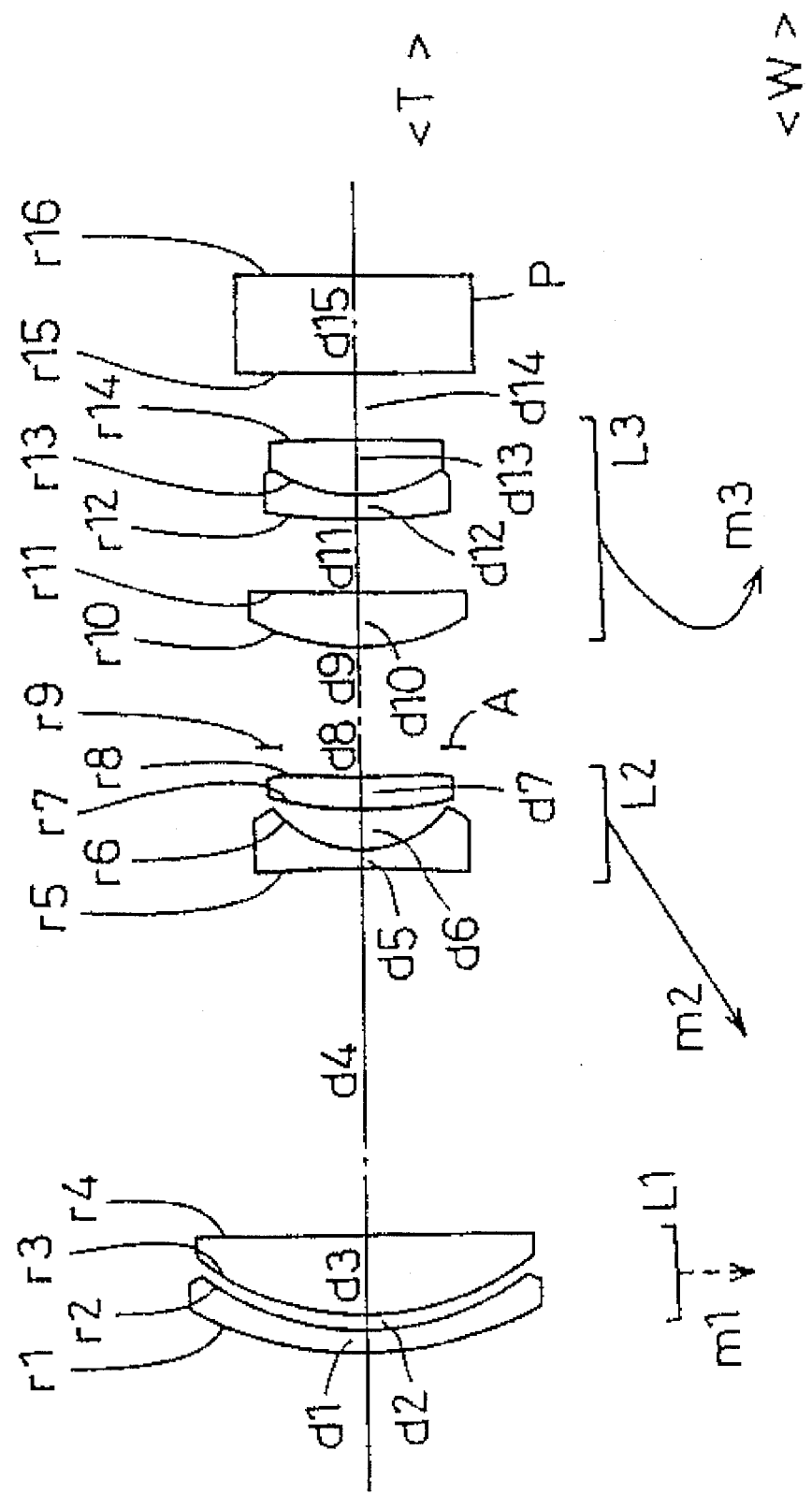
Figure 86:
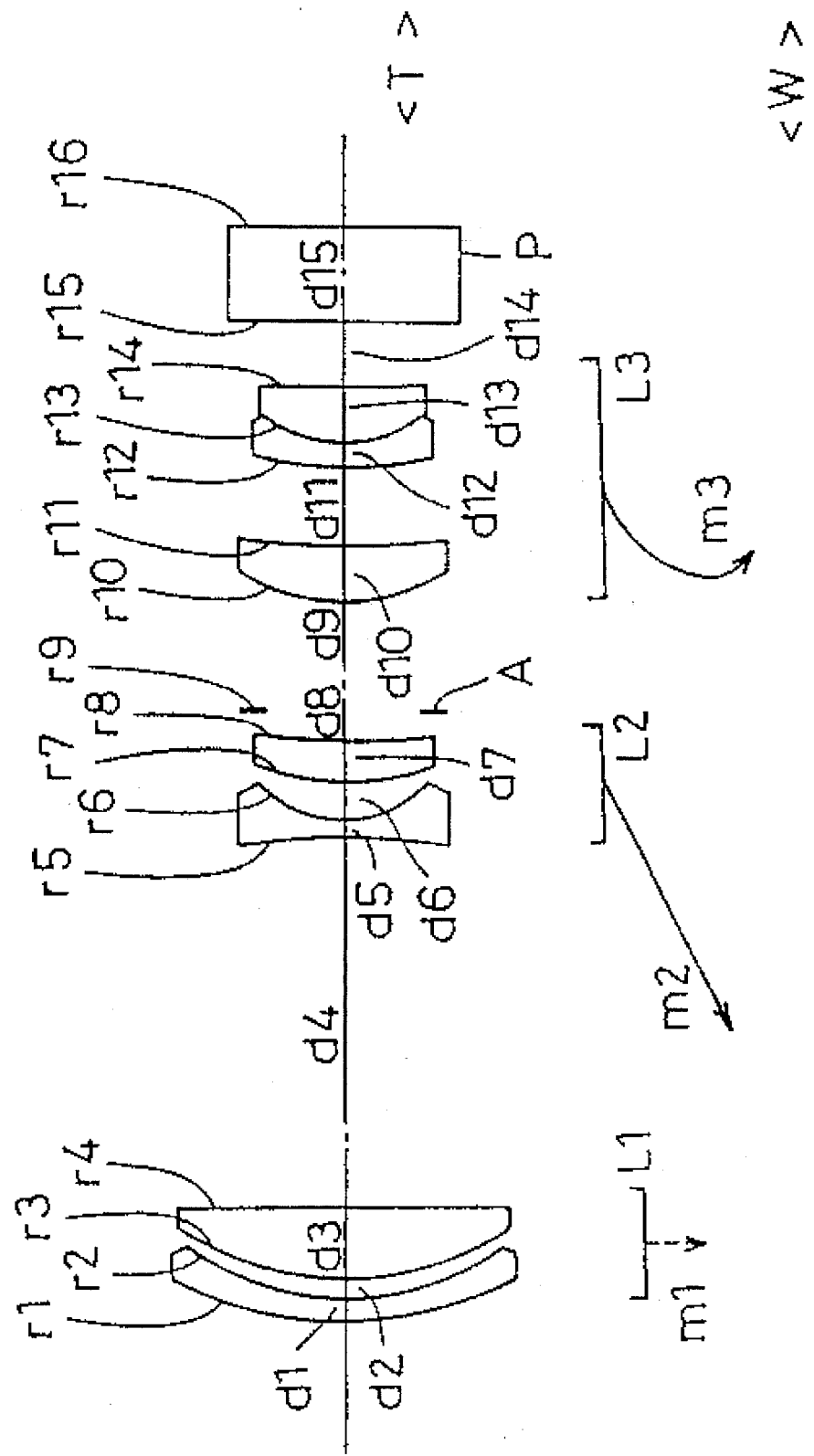
Figure 87:
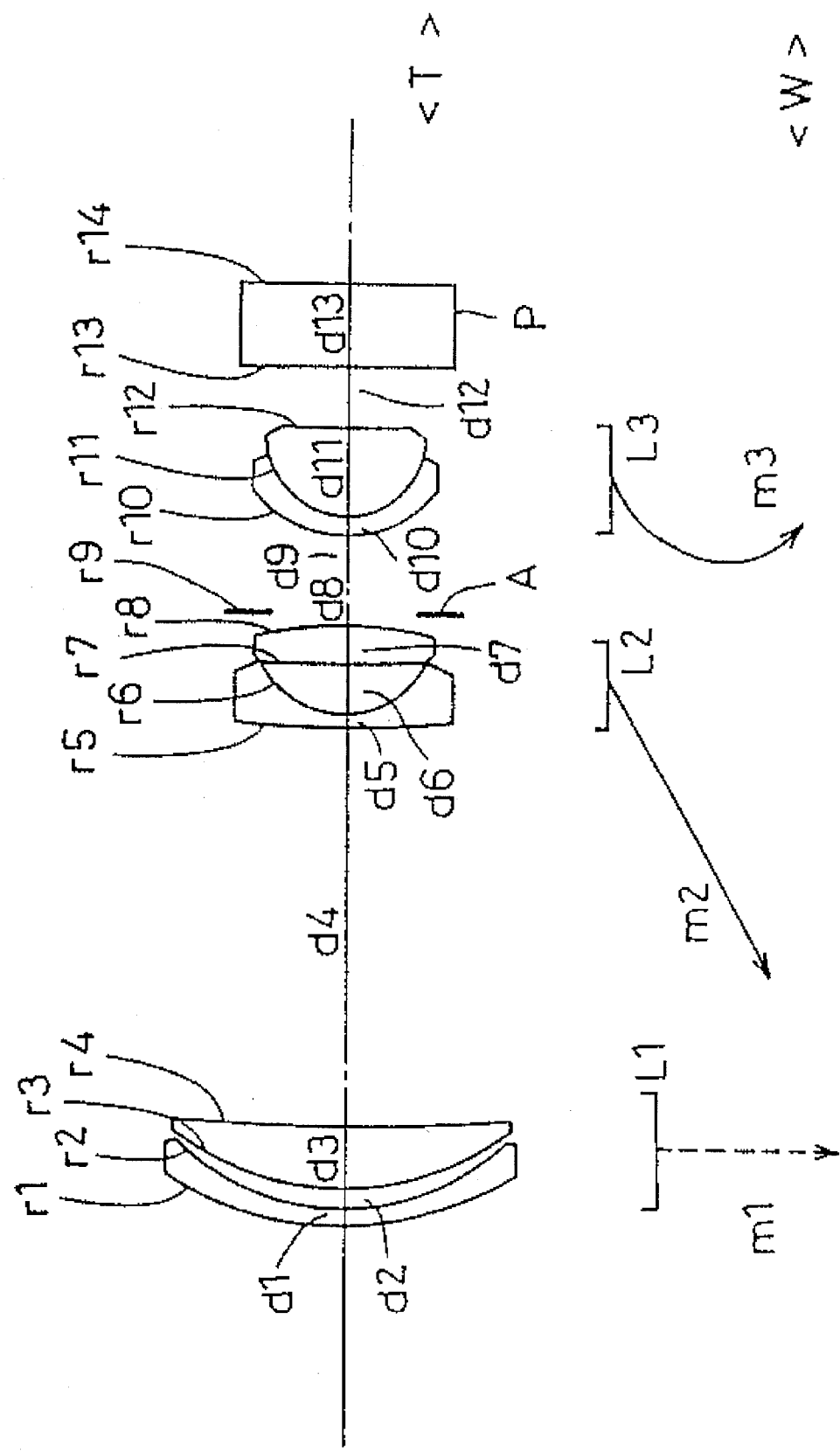
Figure 88:
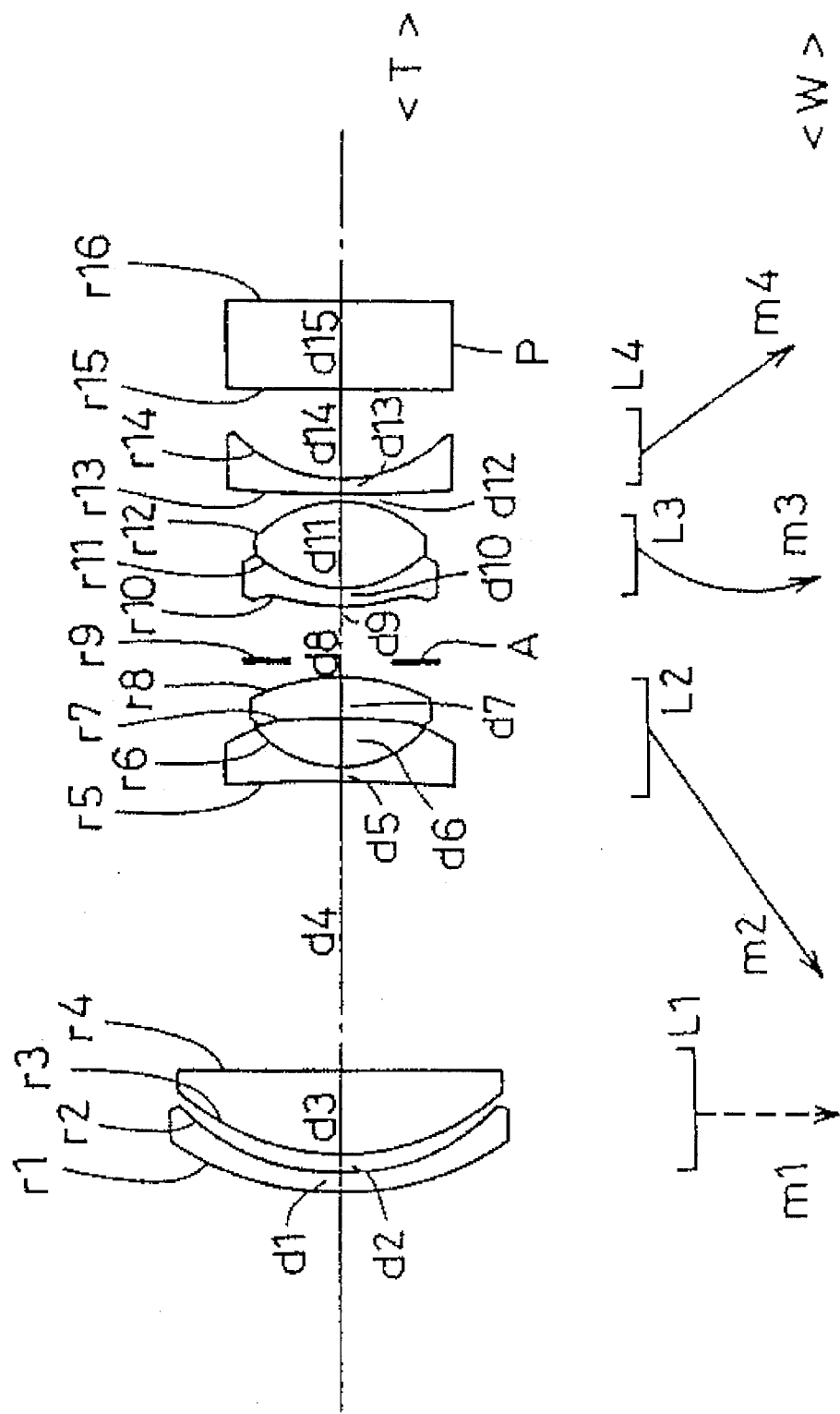
Figure 89:
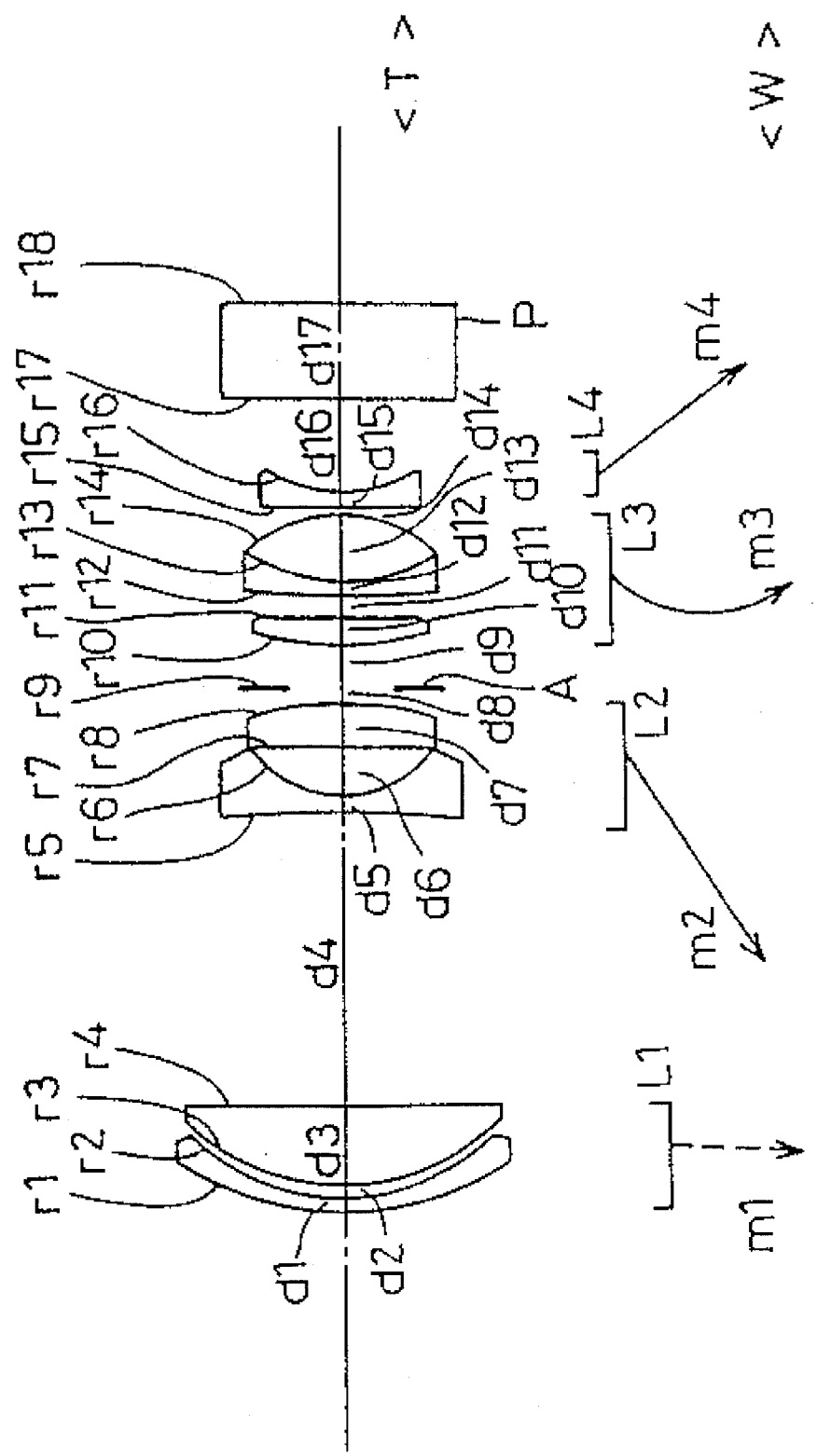
Figure 90:
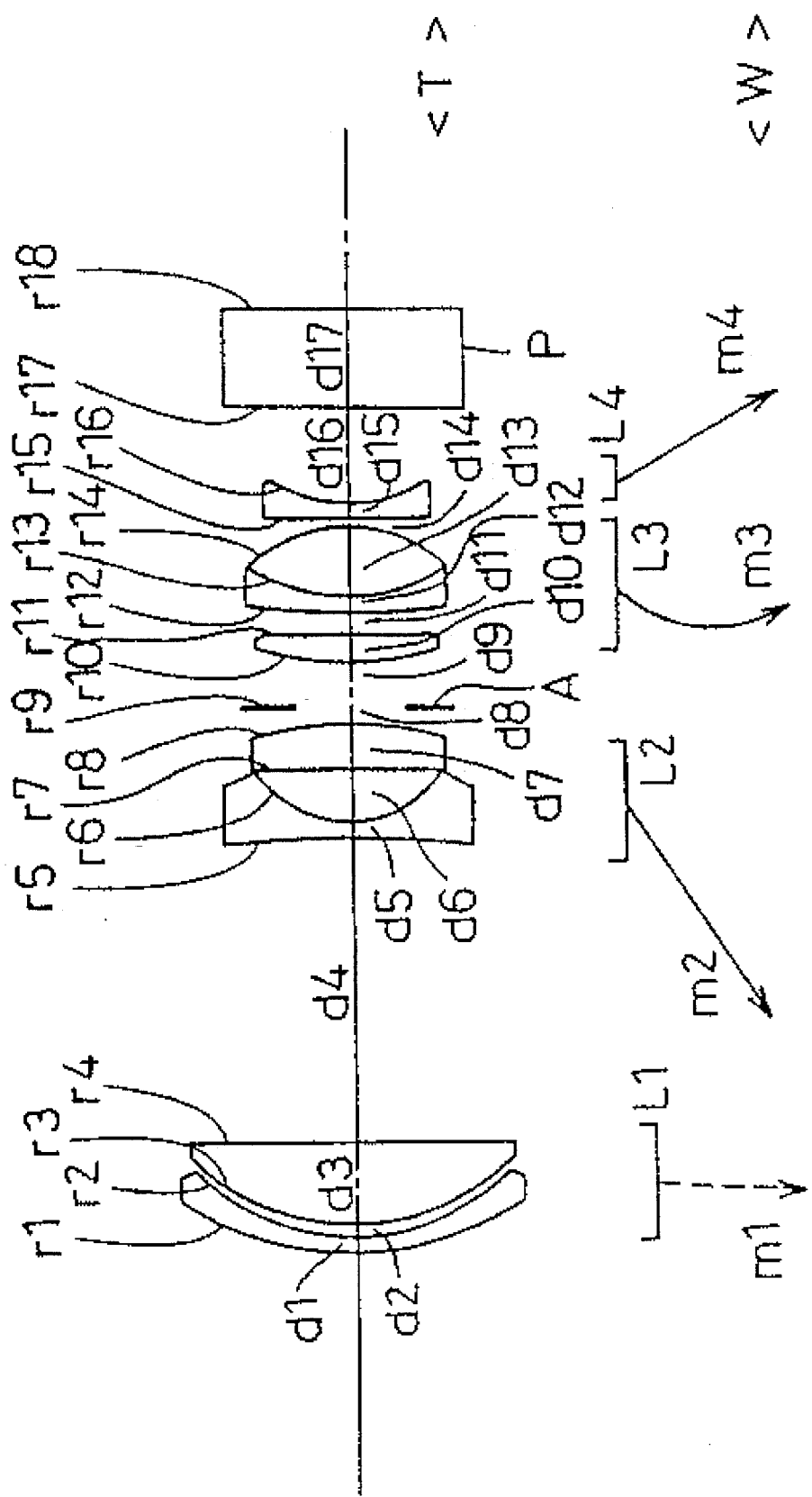
Figure 91:
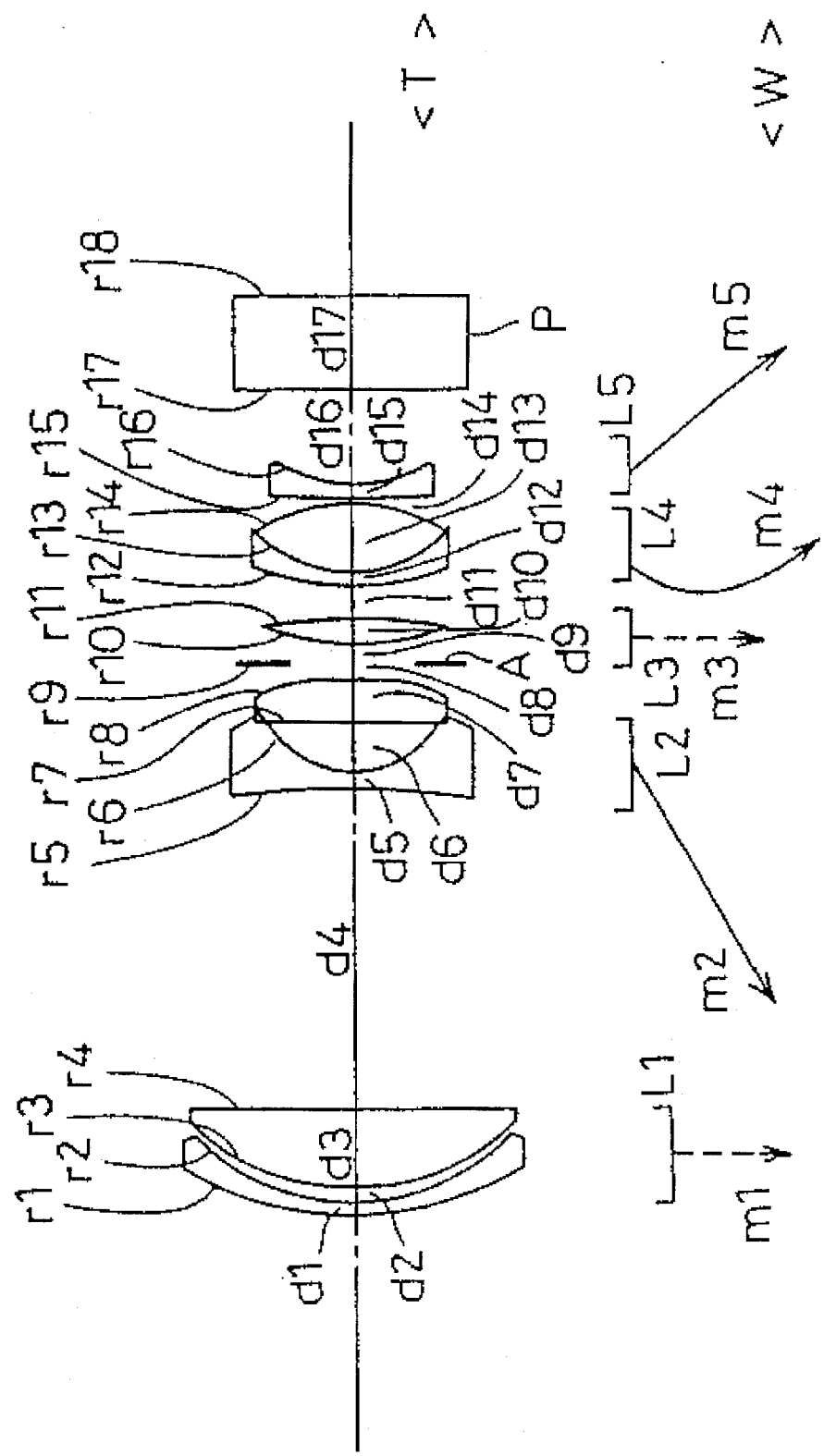

FIGS. 83 to 92 are the cross sectional views of the lens arrangements corresponding to the above-described embodiments 40 to 49, respectively, where a lens arrangement at the longest focal length condition is shown. The arrows m1 to m5 show a movement of the first to the fifth lens units L1 to L5 from the longest (T) to the shortest (W) focal length conditions. The lens units shown by dotted arrows are fixed lens units.

An iris A is provided between the second and third lens units L2 and L3. Aberrations are corrected in the condition where a plate P corresponding to an IR cut glass, a low pass filter, and a face plate for protecting a CCD surface is inserted at a position closest to the image.

In the embodiments 40 to 44, at a zooming from the longest (T) to the shortest (W) focal length conditions, the first lens unit L1 does not move (fixed), the second lens unit L2 monotonously moves along the optical axis toward the object side, and the third lens unit L3 moves toward the object side and returns on the way.

In the embodiments 45 to 47, the fourth lens unit L4 monotonously moves toward the image side. In the embodiment 49, the fourth lens unit L4 does not move.

In the embodiment 48, the first lens unit L1 is fixed, the second lens unit L2 monotonously moves along the optical axis toward the object side, the third lens unit L3 is fixed, the fourth lens unit L4 moves toward the object side and returns on the way, and the fifth lens unit L5 monotonously moves toward the image side.

The embodiment 40 consists of, from the object side, the first lens unit L1 having a negative meniscus lens element whose image-side surface is concave and a positive meniscus lens element whose object-side surface is convex, the second lens unit L2 having a negative bi-concave lens element and a positive meniscus lens element whose object-side surface is convex, an iris A, and the third lens unit L3 having a positive meniscus lens element whose object-side surface is convex and an integrated lens element consisting of a negative meniscus lens element whose image-side surface is concave and a positive bi-convex lens element.

The image-side surface of the positive meniscus lens element whose object-side surface is convex of the second lens unit L2 and the image-side surface of the positive bi-convex lens element are aspherical. A plate P is arranged behind the third lens unit L3.

The embodiment 41 has, from the object side, the first lens unit L1 having a negative meniscus lens element whose image-side surface is concave and a positive meniscus lens element whose object-side surface is convex, the second lens unit L2 having a negative bi-concave lens element and a positive meniscus lens element whose object-side surface is convex, an iris A, and the third lens unit L3 having a positive meniscus lens element whose object-side surface is convex and an integrated lens element consisting of a negative meniscus lens element whose image-side surface is concave and a positive bi-convex lens element.

The image-side surface of the positive meniscus lens element whose object-side surface is convex of the second lens unit L2, the image-side surface of the positive meniscus lens element whose object-side surface is convex of the third lens unit L3 and the image-side surface of the positive bi-convex lens element of the third lens unit L3 are aspherical. A plate P is arranged behind the third lens unit L3.

The embodiment 42 has, from the object side, the first lens unit L1 having a negative meniscus lens element whose image-side surface is concave and a positive meniscus lens element whose object-side surface is convex, the second lens unit L2 having a negative bi-concave lens element and a positive meniscus lens element whose object-side surface is convex, an iris A, and the third lens unit L3 having a positive meniscus lens element whose object-side surface is convex and an integrated lens element consisting of a negative meniscus lens element whose image-side surface is concave and a positive bi-convex lens element.

The image-side surface of the positive meniscus lens element whose object-side surface is convex of the second lens unit L2, the object-side surface of the positive meniscus lens element whose object-side surface is convex of the third lens unit and the image-side surface of the positive bi-convex lens element are aspherical. A plate P is arranged behind the third lens unit L3.

The embodiment 43 has, from the object side, the first lens unit L1 having a negative meniscus lens element whose image-side surface is concave and a positive bi-convex lens element, the second lens unit L2 having a negative bi-concave lens element and a positive meniscus lens element whose object-side surface is convex, an iris A, and the third lens unit L3 having a positive meniscus lens element whose object-side surface is convex and an integrated lens element consisting of a negative meniscus lens element whose image-side surface is concave and a positive meniscus lens element whose object-side surface is convex.

The object-side surface of the positive meniscus lens element whose object-side surface is convex of the second lens unit L2, the image-side surface of the positive meniscus lens element positioned on the object-side whose object-side surface is convex of the third lens unit and the image-side surface of the positive meniscus lens element whose object-side surface is convex constituting the integrated lens element are aspherical. A plate P is arranged behind the third lens unit L3.

The embodiment 44 has, from the object side, the first lens unit L1 having a negative meniscus lens element whose image-side surface is concave and a positive meniscus lens element whose object-side surface is convex, the second lens unit L2 having a negative meniscus lens element whose image-side surface is concave and a positive bi-convex lens element, an iris A, and the third lens unit L3 having an integrated lens element consisting of a negative meniscus lens element whose image-side surface is concave and a positive bi-convex lens element.

The image-side surface of the positive meniscus lens element whose object-side surface is convex of the first lens unit L1, both of the surfaces of the positive bi-convex lens element of the second lens unit L2, the object-side surface of the negative meniscus lens element whose image-side surface is concave of the third lens unit L3 and the image-side surface of the positive bi-convex lens element of the third lens unit L3 are aspherical. A plate P is arranged behind the third lens unit L3.

The embodiment 45 has, from the object side, the first lens unit L1 having a negative meniscus lens element whose image-side surface is concave and a positive meniscus lens whose object-side surface is convex, the second lens unit L2 having a negative bi-concave lens element and a positive meniscus lens element whose image-side surface is convex, an iris A, the third lens unit L3 having an integrated lens element consisting of a negative meniscus lens element whose image-side surface is concave and a positive bi-convex lens element, and the fourth lens element L4 having a negative meniscus lens element whose image-side surface is concave.

The image-side surface of the positive meniscus lens element whose object-side surface is convex of the first lens unit L1, both of the surfaces of the positive meniscus lens element whose image-side surface is convex of the second lens unit L2, the object-side surface of the negative meniscus lens element whose image-side surface is concave of the third lens unit L3 and the image-side surface is concave of positive bi-convex lens elements are aspherical. A plate P is arranged behind the fourth lens unit L4.

The embodiment 46 has, from the object side, the first lens unit L1 having a negative meniscus lens element whose image-side surface is concave and a positive meniscus lens element whose object-side surface is convex, the second lens unit L2 having a negative bi-concave lens element and a positive bi-convex lens element, an iris A, the third lens unit L3 having a positive bi-convex lens element and an integrated lens element consisting of a negative meniscus lens element whose image-side surface is concave and a positive bi-convex lens element, and the fourth lens unit L4 having a negative meniscus lens element whose image-side surface is concave.

The image-side surface of the positive meniscus lens element whose object-side surface is convex of the first lens unit L1, the image-side surface of the positive-convex lens element of the second lens unit L2, the image-side surface of the positive bi-convex lens element arranged on the object side of the third lens unit L3, and the image-side surface of the positive bi-convex lens element constituting the integrated lens element are aspherical. A plate P is arranged behind the fourth lens unit L4.

The embodiment 47 has, from the object side, the first lens unit L1 having a negative meniscus lens element whose image-side surface is concave and a positive meniscus lens element whose object-side surface is convex, the second lens unit L2 having a negative bi-concave lens element and a positive meniscus lens element whose image-side surface is convex, an iris A, the third lens unit L3 having a positive bi-convex lens element and an integrated lens element consisting of a negative meniscus lens element whose image-side surface is concave and a positive bi-convex lens element, and the fourth lens unit L4 having a negative meniscus lens element whose image-side surface is concave.

The image-side surface of the positive meniscus lens element whose image-side surface is convex of the second lens unit L2, the image-side surface of the positive bi-convex lens element arranged on the object side of the third lens unit L3, and the image-side surface of the positive bi-convex lens element constituting the integrated lens element are aspherical. A plate P is arranged behind th fourth lens unit L4.

The embodiment 48 has, from the object side, the first lens unit L1 having a negative meniscus lens element whose image-side surface is concave and a positive meniscus lens element whose object-side surface is convex, the second lens unit L2 having a negative bi-concave lens element and a positive meniscus lens element whose image-side surface is convex, an iris A, the third lens unit L3 having a positive bi-convex lens element, the fourth lens unit L4 having an integrated lens element consisting of a negative meniscus lens element whose image-side surface is concave and a positive bi-convex lens element, and the fifth lens unit L5 having negative meniscus lens element whose image-side surface is concave.

The image-side surface of the positive meniscus lens element whose image-side surface is convex of the second unit L2, the image-side surface of the positive bi-convex lens element of the third lens unit L8, and the image-side surface of the positive bi-convex lens element of the fourth lens unit L4 are aspherical. A plate P is arranged behind the fifth lens unit L5.

The embodiment 49 has, from the object side, the first lens unit L1 having a negative meniscus lens element whose image-side surface is concave and a positive meniscus lens element whose object-side surface is convex, the second lens unit L2 having a negative bi-concave lens element and a positive bi-convex lens element, an iris A, the third lens unit L3 having a positive bi-convex lens element and an integrated lens element consisting of a negative meniscus lens element whose image-side surface is concave and a positive bi-convex lens element, and the fourth lens unit L4 having a negative meniscus lens element whose image-side surface is concave.

The image-side surface of the positive meniscus lens element whose object-side surface is convex of the first lens unit L1, the image-side surface of the positive bi-convex lens element of the second lens unit L2, the image-side surface of the positive bi-convex lens element arranged on the object side of the third lens unit L3, and the image-side surface of the positive bi-convex lens element constituting the integrated lens element are aspherical. A plate P is arranged behind the fourth lens unit L4.

Figure 100A:
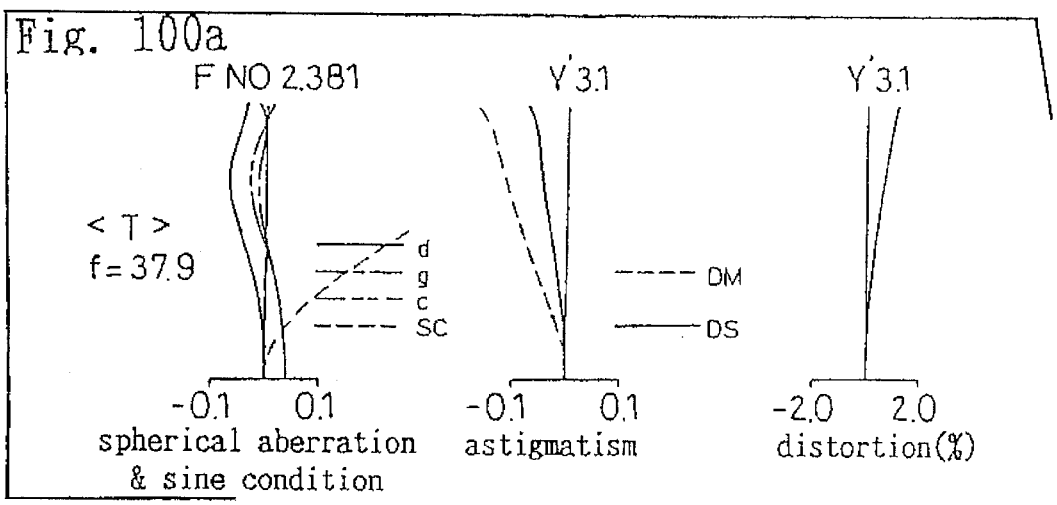
Figure 100B:
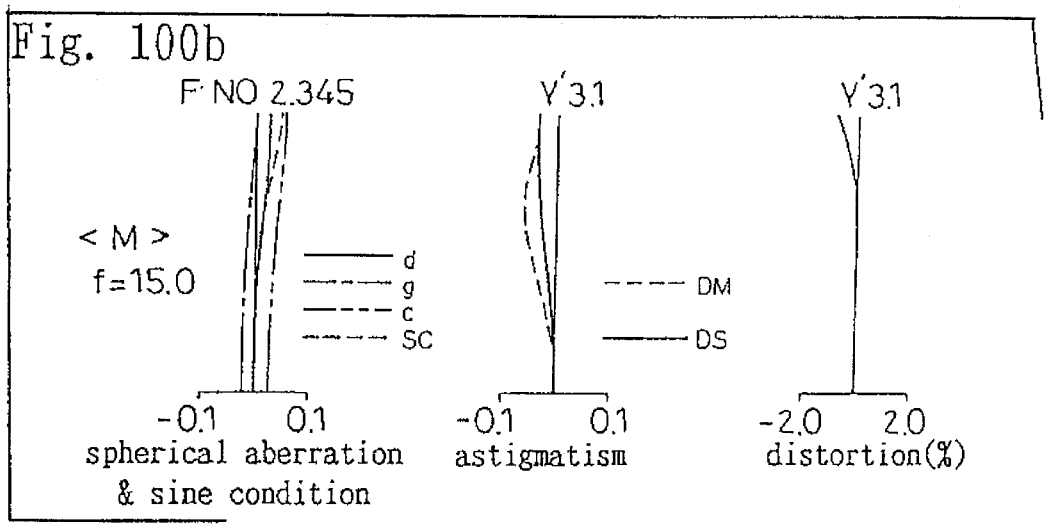
Figure 100C:
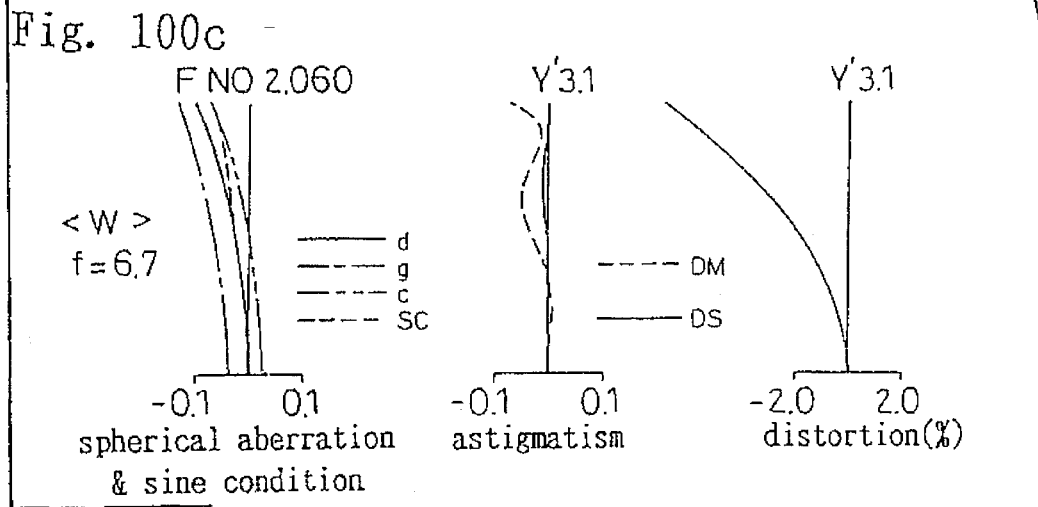
Figure 102A:
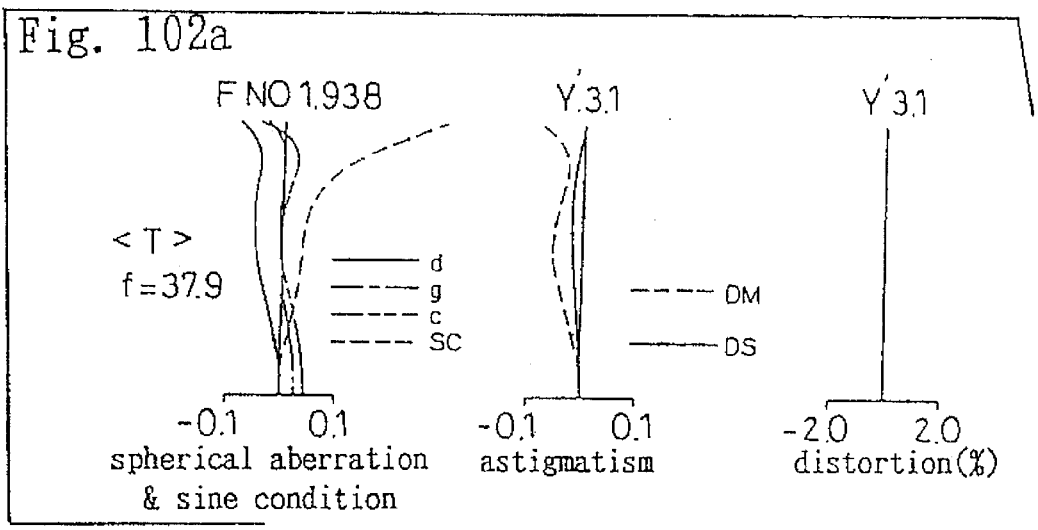
Figure 102B:
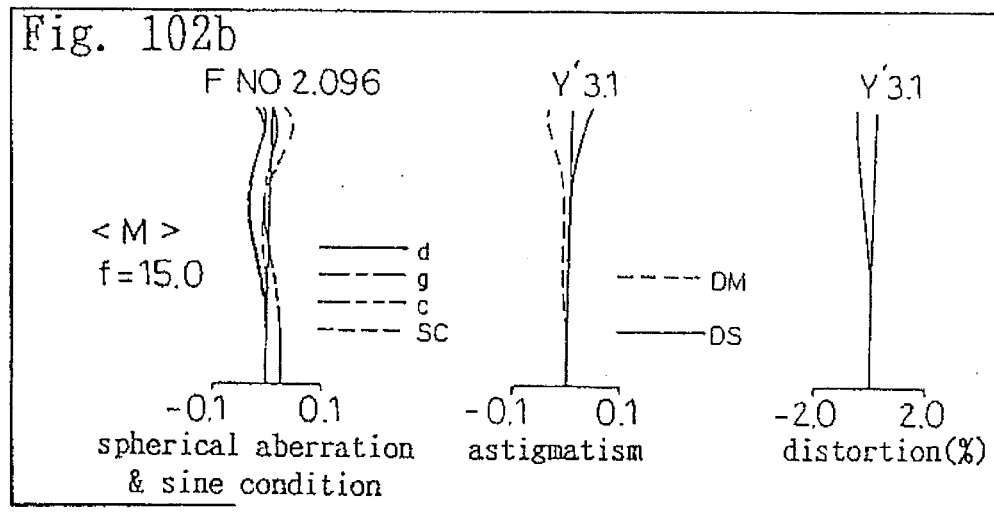
Figure 102C:
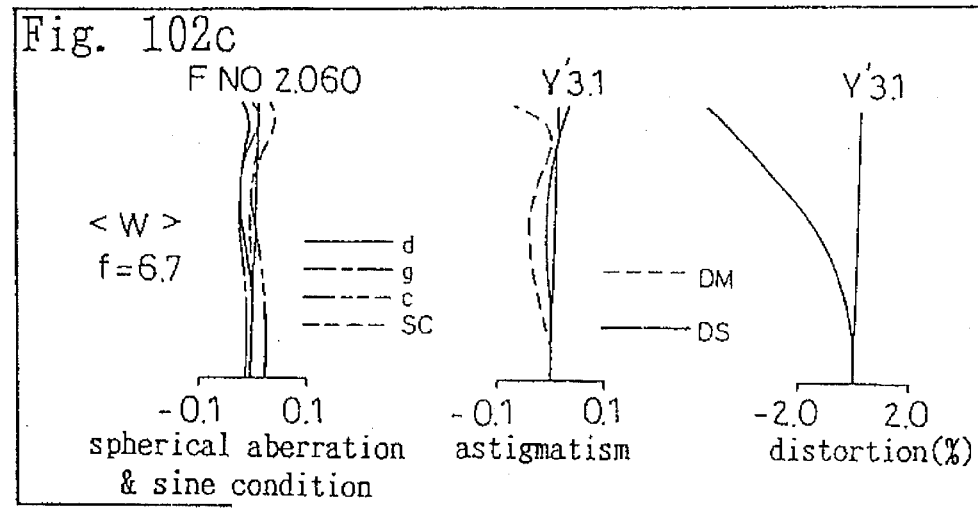

FIGS. 93a, 93b, and 93c to 102a, 102b, and 102c show the aberrations of the above-described embodiments 40 to 49, respectively. a, b and c of each FIG. show the aberrations at the longest, the middle and the shortest focal length conditions, respectively. A solid line d shows the aberration to the d-line. One-dotted chain line g shows the aberration to the g-line. Two-dotted chain line c shows the aberration to the c-line. A dotted line SC shows a sine condition. A dotted line DM and a solid line DS show the astigmatism at the meridional and sagittal image planes, respectively.

The above-described embodiments have an excellent aberration correction performance with a simple lens arrangement having only a few lens elements in spite of having a very high zoom ratio of 6× and a large aperture ratio of F1.8. Also, they are compacter than conventional zoom lens systems in total length and diameter of the front lens. The object of the present invention is sufficiently attained.

TABLE 1

<Embodiment 1>
f = 52.5~19.0~9.25   $F_{NO}$ = 2.32~1.63~1.63

| Radius of Curvature | | Axial Distance | | Refractive Index | | Abbe Number |
|---|---|---|---|---|---|---|
| $r_1$ | 30.516 | | | | | |
| | | $d_1$ | 1.500 | $N_1$ | 1.84666 $v_1$ | 23.82 |
| $r_2$ | 19.677 | | | | | |
| | | $d_2$ | 1.300 | | | |
| $r_3$ | 21.111 | | | | | |
| | | $d_3$ | 5.100 | $N_2$ | 1.71300 $v_2$ | 53.93 |
| $r_4$ | −624.025 | | | | | |
| | | $d_4$ | 28.083~13.192~2.000 | | | |
| $r_5$ | −33.103 | | | | | |
| | | $d_5$ | 1.100 | $N_3$ | 1.77250 $v_3$ | 49.77 |
| $r_6$* | 8.599 | | | | | |
| | | $d_6$ | 3.000 | | | |
| $r_7$ | 17.926 | | | | | |
| | | $d_7$ | 2.300 | $N_4$ | 1.84666 $v_4$ | 23.82 |
| $r_8$ | 48.178 | | | | | |
| | | $d_8$ | 2.200~17.091~28.283 | | | |
| $r_9$ | ∞ | | | | | |
| | | $d_9$ | 6.000~2.604~5.418 | | | |
| $r_{10}$* | 15.002 | | | | | |
| | | $d_{10}$ | 4.800 | $N_5$ | 1.77250 $v_5$ | 49.77 |
| $r_{11}$ | −98.832 | | | | | |
| | | $d_{11}$ | 4.400 | | | |
| $r_{12}$ | −23.994 | | | | | |
| | | $d_{12}$ | 1.500 | $N_6$ | 1.84666 $v_6$ | 23.82 |
| $r_{13}$ | 22.588 | | | | | |
| | | $d_{13}$ | 1.700 | | | |
| $r_{14}$* | 25.915 | | | | | |
| | | $d_{14}$ | 4.200 | $N_7$ | 1.69100 $v_7$ | 54.75 |
| $r_{15}$ | −16.278 | | | | | |
| | | $d_{15}$ | 5.000~8.396~5.582 | | | |
| $r_{16}$ | ∞ | | | | | |
| | | $d_{16}$ | 5.000 | $N_8$ | 1.51680 $v_8$ | 64.20 |
| $r_{17}$ | ∞ | | | | | |

Aspherical coefficient $r_6$:  $\epsilon = 0.10000 \times 10$
$A_4 = -0.21902 \times 10^{-3}$    $A_6 = -0.63326 \times 10^{-6}$
$A_8 = -0.34594 \times 10^{-7}$
$r_{10}$:  $\epsilon = 0.10000 \times 10$
$A_4 = -0.17178 \times 10^{-4}$    $A_6 = -0.82204 \times 10^{-7}$
$A_8 = -0.87576 \times 10^{-10}$
$r_{14}$:  $\epsilon = 0.10000 \times 10$
$A_4 = -0.11222 \times 10^{-3}$    $A_6 = 0.81929 \times 10^{-7}$
$A_8 = 0.98703 \times 10^{-9}$

TABLE 2

<Embodiment 2>
f = 52.5~19.0~9.25   $F_{NO}$ = 2.27~1.63~1.63

| Radius of Curvature | | Axial Distance | | Refractive Index | | Abbe Number |
|---|---|---|---|---|---|---|
| $r_1$ | 31.353 | | | | | |
| | | $d_1$ | 1.500 | $N_1$ | 1.84666 $v_1$ | 23.82 |
| $r_2$ | 19.918 | | | | | |
| | | $d_2$ | 1.400 | | | |
| $r_3$ | 21.437 | | | | | |
| | | $d_3$ | 5.300 | $N_2$ | 1.71300 $v_2$ | 53.93 |
| $r_4$ | −403.794 | | | | | |
| | | $d_4$ | 27.968~13.286~1.999 | | | |
| $r_5$ | −39.216 | | | | | |
| | | $d_5$ | 1.100 | $N_3$ | 1.77250 $v_3$ | 49.77 |
| $r_6$* | 8.429 | | | | | |
| | | $d_6$ | 2.100 | | | |
| $r_7$ | 14.087 | | | | | |
| | | $d_7$ | 3.000 | $N_4$ | 1.84666 $v_4$ | 23.82 |
| $r_8$ | 29.122 | | | | | |
| | | $d_8$ | 2.900~17.581~28.869 | | | |
| $r_9$ | ∞ | | | | | |
| | | $d_9$ | 6.100~2.649~5.348 | | | |
| $r_{10}$* | 15.958 | | | | | |
| | | $d_{10}$ | 4.200 | $N_5$ | 1.77250 $v_5$ | 49.77 |
| $r_{11}$ | −71.528 | | | | | |
| | | $d_{11}$ | 5.300 | | | |
| $r_{12}$ | −20.112 | | | | | |
| | | $d_{12}$ | 2.500 | $N_6$ | 1.84666 $v_6$ | 23.82 |
| $r_{13}$ | 23.352 | | | | | |
| | | $d_{13}$ | 1.800 | | | |
| $r_{14}$* | 22.600 | | | | | |
| | | $d_{14}$ | 4.200 | $N_7$ | 1.71300 $v_7$ | 53.93 |
| $r_{15}$ | −15.967 | | | | | |
| | | $d_{15}$ | 5.000~8.451~5.752 | | | |
| $r_{16}$ | ∞ | | | | | |
| | | $d_{16}$ | 5.000 | $N_8$ | 1.51680 $v_8$ | 64.20 |
| $r_{17}$ | ∞ | | | | | |

Aspherical coefficient $r_6$:  $\epsilon = 0.10000 \times 10$
$A_4 = -0.19345 \times 10^{-3}$    $A_6 = -0.14283 \times 10^{-7}$
$A_8 = -0.45281 \times 10^{-7}$
$r_{10}$:  $\epsilon = 0.10000 \times 10^{-4}$
$A_4 = -0.13108 \times 10^{-4}$    $A_6 = -0.13460 \times 10^{-6}$
$A_8 = 0.25100 \times 10^{-9}$
$r_{14}$:  $\epsilon = 0.10000 \times 10$
$A_4 = -0.11599 \times 10^{-3}$    $A_6 = 0.25408 \times 10^{-6}$
$A_8 = 0.12845 \times 10^{-9}$

TABLE 3

<Embodiment 3>
f = 52.5~19.0~9.25   $F_{NO}$ = 2.22~1.63~1.63

| Radius of Curvature | | Axial Distance | | Refractive Index | | Abbe Number |
|---|---|---|---|---|---|---|
| $r_1$ | 30.750 | | | | | |
| | | $d_1$ | 1.500 | $N_1$ | 1.84666 $v_1$ | 23.82 |
| $r_2$ | 20.177 | | | | | |
| | | $d_2$ | 1.400 | | | |
| $r_3$ | 21.464 | | | | | |
| | | $d_3$ | 5.300 | $N_2$ | 1.71300 $v_2$ | 53.93 |
| $r_4$ | 1619.643 | | | | | |
| | | $d_4$ | 29.456~14.200~2.000 | | | |
| $r_5$* | −36.117 | | | | | |
| | | $d_5$ | 1.100 | $N_3$ | 1.77250 $v_3$ | 49.77 |
| $r_6$ | 9.342 | | | | | |
| | | $d_6$ | 3.200 | | | |
| $r_7$ | 15.199 | | | | | |

TABLE 3-continued

| | | | | | | | |
|---|---|---|---|---|---|---|---|
| | | $d_7$ | 2.000 | $N_4$ | 1.84666 | $v_4$ | 23.82 |
| $r_8$ | 28.260 | | | | | | |
| | | $d_8$ | 2.300~17.556~29.756 | | | | |
| $r_9$ | ∞ | | | | | | |
| | | $d_9$ | 6.100~3.211~5.792 | | | | |
| $r_{10}$* | 17.459 | | | | | | |
| | | $d_{10}$ | 4.600 | $N_5$ | 1.77250 | $v_5$ | 49.77 |
| $r_{11}$ | −46.108 | | | | | | |
| | | $d_{11}$ | 5.300 | | | | |
| $r_{12}$ | −18.252 | | | | | | |
| | | $d_{12}$ | 2.300 | $N_6$ | 1.84666 | $v_6$ | 23.82 |
| $r_{13}$ | 20.422 | | | | | | |
| | | $d_{13}$ | 1.800 | | | | |
| $r_{14}$* | 19.700 | | | | | | |
| | | $d_{14}$ | 4.800 | $N_7$ | 1.71300 | $v_7$ | 53.93 |
| $r_{15}$ | −16.077 | | | | | | |
| | | $d_{15}$ | 5.000~7.889~5.308 | | | | |
| $r_{16}$ | ∞ | | | | | | |
| | | $d_{16}$ | 5.000 | $N_8$ | 1.51680 | $v_8$ | 64.20 |
| $r_{17}$ | ∞ | | | | | | |

Aspherical coefficient $r_5$:  $\epsilon = 0.10000 \times 10$
 $A_4 = 0.11251 \times 10^{-3}$   $A_6 = -0.32466 \times 10^{-6}$
 $A_8 = -0.12421 \times 10^{-8}$ $r_{10}$: $\epsilon = 0.10000 \times 10$
 $A_4 = -0.14130 \times 10^{-4}$   $A_6 = -0.43112 \times 10^{-7}$
 $A_8 = -0.41377 \times 10^{-9}$ $r_{14}$: $\epsilon = 0.10000 \times 10$
 $A_4 = -0.10531 \times 10^{-3}$   $A_6 = 0.21219 \times 10^{-6}$
 $A_8 = 0.55010 \times 10^{-9}$

TABLE 4

\<Embodiment 4\>
$f = 52.5 \sim 19.0 \sim 9.25$    $F_{NO} = 2.23 \sim 1.63 \sim 1.63$

| | Radius of Curvature | | Axial Distance | | Refractive Index | | Abbe Number |
|---|---|---|---|---|---|---|---|
| $r_1$ | 33.284 | | | | | | |
| | | $d_1$ | 1.500 | $N_1$ | 1.84666 | $v_1$ | 23.82 |
| $r_2$ | 21.463 | | | | | | |
| | | $d_2$ | 1.400 | | | | |
| $r_3$ | 23.115 | | | | | | |
| | | $d_3$ | 5.200 | $N_2$ | 1.71300 | $v_2$ | 53.93 |
| $r_4$ | −370.582 | | | | | | |
| | | $d_4$ | 29.756~14.305~2.001 | | | | |
| $r_5$ | −32.771 | | | | | | |
| | | $d_5$ | 1.200 | $N_3$ | 1.77250 | $v_3$ | 49.77 |
| $r_6$ | 9.565 | | | | | | |
| | | $d_6$ | 3.700 | | | | |
| $r_7$* | −233.894 | | | | | | |
| | | $d_7$ | 1.900 | $N_4$ | 1.84666 | $v_4$ | 23.82 |
| $r_8$ | −32.174 | | | | | | |
| | | $d_8$ | 1.400~16.851~29.155 | | | | |
| $r_9$ | ∞ | | | | | | |
| | | $d_9$ | 5.900~3.077~5.840 | | | | |
| $r_{10}$* | 17.038 | | | | | | |
| | | $d_{10}$ | 4.900 | $N_5$ | 1.77250 | $v_5$ | 49.77 |
| $r_{11}$ | −73.606 | | | | | | |
| | | $d_{11}$ | 5.300 | | | | |
| $r_{12}$ | −24.980 | | | | | | |
| | | $d_{12}$ | 2.100 | $N_6$ | 1.84666 | $v_6$ | 23.82 |
| $r_{13}$ | 20.337 | | | | | | |
| | | $d_{13}$ | 1.900 | | | | |
| $r_{14}$* | 24.163 | | | | | | |
| | | $d_{14}$ | 4.600 | $N_7$ | 1.71300 | $v_7$ | 53.93 |
| $r_{15}$ | −16.530 | | | | | | |
| | | $d_{15}$ | 5.000~7.823~5.060 | | | | |
| $r_{16}$ | ∞ | | | | | | |
| | | $d_{16}$ | 5.000 | $N_8$ | 1.51680 | $v_8$ | 64.20 |
| $r_{17}$ | ∞ | | | | | | |

Aspherical coefficient

TABLE 4-continued $r_7$:  $\epsilon = 0.10000 \times 10$
 $A_4 = 0.12378 \times 10^{-3}$   $A_6 = 0.92400 \times 10^{-7}$
 $A_8 = 0.14925 \times 10^{-7}$ $r_{10}$: $\epsilon = 0.10000 \times 10$
 $A_4 = -0.18404 \times 10^{-4}$   $A_6 = -0.35127 \times 10^{-7}$
 $A_8 = -0.40270 \times 10^{-9}$ $r_{14}$: $\epsilon = 0.10000 \times 10$
 $A_4 = -0.86399 \times 10^{-4}$   $A_6 = 0.16283 \times 10^{-6}$
 $A_8 = 0.89459 \times 10^{-9}$

TABLE 5

\<Embodiment 5\>
$f = 52.5 \sim 19.0 \sim 9.25$    $F_{NO} = 2.22 \sim 1.63 \sim 1.63$

| | Radius of Curvature | | Axial Distance | | Refractive Index | | Abbe Number |
|---|---|---|---|---|---|---|---|
| $r_1$ | 30.183 | | | | | | |
| | | $d_1$ | 1.500 | $N_1$ | 1.84666 | $v_1$ | 23.82 |
| $r_2$ | 20.331 | | | | | | |
| | | $d_2$ | 1.400 | | | | |
| $r_3$ | 21.715 | | | | | | |
| | | $d_3$ | 5.100 | $N_2$ | 1.71300 | $v_2$ | 53.93 |
| $r_4$ | 811.155 | | | | | | |
| | | $d_4$ | 29.718~14.232~2.000 | | | | |
| $r_5$ | −77.170 | | | | | | |
| | | $d_5$ | 1.200 | $N_3$ | 1.77250 | $v_3$ | 49.77 |
| $r_6$ | 8.605 | | | | | | |
| | | $d_6$ | 3.700 | | | | |
| $r_7$ | 80.775 | | | | | | |
| | | $d_7$ | 1.900 | $N_4$ | 1.84666 | $v_4$ | 23.82 |
| $r_8$* | −81.441 | | | | | | |
| | | $d_8$ | 1.400~16.886~29.118 | | | | |
| $r_9$ | ∞ | | | | | | |
| | | $d_9$ | 5.900~2.845~5.389 | | | | |
| $r_{10}$ | 17.539 | | | | | | |
| | | $d_{10}$ | 4.400 | $N_5$ | 1.77250 | $v_5$ | 49.77 |
| $r_{11}$* | −54.179 | | | | | | |
| | | $d_{11}$ | 5.300 | | | | |
| $r_{12}$ | −28.000 | | | | | | |
| | | $d_{12}$ | 1.900 | $N_6$ | 1.84666 | $v_6$ | 23.82 |
| $r_{13}$ | 18.529 | | | | | | |
| | | $d_{13}$ | 1.900 | | | | |
| $r_{14}$ | 20.769 | | | | | | |
| | | $d_{14}$ | 4.800 | $N_7$ | 1.71300 | $v_7$ | 53.93 |
| $r_{15}$* | −18.169 | | | | | | |
| | | $d_{15}$ | 5.000~8.055~5.511 | | | | |
| $r_{16}$ | ∞ | | | | | | |
| | | $d_{16}$ | 5.000 | $N_8$ | 1.51680 | $v_8$ | 64.20 |
| $r_{17}$ | ∞ | | | | | | |

Aspherical coefficient $r_8$:  $\epsilon = 0.10000 \times 10$
 $A_4 = -0.11066 \times 10^{-3}$   $A_6 = 0.44095 \times 10^{-7}$
 $A_8 = -0.21307 \times 10^{-7}$ $r_{11}$: $\epsilon = 0.10000 \times 10$
 $A_4 = 0.41741 \times 10^{-4}$   $A_6 = -0.20002 \times 10^{-6}$
 $A_8 = 0.79117 \times 10^{-9}$ $r_{15}$: $\epsilon = 0.10000 \times 10$
 $A_4 = 0.50386 \times 10^{-4}$   $A_6 = 0.34063 \times 10^{-6}$
 $A_8 = -0.13662 \times 10^{-8}$

TABLE 6

\<Embodiment 6\>
$f = 52.5 \sim 19.0 \sim 9.25$    $F_{NO} = 2.22 \sim 1.63 \sim 1.63$

| | Radius of Curvature | | Axial Distance | | Refractive Index | | Abbe Number |
|---|---|---|---|---|---|---|---|
| $r_1$ | 30.302 | | | | | | |
| | | $d_1$ | 1.500 | $N_1$ | 1.84666 | $v_1$ | 23.82 |
| $r_2$ | 20.312 | | | | | | |
| | | $d_2$ | 1.400 | | | | |

TABLE 6-continued

| | | | | | | | |
|---|---|---|---|---|---|---|---|
| $r_3$ | 21.650 | | | | | | |
| | | $d_3$ | 5.100 | $N_2$ | 1.71300 | $v_2$ | 53.93 |
| $r_4$ | 759.255 | | | | | | |
| | | $d_4$ | 29.605~14.196~2.000 | | | | |
| $r_5$ | −89.524 | | | | | | |
| | | $d_5$ | 1.200 | $N_3$ | 1.77250 | $v_3$ | 49.77 |
| $r_6$ | 8.475 | | | | | | |
| | | $d_6$ | 3.700 | | | | |
| $r_7$ | 73.654 | | | | | | |
| | | $d_7$ | 1.900 | $N_4$ | 1.84666 | $v_4$ | 23.82 |
| $r_8$* | −92.584 | | | | | | |
| | | $d_8$ | 1.400~16.808~29.005 | | | | |
| $r_9$ | ∞ | | | | | | |
| | | $d_9$ | 5.900~3.262~5.925 | | | | |
| $r_{10}$ | 17.203 | | | | | | |
| | | $d_{10}$ | 4.500 | $N_5$ | 1.77250 | $v_5$ | 49.77 |
| $r_{11}$* | −68.860 | | | | | | |
| | | $d_{11}$ | 5.800 | | | | |
| $r_{12}$ | −30.119 | | | | | | |
| | | $d_{12}$ | 1.300 | $N_6$ | 1.84666 | $v_6$ | 23.82 |
| $r_{13}$* | 17.686 | | | | | | |
| | | $d_{13}$ | 1.600 | | | | |
| $r_{14}$ | 21.977 | | | | | | |
| | | $d_{14}$ | 4.800 | $N_7$ | 1.71300 | $v_7$ | 53.93 |
| $r_{15}$ | −16.650 | | | | | | |
| | | $d_{15}$ | 5.000~7.638~4.975 | | | | |
| $r_{16}$ | ∞ | | | | | | |
| | | $d_{16}$ | 5.000 | $N_8$ | 1.51680 | $v_8$ | 64.20 |
| $r_{17}$ | ∞ | | | | | | |

| Aspherical coefficient | |
|---|---|
| $r_8$: | $\epsilon = 0.10000 \times 10$ |
| | $A_4 = -0.11191 \times 10^{-3}$  $A_6 = 0.51106 \times 10^{-7}$ |
| | $A_8 = -0.22458 \times 10^{-7}$ |
| $r_{11}$: | $\epsilon = 0.10000 \times 10$ |
| | $A_4 = 0.24628 \times 10^{-4}$  $A_6 = 0.35278 \times 10^{-7}$ |
| | $A_8 = -0.15477 \times 10^{-9}$ |
| $r_{13}$: | $\epsilon = 0.10000 \times 10$ |
| | $A_4 = 0.93491 \times 10^{-4}$  $A_6 = 0.24719 \times 10^{-8}$ |
| | $A_8 = -0.24013 \times 10^{-8}$ |

TABLE 7

<Embodiment 7>
$f = 52.5~19.0~9.25$    $F_{NO} = 2.21~1.63~1.63$

| | Radius of Curvature | | Axial Distance | | Refractive Index | | Abbe Number |
|---|---|---|---|---|---|---|---|
| $r_1$ | 29.900 | | | | | | |
| | | $d_1$ | 1.500 | $N_1$ | 1.84666 | $v_1$ | 23.82 |
| $r_2$ | 20.516 | | | | | | |
| | | $d_2$ | 1.400 | | | | |
| $r_3$ | 21.940 | | | | | | |
| | | $d_3$ | 5.100 | $N_2$ | 1.71300 | $v_2$ | 53.93 |
| $r_4$ | 557.631 | | | | | | |
| | | $d_4$ | 29.588~14.374~2.000 | | | | |
| $r_5$ | −96.505 | | | | | | |
| | | $d_5$ | 1.200 | $N_3$ | 1.77250 | $v_3$ | 49.77 |
| $r_6$ | 8.387 | | | | | | |
| | | $d_6$ | 3.700 | | | | |
| $r_7$ | 67.547 | | | | | | |
| | | $d_7$ | 1.900 | $N_4$ | 1.84666 | $v_4$ | 23.82 |
| $r_8$* | −101.241 | | | | | | |
| | | $d_8$ | 1.400~16.615~28.988 | | | | |
| $r_9$ | ∞ | | | | | | |
| | | $d_9$ | 5.200~2.472~5.092 | | | | |
| $r_{10}$ | 63.966 | | | | | | |
| | | $d_{10}$ | 3.000 | $N_5$ | 1.71300 | $v_5$ | 53.93 |
| $r_{11}$* | −31.391 | | | | | | |
| | | $d_{11}$ | 7.500 | | | | |
| $r_{12}$ | −191.234 | | | | | | |
| | | $d_{12}$ | 1.300 | $N_6$ | 1.84666 | $v_6$ | 23.82 |
| $r_{13}$ | 23.352 | | | | | | |
| | | $d_{13}$ | 1.300 | | | | |
| $r_{14}$ | 24.795 | | | | | | |

TABLE 7-continued

| | | | | | | | |
|---|---|---|---|---|---|---|---|
| | | $d_{14}$ | 5.700 | $N_7$ | 1.61800 | $v_7$ | 63.39 |
| $r_{15}$* | −15.497 | | | | | | |
| | | $d_{15}$ | 5.000~7.728~5.108 | | | | |
| $r_{16}$ | ∞ | | | | | | |
| | | $d_{16}$ | 5.000 | $N_8$ | 1.51680 | $v_8$ | 64.20 |
| $r_{17}$ | ∞ | | | | | | |

| Aspherical coefficient | |
|---|---|
| $r_8$: | $\epsilon = 0.10000 \times 10$ |
| | $A_4 = -0.11201 \times 10^{-3}$  $A_6 = -0.12401 \times 10^{-6}$ |
| | $A_8 = -0.20029 \times 10^{-7}$ |
| $r_{11}$: | $\epsilon = 0.10000 \times 10$ |
| | $A_4 = 0.46016 \times 10^{-4}$  $A_6 = 0.15437 \times 10^{-7}$ |
| | $A_8 = 0.44240 \times 10^{-9}$ |
| $r_{15}$: | $\epsilon = 0.10000 \times 10$ |
| | $A_4 = 0.22600 \times 10^{-4}$  $A_6 = 0.10442 \times 10^{-6}$ |
| | $A_8 = 0.95730 \times 10^{-10}$ |

TABLE 8

<Embodiment 8>
$f = 52.5~19.0~9.25$    $F_{NO} = 2.21~1.63~1.63$

| | Radius of Curvature | | Axial Distance | | Refractive Index | | Abbe Number |
|---|---|---|---|---|---|---|---|
| $r_1$ | 29.872 | | | | | | |
| | | $d_1$ | 1.500 | $N_1$ | 1.84666 | $v_1$ | 23.82 |
| $r_2$ | 20.258 | | | | | | |
| | | $d_2$ | 1.400 | | | | |
| $r_3$ | 21.604 | | | | | | |
| | | $d_3$ | 5.100 | $N_2$ | 1.71300 | $v_2$ | 53.93 |
| $r_4$ | 540.678 | | | | | | |
| | | $d_4$ | 29.598~14.206~2.000 | | | | |
| $r_5$ | −91.246 | | | | | | |
| | | $d_5$ | 1.200 | $N_3$ | 1.77250 | $v_3$ | 49.77 |
| $r_6$ | 8.453 | | | | | | |
| | | $d_6$ | 3.700 | | | | |
| $r_7$ | 65.493 | | | | | | |
| | | $d_7$ | 1.900 | $N_4$ | 1.84666 | $v_4$ | 23.82 |
| $r_8$* | −107.862 | | | | | | |
| | | $d_8$ | 1.400~16.791~28.998 | | | | |
| $r_9$ | ∞ | | | | | | |
| | | $d_9$ | 5.200~2.479~5.105 | | | | |
| $r_{10}$ | 72.053 | | | | | | |
| | | $d_{10}$ | 3.000 | $N_5$ | 1.71300 | $v_5$ | 53.93 |
| $r_{11}$* | −37.462 | | | | | | |
| | | $d_{11}$ | 7.500 | | | | |
| $r_{12}$ | 109.869 | | | | | | |
| | | $d_{12}$ | 1.300 | $N_6$ | 1.84666 | $v_6$ | 23.82 |
| $r_{13}$ | 19.982 | | | | | | |
| | | $d_{13}$ | 5.400 | $N_7$ | 1.61800 | $v_7$ | 63.39 |
| $r_{14}$* | −17.991 | | | | | | |
| | | $d_{14}$ | 5.000~7.721~5.095 | | | | |
| $r_{15}$ | ∞ | | | | | | |
| | | $d_{15}$ | 5.000 | $N_8$ | 1.51680 | $v_8$ | 64.20 |
| $r_{16}$ | ∞ | | | | | | |

| Aspherical coefficient | |
|---|---|
| $r_8$: | $\epsilon = 0.10000 \times 10$ |
| | $A_4 = -0.10906 \times 10^{-3}$  $A_6 = -0.14505 \times 10^{-6}$ |
| | $A_8 = -0.18237 \times 10^{-7}$ |
| $r_{11}$: | $\epsilon = 0.10000 \times 10$ |
| | $A_4 = 0.39760 \times 10^{-4}$  $A_6 = 0.44990 \times 10^{-7}$ |
| | $A_8 = 0.67384 \times 10^{-9}$ |
| $r_{14}$: | $\epsilon = 0.10000 \times 10$ |
| | $A_4 = 0.47188 \times 10^{-5}$  $A_6 = 0.13754 \times 10^{-7}$ |
| | $A_8 = -0.22440 \times 10^{-9}$ |

TABLE 9

<Embodiment 9>
$f = 52.5~19.0~9.25$    $F_{NO} = 2.42~1.63~1.63$

TABLE 9-continued

| | Radius of Curvature | | Axial Distance | | Refractive Index | | Abbe Number |
|---|---|---|---|---|---|---|---|
| $r_1$ | 28.491 | | | | | | |
| | | $d_1$ | 1.500 | $N_1$ | 1.84666 | $v_1$ | 23.82 |
| $r_2$ | 18.492 | | | | | | |
| | | $d_2$ | 1.300 | | | | |
| $r_3$ | 19.881 | | | | | | |
| | | $d_3$ | 5.000 | $N_2$ | 1.71300 | $v_2$ | 53.93 |
| $r_4$ | −687.649 | | | | | | |
| | | $d_4$ | 25.463~11.793~2.000 | | | | |
| $r_5$ | −34.322 | | | | | | |
| | | $d_5$ | 1.100 | $N_3$ | 1.77250 | $v_3$ | 49.77 |
| $r_6$* | 8.450 | | | | | | |
| | | $d_6$ | 3.300 | | | | |
| $r_7$ | 18.690 | | | | | | |
| | | $d_7$ | 2.200 | $N_4$ | 1.84666 | $v_4$ | 23.82 |
| $r_8$ | 54.429 | | | | | | |
| | | $d_8$ | 2.000~18.670~31.462 | | | | |
| $r_9$ | ∞ | | | | | | |
| | | $d_9$ | 6.000~2.777~5.813 | | | | |
| $r_{10}$* | 13.743 | | | | | | |
| | | $d_{10}$ | 5.500 | $N_5$ | 1.67000 | $v_5$ | 57.07 |
| $r_{11}$ | −103.350 | | | | | | |
| | | $d_{11}$ | 4.200 | | | | |
| $r_{12}$ | −27.284 | | | | | | |
| | | $d_{12}$ | 1.300 | $N_6$ | 1.80518 | $v_6$ | 25.43 |
| $r_{13}$ | 22.283 | | | | | | |
| | | $d_{13}$ | 1.700 | | | | |
| $r_{14}$* | 22.891 | | | | | | |
| | | $d_{14}$ | 4.300 | $N_7$ | 1.67000 | $v_7$ | 57.07 |
| $r_{15}$ | −19.032 | | | | | | |
| | | $d_{15}$ | 5.000~8.223~5.187 | | | | |
| $r_{16}$ | ∞ | | | | | | |
| | | $d_{16}$ | 5.000 | $N_8$ | 1.51680 | $v_8$ | 64.20 |
| $r_{17}$ | ∞ | | | | | | |

| Aspherical coefficient |
|---|
| $r_6$:   $\epsilon = 0.10000 \times 10$ <br> $A_4 = -0.22871 \times 10^{-3}$    $A_6 = -0.75052 \times 10^{-6}$ <br> $A_8 = -0.39681 \times 10^{-7}$ |
| $r_{10}$:   $\epsilon = 0.10000 \times 10$ <br> $A_4 = -0.19353 \times 10^{-4}$    $A_6 = -0.96393 \times 10^{-7}$ <br> $A_8 = -0.24459 \times 10^{-9}$ |
| $r_{14}$:   $\epsilon = 0.10000 \times 10$ <br> $A_4 = -0.11181 \times 10^{-3}$    $A_6 = -0.47940 \times 10^{-7}$ <br> $A_8 = -0.37355 \times 10^{-9}$ |

TABLE 10

<Embodiment 10>
f = 52.5~19.0~9.25    $F_{NO} = 2.24$~1.63~1.63

| | Radius of Curvature | | Axial Distance | | Refractive Index | | Abbe Number |
|---|---|---|---|---|---|---|---|
| $r_1$ | 31.679 | | | | | | |
| | | $d_1$ | 1.500 | $N_1$ | 1.84666 | $v_1$ | 23.82 |
| $r_2$ | 20.698 | | | | | | |
| | | $d_2$ | 1.300 | | | | |
| $r_3$ | 22.177 | | | | | | |
| | | $d_3$ | 5.100 | $N_2$ | 1.71300 | $v_2$ | 53.93 |
| $r_4$ | −1146.973 | | | | | | |
| | | $d_4$ | 31.304~14.487~2.000 | | | | |
| $r_5$ | −27.283 | | | | | | |
| | | $d_5$ | 1.100 | $N_3$ | 1.77250 | $v_3$ | 49.77 |
| $r_6$* | 7.901 | | | | | | |
| | | $d_6$ | 3.300 | | | | |
| $r_7$ | 18.957 | | | | | | |
| | | $d_7$ | 1.900 | $N_4$ | 1.84666 | $v_4$ | 23.82 |
| $r_8$ | 67.117 | | | | | | |
| | | $d_8$ | 1.900~12.967~21.204 | | | | |
| $r_9$ | ∞ | | | | | | |
| | | $d_9$ | 7.000~3.302~6.638 | | | | |
| $r_{10}$* | 15.206 | | | | | | |
| | | $d_{10}$ | 5.200 | $N_5$ | 1.69100 | $v_5$ | 54.75 |
| $r_{11}$ | −79.015 | | | | | | |
| | | $d_{11}$ | 4.400 | | | | |
| $r_{12}$ | −32.176 | | | | | | |
| | | $d_{12}$ | 1.300 | $N_6$ | 1.84666 | $v_6$ | 23.82 |
| $r_{13}$ | 28.137 | | | | | | |
| | | $d_{13}$ | 1.500 | | | | |
| $r_{14}$* | 23.931 | | | | | | |
| | | $d_{14}$ | 4.500 | $N_7$ | 1.60311 | $v_7$ | 60.74 |
| $r_{15}$ | −15.949 | | | | | | |
| | | $d_{15}$ | 5.000~8.698~5.362 | | | | |
| $r_{16}$ | ∞ | | | | | | |
| | | $d_{16}$ | 5.000 | $N_8$ | 1.51680 | $v_8$ | 64.20 |
| $r_{17}$ | ∞ | | | | | | |

| Aspherical coefficient |
|---|
| $r_6$:   $\epsilon = 0.10000 \times 10$ <br> $A_4 = -0.30807 \times 10^{-3}$    $A_6 = -0.16100 \times 10^{-5}$ <br> $A_8 = -0.55189 \times 10^{-7}$ |
| $r_{10}$:   $\epsilon = 0.10000 \times 10$ <br> $A_4 = -0.23193 \times 10^{-4}$    $A_6 = -0.10895 \times 10^{-6}$ <br> $A_8 = -0.26703 \times 10^{-9}$ |
| $r_{14}$:   $\epsilon = 0.10000 \times 10$ <br> $A_4 = -0.13036 \times 10^{-3}$    $A_6 = 0.21448 \times 10^{-7}$ <br> $A_8 = 0.12126 \times 10^{-8}$ |

TABLE 11

<Embodiment 11>
f = 52.5~23.0~9.25    $F_{NO} = 2.22$~1.63~1.63

| | Radius of Curvature | | Axial Distance | | Refractive Index | | Abbe Number |
|---|---|---|---|---|---|---|---|
| $r_1$ | 30.747 | | | | | | |
| | | $d_1$ | 1.500 | $N_1$ | 1.84666 | $v_1$ | 23.82 |
| $r_2$ | 20.389 | | | | | | |
| | | $d_2$ | 1.400 | | | | |
| $r_3$ | 21.788 | | | | | | |
| | | $d_3$ | 5.100 | $N_2$ | 1.71300 | $v_2$ | 53.93 |
| $r_4$ | 2907.315 | | | | | | |
| | | $d_4$ | 29.787~16.964~2.000 | | | | |
| $r_5$ | −76.763 | | | | | | |
| | | $d_5$ | 1.200 | $N_3$ | 1.77250 | $v_3$ | 49.77 |
| $r_6$ | 8.645 | | | | | | |
| | | $d_6$ | 3.700 | | | | |
| $r_7$ | 66.615 | | | | | | |
| | | $d_7$ | 1.900 | $N_4$ | 1.84666 | $v_4$ | 23.82 |
| $r_8$* | −104.588 | | | | | | |
| | | $d_8$ | 1.400~14.223~29.186 | | | | |
| $r_9$ | ∞ | | | | | | |
| | | $d_9$ | 5.500~1.627~4.720 | | | | |
| $r_{10}$ | 19.372 | | | | | | |
| | | $d_{10}$ | 4.400 | $N_5$ | 1.77250 | $v_5$ | 49.77 |
| $r_{11}$* | −47.816 | | | | | | |
| | | $d_{11}$ | 6.000~6.300~6.300 | | | | |
| $r_{12}$ | −32.457 | | | | | | |
| | | $d_{12}$ | 1.300 | $N_6$ | 1.84666 | $v_6$ | 23.82 |
| $r_{13}$* | 16.739 | | | | | | |
| | | $d_{13}$ | 1.600 | | | | |
| $r_{14}$ | 21.890 | | | | | | |
| | | $d_{14}$ | 5.000 | $N_7$ | 1.71300 | $v_7$ | 53.93 |
| $r_{15}$ | −15.813 | | | | | | |
| | | $d_{15}$ | 5.000~8.573~5.480 | | | | |
| $r_{16}$ | ∞ | | | | | | |
| | | $d_{16}$ | 5.000 | $N_8$ | 1.51680 | $v_8$ | 64.20 |
| $r_{17}$ | ∞ | | | | | | |

| Aspherical coefficient |
|---|
| $r_8$:   $\epsilon = 0.10000 \times 10$ <br> $A_4 = -0.10808 \times 10^{-3}$    $A_6 = 0.10462 \times 10^{-7}$ <br> $A_8 = -0.19798 \times 10^{-7}$ |
| $r_{11}$:   $\epsilon = 0.10000 \times 10$ <br> $A_4 = 0.33515 \times 10^{-4}$    $A_6 = -0.10359 \times 10^{-7}$ <br> $A_8 = 0.18918 \times 10^{-9}$ |
| $r_{13}$:   $\epsilon = 0.10000 \times 10$ |

TABLE 11-continued $A_4 = 0.72402 \times 10^{-4}$    $A_6 = -0.35959 \times 10^{-7}$
$A_8 = -0.19113 \times 10^{-8}$

TABLE 12

<Embodiment 12>
$f = 52.4 \sim 16.0 \sim 9.25$    $F_{NO} = 2.16 \sim 1.63 \sim 1.63$

| | Radius of Curvature | | Axial Distance | | Refractive Index | | Abbe Number |
|---|---|---|---|---|---|---|---|
| $r_1$ | 30.859 | | | | | | |
| | | $d_1$ | 1.500 | $N_1$ | 1.84666 | $v_1$ | 23.82 |
| $r_2$ | 20.315 | | | | | | |
| | | $d_2$ | 1.400 | | | | |
| $r_3$ | 21.694 | | | | | | |
| | | $d_3$ | 5.300 | $N_2$ | 1.71300 | $v_2$ | 53.93 |
| $r_4$ | 18853.695 | | | | | | |
| | | $d_4$ | 28.686~10.817~2.001 | | | | |
| $r_5$ | −49.866 | | | | | | |
| | | $d_5$ | 1.100 | $N_3$ | 1.77250 | $v_5$ | 49.77 |
| $r_6$* | 8.688 | | | | | | |
| | | $d_6$ | 2.500 | | | | |
| $r_7$ | 13.913 | | | | | | |
| | | $d_7$ | 3.400 | $N_4$ | 1.84666 | $v_4$ | 23.82 |
| $r_8$ | 24.536 | | | | | | |
| | | $d_8$ | 3.000~20.869~29.686 | | | | |
| $r_9$ | ∞ | | | | | | |
| | | $d_9$ | 5.800~3.737~5.715 | | | | |
| $r_{10}$ | 33.956 | | | | | | |
| | | $d_{10}$ | 2.800 | $N_5$ | 1.71300 | $v_5$ | 53.93 |
| $r_{11}$ | −81.878 | | | | | | |
| | | $d_{11}$ | 0.100 | | | | |
| $r_{12}$ | 12.759 | | | | | | |
| | | $d_{12}$ | 4.000 | $N_6$ | 1.77250 | $v_6$ | 49.77 |
| $r_{13}$ | 57.935 | | | | | | |
| | | $d_{13}$ | 0.700 | | | | |
| $r_{14}$ | −222.389 | | | | | | |
| | | $d_{14}$ | 3.200 | $N_7$ | 1.80518 | $v_7$ | 25.43 |
| $r_{15}$ | 9.752 | | | | | | |
| | | $d_{15}$ | 1.500 | | | | |
| $r_{16}$ | 22.195 | | | | | | |
| | | $d_{16}$ | 3.000 | $N_8$ | 1.77250 | $v_8$ | 49.77 |
| $r_{17}$* | −36.519 | | | | | | |
| | | $d_{17}$ | 5.000~7.063~5.085 | | | | |
| $r_{18}$ | ∞ | | | | | | |
| | | $d_{18}$ | 5.000 | $N_9$ | 1.51680 | $v_9$ | 64.20 |
| $r_{19}$ | ∞ | | | | | | |

Aspherical coefficient $r_6$:   $\epsilon = 0.10000 \times 10$
$A_4 = -0.14724 \times 10^{-3}$    $A_6 = 0.39708 \times 10^{-6}$
$A_8 = -0.40940 \times 10^{-7}$ $r_{17}$:   $\epsilon = 0.10000 \times 10$
$A_4 = 0.66529 \times 10^{-5}$    $A_6 = 0.47942 \times 10^{-7}$
$A_8 = -0.12138 \times 10^{-7}$

TABLE 13

<Embodiment 13>
$f = 52.5 \sim 19.0 \sim 9.25$    $F_{NO} = 2.26 \sim 1.63 \sim 1.63$

| | Radius of Curvature | | Axial Distance | | Refractive Index | | Abbe Number |
|---|---|---|---|---|---|---|---|
| $r_1$ | 30.956 | | | | | | |
| | | $d_1$ | 1.500 | $N_1$ | 1.84666 | $v_1$ | 23.82 |
| $r_2$ | 20.655 | | | | | | |
| | | $d_2$ | 1.400 | | | | |
| $r_3$ | 22.367 | | | | | | |
| | | $d_3$ | 5.100 | $N_2$ | 1.71300 | $v_2$ | 53.93 |
| $r_4$ | −518.546 | | | | | | |
| | | $d_4$ | 27.781~13.608~2.000 | | | | |
| $r_5$ | −48.256 | | | | | | |
| | | $d_5$ | 1.100 | $N_3$ | 1.77250 | $v_3$ | 49.77 |
| $r_6$* | 8.438 | | | | | | |
| | | $d_6$ | 2.100 | | | | |
| $r_7$ | 12.788 | | | | | | |
| | | $d_7$ | 3.000 | $N_4$ | 1.84666 | $v_4$ | 23.82 |
| $r_8$ | 22.140 | | | | | | |
| | | $d_8$ | 2.900~17.073~28.681 | | | | |
| $r_9$ | ∞ | | | | | | |
| | | $d_9$ | 6.100~2.550~5.106 | | | | |
| $r_{10}$ | 17.606 | | | | | | |
| | | $d_{10}$ | 3.600 | $N_5$ | 1.77250 | $v_5$ | 49.77 |
| $r_{11}$ | −908.042 | | | | | | |
| | | $d_{11}$ | 6.200 | | | | |
| $r_{12}$ | −16.748 | | | | | | |
| | | $d_{12}$ | 3.200 | $N_6$ | 1.80518 | $v_6$ | 25.43 |
| $r_{13}$ | 24.715 | | | | | | |
| | | $d_{13}$ | 1.100 | | | | |
| $r_{14}$ | 147.895 | | | | | | |
| | | $d_{14}$ | 2.700 | $N_7$ | 1.69100 | $v_7$ | 54.75 |
| $r_{15}$ | −35.094 | | | | | | |
| | | $d_{15}$ | 0.100 | | | | |
| $r_{16}$* | 23.471 | | | | | | |
| | | $d_{16}$ | 4.000 | $N_8$ | 1.71300 | $v_8$ | 53.93 |
| $r_{17}$ | −21.402 | | | | | | |
| | | $d_{17}$ | 5.000~8.550~5.994 | | | | |
| $r_{18}$ | ∞ | | | | | | |
| | | $d_{18}$ | 5.000 | $N_9$ | 1.51680 | $v_9$ | 64.20 |
| $r_{19}$ | ∞ | | | | | | |

Aspherical coefficient $r_6$:   $\epsilon = 0.10000 \times 10$
$A_4 = -0.14744 \times 10^{-3}$    $A_6 = -0.33281 \times 10^{-6}$
$A_8 = -0.39797 \times 10^{-7}$ $r_{16}$:   $\epsilon = 0.10000 \times 10$
$A_4 = -0.50770 \times 10^{-4}$    $A_6 = 0.82764 \times 10^{-7}$
$A_8 = -0.26199 \times 10^{-9}$

TABLE 14

<Embodiment 14>
$f = 52.5 \sim 19.0 \sim 9.25$    $F_{NO} = 2.21 \sim 1.63 \sim 1.63$

| | Radius of Curvature | | Axial Distance | | Refractive Index | | Abbe Number |
|---|---|---|---|---|---|---|---|
| $r_1$ | 29.017 | | | | | | |
| | | $d_1$ | 1.500 | $N_1$ | 1.84666 | $v_1$ | 23.82 |
| $r_2$ | 19.813 | | | | | | |
| | | $d_2$ | 1.400 | | | | |
| $r_3$ | 21.114 | | | | | | |
| | | $d_3$ | 5.100 | $N_2$ | 1.71300 | $v_2$ | 53.93 |
| $r_4$ | 345.710 | | | | | | |
| | | $d_4$ | 29.590~14.168~2.000 | | | | |
| $r_5$ | −90.577 | | | | | | |
| | | $d_5$ | 1.200 | $N_3$ | 1.77250 | $v_3$ | 49.77 |
| $r_6$ | 8.401 | | | | | | |
| | | $d_6$ | 3.700 | | | | |
| $r_7$ | 55.633 | | | | | | |
| | | $d_7$ | 1.900 | $N_4$ | 1.84666 | $v_4$ | 23.82 |
| $r_8$* | −138.775 | | | | | | |
| | | $d_8$ | 1.400~16.822~28.990 | | | | |
| $r_9$ | ∞ | | | | | | |
| | | $d_9$ | 5.200~2.376~4.956 | | | | |
| $r_{10}$ | 55.351 | | | | | | |
| | | $d_{10}$ | 3.000 | $N_5$ | 1.71300 | $v_5$ | 53.93 |
| $r_{11}$* | −46.597 | | | | | | |
| | | $d_{11}$ | 6.700 | | | | |
| $r_{12}$ | 98.701 | | | | | | |
| | | $d_2$ | 6.300 | $N_6$ | 1.61800 | $v_6$ | 63.39 |
| $r_{13}$ | −10.393 | | | | | | |
| | | $d_{13}$ | 1.300 | $N_7$ | 1.84666 | $v_7$ | 23.82 |
| $r_{14}$* | −17.800 | | | | | | |
| | | $d_{14}$ | 5.000~7.824~5.244 | | | | |
| $r_{15}$ | ∞ | | | | | | |
| | | $d_{15}$ | 5.000 | $N_8$ | 1.51680 | $v_8$ | 64.20 |
| $r_{16}$ | ∞ | | | | | | |

TABLE 14-continued

Aspherical coefficient $r_8$: $\epsilon = 0.10000 \times 10$
$A_4 = -0.10644 \times 10^{-3}$   $A_6 = -0.44401 \times 10^{-6}$
$A_8 = -0.11411 \times 10^{-7}$ $r_{11}$: $\epsilon = 0.10000 \times 10$
$A_4 = 0.23136 \times 10^{-4}$   $A_6 = 0.31636 \times 10^{-7}$
$A_8 = -0.57650 \times 10^{-9}$ $r_{14}$: $\epsilon = 0.10000 \times 10$
$A_4 = 0.71539 \times 10^{-6}$   $A_6 = -0.20593 \times 10^{-7}$
$A_8 = -0.44352 \times 10^{-9}$

TABLE 15

<Embodiment 15>
$f = 52.5 \sim 19.0 \sim 9.25$   $F_{NO} = 2.25 \sim 1.63 \sim 1.63$

| | Radius of Curvature | | Axial Distance | | Refractive Index | | Abbe Number |
|---|---|---|---|---|---|---|---|
| $r_1$ | 30.622 | | | | | | |
| | | $d_1$ | 1.500 | $N_1$ | 1.84666 | $v_1$ | 23.82 |
| $r_2$ | 19.779 | | | | | | |
| | | $d_2$ | 1.400 | | | | |
| $r_3$* | 21.854 | | | | | | |
| | | $d_3$ | 5.300 | $N_2$ | 1.71300 | $v_2$ | 53.93 |
| $r_4$ | −326.475 | | | | | | |
| | | $d_4$ | 27.940~13.286~2.000 | | | | |
| $r_5$ | −35.938 | | | | | | |
| | | $d_5$ | 1.100 | $N_3$ | 1.77250 | $v_3$ | 49.77 |
| $r_6$* | 8.681 | | | | | | |
| | | $d_6$ | 2.100 | | | | |
| $r_7$ | 14.632 | | | | | | |
| | | $d_7$ | 3.000 | $N_4$ | 1.84666 | $v_4$ | 23.82 |
| $r_8$ | 30.822 | | | | | | |
| | | $d_8$ | 2.900~17.554~28.840 | | | | |
| $r_9$ | ∞ | | | | | | |
| | | $d_9$ | 6.100~2.456~5.108 | | | | |
| $r_{10}$* | 15.467 | | | | | | |
| | | $d_{10}$ | 4.500 | $N_5$ | 1.77250 | $v_5$ | 49.77 |
| $r_{11}$ | −73.721 | | | | | | |
| | | $d_{11}$ | 5.300 | | | | |
| $r_{12}$ | −19.802 | | | | | | |
| | | $d_{12}$ | 2.500 | $N_6$ | 1.84666 | $v_6$ | 23.82 |
| $r_{13}$ | 22.058 | | | | | | |
| | | $d_{13}$ | 1.800 | | | | |
| $r_{14}$* | 23.352 | | | | | | |
| | | $d_{14}$ | 4.300 | $N_7$ | 1.71300 | $v_7$ | 53.93 |
| $r_{15}$ | −15.097 | | | | | | |
| | | $d_{15}$ | 5.000~8.644~5.992 | | | | |
| $r_{16}$ | ∞ | | | | | | |
| | | $d_{16}$ | 5.000 | $N_8$ | 1.51680 | $v_8$ | 64.20 |
| $r_{17}$ | ∞ | | | | | | |

Aspherical coefficient $r_3$: $\epsilon = 0.10000 \times 10$
$A_4 = 0.25437 \times 10^{-6}$   $A_6 = -0.24898 \times 10^{-9}$
$A_8 = 0.28161 \times 10^{-10}$ $r_6$: $\epsilon = 0.10000 \times 10$
$A_4 = -0.19880 \times 10^{-3}$   $A_6 = 0.35981 \times 10^{-6}$
$A_8 = -0.43102 \times 10^{-7}$ $r_{10}$: $\epsilon = 0.10000 \times 10$
$A_4 = -0.14843 \times 10^{-4}$   $A_6 = -0.17778 \times 10^{-6}$
$A_8 = 0.44457 \times 10^{-9}$ $r_{14}$: $\epsilon = 0.10000 \times 10$
$A_4 = -0.12716 \times 10^{-3}$   $A_6 = 0.31969 \times 10^{-6}$
$A_8 = 0.50205 \times 10^{-9}$

TABLE 16

<Embodiment 16>
$f = 52.5 \sim 20.0 \sim 9.25$   $F_{NO} = 2.34 \sim 1.63 \sim 1.63$

| | Radius of Curvature | | Axial Distance | | Refractive Index | | Abbe Number |
|---|---|---|---|---|---|---|---|
| $r_1$ | 34.087 | | | | | | |
| | | $d_1$ | 1.400 | $N_1$ | 1.84666 | $v_1$ | 23.82 |
| $r_2$ | 21.366 | | | | | | |
| | | $d_2$ | 1.500 | | | | |
| $r_3$ | 23.552 | | | | | | |
| | | $d_3$ | 4.900 | $N_2$ | 1.71300 | $v_2$ | 53.93 |
| $r_4$ | −162.167 | | | | | | |
| | | $d_4$ | 26.846~12.599~1.000 | | | | |
| $r_5$ | 66.096 | | | | | | |
| | | $d_5$ | 1.000 | $N_3$ | 1.77250 | $v_3$ | 49.77 |
| $r_6$* | 13.539 | | | | | | |
| | | $d_6$ | 2.500 | | | | |
| $r_7$ | −17.192 | | | | | | |
| | | $d_7$ | 1.000 | $N_4$ | 1.74250 | $v_4$ | 52.47 |
| $r_8$ | 26.401 | | | | | | |
| | | $d_8$ | 2.300 | $N_5$ | 1.84666 | $v_5$ | 23.82 |
| $r_9$ | −88.943 | | | | | | |
| | | $d_9$ | 1.500~15.747~27.346 | | | | |
| $r_{10}$ | ∞ | | | | | | |
| | | $d_{10}$ | 6.000~2.557~5.679 | | | | |
| $r_{11}$* | 14.459 | | | | | | |
| | | $d_{11}$ | 4.500 | $N_6$ | 1.77250 | $v_6$ | 49.77 |
| $r_{12}$ | 285.252 | | | | | | |
| | | $d_{12}$ | 4.000 | | | | |
| $r_{13}$ | −30.961 | | | | | | |
| | | $d_{13}$ | 1.500 | $N_7$ | 1.84666 | $v_7$ | 23.82 |
| $r_{14}$ | 24.495 | | | | | | |
| | | $d_{14}$ | 1.600 | | | | |
| $r_{15}$* | 27.528 | | | | | | |
| | | $d_{15}$ | 4.500 | $N_8$ | 1.71300 | $v_8$ | 53.93 |
| $r_{16}$ | −15.948 | | | | | | |
| | | $d_{16}$ | 6.000~9.443~6.321 | | | | |
| $r_{17}$ | ∞ | | | | | | |
| | | $d_{17}$ | 4.000 | $N_9$ | 1.51680 | $v_9$ | 64.20 |
| $r_{18}$ | ∞ | | | | | | |

Aspherical coefficient $r_6$: $\epsilon = 0.10000 \times 10$
$A_4 = -0.19527 \times 10^{-4}$   $A_6 = -0.10374 \times 10^{-6}$
$A_8 = 0.11782 \times 10^{-7}$ $r_{11}$: $\epsilon = 0.10000 \times 10$
$A_4 = -0.21619 \times 10^{-4}$   $A_6 = -0.43525 \times 10^{-7}$
$A_8 = -0.82218 \times 10^{-9}$ $r_{15}$: $\epsilon = 0.10000 \times 10$
$A_4 = -0.11658 \times 10^{-3}$   $A_6 = 0.14494 \times 10^{-6}$
$A_8 = 0.75439 \times 10^{-9}$

TABLE 17

<Embodiment 17>
$f = 52.5 \sim 20.0 \sim 9.24$   $F_{NO} = 2.28 \sim 1.63 \sim 1.63$

| | Radius of Curvature | | Axial Distance | | Refractive Index | | Abbe Number |
|---|---|---|---|---|---|---|---|
| $r_1$ | 31.437 | | | | | | |
| | | $d_1$ | 1.400 | $N_1$ | 1.84666 | $v_1$ | 23.82 |
| $r_2$ | 20.972 | | | | | | |
| | | $d_2$ | 1.500 | | | | |
| $r_3$ | 22.864 | | | | | | |
| | | $d_3$ | 4.900 | $N_2$ | 1.71300 | $v_2$ | 53.93 |
| $r_4$ | −359.037 | | | | | | |
| | | $d_4$ | 26.906~13.039~1.000 | | | | |
| $r_5$ | 49.216 | | | | | | |
| | | $d_5$ | 1.000 | $N_3$ | 1.77250 | $v_3$ | 49.77 |
| $r_6$ | 13.730 | | | | | | |
| | | $d_6$ | 2.300 | | | | |
| $r_7$ | −21.802 | | | | | | |
| | | $d_7$ | 1.000 | $N_4$ | 1.71300 | $v_4$ | 53.93 |
| $r_8$ | 19.719 | | | | | | |
| | | $d_8$ | 1.600 | | | | |
| $r_9$ | 23.785 | | | | | | |
| | | $d_9$ | 2.100 | $N_5$ | 1.84666 | $v_5$ | 23.82 |
| $r_{10}$ | 190.429 | | | | | | |
| | | $d_{10}$ | 1.500~15.367~27.406 | | | | |
| $r_{11}$ | ∞(iris) | | | | | | |

TABLE 17-continued

| | | | | | | | |
|---|---|---|---|---|---|---|---|
| | | $d_{11}$ | 6.000~2.407~5.353 | | | | |
| $r_{12}*$ | 29.251 | | | | | | |
| | | $d_{12}$ | 3.500 | $N_6$ | 1.77250 | $v_6$ | 49.77 |
| $r_{13}$ | −32.011 | | | | | | |
| | | $d_{13}$ | 4.600 | | | | |
| $r_{14}$ | −21.532 | | | | | | |
| | | $d_{14}$ | 1.600 | $N_7$ | 1.80518 | $v_7$ | 25.43 |
| $r_{15}$ | 19.646 | | | | | | |
| | | $d_{15}$ | 1.400 | | | | |
| $r_{16}$ | 33.168 | | | | | | |
| | | $d_{16}$ | 6.000 | $N_8$ | 1.77250 | $v_8$ | 49.77 |
| $r_{17}*$ | −13.621 | | | | | | |
| | | $d_{17}$ | 6.000~9.593~6.647 | | | | |
| $r_{18}$ | ∞ | | | | | | |
| | | $d_{18}$ | 4.000 | $N_9$ | 1.51680 | $v_9$ | 64.20 |
| $r_{19}$ | ∞ | | | | | | |

Aspherical coefficient $r_{12}$:
$\epsilon = 0.10000 \times 10$
$A_4 = -0.53927 \times 10^{-4}$    $A_6 = 0.35786 \times 10^{-7}$
$A_8 = -0.23485 \times 10^{-8}$ $r_{17}$:
$\epsilon = 0.10000 \times 10$
$A_4 = 0.21957 \times 10^{-4}$    $A_6 = 0.74721 \times 10^{-7}$
$A_8 = -0.12133 \times 10^{-8}$ Condition (1) (5) (6)

$\phi I/\phi III =$ 0.269
$fw \cdot \phi I =$ 0.188
$\phi III^A/\phi I =$ 2.42

TABLE 18

<Embodiment 18>
f = 52.5~20.0~9.24    $F_{NO}$ = 2.33~1.63~1.63

| | Radius of Curvature | | Axial Distance | | Refractive Index | | Abbe Number |
|---|---|---|---|---|---|---|---|
| $r_1$ | 33.829 | | | | | | |
| | | $d_1$ | 1.400 | $N_1$ | 1.84666 | $v_1$ | 23.82 |
| $r_2$ | 21.062 | | | | | | |
| | | $d_2$ | 1.500 | | | | |
| $r_3$ | 22.910 | | | | | | |
| | | $d_3$ | 4.900 | $N_2$ | 1.71300 | $v_2$ | 53.93 |
| $r_4$ | −188.790 | | | | | | |
| | | $d_4$ | 26.688~12.583~0.999 | | | | |
| $r_5$ | 72.383 | | | | | | |
| | | $d_5$ | 1.000 | $N_3$ | 1.77250 | $v_3$ | 49.77 |
| $r_6$ | 13.850 | | | | | | |
| | | $d_6$ | 2.500 | | | | |
| $r_7$ | −16.936 | | | | | | |
| | | $d_7$ | 1.000 | $N_4$ | 1.71300 | $v_4$ | 53.93 |
| $r_8$ | 21.644 | | | | | | |
| | | $d_8$ | 2.300 | $N_5$ | 1.84666 | $v_5$ | 23.82 |
| $r_9$ | −137.829 | | | | | | |
| | | $d_9$ | 1.500~15.605~27.189 | | | | |
| $r_{10}$ | ∞(iris) | | | | | | |
| | | $d_{10}$ | 6.000~2.951~6.153 | | | | |
| $r_{11}*$ | 15.531 | | | | | | |
| | | $d_{11}$ | 4.500 | $N_6$ | 1.77250 | $v_6$ | 49.77 |
| $r_{12}$ | −304.032 | | | | | | |
| | | $d_{12}$ | 3.700 | | | | |
| $r_{13}$ | −27.595 | | | | | | |
| | | $d_{13}$ | 1.500 | $N_7$ | 1.84666 | $v_7$ | 23.82 |
| $r_{14}$ | 24.364 | | | | | | |
| | | $d_{14}$ | 1.800 | | | | |
| $r_{15}*$ | 24.018 | | | | | | |
| | | $d_{15}$ | 4.500 | $N_8$ | 1.71300 | $v_8$ | 53.93 |
| $r_{16}$ | −17.053 | | | | | | |
| | | $d_{16}$ | 6.000~9.049~5.847 | | | | |
| $r_{17}$ | ∞ | | | | | | |
| | | $d_{17}$ | 4.000 | $N_9$ | 1.51680 | $v_9$ | 64.20 |
| $r_{18}$ | ∞ | | | | | | |

Aspherical coefficient

TABLE 18-continued $r_{11}$:
$\epsilon = 0.10000 \times 10$
$A_4 = -0.13956 \times 10^{-4}$    $A_6 = -0.30386 \times 10^{-7}$
$A_8 = -0.73196 \times 10^{-9}$ $r_{15}$:
$\epsilon = 0.10000 \times 10$
$A_4 = -0.10319 \times 10^{-3}$    $A_6 = 0.93840 \times 10^{-7}$
$A_8 = 0.15434 \times 10^{-8}$ Condition (1) (5) (6)

$\phi I/\phi III =$ 0.267
$fw \cdot \phi I =$ 0.188
$\phi III^A/\phi I =$ 2.55

TABLE 19

<Embodiment 19>
f = 52.5~20.0~9.24    $F_{NO}$ = 2.11~1.63~1.63

| | Radius of Curvature | | Axial Distance | | Refractive Index | | Abbe Number |
|---|---|---|---|---|---|---|---|
| $r_1$ | 35.687 | | | | | | |
| | | $d_1$ | 1.400 | $N_1$ | 1.84666 | $v_1$ | 23.82 |
| $r_2$ | 22.721 | | | | | | |
| | | $d_2$ | 1.500 | | | | |
| $r_3$ | 24.729 | | | | | | |
| | | $d_3$ | 5.300 | $N_2$ | 1.71300 | $v_2$ | 53.93 |
| $r_4$ | −226.376 | | | | | | |
| | | $d_4$ | 27.966~13.562~1.000 | | | | |
| $r_5$ | 32.720 | | | | | | |
| | | $d_5$ | 1.000 | $N_3$ | 1.77250 | $v_3$ | 49.77 |
| $r_6$ | 15.623 | | | | | | |
| | | $d_6$ | 2.700 | | | | |
| $r_7$ | −23.490 | | | | | | |
| | | $d_7$ | 1.000 | $N_4$ | 1.71300 | $v_4$ | 53.93 |
| $r_8$ | 16.429 | | | | | | |
| | | $d_8$ | 2.700 | $N_5$ | 1.84666 | $v_5$ | 23.82 |
| $r_9*$ | 40.108 | | | | | | |
| | | $d_9$ | 1.800~16.205~28.766 | | | | |
| $r_{10}$ | ∞(iris) | | | | | | |
| | | $d_{10}$ | 6.000~3.016~5.628 | | | | |
| $r_{11}$ | 45.408 | | | | | | |
| | | $d_{11}$ | 2.900 | $N_6$ | 1.74250 | $v_6$ | 52.47 |
| $r_{12}*$ | −56.653 | | | | | | |
| | | $d_{12}$ | 6.900 | | | | |
| $r_{13}$ | −125.325 | | | | | | |
| | | $d_{13}$ | 5.900 | $N_7$ | 1.61800 | $v_7$ | 63.39 |
| $r_{14}$ | −8.762 | | | | | | |
| | | $d_{14}$ | 1.300 | $N_8$ | 1.84666 | $v_8$ | 23.82 |
| $r_{15}*$ | −12.962 | | | | | | |
| | | $d_{15}$ | 6.000~8.984~6.372 | | | | |
| $r_{16}$ | ∞ | | | | | | |
| | | $d_{16}$ | 4.000 | $N_9$ | 1.51680 | $v_9$ | 64.20 |
| $r_{17}$ | ∞ | | | | | | |

Aspherical coefficient $r_9$:
$\epsilon = 0.10000 \times 10$
$A_4 = -0.73843 \times 10^{-5}$    $A_6 = -0.18456 \times 10^{-6}$
$A_8 = 0.95910 \times 10^{-8}$ $r_{12}$:
$\epsilon = 0.10000 \times 10$
$A_4 = 0.41179 \times 10^{-4}$    $A_6 = 0.16649 \times 10^{-6}$
$A_8 = -0.82331 \times 10^{-9}$ $r_{15}$:
$\epsilon = 0.10000 \times 10$
$A_4 = 0.24259 \times 10^{-4}$    $A_6 = -0.20975 \times 10^{-7}$
$A_8 = -0.79092 \times 10^{-9}$ Condition (1) (5) (6)

$\phi I/\phi III =$ 0.261
$fw \cdot \phi I =$ 0.176
$\phi III^A/\phi I =$ 1.53

TABLE 20

<Embodiment 20>
f = 52.5~20.0~9.24   $F_{NO}$ = 2.34~1.63~1.63

| | Radius of Curvature | | Axial Distance | | Refractive Index | | Abbe Number |
|---|---|---|---|---|---|---|---|
| $r_1$ | 34.087 | | | | | | |
| | | $d_1$ | 1.400 | $N_1$ | 1.84666 | $v_1$ | 23.82 |
| $r_2$ | 21.366 | | | | | | |
| | | $d_2$ | 1.500 | | | | |
| $r_3$ | 23.552 | | | | | | |
| | | $d_3$ | 4.900 | $N_2$ | 1.71300 | $v_2$ | 53.93 |
| $r_4$ | −162.167 | | | | | | |
| | | $d_4$ | 26.846~12.599~1.000 | | | | |
| $r_5$ | 66.096 | | | | | | |
| | | $d_5$ | 1.000 | $N_3$ | 1.77250 | $v_3$ | 49.77 |
| $r_6$ | 13.539 | | | | | | |
| | | $d_6$ | 2.500 | | | | |
| $r_7$ | −17.192 | | | | | | |
| | | $d_7$ | 1.000 | $N_4$ | 1.74250 | $v_4$ | 52.47 |
| $r_8$ | 26.401 | | | | | | |
| | | $d_8$ | 2.300 | $N_5$ | 1.84666 | $v_5$ | 23.82 |
| $r_9$ | −88.943 | | | | | | |
| | | $d_9$ | 1.500~15.747~27.346 | | | | |
| $r_{10}$ | ∞(iris) | | | | | | |
| | | $d_{10}$ | 6.000~2.557~5.679 | | | | |
| $r_{11}$* | 14.459 | | | | | | |
| | | $d_{11}$ | 4.500 | $N_6$ | 1.77250 | $v_6$ | 49.77 |
| $r_{12}$ | 285.252 | | | | | | |
| | | $d_{12}$ | 4.000 | | | | |
| $r_{13}$ | −30.961 | | | | | | |
| | | $d_{13}$ | 1.500 | $N_7$ | 1.84666 | $v_7$ | 23.82 |
| $r_{14}$ | 24.495 | | | | | | |
| | | $d_{14}$ | 1.600 | | | | |
| $r_{15}$* | 27.528 | | | | | | |
| | | $d_{15}$ | 4.500 | $N_8$ | 1.71300 | $v_8$ | 53.93 |
| $r_{16}$ | −15.948 | | | | | | |
| | | $d_{16}$ | 6.000~9.443~6.321 | | | | |
| $r_{17}$ | ∞ | | | | | | |
| | | $d_{17}$ | 4.000 | $N_9$ | 1.51680 | $v_9$ | 64.20 |
| $r_{18}$ | ∞ | | | | | | |

Aspherical coefficient $r_6$: $\epsilon = 0.10000 \times 10$
$A_4 = -0.19527 \times 10^{-4}$   $A_6 = -0.10374 \times 10^{-6}$
$A_8 = 0.11782 \times 10^{-7}$ $r_{11}$: $\epsilon = 0.10000 \times 10$
$A_4 = -0.21619 \times 10^{-4}$   $A_6 = -0.43525 \times 10^{-7}$
$A_8 = -0.82218 \times 10^{-9}$ $r_{15}$: $\epsilon = 0.10000 \times 10$
$A_4 = -0.11658 \times 10^{-3}$   $A_6 = 0.14494 \times 10^{-6}$
$A_8 = 0.75439 \times 10^{-9}$

Condition (1) (5) (6)

| | |
|---|---|
| $\|\phi I/\phi III\| =$ | 0.269 |
| $fw \cdot \phi I =$ | 0.189 |
| $\phi III^A/\phi I =$ | 2.49 |

TABLE 21

<Embodiment 21>
f = 52.5~20.0~9.24   $F_{NO}$ = 2.33~1.63~1.63

| | Radius of Curvature | | Axial Distance | | Refractive Index | | Abbe Number |
|---|---|---|---|---|---|---|---|
| $r_1$ | 31.373 | | | | | | |
| | | $d_1$ | 1.400 | $N_1$ | 1.84666 | $v_1$ | 23.82 |
| $r_2$ | 20.225 | | | | | | |
| | | $d_2$ | 1.500 | | | | |
| $r_3$ | 21.797 | | | | | | |
| | | $d_3$ | 5.000 | $N_2$ | 1.71300 | $v_2$ | 53.93 |
| $r_4$ | −452.802 | | | | | | |
| | | $d_4$ | 27.002~12.354~1.000 | | | | |
| $r_5$ | 39.628 | | | | | | |
| | | $d_5$ | 1.000 | $N_3$ | 1.77250 | $v_3$ | 49.77 |
| $r_6$ | 12.918 | | | | | | |
| | | $d_6$ | 2.300 | | | | |
| $r_7$ | −22.741 | | | | | | |
| | | $d_7$ | 1.000 | $N_4$ | 1.71300 | $v_4$ | 53.93 |
| $r_8$ | 15.777 | | | | | | |
| | | $d_8$ | 1.600 | | | | |
| $r_9$ | 20.289 | | | | | | |
| | | $d_9$ | 2.000 | $N_5$ | 1.84666 | $v_5$ | 23.82 |
| $r_{10}$ | 182.158 | | | | | | |
| | | $d_{10}$ | 1.500~16.148~27.501 | | | | |
| $r_{11}$ | ∞(iris) | | | | | | |
| | | $d_{11}$ | 6.000~2.831~5.923 | | | | |
| $r_{12}$ | 25.108 | | | | | | |
| | | $d_{12}$ | 3.100 | $N_6$ | 1.71300 | $v_6$ | 53.93 |
| $r_{13}$ | −326.952 | | | | | | |
| | | $d_{13}$ | 0.100 | | | | |
| $r_{14}$ | 12.621 | | | | | | |
| | | $d_{14}$ | 4.000 | $N_7$ | 1.77250 | $v_7$ | 49.77 |
| $r_{15}$ | 46.124 | | | | | | |
| | | $d_{15}$ | 0.700 | | | | |
| $r_{16}$ | −224.829 | | | | | | |
| | | $d_{16}$ | 2.800 | $N_8$ | 1.80518 | $v_8$ | 25.43 |
| $r_{17}$ | 9.422 | | | | | | |
| | | $d_{17}$ | 1.500 | | | | |
| $r_{18}$ | 21.115 | | | | | | |
| | | $d_{18}$ | 3.100 | $N_9$ | 1.77250 | $v_9$ | 49.77 |
| $r_{19}$* | −31.457 | | | | | | |
| | | $d_{19}$ | 6.000~9.169~6.077 | | | | |
| $r_{20}$ | ∞ | | | | | | |
| | | $d_{20}$ | 4.000 | $N_{10}$ | 1.51680 | $v_{10}$ | 64.20 |
| $r_{21}$ | ∞ | | | | | | |

Aspherical coefficient $r_{19}$: $\epsilon = 0.10000 \times 10$
$A_4 = 0.99482 \times 10^5$   $A_6 = 0.35011 \times 10^{-6}$
$A_8 = -0.25730 \times 10^{-7}$

Condition (1) (5) (6)

| | |
|---|---|
| $\|\phi I/\phi II\| =$ | 0.267 |
| $fw \cdot \phi I =$ | 0.187 |
| $\phi III^A/\phi I =$ | 3.75 |

TABLE 22

<Embodiment 22>
f = 52.5~20.0~9.24   $F_{NO}$ = 2.30~1.63~1.63

| | Radius of Curvature | | Axial Distance | | Refractive Index | | Abbe Number |
|---|---|---|---|---|---|---|---|
| $r_1$ | 32.196 | | | | | | |
| | | $d_1$ | 1.400 | $N_1$ | 1.84666 | $v_1$ | 23.82 |
| $r_2$ | 21.038 | | | | | | |
| | | $d_2$ | 1.300 | | | | |
| $r_3$ | 22.834 | | | | | | |
| | | $d_3$ | 4.900 | $N_2$ | 1.71300 | $v_2$ | 53.93 |
| $r_4$ | −248.856 | | | | | | |
| | | $d_4$ | 26.193~12.197~1.000 | | | | |
| $r_5$ | 68.211 | | | | | | |
| | | $d_5$ | 1.000 | $N_3$ | 1.77250 | $v_3$ | 49.77 |
| $r_6$ | 14.779 | | | | | | |
| | | $d_6$ | 2.500 | | | | |
| $r_7$ | −19.082 | | | | | | |
| | | $d_7$ | 1.000 | $N_4$ | 1.71300 | $v_4$ | 53.93 |
| $r_8$ | 21.413 | | | | | | |
| | | $d_8$ | 2.300 | $N_5$ | 1.84666 | $v_5$ | 23.82 |
| $r_9$ | 275.205 | | | | | | |
| | | $d_9$ | 1.500~15.497~26.693 | | | | |
| $r_{10}$ | ∞(iris) | | | | | | |
| | | $d_{10}$ | 6.000~2.359~5.403 | | | | |
| $r_{11}$* | 12.851 | | | | | | |
| | | $d_{11}$ | 4.700 | $N_6$ | 1.77250 | $v_6$ | 49.77 |
| $r_{12}$ | −209.779 | | | | | | |
| | | $d_{12}$ | 2.300 | | | | |

TABLE 22-continued

| | | | | | | | |
|---|---|---|---|---|---|---|---|
| $r_{13}$ | −36.096 | | | | | | |
| | | $d_{13}$ | 2.000 | $N_7$ | 1.80518 | $v_7$ | 25.43 |
| $r_{14}$ | 13.903 | | | | | | |
| | | $d_{14}$ | 1.700 | | | | |
| $r_{15}$ | −448.189 | | | | | | |
| | | $d_{15}$ | 3.000 | $N_8$ | 1.74250 | $v_8$ | 52.47 |
| $r_{16}$ | −23.591 | | | | | | |
| | | $d_{16}$ | 0.100 | | | | |
| $r_{17}$ | 25.941 | | | | | | |
| | | $d_{17}$ | 3.000 | $N_9$ | 1.74250 | $v_9$ | 52.47 |
| $r_{18}$ | −53.270 | | | | | | |
| | | $d_{18}$ | 6.000~9.641~6.597 | | | | |
| $r_{19}$ | ∞ | | | | | | |
| | | $d_{19}$ | 4.000 | $N_{10}$ | 1.51680 | $v_{10}$ | 64.20 |
| $r_{20}$ | ∞ | | | | | | |

| Aspherical coefficient |
|---|
| $r_{11}$: $\epsilon = 0.10000 \times 10$ |
| $A_4 = -0.39274 \times 10^{-4}$  $A_6 = 0.35298 \times 10^{-7}$ |
| $A_8 = -0.11829 \times 10^{-8}$ |

| Conditions (1) (5) (6) |
|---|
| $\phi I/\phi III$ = 0.265 |
| $fw \cdot \phi I$ = 0.191 |
| $\phi III^A/\phi I$ = 3.05 |

TABLE 23

<Embodiment 23>
f = 52.5~22.0~9.24    $F_{NO}$ = 2.20~1.63~1.63

| | Radius of Curvature | | Axial Distance | | Refractive Index | | Abbe Number |
|---|---|---|---|---|---|---|---|
| $r_1$ | 30.150 | | | | | | |
| | | $d_1$ | 1.400 | $N_1$ | 1.84666 | $v_1$ | 23.82 |
| $r_2$ | 20.193 | | | | | | |
| | | $d_2$ | 1.500 | | | | |
| $r_3$ | 22.031 | | | | | | |
| | | $d_3$ | 5.000 | $N_2$ | 1.71300 | $v_2$ | 53.93 |
| $r_4$ | −362.850 | | | | | | |
| | | $d_4$ | 24.748~13.155~1.000 | | | | |
| $r_5$ | 38.905 | | | | | | |
| | | $d_5$ | 1.000 | $N_3$ | 1.77250 | $v_3$ | 49.77 |
| $r_6$ | 13.723 | | | | | | |
| | | $d_6$ | 2.400 | | | | |
| $r_7$ | −23.792 | | | | | | |
| | | $d_7$ | 1.000 | $N_4$ | 1.71300 | $v_4$ | 53.93 |
| $r_8$ | 18.275 | | | | | | |
| | | $d_8$ | 1.600 | | | | |
| $r_9$ | 21.954 | | | | | | |
| | | $d_9$ | 1.900 | $N_5$ | 1.84666 | $v_5$ | 23.82 |
| $r_{10}$ | 93.632 | | | | | | |
| | | $d_{10}$ | 1.500~16.093~31.248 | | | | |
| $r_{11}$ | ∞(iris) | | | | | | |
| | | $d_{11}$ | 5.500~1.842~4.946 | | | | |
| $r_{12}$* | 25.018 | | | | | | |
| | | $d_{12}$ | 3.600 | $N_6$ | 1.77250 | $v_6$ | 49.77 |
| $r_{13}$ | −35.322 | | | | | | |
| | | $d_{13}$ | 4.600 | | | | |
| $r_{14}$ | −20.882 | | | | | | |
| | | $d_{14}$ | 1.600 | $N_7$ | 1.80518 | $v_7$ | 25.43 |
| $r_{15}$ | 18.857 | | | | | | |
| | | $d_{15}$ | 1.400 | | | | |
| $r_{16}$ | 32.428 | | | | | | |
| | | $d_{16}$ | 6.000 | $N_8$ | 1.77250 | $v_8$ | 49.77 |
| $r_{17}$* | −13.703 | | | | | | |
| | | $d_{17}$ | 6.000~9.658~6.554 | | | | |
| $r_{18}$ | ∞ | | | | | | |
| | | $d_{18}$ | 4.000 | $N_9$ | 1.51680 | $v_9$ | 64.20 |
| $r_{19}$ | ∞ | | | | | | |

| Aspherical coefficient |
|---|
| $r_{12}$: $\epsilon = 0.10000 \times 10$ |

TABLE 23-continued

| | |
|---|---|
| $A_4 = -0.47415 \times 10^{-4}$ | $A_6 = 0.51695 \times 10^{-7}$ |
| $A_8 = -0.21291 \times 10^{-8}$ | |
| $r_{17}$: $\epsilon = 0.10000 \times 10$ | |
| $A_4 = 0.22493 \times 10^{-4}$ | $A_6 = 0.11076 \times 10^{-6}$ |
| $A_8 = -0.19515 \times 10^{-8}$ | |

| Condition (1) (5) (6) |
|---|
| $\phi I/\phi III$ = 0.287 |
| $fw \cdot \phi I$ = 0.196 |
| $\phi III^A/\phi I$ = 2.42 |

TABLE 24

<Embodiment 24>
f = 2.5~19.0~9.25    $F_{NO}$ = 1.98~1.99~1.85

| | Radius of Curvature | | Axial Distance | | Refractive Index | | Abbe Number |
|---|---|---|---|---|---|---|---|
| $r_1$ | 31.384 | | | | | | |
| | | $d_1$ | 1.500 | $N_1$ | 1.84666 | $v_1$ | 23.82 |
| $r_2$ | 22.052 | | | | | | |
| | | $d_2$ | 1.400 | | | | |
| $r_3$ | 23.457 | | | | | | |
| | | $d_3$ | 5.200 | $N_2$ | 1.71300 | $v_2$ | 53.93 |
| $r_4$ | 237.229 | | | | | | |
| | | $d_4$ | 33.891~16.508~2.000 | | | | |
| $r_5$ | −147.614 | | | | | | |
| | | $d_5$ | 1.200 | $N_3$ | 1.77250 | $v_3$ | 49.77 |
| $r_6$ | 8.584 | | | | | | |
| | | $d_6$ | 3.700 | | | | |
| $r_7$ | 46.268 | | | | | | |
| | | $d_7$ | 2.200 | $N_4$ | 1.84666 | $v_4$ | 23.82 |
| $r_8$* | −129.592 | | | | | | |
| | | $d_8$ | 1.000~18.382~32.891 | | | | |
| $r_9$ | ∞(iris) | | | | | | |
| | | $d_9$ | 11.500~8.974~11.062 | | | | |
| $r_{10}$* | 27.508 | | | | | | |
| | | $d_{10}$ | 7.500 | $N_5$ | 1.61800 | $v_5$ | 63.39 |
| $r_{11}$ | −10.714 | | | | | | |
| | | $d_{11}$ | 1.500 | $N_6$ | 1.84666 | $v_6$ | 23.82 |
| $r_{12}$* | −16.956 | | | | | | |
| | | $d_{12}$ | 5.000~7.526~5.438 | | | | |
| $r_{13}$ | ∞ | | | | | | |
| | | $d_{13}$ | 5.000 | $N_7$ | 1.51680 | $v_7$ | 64.20 |
| $r_{14}$ | ∞ | | | | | | |

| Aspherical coefficient |
|---|
| $r_8$: $\epsilon = 0.10000 \times 10$ |
| $A_4 = -0.93831 \times 10^{-4}$  $A_6 = -0.47468 \times 10^{-6}$ |
| $A_8 = -0.10598 \times 10^{-7}$ |
| $r_{10}$: $\epsilon = 0.10000 \times 10$ |
| $A_4 = -0.52279 \times 10^{-4}$  $A_6 = 0.10319 \times 10^{-6}$ |
| $A_8 = -0.49502 \times 10^{-8}$ |
| $r_{12}$: $\epsilon = 0.10000 \times 10$ |
| $A_4 = -0.49583 \times 10^{-5}$  $A_6 = 0.69285 \times 10^{-9}$ |
| $A_8 = -0.17990 \times 10^{-8}$ |

TABLE 25

<Embodiment 25>
f = 52.5~19.0~9.25    $F_{NO}$ = 2.00~1.99~1.85

| | Radius of Curvature | | Axial Distance | | Refractive Index | | Abbe Number |
|---|---|---|---|---|---|---|---|
| $r_1$ | 29.279 | | | | | | |
| | | $d_1$ | 1.500 | $N_1$ | 1.84666 | $v_1$ | 23.82 |
| $r_2$ | 21.375 | | | | | | |
| | | $d_2$ | 1.400 | | | | |
| $r_3$ | 22.873 | | | | | | |
| | | $d_3$ | 5.200 | $N_2$ | 1.71300 | $v_2$ | 53.93 |
| $r_4$ | 149.991 | | | | | | |
| | | $d_4$ | 33.365~15.976~1.200 | | | | |

TABLE 25-continued

| | | | | | | | |
|---|---|---|---|---|---|---|---|
| $r_5$ | 319.484 | | | | | | |
| | | $d_5$ | 1.200 | $N_3$ | 1.77250 | $\nu_3$ | 49.77 |
| $r_6$ | 8.318 | | | | | | |
| | | $d_6$ | 5.100 | | | | |
| $r_7$ | 182.368 | | | | | | |
| | | $d_7$ | 2.000 | $N_4$ | 1.84666 | $\nu_4$ | 23.82 |
| $r_8{}^*$ | −58.238 | | | | | | |
| | | $d_8$ | 1.000~18.389~33.165 | | | | |
| $r_9$ | ∞(iris) | | | | | | |
| | | $d_9$ | 11.500~9.268~11.473 | | | | |
| $r_{10}{}^*$ | 30.800 | | | | | | |
| | | $d_{10}$ | 7.500 | $N_5$ | 1.61800 | $\nu_5$ | 63.39 |
| $r_{11}$ | −10.681 | | | | | | |
| | | $d_{11}$ | 1.500 | $N_6$ | 1.84666 | $\nu_6$ | 23.82 |
| $r_{12}{}^*$ | −16.904 | | | | | | |
| | | $d_{12}$ | 5.000~7.232~5.027 | | | | |
| $r_{13}$ | ∞ | | | | | | |
| | | $d_{13}$ | 5.000 | $N_7$ | 1.51680 | $\nu_7$ | 64.20 |
| $r_{14}$ | ∞ | | | | | | |

Aspherical coefficient $r_8$:  $\epsilon = 0.10000 \times 10$
 $A_4 = -0.78998 \times 10^{-4}$   $A_6 = -0.48403 \times 10^{-6}$
 $A_8 = -0.71430 \times 10^{-8}$ $r_{10}$:  $\epsilon = 0.10000 \times 10$
 $A_4 = -0.57308 \times 10^{-4}$   $A_6 = 0.19747 \times 10^{-6}$
 $A_8 = -0.65991 \times 10^{-8}$ $r_{12}$:  $\epsilon = 0.10000 \times 10$
 $A_4 = -0.10183 \times 10^{-4}$   $A_6 = 0.22653 \times 10^{-7}$
 $A_8 = -0.20323 \times 10^{-8}$

TABLE 26

<Embodiment 26>
$f = 52.5{\sim}19.0{\sim}9.25$   $F_{NO} = 2.17{\sim}2.02{\sim}1.85$

| | Radius of Curvature | | Axial Distance | | Refractive Index | | Abbe Number |
|---|---|---|---|---|---|---|---|
| $r_1$ | 29.526 | | | | | | |
| | | $d_1$ | 1.500 | $N_1$ | 1.84666 | $\nu_1$ | 23.82 |
| $r_2$ | 20.795 | | | | | | |
| | | $d_2$ | 1.400 | | | | |
| $r_3$ | 22.329 | | | | | | |
| | | $d_3$ | 5.100 | $N_2$ | 1.71300 | $\nu_2$ | 53.93 |
| $r_4$ | 392.438 | | | | | | |
| | | $d_4$ | 30.982~14.726~2.000 | | | | |
| $r_5$ | −67.208 | | | | | | |
| | | $d_5$ | 1.200 | $N_3$ | 1.77250 | $\nu_3$ | 49.77 |
| $r_6$ | 8.412 | | | | | | |
| | | $d_6$ | 3.700 | | | | |
| $r_7$ | 61.292 | | | | | | |
| | | $d_7$ | 1.900 | $N_4$ | 1.84666 | $\nu_4$ | 23.82 |
| $r_8{}^*$ | −70.382 | | | | | | |
| | | $d_8$ | 1.400~17.656~30.382 | | | | |
| $r_9$ | ∞(iris) | | | | | | |
| | | $d_9$ | 9.000~4.977~7.050 | | | | |
| $r_{10}{}^*$ | 25.172 | | | | | | |
| | | $d_{10}$ | 7.300 | $N_5$ | 1.61800 | $\nu_5$ | 63.39 |
| $r_{11}$ | −10.512 | | | | | | |
| | | $d_{11}$ | 1.500 | $N_6$ | 1.84666 | $\nu_6$ | 23.92 |
| $r_{12}{}^*$ | −16.357 | | | | | | |
| | | $d_{12}$ | 5.000~9.023~6.950 | | | | |
| $r_{13}$ | ∞ | | | | | | |
| | | $d_{13}$ | 5.000 | $N_7$ | 1.51680 | $\nu_7$ | 64.20 |
| $r_{14}$ | ∞ | | | | | | |

Aspherical coefficient $r_8$:  $\epsilon = 0.10000 \times 10$
 $A_4 = -0.10026 \times 10^{-3}$   $A_6 = -0.10307 \times 10^{-5}$
 $A_8 = -0.31344 \times 10^{-8}$ $r_{10}$:  $\epsilon = 0.10000 \times 10$
 $A_4 = -0.56905 \times 10^{-4}$   $A_6 = 0.19832 \times 10^{-6}$
 $A_8 = -0.64948 \times 10^{-8}$ $r_{12}$:  $\epsilon = 0.10000 \times 10$

TABLE 26-continued $A_4 = 0.23776 \times 10^{-6}$   $A_6 = 0.30464 \times 10^{-7}$
 $A_8 = -0.25016 \times 10^{-8}$

TABLE 27

<Embodiment 27>
$f = 52.5{\sim}19.0{\sim}9.25$   $F_{NO} = 2.16{\sim}2.07{\sim}1.85$

| | Radius of Curvature | | Axial Distance | | Refractive Index | | Abbe Number |
|---|---|---|---|---|---|---|---|
| $r_1$ | 27.437 | | | | | | |
| | | $d_1$ | 1.500 | $N_1$ | 1.84666 | $\nu_1$ | 23.82 |
| $r_2$ | 19.743 | | | | | | |
| | | $d_2$ | 1.400 | | | | |
| $r_3$ | 21.031 | | | | | | |
| | | $d_3$ | 5.000 | $N_2$ | 1.71300 | $\nu_2$ | 53.93 |
| $r_4$ | 156.109 | | | | | | |
| | | $d_4$ | 30.120~14.347~2.000 | | | | |
| $r_5$ | −70.747 | | | | | | |
| | | $d_5$ | 1.200 | $N_3$ | 1.77250 | $\nu_3$ | 49.77 |
| $r_6$ | 8.458 | | | | | | |
| | | $d_6$ | 3.700 | | | | |
| $r_7$ | 73.425 | | | | | | |
| | | $d_7$ | 1.900 | $N_4$ | 1.84666 | $\nu_4$ | 23.82 |
| $r_8{}^*$ | −71.836 | | | | | | |
| | | $d_8$ | 1.400~17.262~29.610 | | | | |
| $r_9$ | ∞ (iris) | | | | | | |
| | | $d_9$ | 6.000~3.877~6.466 | | | | |
| $r_{10}{}^*$ | 30.966 | | | | | | |
| | | $d_{10}$ | 7.100 | $N_5$ | 1.61800 | $\nu_5$ | 63.39 |
| $r_{11}$ | −9.323 | | | | | | |
| | | $d_{11}$ | 1.500 | $N_6$ | 1.84666 | $\nu_6$ | 23.82 |
| $r_{12}{}^*$ | −14.460 | | | | | | |
| | | $d_{12}$ | 5.000~7.123~4.534 | | | | |
| $r_{13}$ | ∞ | | | | | | |
| | | $d_{13}$ | 5.000 | $N_7$ | 1.51680 | $\nu_7$ | 64.20 |
| $r_{14}$ | ∞ | | | | | | |

Aspherical coefficient $r_8$:  $\epsilon = 0.10000 \times 10$
 $A_4 = -0.10702 \times 10^{-3}$   $A_6 = -0.26884 \times 10^{-6}$
 $A_8 = -0.17875 \times 10^{-7}$ $r_{10}$:  $\epsilon = 0.10000 \times 10$
 $A_4 = -0.91114 \times 10^{-4}$   $A_6 = 0.51090 \times 10^{-6}$
 $A_8 = -0.17076 \times 10^{-7}$ $r_{12}$:  $\epsilon = 0.10000 \times 10$
 $A_4 = -0.13492 \times 10^{-4}$   $A_6 = 0.28455 \times 10^{-7}$
 $A_8 = -0.38910 \times 10^{-8}$

TABLE 28

<Embodiment 28>
$f = 52.5{\sim}19.0{\sim}9.25$   $F_{NO} = 1.98{\sim}1.98{\sim}1.85$

| | Radius of Curvature | | Axial Distance | | Refractive Index | | Abbe Number |
|---|---|---|---|---|---|---|---|
| $r_1$ | 30.103 | | | | | | |
| | | $d_1$ | 1.500 | $N_1$ | 1.84666 | $\nu_1$ | 23.82 |
| $r_2$ | 21.220 | | | | | | |
| | | $d_2$ | 1.300 | | | | |
| $r_3$ | 22.501 | | | | | | |
| | | $d_3$ | 5.400 | $N_2$ | 1.71300 | $\nu_2$ | 53.93 |
| $r_4$ | 159.247 | | | | | | |
| | | $d_4$ | 34.403~16.920~2.000 | | | | |
| $r_5$ | −269.197 | | | | | | |
| | | $d_5$ | 1.200 | $N_3$ | 1.77250 | $\nu_3$ | 49.77 |
| $r_6{}^*$ | 8.313 | | | | | | |
| | | $d_6$ | 4.700 | | | | |
| $r_7$ | 16.221 | | | | | | |

TABLE 28-continued

| | | | | | | |
|---|---|---|---|---|---|---|
| | | $d_7$ | 2.200 | $N_4$ 1.84666 | $v_4$ | 23.82 |
| $r_8$ | 31.209 | | | | | |
| | | $d_8$ | 2.100~19.583~34.503 | | | |
| $r_9$ | ∞ (iris) | | | | | |
| | | $d_9$ | 10.700~8.235~10.209 | | | |
| $r_{10}*$ | 32.838 | | | | | |
| | | $d_{10}$ | 7.500 | $N_5$ 1.61800 | $v_5$ | 63.39 |
| $r_{11}$ | −9.877 | | | | | |
| | | $d_{11}$ | 1.900 | $N_6$ 1.84666 | $v_6$ | 23.82 |
| $r_{12}*$ | −15.597 | | | | | |
| | | $d_{12}$ | 5.000~7.465~5.491 | | | |
| $r_{13}$ | ∞ | | | | | |
| | | $d_{13}$ | 5.000 | $N_7$ 1.51680 | $v_7$ | 64.20 |
| $r_{14}$ | ∞ | | | | | |

Aspherical coefficient $r_6$: $\epsilon = 0.10000 \times 10$
$A_4 = -0.13308 \times 10^{-3}$   $A_8 = -0.29752 \times 10^{-6}$
$A_8 = -0.47409 \times 10^{-7}$ $R_{10}$: $\epsilon = 0.10000 \times 10$
$A_4 = -0.80260 \times 10^{-4}$   $A_6 = 0.45467 \times 10^{-6}$
$A_8 = -0.11358 \times 10^{-7}$ $r_{12}$: $\epsilon = 0.10000 \times 10$
$A_4 = -0.17990 \times 10^{-1}$   $A_6 = 0.12314 \times 10^{-6}$
$A_8 = -0.30259 \times 10^{-8}$

TABLE 29

<Embodiment 29>
f = 52.5~19.0~9.25  $F_{NO}$ = 2.15~2.09~1.85

| | Radius of Curvature | | Axial Distance | Refractive Index | | Abbe Number |
|---|---|---|---|---|---|---|
| $r_1$ | 35.726 | | | | | |
| | | $d_1$ | 1.500 | $N_1$ 1.84666 | $v_1$ | 23.82 |
| $r_2$ | 23.835 | | | | | |
| | | $d_2$ | 1.400 | | | |
| $r_3*$ | 2.918 | | | | | |
| | | $d_3$ | 4.900 | $N_2$ 1.71300 | $v_2$ | 53.93 |
| $r_4$ | 310.575 | | | | | |
| | | $d_4$ | 32.862~15.888~2.000 | | | |
| $r_5$ | −62.106 | | | | | |
| | | $d_5$ | 1.200 | $N_3$ 1.77250 | $v_3$ | 49.77 |
| $r_6$ | 8.453 | | | | | |
| | | $d_6$ | 4.800 | | | |
| $r_7$ | −91.081 | | | | | |
| | | $d_7$ | 2.000 | $N_4$ 1.84666 | $v_4$ | 23.82 |
| $r_8*$ | −25.168 | | | | | |
| | | $d_8$ | 1.000~17.974~31.862 | | | |
| $r_9$ | ∞ (iris) | | | | | |
| | | $d_9$ | 8.000~5.374~7.742 | | | |
| $r_{10}*$ | 31.312 | | | | | |
| | | $d_{10}$ | 7.700 | $N_5$ 1.61800 | $v_5$ | 63.39 |
| $r_{11}$ | −10.261 | | | | | |
| | | $d_{11}$ | 1.800 | $N_6$ 1.84666 | $v_6$ | 23.82 |
| $r_{12}*$ | −16.184 | | | | | |
| | | $d_{12}$ | 5.000~7.626~5.258 | | | |
| $r_{13}$ | ∞ | | | | | |
| | | $d_{13}$ | 5.000 | $N_7$ 1.51680 | $v_7$ | 64.20 |
| $r_{14}$ | ∞ | | | | | |

Aspherical coefficient $r_3$: $\epsilon = 0.10000 \times 10$
$A_4 = -0.13788 \times 10^{-5}$   $A_6 = -0.79448 \times 10^{-8}$
$A_8 = 0.90446 \times 10^{-11}$ $r_8$: $\epsilon = 0.10000 \times 10$
$A_4 = -0.97959 \times 10^{-4}$   $A_6 = -0.15249 \times 10^{-6}$
$A_8 = -0.15824 \times 10^{-7}$ $r_{10}$: $\epsilon = 0.10000 \times 10$

TABLE 29-continued $A_4 = -0.54581 \times 10^{-4}$   $A_6 = 0.42702 \times 10^{-7}$
$A_8 = -0.50586 \times 10^{-6}$ $r_{12}$: $\epsilon = 0.10000 \times 10$
$A_4 = -0.37870 \times 10^{-5}$   $A_6 = -0.72498 \times 10^{-7}$
$A_6 = -0.11686 \times 10^{-8}$

TABLE 30

<Embodiment 30>
f = 52.5~19.0~9.25  $F_{NO}$ = 1.98~2.00~1.85

| | Radius of Curvature | | Axial Distance | Refractive Index | | Abbe Number |
|---|---|---|---|---|---|---|
| $r_1$ | 30.167 | | | | | |
| | | $d_1$ | 1.500 | $N_1$ 1.84666 | $v_1$ | 23.82 |
| $r_2$ | 21.462 | | | | | |
| | | $d_2$ | 1.400 | | | |
| $r_3$ | 22.821 | | | | | |
| | | $d_3$ | 5.300 | $N_2$ 1.71300 | $v_2$ | 53.93 |
| $r_4$ | 181.786 | | | | | |
| | | $d_4$ | 3.771~16.411~2.000 | | | |
| $r_5$ | −1446.550 | | | | | |
| | | $d_5$ | 1.200 | $N_3$ 1.77250 | $v_3$ | 49.77 |
| $r_6$ | 8.252 | | | | | |
| | | $d_6$ | 4.000 | | | |
| $r_7$ | 53.913 | | | | | |
| | | $d_7$ | 2.200 | $N_4$ 1.84666 | $v_4$ | 23.82 |
| $r_8*$ | −112.046 | | | | | |
| | | $d_8$ | 1.000~18.360~32.771 | | | |
| $r_9$ | ∞ (iris) | | | | | |
| | | $d_9$ | 13.000~10.426~12.480 | | | |
| $r_{10}*$ | 13.898 | | | | | |
| | | $d_{10}$ | 1.500 | $N_5$ 1.84666 | $v_5$ | 23.82 |
| $r_{11}$ | 9.227 | | | | | |
| | | $d_{11}$ | 7.200 | $N_6$ 1.61800 | $v_6$ | 63.39 |
| $r_{12}*$ | −42.987 | | | | | |
| | | $d_{12}$ | 5.000~7.574~5.520 | | | |
| $r_{13}$ | ∞ | | | | | |
| | | $d_{13}$ | 5.000 | $N_7$ 1.51680 | $v_7$ | 64.20 |
| $r_{14}$ | ∞ | | | | | |

Aspherical coefficient $r_8L$: $\epsilon = 0.10000 \times 10$
$A_4 = -0.96988 \times 10^{-4}$   $A_6 = -0.39027 \times 10^{-6}$
$A_8 = -0.13530 \times 10^{-7}$ $R_{10}$: $\epsilon = 0.10000 \times 10$
$A_4 = 0.53219 \times 10^{-5}$   $A_6 = 0.32571 \times 10^{-7}$
$A_8 = 0.18999 \times 10^{-8}$ $r_{12}$: $\epsilon = 0.10000 \times 10$
$A_4 = 0.72668 \times 10^{-4}$   $A_6 = 0.38585 \times 10^{-7}$
$A_8 = 0.61664 \times 10^{-8}$

TABLE 31

<Embodiment 31>
f = 52.5~19.0~9.25  $F_{NO}$ = 1.98~1.98~1.85

| | Radius of Curvature | | Axial Distance | Refractive Index | | Abbe Number |
|---|---|---|---|---|---|---|
| $r_1$ | 33.393 | | | | | |
| | | $d_1$ | 1.500 | $N_1$ 1.84666 | $v_1$ | 23.82 |
| $r_2$ | 23.000 | | | | | |
| | | $d_2$ | 1.400 | | | |
| $r_3$ | 24.437 | | | | | |
| | | $d_3$ | 5.200 | $N_2$ 1.71300 | $v_2$ | 53.93 |
| $r_4$ | 332.404 | | | | | |
| | | $d_4$ | 36.975~17.857~1.100 | | | |

TABLE 31-continued

| | | | | | | | |
|---|---|---|---|---|---|---|---|
| $r_5$ | −269.129 | | | | | | |
| | | $d_5$ | 1.200 | | $N_3$ 1.77250 | $v_3$ | 49.77 |
| $r_6$ | 8.231 | | | | | | |
| | | $d_6$ | 4.000 | | | | |
| $r_7$ | 41.906 | | | | | | |
| | | $d_7$ | 2.200 | | $N_4$ 1.84666 | $v_4$ | 23.82 |
| $r_8$* | −196.850 | | | | | | |
| | | $d_8$ | 1.000~15.118~26.875 | | | | |
| $r_9$ | ∞ (iris) | | | | | | |
| | | $d_9$ | 15.000~11.453~13.198 | | | | |
| $r_{10}$* | 14.170 | | | | | | |
| | | $d_{10}$ | 1.500 | | $N_5$ 1.84666 | $v_5$ | 23.82 |
| $r_{11}$ | 8.975 | | | | | | |
| | | $d_{11}$ | 7.300 | | $N_6$ 1.67000 | $v_6$ | 57.07 |
| $r_{12}$* | −55.734 | | | | | | |
| | | $d_{12}$ | 5.000~8.547~6.802 | | | | |
| $r_{13}$ | ∞ | | | | | | |
| | | $d_{13}$ | 5.000 | | $N_7$ 1.51680 | $v_7$ | 64.20 |
| $r_{14}$ | ∞ | | | | | | |

Aspherical coefficient $r_8$L: $\epsilon = 0.10000 \times 10$
$A_4 = -0.96729 \times 10^{-4}$    $A_6 = -0.53410 \times 10^{-6}$
$A_8 = -0.78675 \times 10^{-8}$ $r_{10}$: $\epsilon = 0.10000 \times 10$
$A_4 = 0.11026 \times 10^{-4}$    $A_6 = 0.63211 \times 10^{-7}$
$A_8 = 0.21263 \times 10^{-8}$ $r_{12}$: $\epsilon = 0.10000 \times 10$
$A_4 = 0.85917 \times 10^{-4}$    $A_6 = 0.63785 \times 10^{-7}$
$A_8 = 0.83871 \times 10^{-8}$

TABLE 32

<Embodiment 32>
f = 52.5~19.0~9.25   $F_{NO}$ = 2.27~2.03~1.85

| | Radius of Curvature | | Axial Distance | | Refractive Index | | Abbe Number |
|---|---|---|---|---|---|---|---|
| $r_1$ | 32.558 | | | | | | |
| | | $d_1$ | 1.500 | | $N_1$ 1.84666 | $v_1$ | 23.82 |
| $r_2$ | 22.054 | | | | | | |
| | | $d_2$ | 1.400 | | | | |
| $r_3$* | 21.879 | | | | | | |
| | | $d_3$ | 4.600 | | $N_2$ 1.71300 | $v_2$ | 53.93 |
| $r_4$ | 382.000 | | | | | | |
| | | $d_4$ | 29.349~13.890~2.000 | | | | |
| $r_5$ | −82.021 | | | | | | |
| | | $d_5$ | 1.200 | | $N_3$ 1.77250 | $v_3$ | 49.77 |
| $r_6$ | 8.701 | | | | | | |
| | | $d_6$ | 4.100 | | | | |
| $r_7$ | 21.334 | | | | | | |
| | | $d_7$ | 2.200 | | $N_4$ 1.84666 | $v_4$ | 23.82 |
| $r_8$* | −42.941 | | | | | | |
| | | $d_8$ | 1.000~20.709~36.349 | | | | |
| $r_9$ | ∞ (iris) | | | | | | |
| | | $d_9$ | 8.000~5.040~7.388 | | | | |
| $r_{10}$* | 28.615 | | | | | | |
| | | $d_{10}$ | 7.100 | | $N_5$ 1.61800 | $v_5$ | 63.39 |
| $r_{11}$ | −10.797 | | | | | | |
| | | $d_{11}$ | 1.400 | | $N_6$ 1.84666 | $v_6$ | 23.82 |
| $r_{12}$* | −17.007 | | | | | | |
| | | $d_{12}$ | 5.000~7.960~5.612 | | | | |
| $r_{13}$ | ∞ | | | | | | |
| | | $d_{13}$ | 5.000 | | $N_7$ 1.51680 | $v_7$ | 64.20 |
| $r_{14}$ | ∞ | | | | | | |

Aspherical coefficient $r_3$: $\epsilon = 0.10000 \times 10$
$A_4 = -0.93830 \times 10^{-6}$    $A_6 = -0.11284 \times 10^{-7}$ TABLE 32-continued $A_8 = 0.18424 \times 10^{-10}$ $r_8$: $\epsilon = 0.10000 \times 10$
$A_4 = -0.92331 \times 10^{-4}$    $A_6 = -0.40727 \times 10^{-6}$
$A_8 = -0.10797 \times 10^{-7}$ $r_{10}$: $\epsilon = 0.10000 \times 10$
$A_4 = -0.61542 \times 10^{-4}$    $A_6 = 0.28449 \times 10^{-6}$
$A_8 = -0.78189 \times 10^{-8}$ $r_{12}$: $\epsilon = 0.10000 \times r10$
$A_4 = -0.11282 \times 10^{-4}$    $A_6 = 0.70271 \times 10^{-7}$
$A_6 = -0.27140 \times 10^{-8}$

TABLE 33

| | $\phi I \cdot f_T$ | $\phi I/|\phi III|$ |
|---|---|---|
| Embodiment 24 | 0.882 | 0.274 |
| Embodiment 25 | 0.877 | 0.274 |
| Embodiment 26 | 0.992 | 0.282 |
| Embodiment 27 | 0.966 | 0.265 |
| Embodiment 28 | 0.861 | 0.272 |
| Embodiment 29 | 0.929 | 0.279 |
| Embodiment 30 | 0.882 | 0.273 |
| Embodiment 31 | 0.856 | 0.261 |
| Embodiment 32 | 1.003 | 0.303 |

TABLE 34

| | $rII_N^R/rII_N^F$ | $rIII^F/rIII^R$ |
|---|---|---|
| Embodiment 24 | −0.058 | −1.622 |
| Embodiment 25 | 0.026 | −1.822 |
| Embodiment 26 | −0.125 | −1.539 |
| Embodiment 27 | −0.120 | −2.141 |
| Embodiment 28 | −0.031 | −2.105 |
| Embodiment 29 | −0.136 | −1.935 |
| Embodiment 30 | −0.006 | −0.323 |
| Embodiment 31 | −0.031 | −0.254 |
| Embodiment 32 | −0.106 | −1.683 |

TABLE 35

<Embodiment 33>
f = 50.4~17.0~6.68   $F_{NO}$ = 1.79~1.90~1.63   2ω = 63°

| | Radius of Curvature | | Axial Distance | | Refractive Index | | Abbe Number |
|---|---|---|---|---|---|---|---|
| $r_1$ | 59.524 | | | | | | |
| | | $d_1$ | 1.700 | | $N_1$ 1.84666 | $v_1$ | 23.82 |
| $r_2$ | 31.056 | | | | | | |
| | | $d_2$ | 5.100 | | $N_2$ 1.69100 | $v_2$ | 54.75 |
| $r_3$ | 310.019 | | | | | | |
| | | $d_3$ | 0.100 | | | | |
| $r_4$ | 30.780 | | | | | | |
| | | $d_4$ | 3.300 | | $N_3$ 1.69100 | $v_3$ | 54.75 |
| $r_5$ | 8.420 | | | | | | |
| | | $d_5$ | 26.305~13.663~1.000 | | | | |
| $r_6$ | 83.333 | | | | | | |
| | | $d_6$ | 1.000 | | $N_4$ 1.77250 | $v_4$ | 49.77 |
| $r_7$ | 9.987 | | | | | | |
| | | $d_7$ | 3.500 | | | | |
| $r_8$* | −26.407 | | | | | | |
| | | $d_8$ | 1.000 | | $N_5$ 1.77250 | $v_5$ | 49.77 |
| $r_9$ | 13.369 | | | | | | |
| | | $d_9$ | 1.400 | | | | |
| $r_{10}$ | 17.739 | | | | | | |
| | | $d_{10}$ | 2.800 | | $N_6$ 1.75520 | $v_6$ | 27.51 |
| $r_{11}$ | −70.547 | | | | | | |
| | | $d_{11}$ | 1.500~14.141~26.804 | | | | |
| $r_{12}$ | ∞ (iris) | | | | | | |
| | | $d_{12}$ | 8.400~5.911~8.912 | | | | |

TABLE 35-continued

| | | | | | | |
|---|---|---|---|---|---|---|
| $r_{13}$ | 12.225 | | | | | |
| | | $d_{13}$ | 4.600 | $N_7$ | 1.51680 $v_7$ | 64.20 |
| $r_{14}$ | 209.288 | | | | | |
| | | $d_{14}$ | 0.100 | | | |
| $r_{15}$ | 11.540 | | | | | |
| | | $d_{15}$ | 3.400 | $N_8$ | 1.64250 $v_8$ | 58.04 |
| $r_{16}$ | 46.266 | | | | | |
| | | $d_{16}$ | 0.500 | | | |
| $r_{17}$ | 349.577 | | | | | |
| | | $d_{17}$ | 1.400 | $N_9$ | 1.84666 $v_9$ | 23.82 |
| $r_{18}$ | 12.972 | | | | | |
| | | $d_{18}$ | 1.400 | | | |
| $r_{19}$ | 14.063 | | | | | |
| | | $d_{19}$ | 2.100 | $N_{10}$ | 1.51680 $v_{10}$ | 64.20 |
| $r_{20}$* | 226.830 | | | | | |
| | | $d_{20}$ | 6.000~8.489~5.488 | | | |
| $r_{21}$ | ∞ | | | | | |
| | | $d_{21}$ | 4.000 | $N_{11}$ | 1.51680 $v_{11}$ | 64.20 |
| $r_2$ | ∞ | | | | | |

Aspherical coefficient $r_8$:  $\epsilon = 0.10000 \times 10$
  $A_4 = 0.74769 \times 10^{-4}$   $A_6 = -0.10813 \times 10^{-5}$
  $A_8 = 0.69175 \times 10^{-8}$ $r_{20}$:  $\epsilon = 0.10000 \times 10$
  $A_4 = 0.45629 \times 10^{-3}$   $A_6 = -0.80132 \times 10^{-6}$
  $A_8 = 0.14697 \times 10^{-6}$

TABLE 36

<Embodiment 34>
f = 50.4~17.0~6.68   $F_{NO}$ = 1.79~1.90~1.63   2ω = 63°

| | Radius of Curvature | | Axial Distance | | Refractive Index | Abbe Number |
|---|---|---|---|---|---|---|
| $r_1$ | 59.172 | | | | | |
| | | $d_1$ | 1.700 | $N_1$ | 1.84666 $v_1$ | 23.82 |
| $r_2$ | 31.153 | | | | | |
| | | $d_2$ | 5.100 | $N_2$ | 1.69100 $v_2$ | 54.75 |
| $r_3$ | 291.600 | | | | | |
| | | $d_3$ | 0.100 | | | |
| $r_4$ | 31.175 | | | | | |
| | | $d_4$ | 3.300 | $N_3$ | 1.69100 $v_3$ | 54.75 |
| $r_5$ | 88.623 | | | | | |
| | | $d_5$ | 26.543~13.773~1.000 | | | |
| $r_6$ | 71.429 | | | | | |
| | | $d_6$ | 1.000 | $N_4$ | 1.77250 $v_4$ | 49.77 |
| $r_7$ | 10.066 | | | | | |
| | | $d_7$ | 3.600 | | | |
| $r_8$* | −27.794 | | | | | |
| | | $d_8$ | 1.000 | $N_5$ | 1.77250 $v_5$ | 49.77 |
| $r_9$ | 13.477 | | | | | |
| | | $d_9$ | 1.400 | | | |
| $r_{10}$ | 17.486 | | | | | |
| | | $d_{10}$ | 2.800 | $N_6$ | 1.75520 $v_6$ | 27.51 |
| $r_{11}$ | −92.197 | | | | | |
| | | $d_{11}$ | 1.500~14.269~27.042 | | | |
| $r_{12}$ | ∞ (iris) | | | | | |
| | | $d_{12}$ | 8.400~6.057~9.010 | | | |
| $r_{13}$ | 12.307 | | | | | |
| | | $d_{13}$ | 4.300 | $N_7$ | 1.60311 $v_7$ | 60.74 |
| $r_{14}$ | 111.007 | | | | | |
| | | $d_{14}$ | 0.100 | | | |
| $r_{15}$ | 12.109 | | | | | |
| | | $d_{15}$ | 3.200 | $N_8$ | 1.67000 $v_8$ | 57.07 |
| $r_{16}$ | 42.779 | | | | | |
| | | $d_{16}$ | 0.500 | | | |
| $r_{17}$ | 362.989 | | | | | |
| | | $d_{17}$ | 1.400 | $N_9$ | 1.84666 $v_9$ | 23.82 |
| $r_{18}$ | 11.964 | | | | | |
| | | $d_{18}$ | 1.400 | | | |
| $r_{19}$ | 13.755 | | | | | |

TABLE 36-continued

| | | | | | | |
|---|---|---|---|---|---|---|
| | | $d_{19}$ | 2.200 | $N_{10}$ | 1.58913 $v_{10}$ | 61.11 |
| $r_{20}$* | 98.522 | | | | | |
| | | $d_{20}$ | 6.000~8.343~5.390 | | | |
| $r_{21}$ | ∞ | | | | | |
| | | $d_{21}$ | 4.000 | $N_{11}$ | 1.51680 $v_{11}$ | 64.20 |
| $r_2$ | ∞ | | | | | |

Aspherical coefficient $r_8$:  $\epsilon = 0.10000 \times 10$
  $A_4 = 0.64988 \times 10^{-4}$   $A_6 = -0.11110 \times 10^{-5}$
  $A_8 = 0.73647 \times 10^{-8}$ $r_{20}$:  $\epsilon = 0.10000 \times 10$
  $A_4 = 0.41342 \times 10^{-3}$   $A_6 = -0.13176 \times 10^{-5}$
  $A_8 = 0.16445 \times 10^{-6}$

TABLE 37

<Embodiment 35>
f = 50.4~17.0~6.68   $F_{NO}$ = 1.73~1.88~1.63   2ω = 63°

| | Radius of Curvature | | Axial Distance | | Refractive Index | Abbe Number |
|---|---|---|---|---|---|---|
| $r_1$ | 60.241 | | | | | |
| | | $d_1$ | 1.700 | $N_1$ | 1.84666 $v_1$ | 23.82 |
| $r_2$ | 32.362 | | | | | |
| | | $d_2$ | 5.100 | $N_2$ | 1.69100 $v_2$ | 54.75 |
| $r_3$ | 249.0300 | | | | | |
| | | $d_3$ | 0.100 | | | |
| $r_4$ | 30.280 | | | | | |
| | | $d_4$ | 3.400 | $N_3$ | 1.69100 $v_3$ | 54.75 |
| $r_5$ | 76.719 | | | | | |
| | | $d_5$ | 27.544~14.387~1.000 | | | |
| $r_6$ | 45.455 | | | | | |
| | | $d_6$ | 1.000 | $N_4$ | 1.80500 $v_4$ | 40.97 |
| $r_7$ | 10.307 | | | | | |
| | | $d_7$ | 3.700 | | | |
| $r_8$ | −40.204 | | | | | |
| | | $d_8$ | 1.000 | $N_5$ | 1.77250 $v_5$ | 49.77 |
| $r_9$ | 12.369 | | | | | |
| | | $d_9$ | 1.400 | | | |
| $r_{10}$ | 15.377 | | | | | |
| | | $d_{10}$ | 2.800 | $N_6$ | 1.80518 $v_6$ | 25.43 |
| $r_{11}$ | 211.329 | | | | | |
| | | $d_{11}$ | 1.500~14.657~28.044 | | | |
| $r_{12}$ | ∞ (iris) | | | | | |
| | | $d_{12}$ | 8.400~6.058~8.732 | | | |
| $r_{13}$ | 12.687 | | | | | |
| | | $d_{13}$ | 4.200 | $N_7$ | 1.60311 $v_7$ | 60.74 |
| $r_{14}$ | 125.220 | | | | | |
| | | $d_{14}$ | 0.100 | | | |
| $r_{15}$ | 12.581 | | | | | |
| | | $d_{15}$ | 3.200 | $N_8$ | 1.67000 $v_8$ | 57.07 |
| $r_{16}$ | 41.848 | | | | | |
| | | $d_{16}$ | 0.550 | | | |
| $r_{17}$ | 209.814 | | | | | |
| | | $d_{17}$ | 1.400 | $N_9$ | 1.84666 $v_9$ | 23.82 |
| $r_{18}$ | 12.187 | | | | | |
| | | $d_{18}$ | 1.300 | | | |
| $r_{19}$ | 13.275 | | | | | |
| | | $d_{19}$ | 2.200 | $N_{10}$ | 1.58913 $v_{10}$ | 61.11 |
| $r_{20}$* | 163.360 | | | | | |
| | | $d_{20}$ | 6.000~8.342~5.668 | | | |
| $r_{21}$ | ∞ | | | | | |
| | | $d_{21}$ | 4.000 | $N_{11}$ | 1.51680 $v_{11}$ | 64.20 |
| $r_{22}$ | ∞ | | | | | |

Aspherical coefficient $r_{20}$:  $\epsilon = 0.10000 \times 10$
  $A_4 = 0.33194 \times 10^{-3}$   $A_6 = 0.14137 \times 10^{-5}$
  $A_8 = 0.63625 \times 10^{-7}$

TABLE 38

<Embodiment 36>
f = 54.4~19.0~7.2  $F_{NO}$ = 2.30~1.93~1.63  2ω = 60°

| | Radius of Curvature | | Axial Distance | | Refractive Index | | Abbe Number |
|---|---|---|---|---|---|---|---|
| $r_1$ | 54.945 | | | | | | |
| | | $d_1$ | 1.600 | $N_1$ | 1.84666 | $v_1$ | 23.82 |
| $r_2$ | 31.646 | | | | | | |
| | | $d_2$ | 4.600 | $N_2$ | 1.58913 | $v_2$ | 61.11 |
| $r_3$ | 309.521 | | | | | | |
| | | $d_3$ | 0.100 | | | | |
| $r_4$ | 30.107 | | | | | | |
| | | $d_4$ | 3.40 | $N_3$ | 1.69100 | $v_3$ | 54.75 |
| $r_5$ | 87.433 | | | | | | |
| | | $d_5$ | 27.996~14.652~1.000 | | | | |
| $r_6$ | 40.000 | | | | | | |
| | | $d_6$ | 1.000 | $N_4$ | 1.80500 | $v_4$ | 40.97 |
| $r_7$ | 10.237 | | | | | | |
| | | $d_7$ | 3.500 | | | | |
| $r_8$ | −34.725 | | | | | | |
| | | $d_8$ | 1.000 | $N_5$ | 1.77250 | $v_5$ | 49.77 |
| $r_9$ | 12.480 | | | | | | |
| | | $d_9$ | 1.400 | | | | |
| $r_{10}$ | 15.679 | | | | | | |
| | | $d_{10}$ | 2.700 | $N_6$ | 1.80518 | $v_6$ | 25.43 |
| $r_{11}$ | 477.432 | | | | | | |
| | | $d_{11}$ | 1.500~14.844~28.496 | | | | |
| $r_{12}$ | ∞ (iris) | | | | | | |
| | | $d_{12}$ | 9.800~6.230~9.482 | | | | |
| $r_{13}$ | 13.035 | | | | | | |
| | | $d_{13}$ | 4.500 | $N_7$ | 1.60311 | $v_7$ | 60.74 |
| $r_{14}$ | 131.887 | | | | | | |
| | | $d_{14}$ | 0.100 | | | | |
| $r_{15}$ | 12.897 | | | | | | |
| | | $d_{15}$ | 3.200 | $N_8$ | 1.67000 | $v_8$ | 57.07 |
| $r_{16}$ | 41.114 | | | | | | |
| | | $d_{16}$ | 0.550 | | | | |
| $r_{17}$ | 191.236 | | | | | | |
| | | $d_{17}$ | 1.400 | $N_9$ | 1.84666 | $v_9$ | 23.82 |
| $r_{18}$ | 12.318 | | | | | | |
| | | $d_{18}$ | 1.400 | | | | |
| $r_{19}$ | 13.363 | | | | | | |
| | | $d_{19}$ | 2.300 | $N_{10}$ | 1.58913 | $v_{10}$ | 61.11 |
| $r_{20}$* | 83.866 | | | | | | |
| | | $d_{20}$ | 6.000~9.570~6.318 | | | | |
| $r_{21}$ | ∞ | | | | | | |
| | | $d_{21}$ | 4.000 | $N_{11}$ | 1.51680 | $v_{11}$ | 64.20 |
| $r_2$ | ∞ | | | | | | |

Aspherical coefficient $r_{20}$:  $\epsilon = 0.10000 \times 10$
$A_4 = 0.30928 \times 10^{-3}$   $A_6 = 0.32936 \times 10^{-6}$
$A_8 = 0.77150 \times 10^{-7}$

TABLE 39

<Embodiment 37>
f = 58.4~21.0~7.7  $F_{NO}$ = 2.30~1.93~1.63  2ω = 56°

| | Radius of Curvature | | Axial Distance | | Refractive Index | | Abbe Number |
|---|---|---|---|---|---|---|---|
| $r_1$ | 30.581 | | | | | | |
| | | $d_1$ | 1.300 | $N_1$ | 1.84666 | $v_1$ | 23.82 |
| $r_2$ | 20.325 | | | | | | |
| | | $d_2$ | 1.500 | | | | |
| $r_3$ | 21.922 | | | | | | |
| | | $d_3$ | 5.700 | $N_2$ | 1.71300 | $v_2$ | 53.93 |
| $r_4$ | −1067.213 | | | | | | |
| | | $d_4$ | 30.461~15.938~1.000 | | | | |
| $r_5$ | 42.310 | | | | | | |

TABLE 39-continued

| | | $d_5$ | 0.900 | $N_3$ | 1.80500 | $v_3$ | 40.97 |
|---|---|---|---|---|---|---|---|
| $r_6$ | 11.119 | | | | | | |
| | | $d_6$ | 3.000 | | | | |
| $r_7$ | −30.601 | | | | | | |
| | | $d_7$ | 0.900 | $N_4$ | 1.77250 | $v_4$ | 49.77 |
| $r_8$ | 13.279 | | | | | | |
| | | $d_8$ | 1.400 | | | | |
| $r_9$ | 16.761 | | | | | | |
| | | $d_9$ | 2.600 | $N_5$ | 1.76182 | $v_5$ | 26.55 |
| $r_{10}$ | −184.356 | | | | | | |
| | | $d_{10}$ | 1.400~15.923~30.861 | | | | |
| $r_{11}$ | ∞ (iris) | | | | | | |
| | | $d_{11}$ | 11.000~5.503~9.104 | | | | |
| $r_{12}$ | 13.173 | | | | | | |
| | | $d_{12}$ | 4.800 | $N_6$ | 1.60311 | $v_6$ | 60.74 |
| $r_{13}$ | 103.283 | | | | | | |
| | | $d_{13}$ | 0.100 | | | | |
| $r_{14}$ | 14.126 | | | | | | |
| | | $d_{14}$ | 3.100 | $N_7$ | 1.67000 | $v_7$ | 57.07 |
| $r_{15}$ | 32.754 | | | | | | |
| | | $d_{15}$ | 0.700 | | | | |
| $r_{16}$ | 131.179 | | | | | | |
| | | $d_{16}$ | 1.300 | $N_8$ | 1.84666 | $v_8$ | 23.82 |
| $r_{17}$ | 13.177 | | | | | | |
| | | $d_{17}$ | 1.400 | | | | |
| $r_{18}$ | 13.414 | | | | | | |
| | | $d_{18}$ | 2.400 | $N_9$ | 1.60311 | $v_9$ | 60.74 |
| $r_{19}$* | 104.280 | | | | | | |
| | | $d_{19}$ | 6.000~11.470~7.896 | | | | |
| $r_{20}$ | ∞ | | | | | | |
| | | $d_{20}$ | 4.000 | $N_{10}$ | 1.51680 | $v_{10}$ | 64.20 |
| $r_{21}$ | ∞ | | | | | | |

Aspherical coefficient $r_{19}$:  $\epsilon = 0.10000 \times 10$
$A_4 = 0.27392 \times 10^{-3}$   $A_6 = -0.66226 \times 10^{-6}$
$A_8 = 0.70141 \times 10^{-7}$

TABLE 40

<Embodiment 38>
f = 50.4~17.0~6.68  $F_{NO}$ = 1.67~1.91~1.64  2ω = 63°

| | Radius of Curvature | | Axial Distance | | Refractive Index | | Abbe Number |
|---|---|---|---|---|---|---|---|
| $r_1$ | 52.45 | | | | | | |
| | | $d_1$ | 1.300 | $N_1$ | 1.84666 | $v_1$ | 23.82 |
| $r_2$ | 28.316 | | | | | | |
| | | $d_2$ | 5.700 | $N_2$ | 1.69680 | $v_2$ | 56.47 |
| $r_3$ | 168.430 | | | | | | |
| | | $d_3$ | 0.100 | | | | |
| $r_4$ | 30.094 | | | | | | |
| | | $d_4$ | 3.700 | $N_3$ | 1.72000 | $v_3$ | 50.31 |
| $r_5$ | 87.126 | | | | | | |
| | | $d_5$ | 24.856~12.872~1.000 | | | | |
| $r_6$ | 79.486 | | | | | | |
| | | $d_6$ | 0.900 | $N_4$ | 1.75450 | $v_4$ | 51.57 |
| $r_7$ | −8.574 | | | | | | |
| | | $d_7$ | 4.100 | | | | |
| $r_8$ | −97.831 | | | | | | |
| | | $d_8$ | 0.900 | $N_5$ | 1.69680 | $v_5$ | 56.47 |
| $r_9$ | 15.963 | | | | | | |
| | | $d_9$ | 1.400 | | | | |
| $r_{10}$ | 14.603 | | | | | | |
| | | $d_{10}$ | 2.700 | $N_6$ | 1.79850 | $v_6$ | 22.60 |
| $r_{11}$ | 34.308 | | | | | | |
| | | $d_{11}$ | 1.400~13.384~25.257 | | | | |
| $r_{12}$ | ∞ (iris) | | | | | | |
| | | $d_{12}$ | 7.000~3.950~6.835 | | | | |

TABLE 40-continued

| | | | | | |
|---|---|---|---|---|---|
| $r_{13}^*$ | 10.318 | | | | |
| | | $d_{13}$ 5.500 | $N_7$ | 1.61800 | $v_7$ 63.39 |
| $r_{14}$ | 334.622 | | | | |
| | | $d_{14}$ 1.200 | | | |
| $r_{15}$ | 82.198 | | | | |
| | | $d_{15}$ 1.200 | $N_8$ | 1.83350 | $v_8$ 21.00 |
| $r_{16}$ | 14.841 | | | | |
| | | $d_{16}$ 1.700 | | | |
| $r_{17}$ | 11.220 | | | | |
| | | $d_{17}$ 3.500 | $N_9$ | 1.60311 | $v_9$ 60.74 |
| $r_{18}^*$ | −291.531 | | | | |
| | | $d_{18}$ 6.000~9.050~6.165 | | | |
| $r_{19}$ | ∞ | | | | |
| | | $d_{19}$ 4.000 | $N_{10}$ | 1.51680 | $v_{10}$ 64.20 |
| $r_{20}$ | ∞ | | | | |

Aspherical coefficient $r_{13}$: $\epsilon = 0.10000 \times 10$
  $A_4 = -0.44080 \times 10^{-4}$     $A_6 = -0.42786 \times 10^{-6}$
  $A_8 = 0.83096 \times 10^{-8}$      $A_{10} = -0.17642 \times 10^{-9}$
  $A_{12} = 0.5894 \times 10^{-12}$ $r_{18}$: $\epsilon = 0.10000 \times 10$
  $A_4 = 0.25983 \times 10^{-3}$      $A_6 = 0.56984 \times 10^{-5}$
  $A_8 = -0.20856 \times 10^{-6}$     $A_{10} = 0.55977 \times 10^{-8}$
  $A_{12} = -0.37559 \times 10^{-10}$

TABLE 41

<Embodiment 39>
$f = 50.4$~$17.1$~$6.68$   $F_{NO} = 1.73$~$1.95$~$1.64$   $2\omega = 63°$

| | Radius of Curvature | Axial Distance | Refractive Index | Abbe Number |
|---|---|---|---|---|
| $r_1$ | 43.879 | | | |
| | | $d_1$ 1.500 | $N_1$ 1.84666 | $v_1$ 23.82 |
| $r_2$ | 26.091 | | | |
| | | $d_2$ 5.200 | $N_2$ 1.69680 | $v_2$ 56.47 |
| $r_3$ | 121.731 | | | |
| | | $d_3$ 0.100 | | |
| $r_4$ | 30.111 | | | |
| | | $d_4$ 3.500 | $N_3$ 1.71300 | $v_3$ 53.93 |
| $r_5$ | 79.916 | | | |
| | | $d_5$ 24.813~12.397~1.000 | | |
| $r_6$ | 65.945 | | | |
| | | $d_6$ 0.900 | $N_4$ 1.77250 | $v_4$ 49.77 |
| $r_7$ | 8.218 | | | |
| | | $d_7$ 3.500 | | |
| $r_8$ | −33.994 | | | |
| | | $d_8$ 0.900 | $N_5$ 1.77250 | $v_5$ 49.77 |
| $r_9$ | 17.177 | | | |
| | | $d_9$ 1.400 | | |
| $r_{10}$ | 17.320 | | | |
| | | $d_{10}$ 2.600 | $N_6$ 1.80518 | $v_6$ 25.43 |
| $r_{11}$ | 319.125 | | | |
| | | $d_{11}$ 1.400~12.316~24.213 | | |
| $r_{12}$ | ∞(iris) | | | |
| | | $d_{12}$ 8.000~4.321~7.695 | | |
| $r_{13}^*$ | 10.639 | | | |
| | | $d_{13}$ 5.500 | $N_7$ 1.61800 | $v_7$ 63.39 |
| $r_{14}$ | 146.367 | | | |
| | | $d_{14}$ 1.200 | | |
| $r_{15}$ | 65.452 | | | |
| | | $d_{15}$ 1.200 | $N_8$ 1.83350 | $v_8$ 21.00 |
| $r_{16}$ | 14.265 | | | |
| | | $d_{16}$ 1.700 | | |
| $r_{17}$ | 11.056 | | | |
| | | $d_{17}$ 3.500 | $N_9$ 1.60311 | $v_9$ 60.74 |
| $r_{18}^*$ | −163.248 | | | |
| | | $d_{18}$ 6.000~9.679~6.305 | | |
| $r_{19}$ | ∞ | | | |
| | | $d_{19}$ 4.000 | $N_{10}$ 1.51680 | $v_{10}$ 64.20 |
| $r_{20}$ | ∞ | | | |

Aspherical coefficient

TABLE 41-continued

<Embodiment 39>
$f = 50.4$~$17.1$~$6.68$   $F_{NO} = 1.73$~$1.95$~$1.64$   $2\omega = 63°$ $r_{13}$: $\epsilon = 0.10000 \times 10$
  $A_4 = -0.34219 \times 10^{-4}$     $A_6 = -0.40465 \times 10^{-6}$
  $A_8 = 0.10207 \times 10^{-7}$      $A_{10} = -0.19276 \times 10^{-9}$
  $A_{12} = 0.80767 \times 10^{-12}$ $r_{18}$: $\epsilon = 0.10000 \times 10$
  $A_4 = 0.24218 \times 10^{-3}$      $A_6 = 0.54060 \times 10^{-5}$
  $A_8 = -0.20697 \times 10^{-6}$     $A_{10} = 0.53767 \times 10^{-8}$
  $A_{12} = -0.41873 \times 10^{-10}$

TABLE 42

| | $\phi$ I | $\phi$ II | $\phi$ III |
|---|---|---|---|
| Embodiment 33 | 0.0216 | −0.0943 | 0.06065 |
| Embodiment 34 | 0.0213 | −0.0934 | 0.06141 |
| Embodiment 35 | 0.0204 | −0.0899 | 0.06231 |
| Embodiment 36 | 0.0205 | −0.0883 | 0.05855 |
| Embodiment 37 | 0.0200 | −0.0809 | 0.05470 |
| Embodiment 38 | 0.0224 | −0.0998 | 0.06267 |
| Embodiment 39 | 0.0227 | −0.102 | 0.06115 |

TABLE 43

| | $\phi_A$ | $f_w$ | $f_T$ |
|---|---|---|---|
| Embodiment 33 | 0.07893 | 6.68 | 50.4 |
| Embodiment 34 | 0.08133 | 6.68 | 50.4 |
| Embodiment 35 | 0.07852 | 6.68 | 50.4 |
| Embodiment 36 | 0.07588 | 7.2 | 54.4 |
| Embodiment 37 | 0.06701 | 7.7 | 58.4 |
| Embodiment 38 | 0.05842 | 6.68 | 50.4 |
| Embodiment 39 | 0.05470 | 6.68 | 50.4 |

TABLE 44

| | Z | Y' | $F_w$ |
|---|---|---|---|
| Embodiment 33 | 7.54 | 4.1 | 1.63 |
| Embodiment 34 | 7.54 | 4.1 | 1.63 |
| Embodiment 35 | 7.54 | 4.1 | 1.63 |
| Embodiment 36 | 7.56 | 4.1 | 1.63 |
| Embodiment 37 | 7.58 | 4.1 | 1.63 |
| Embodiment 38 | 7.54 | 4.1 | 1.64 |
| Embodiment 39 | 7.54 | 4.1 | 1.64 |

TABLE 45

| | $\|\phi III\| \cdot Z \cdot Y'$ | $\dfrac{\|\phi III\|}{\phi I} \cdot \dfrac{Y' \cdot Z}{f_w}$ |
|---|---|---|
| Embodiment 33 | 2.92 | 20.2 |
| Embodiment 34 | 2.89 | 20.3 |
| Embodiment 35 | 2.78 | 20.4 |
| Embodiment 36 | 2.73 | 18.5 |
| Embodiment 37 | 2.50 | 16.3 |
| Embodiment 38 | 3.09 | 20.6 |
| Embodiment 39 | 3.15 | 20.8 |

TABLE 46

| | $\dfrac{\phi_A \cdot f_T}{F_w}$ | $\dfrac{r_B}{\|r_A\|}$ |
|---|---|---|
| Embodiment 33 | 2.44 | 0.506 |
| Embodiment 34 | 2.51 | 0.485 |
| Embodiment 35 | 2.43 | 0.308 |

TABLE 46-continued

|  | $\dfrac{\phi_A \cdot f_T}{F_w}$ | $\dfrac{r_B}{|r_A|}$ |
|---|---|---|
| Embodiment 36 | 2.53 | 0.359 |
| Embodiment 37 | 2.40 | 0.434 |
| Embodiment 38 | 1.80 | 0.108 |
| Embodiment 39 | 1.68 | 0.125 |

TABLE 47

|  | $\dfrac{f_w}{r_D}$ | $\dfrac{r_R}{r_F}$ |
|---|---|---|
| Embodiment 33 | 0.0294 | 0.0371 |
| Embodiment 34 | 0.0678 | 0.0303 |
| Embodiment 35 | 0.0409 | 0.0581 |
| Embodiment 36 | 0.0859 | 0.0644 |
| Embodiment 37 | 0.0738 | 0.100 |
| Embodiment 38 | −0.0229 | 0.218 |
| Embodiment 39 | −0.0409 | 0.181 |

TABLE 48

<Embodiment 40>
f = 37.9~18.0~6.7  $F_{NO}$ = 2.122~2.078~1.830

| Radius of Curvature | Axial Distance | Refractive Index | Abbe Number |
|---|---|---|---|
| $r_1$ 20.686 | | | |
| | $d_1$ 1.300 | $N_1$ 1.83350 | $v_1$ 21.00 |
| $r_2$ 14.876 | | | |
| | $d_2$ 1.000 | | |
| $r_3$ 16.091 | | | |
| | $d_3$ 4.300 | $N_2$ 1.69680 | $v_2$ 56.47 |
| $r_4$ 474.048 | | | |
| | $d_4$ 20.447~12.019~1.000 | | |
| $r_5$ −72.446 | | | |
| | $d_5$ 1.000 | $N_3$ 1.75450 | $v_3$ 51.57 |
| $r_6$ 6.378 | | | |
| | $d_6$ 2.250 | | |
| $r_7$ 19.313 | | | |
| | $d_7$ 1.925 | $N_4$ 1.84666 | $v_4$ 23.82 |
| $r_8$* 41.725 | | | |
| | $d_8$ 1.650~10.079~21.097 | | |
| $r_9$ ∞(iris) | | | |
| | $d_9$ 5.700~2.326~4.350 | | |
| $r_{10}$ 12.566 | | | |
| | $d_{10}$ 3.200 | $N_5$ 1.77250 | $v_5$ 49.77 |
| $r_{11}$* 162.397 | | | |
| | $d_{11}$ 4.200 | | |
| $r_{12}$ 33.502 | | | |
| | $d_{12}$ 1.300 | $N_6$ 1.83350 | $v_6$ 21.00 |
| $r_{13}$ 8.652 | | | |
| | $d_{13}$ 3.200 | $N_7$ 1.77250 | $v_7$ 49.77 |
| $r_{14}$* −67.775 | | | |
| | $d_{14}$ 3.750~7.124~5.100 | | |
| $r_{15}$ ∞ | | | |
| | $d_{15}$ 5.500 | $N_8$ 1.51680 | $v_8$ 64.20 |
| $r_{16}$ ∞ | | | |

Condition(18), (19)

$r_8$: $\delta$ = −0.11258
$|\delta/fS|$ = 0.01680
$\phi_{31}/\phi_{33}$ = 0.57893
Aspherical coefficient $r_8$: $\epsilon$ = 0.10000 × 10
  $A_4$ = −0.22439 × 10$^{-3}$     $A_6$ = −0.60006 × 10$^{-5}$
  $A_8$ = 0.18651 × 10$^{-6}$      $A_{10}$ = −0.49533 × 10$^{-8}$
  $A_{12}$ = −0.75636 × 10$^{-10}$
$r_{11}$: $\epsilon$ = 0.10000 × 10

TABLE 48-continued

<Embodiment 40>
f = 37.9~18.0~6.7  $F_{NO}$ = 2.122~2.078~1.830

$A_4$ = 0.66791 × 10$^{-4}$      $A_6$ = −0.15127 × 10$^{-6}$
  $A_8$ = −0.90123 × 10$^{-8}$     $A_{10}$ = −0.32857 × 10$^{-10}$
  $A_{12}$ = 0.74825 × 10$^{-11}$
$r_{14}$: $\epsilon$ = 0.10000 × 10
  $A_4$ = 0.12629 × 10$^{-3}$      $A_6$ = 0.15663 × 10$^{-5}$
  $A_8$ = −0.10829 × 10$^{-6}$     $A_{10}$ = 0.14388 × 10$^{-7}$
  $A_{12}$ = −0.43303 × 10$^{-9}$

TABLE 49

<Embodiment 41>
f = 37.9~18.0~6.7  $F_{NO}$ = 2.120~2.093~1.830

| Radius of Curvature | Axial Distance | Refractive Index | Abbe Number |
|---|---|---|---|
| $r_1$ 20.586 | | | |
| | $d_1$ 1.300 | $N_1$ 1.83350 | $v_1$ 21.00 |
| $r_2$ 14.901 | | | |
| | $d_2$ 1.000 | | |
| $r_3$ 16.139 | | | |
| | $d_3$ 4.300 | $N_2$ 1.69680 | $v_2$ 56.47 |
| $r_4$ 426.257 | | | |
| | $d_4$ 20.465~12.054~1.000 | | |
| $r_5$ −68.241 | | | |
| | $d_5$ 1.000 | $N_3$ 1.75450 | $v_3$ 51.57 |
| $r_6$ 5.999 | | | |
| | $d_6$ 2.250 | | |
| $r_7$ 29.372 | | | |
| | $d_7$ 1.925 | $N_4$ 1.84666 | $v_4$ 23.82 |
| $r_8$* 1689.846 | | | |
| | $d_8$ 1.650~10.062~21.115 | | |
| $r_9$ ∞(iris) | | | |
| | $d_9$ 5.700~2.446~4.604 | | |
| $r_{10}$ 12.696 | | | |
| | $d_{10}$ 3.200 | $N_5$ 1.77250 | $v_5$ 49.77 |
| $r_{11}$* 147.788 | | | |
| | $d_{11}$ 4.200 | | |
| $r_{12}$ 35.397 | | | |
| | $d_{12}$ 1.300 | $N_6$ 1.83350 | $v_6$ 21.00 |
| $r_{13}$ 8.866 | | | |
| | $d_{13}$ 3.200 | $N_7$ 1.77250 | $v_7$ 49.77 |
| $r_{14}$* −67.908 | | | |
| | $d_{14}$ 3.750~7.004~4.846 | | |
| $r_{15}$ ∞ | | | |
| | $d_{15}$ 5.500 | $N_8$ 1.51680 | $v_8$ 64.20 |
| $r_{16}$ ∞ | | | |

Condition(18), (19)

$r_8$: $\delta$ = −0.143103
$|\delta/fS|$ = 0.02136
$\phi_{31}/\phi_{33}$ = 0.58102
Aspherical coefficient $r_8$: $\epsilon$ = 0.10000 × 10
  $A_4$ = −0.27774 × 10$^{-3}$     $A_6$ = −0.62099 × 10$^{-5}$
  $A_8$ = 0.11810 × 10$^{-6}$      $A_{10}$ = −0.50638 × 10$^{-8}$
  $A_{12}$ = −0.96666 × 10$^{-10}$
Aspherical coefficient $r_{11}$: $\epsilon$ = 0.10000 × 10
  $A_4$ = 0.59774 × 10$^{-4}$      $A_6$ = −0.30326 × 10$^{-6}$
  $A_8$ = −0.48249 × 10$^{-8}$     $A_{10}$ = 0.15627 × 10$^{-9}$
  $A_{12}$ = 0.99175 × 10$^{-12}$
$r_{14}$: $\epsilon$ = 0.10000 × 10
  $A_4$ = 0.12746 × 10$^{-3}$      $A_6$ = 0.20864 × 10$^{-5}$
  $A_8$ = −0.90941 × 10$^{-7}$     $A_{10}$ = 0.10499 × 10$^{-7}$
  $A_{12}$ = −0.31453 × 10$^{-9}$

TABLE 50

<Embodiment 42>
$f = 37.9 \sim 18.0 \sim 6.7$  $F_{NO} = 2.121 \sim 2.081 \sim 1.830$

| | Radius of Curvature | Axial Distance | Refractive Index | Abbe Number |
|---|---|---|---|---|
| $r_1$ | 20.634 | | | |
| | | $d_1$ 1.300 | $N_1$ 1.83350 | $v_1$ 21.00 |
| $r_2$ | 14.839 | | | |
| | | $d_2$ 1.000 | | |
| $r_3$ | 16.057 | | | |
| | | $d_3$ 4.300 | $N_2$ 1.69680 | $v_2$ 56.47 |
| $r_4$ | 453.930 | | | |
| | | $d_4$ 20.455~12.014~1.000 | | |
| $r_5$ | −65.462 | | | |
| | | $d_5$ 1.000 | $N_3$ 1.75450 | $v_3$ 51.57 |
| $r_6$ | 6.393 | | | |
| | | $d_6$ 2.250 | | |
| $r_7$ | 19.739 | | | |
| | | $d_7$ 1.925 | $N_4$ 1.84666 | $v_4$ 23.82 |
| $r_8$* | 45.139 | | | |
| | | $d_8$ 1.650~10.091~21.105 | | |
| $r_9$ | ∞(iris) | | | |
| | | $d_9$ 5.700~2.330~4.369 | | |
| $r_{10}$* | 12.512 | | | |
| | | $d_{10}$ 3.200 | $N_5$ 1.77250 | $v_5$ = 49.77 |
| $r_{11}$ | 170.856 | | | |
| | | $d_{11}$ 4.200 | | |
| $r_{12}$ | 33.315 | | | |
| | | $d_{12}$ 1.300 | $N_6$ 1.83350 | $v_6$ 21.00 |
| $r_{13}$ | 8.489 | | | |
| | | $d_{13}$ 3.200 | $N_7$ 1.77250 | $v_7$ 49.77 |
| $r_{14}$* | −73.627 | | | |
| | | $d_{14}$ 3.750~7.120~5.081 | | |
| $r_{15}$ | ∞ | | | |
| | | $d_{15}$ 5.500 | $N_8$ 1.51680 | $v_8$ 64.20 |
| $r_{16}$ | ∞ | | | |

Condition(18), (19)

$r_8$: $\delta = -0.114145$
$|\delta/f| = 0.017037$
$\phi 31/\phi 33 = 0.57858$
Aspherical coefficient $r_8$: $\epsilon = 0.10000 \times 10$
$A_4 = -0.23031 \times 10^{-3}$   $A_6 = -0.60552 \times 10^{-5}$
$A_8 = 0.19549 \times 10^{-6}$   $A_{10} = -0.45141 \times 10^{-8}$
$A_{12} = -0.10383 \times 10^{-9}$
$r_{10}$: $\epsilon = 0.10000 \times 10$
$A_4 = -0.45072 \times 10^{-4}$   $A_6 = -0.60399 \times 10^{-6}$
$A_8 = 0.52402 \times 10^{-7}$   $A_{10} = -0.16010 \times 10^{-8}$
$A_{12} = 0.15809 \times 10^{-10}$
$r_{14}$: $\epsilon = 0.10000 \times 10$
$A_4 = 0.14732 \times 10^{-3}$   $A_6 = 0.16340 \times 10^{-5}$
$A_8 = -0.10337 \times 10^{-6}$   $A_{10} = 0.13800 \times 10^{-7}$
$A_{12} = -0.46038 \times 10^{-9}$

TABLE 51

<Embodiment 43>
$f = 37.9 \sim 18.0 \sim 6.7$  $F_{NO} = 2.099 \sim 2.087 \sim 1.830$

| | Radius of Curvature | Axial Distance | Refractive Index | Abbe Number |
|---|---|---|---|---|
| $r_1$ | 21.417 | | | |
| | | $d_1$ 1.300 | $N_1$ 1.83350 | $v_1$ 21.00 |
| $r_2$ | 15.382 | | | |
| | | $d_2$ 1.100 | | |
| $r_3$ | 16.822 | | | |
| | | $d_3$ 4.200 | $N_2$ 1.69680 | $v_2$ 56.47 |
| $r_4$ | −9389.667 | | | |
| | | $d_4$ 20.627~12.167~1.150 | | |
| $r_5$ | −46.261 | | | |
| | | $d_5$ 1.000 | $N_3$ 1.75450 | $v_3$ 51.57 |
| $r_6$ | 6.613 | | | |

TABLE 51-continued

<Embodiment 43>
$f = 37.9 \sim 18.0 \sim 6.7$  $F_{NO} = 2.099 \sim 2.087 \sim 1.830$

| | | $d_6$ 2.300 | | |
|---|---|---|---|---|
| $r_7$* | 19.627 | | | |
| | | $d_7$ 2.200 | $N_4$ 1.84666 | $v_6$ 23.82 |
| $r_8$ | 46.479 | | | |
| | | $d_8$ 1.650~10.109~21.127 | | |
| $r_9$ | ∞(iris) | | | |
| | | $d_9$ 6.000~2.689~4.810 | | |
| $r_{10}$ | 11.299 | | | |
| | | $d_{10}$ 3.200 | $N_5$ 1.77250 | $v_5$ 49.77 |
| $r_{11}$* | 56.187 | | | |
| | | $d_{11}$ 4.500 | | |
| $r_{12}$ | 23.422 | | | |
| | | $d_{12}$ 1.300 | $N_6$ 1.83350 | $v_6$ 21.00 |
| $r_{13}$ | 7.795 | | | |
| | | $d_{13}$ 3.200 | $N_7$ 1.77250 | $v_7$ 49.77 |
| $r_{14}$* | 1772.610 | | | |
| | | $d_{14}$ 3.750~7.061~4.940 | | |
| $r_{15}$ | ∞ | | | |
| | | $d_{15}$ 5.500 | $N_8$ 1.51680 | $v_8$ 64.20 |
| $r_{16}$ | ∞ | | | |

Condition(18), (19)

$r_8$: $\delta = 0.126361$
$|\delta/f| = 0.018860$
$\phi 33/\phi 31 = 0.57030$
Aspherical coefficient $r_7$: $\epsilon = 0.10000 \times 10$
$A_4 = 0.26272 \times 10^{-3}$   $A_6 = -0.73085 \times 10^{-6}$
$A_8 = 0.21844 \times 10^{-6}$   $A_{10} = -0.72289 \times 10^{-8}$
$A_{12} = 0.18247 \times 10^{-9}$
Aspherical coefficient $r_{11}$: $\epsilon = 0.1000 \times 10$
$A_4 = 051455 \times 10^{-4}$   $A_6 = 0.28732 \times 10^{-5}$
$A_8 = -0.21825 \times 10^{-6}$   $A_{10} = 0.69571 \times 10^{-8}$
$A_{12} = -0.77985 \times 10^{-10}$
$r_{14}$: $\epsilon = 0.10000 \times 10$
$A_4 = 0.22652 \times 10^{-3}$   $A_6 = 0.32145 \times 10^{-5}$
$A_8 = -0.83194 \times 10^{-6}$   $A_{10} = 0.76761 \times 10^{-7}$
$A_{12} = -0.19746 \times 10^{-8}$

TABLE 52

<Embodiment 44>
$f = 37.9 \sim 15.0 \sim 6.7$  $F_{NO} = 1.864 \sim 2.032 \sim 1.850$

| | Radius of Curvature | Axial Distance | Refractive Index | Abbe Number |
|---|---|---|---|---|
| $r_1$ | 21.665 | | | |
| | | $d_1$ 1.100 | $N_1$ 1.84666 | $v_1$ 23.83 |
| $r_2$ | 15.821 | | | |
| | | $d_2$ 1.050 | | |
| $r_3$ | 17.089 | | | |
| | | $d_3$ 4.000 | $N_2$ 1.71300 | $v_2$ 53.93 |
| $r_4$* | 121.177 | | | |
| | | $d_4$ 25.558~12.886~1.000 | | |
| $r_5$ | 69.405 | | | |
| | | $d_5$ 0.900 | $N_3$ 1.77250 | $v_3$ 49.77 |
| $r_6$ | 5.799 | | | |
| | | $d_6$ 3.100 | | |
| $r_7$* | 63.792 | | | |
| | | $d_7$ 2.400 | $N_4$ 1.84666 | $v_4$ 23.83 |
| $r_8$* | −52.758 | | | |
| | | $d_8$ 1.000~13.671~25.558 | | |
| $r_9$ | ∞(iris) | | | |
| | | $d_9$ 5.000~2.265~3.555 | | |
| $r_{10}$* | 8.012 | | | |
| | | $d_{10}$ 1.100 | $N_5$ 1.84666 | $v_5$ 23.82 |
| $r_{11}$ | 5.253 | | | |
| | | $d_{11}$ 5.500 | $N_6$ 1.67000 | $v_6$ 57.07 |
| $r_{12}$* | −5964.804 | | | |

TABLE 52-continued

<Embodiment 44>
f = 37.9~15.0~6.7  $F_{NO}$ = 1.864~2.032~1.850

|  |  |  |  |  |
|---|---|---|---|---|
|  |  | $d_{12}$ 4.000~6.735~5.445 |  |  |
| $r_{13}$ | ∞ |  |  |  |
|  |  | $d_{13}$ 5.500 | $N_7$ 1.51680 | $v_7$ 64.20 |
| $r_{14}$ | ∞ |  |  |  |

Condition(18)

$r_7$: $\delta$ = −0.007710
  $|\delta/fS|$ = 0.001151
$r_8$: $\delta$ = −0.23834
  $|\delta/fS|$ = 0.03557

Aspherical coefficient $r_4$: $\epsilon$ = 0.1000 × 10
  $A_4$ = −0.18599 × 10$^{-5}$    $A_6$ = 0.82018 × 10$^{-7}$
  $A_8$ = −0.13008 × 10$^{-8}$    $A_{10}$ = 0.84606 × 10$^{-11}$
  $A_{12}$ = −0.22363 × 10$^{-13}$
$r_7$: $\epsilon$ = 0.10000 × 10
  $A_4$ = −0.21529 × 10$^{-3}$    $A_6$ = 0.71478 × 10$^{-5}$
  $A_8$ = 0.59554 × 10$^{-6}$    $A_{10}$ = −0.56172 × 10$^{-7}$
  $A_{12}$ = 0.14442 × 10$^{-8}$
$r_8$: $\epsilon$ = 0.10000 × 10
  $A_4$ = −0.44631 × 10$^{-3}$    $A_6$ = 0.10449 × 10$^{-4}$
  $A_8$ −0.48774 × 10$^{-6}$    $A_{10}$ = 0.37887 × 10$^{-8}$
  $A_{12}$ = 0.12638 × 10$^{-9}$
$r_{10}$: $\epsilon$ = 0.10000 × 10
  $A_4$ = 0.48856 × 10$^{-4}$    $A_6$ = 0.16289 × 10$^{-5}$
  $A_8$ = 0.16836 × 10$^{-7}$    $A_{10}$ = −0.13196 × 10$^{-8}$
  $A_{12}$ = 0.50564 × 10$^{-10}$
$r_{12}$: $\epsilon$ = 0.10000 × 10
  $A_4$ = 0.54830 × 10$^{-3}$    $A_6$ = 0.18035 × 10$^{-5}$
  $A_8$ = 0.72199 × 10$^{-6}$    $A_{10}$ = −0.40373 × 10$^{-7}$
  $A_{12}$ = 0.16691 × 10$^{-8}$

TABLE 53

<Embodiment 45>
f = 37.9~15.0~6.7  $F_{NO}$ = 2.423~2.330~2.060

| | Radius of Curvature | Axial Distance | Refractive Index | Abbe Number |
|---|---|---|---|---|
| $r_1$ | 19.265 | | | |
| | | $d_1$ 1.100 | $N_1$ 1.84666 | $v_1$ 23.82 |
| $r_2$ | 13.944 | | | |
| | | $d_2$ 1.050 | | |
| $r_3$ | 14.530 | | | |
| | | $d_3$ 5.000 | $N_2$ 1.69680 | $v_2$ 56.47 |
| $r_4$* | 526.244 | | | |
| | | $d_4$ 17.928~9.872~1.000 | | |
| $r_5$ | −106.664 | | | |
| | | $d_5$ 0.900 | $N_3$ 1.85000 | $v_3$ 40.04 |
| $r_6$ | 6.604 | | | |
| | | $d_6$ 3.100 | | |
| $r_7$* | −86.979 | | | |
| | | $d_7$ 2.700 | $N_4$ 1.84666 | $v_4$ 23.82 |
| $r_8$* | −16.957 | | | |
| | | $d_8$ 1.000~9.056~17.928 | | |
| $r_9$ | ∞(iris) | | | |
| | | $d_9$ 3.500~3.106~4.047 | | |
| $r_{10}$* | 10.933 | | | |
| | | $d_{10}$ 1.100 | $N_5$ 1.83350 | $v_5$ 21.00 |
| $r_{11}$ | 7.304 | | | |
| | | $d_{11}$ 5.500 | $N_6$ 1.60311 | $v_6$ 60.74 |
| $r_{12}$* | −6.733 | | | |
| | | $d_{12}$ 0.400~2.794~3.853 | | |
| $r_{13}$ | 100.000 | | | |
| | | $d_{13}$ 0.900 | $N_7$ 1.77250 | $v_7$ 49.77 |
| $r_{14}$ | 8.771 | | | |
| | | $d_{14}$ 5.500~3.500~1.500 | | |
| $r_{15}$ | ∞ | | | |
| | | $d_{15}$ 5.500 | $N_8$ 1.51680 | $v_8$ 64.20 |
| $r_{16}$ | ∞ | | | |

TABLE 53-continued

<Embodiment 45>
f = 37.9~15.0~6.7  $F_{NO}$ = 2.423~2.330~2.060

Condition(18)

$r_7$: $\delta$ = −0.201661
  $|\delta/fS|$ = 0.030099
$r_8$: $\delta$ = −0.263236
  $|\delta/fS|$ = 0.039289

Aspherical coefficient $r_4$: $\epsilon$ = 0.1000 × 10
  $A_4$ = 0.61295 × 10$^{-5}$    $A_6$ = 0.12707 × 10$^{-6}$
  $A_8$ = −0.46281 × 10$^{-8}$    $A_{10}$ = 0.63589 × 10$^{-10}$
  $A_{12}$ = −0.31068 × 10$^{-12}$
$r_7$: $\epsilon$ = 0.10000 × 10
  $A_4$ = −0.19167 × 10$^{-3}$    $A_6$ = −0.11732 × 10$^{-4}$
  $A_8$ = 0.10810 × 10$^{-6}$    $A_{10}$ = 0.58508 × 10$^{-8}$
  $A_{12}$ = −0.57012 × 10$^{-9}$
$r_8$: $\epsilon$ = 0.10000 × 10
  $A_4$ = −0.35635 × 10$^{-3}$    $A_6$ = 0.11166 × 10$^{-4}$
  $A_8$ = −0.48848 × 10$^{-6}$    $A_{10}$ = −0.17449 × 10$^{-7}$
  $A_{12}$ = 0.55823 × 10$^{-10}$
$r_{10}$: $\epsilon$ = 0.10000 × 10
  $A_4$ = 0.40851 × 10$^{-3}$    $A_6$ = −0.15122 × 10$^{-4}$
  $A_8$ = 0.71923 × 10$^{-6}$    $A_{10}$ = −0.13398 × 10$^{-7}$
  $A_{12}$ = −0.37093 × 10$^{-9}$
$r_{12}$: $\epsilon$ = 0.10000 × 10
  $A_4$ = 0.52190 × 10$^{-3}$    $A_6$ = −0.12879 × 10$^{-4}$
  $A_8$ = −0.12505 × 10$^{-6}$    $A_{10}$ = −0.56795 × 10$^{-9}$
  $A_{12}$ = 0.91969 × 10$^{-10}$

TABLE 54

<Embodiment 46>
f = 37.9~15.0~6.7  $F_{NO}$ = 2.408~2.353~2.060

| | Radius of Curvature | Axial Distance | Refractive Index | Abbe Number |
|---|---|---|---|---|
| $r_1$ | 17.494 | | | |
| | | $d_1$ 0.800 | $N_1$ 1.84666 | $v_1$ 23.82 |
| $r_2$ | 12.669 | | | |
| | | $d_2$ 0.800 | | |
| $r_3$ | 13.442 | | | |
| | | $d_3$ 4.500 | $N_2$ 1.69680 | $v_2$ 56.47 |
| $r_4$* | 248.420 | | | |
| | | $d_4$ 17.152~9.501~1.500 | | |
| $r_5$ | −75.493 | | | |
| | | $d_5$ 0.900 | $N_3$ 1.77250 | $v_3$ 49.77 |
| $r_6$ | 6.450 | | | |
| | | $d_6$ 3.000 | | |
| $r_7$ | 345.541 | | | |
| | | $d_7$ 2.500 | $N_4$ 1.83350 | $v_4$ 21.00 |
| $r_8$* | −29.852 | | | |
| | | $d_8$ 1.000~8.651~16.652 | | |
| $r_9$ | ∞(iris) | | | |
| | | $d_9$ 2.500~2.187~3.294 | | |
| $r_{10}$ | 18.002 | | | |
| | | $d_{10}$ 1.500 | $N_5$ 1.69680 | $v_5$ 56.47 |
| $r_{11}$* | −42.705 | | | |
| | | $d_{11}$ 1.300 | | |
| $r_{12}$ | 48.229 | | | |
| | | $d_{12}$ 0.900 | $N_6$ 1.84666 | $v_6$ 23.82 |
| $r_{13}$ | 10.189 | | | |
| | | $d_{13}$ 4.000 | $N_7$ 1.69680 | $v_7$ 56.47 |
| $r_{14}$* | −8.456 | | | |
| | | $d_{14}$ 0.400~2.713~3.606 | | |
| $r_{15}$ | 100.00 | | | |
| | | $d_{15}$ 0.900 | $N_8$ 1.77250 | $v_8$ 49.77 |
| $r_{16}$ | 8.771 | | | |
| | | $d_{16}$ 5.500~3.500~1.500 | | |
| $r_{17}$ | ∞ | | | |
| | | $d_{17}$ 5.500 | $N_9$ 1.51680 | $v_9$ 64.20 |
| $r_{18}$ | ∞ | | | |

TABLE 54-continued

<Embodiment 46>
$f = 37.9 \sim 15.0 \sim 6.7$   $F_{NO} = 2.408 \sim 2.353 \sim 2.060$ Condition(18)

$r_8$: $\delta = -0.094265$
$|\delta/fS| = 0.014069$

Aspherical coefficient $r_4$: $\epsilon = 0.1000 \times 10$
$A_4 = 0.34437 \times 10^{-5}$   $A_6 = -0.19202 \times 10^{-7}$
$A_8 = 0.89387 \times 10^{-10}$   $A_{10} = 0.11981 \times 10^{-11}$
$A_{12} = -0.38261 \times 10^{-13}$ $r_8$: $\epsilon = 0.10000 \times 10$
$A_4 = -0.19006 \times 10^{-3}$   $A_6 = -0.44715 \times 10^{-5}$
$A_8 = 0.16589 \times 10^{-6}$   $A_{10} = -0.95426 \times 10^{-9}$
$A_{12} = -0.21443 \times 10^{-9}$ $r_{11}$: $\epsilon = 0.10000 \times 10$
$A_4 = 0.44701 \times 10^{-3}$   $A_6 = 0.46063 \times 10^{-5}$
$A_8 = 0.36029 \times 10^{-7}$   $A_{10} = 0.52327 \times 10^{-8}$
$A_{12} = 0.37521 \times 10^{-10}$ Aspherical coefficient $r_{14}$: $\epsilon = 0.10000 \times 10$
$A_4 = 0.19113 \times 10^{-3}$   $A_6 = -0.68146 \times 10^{-6}$
$A_8 = -0.10682 \times 10^{-6}$   $A_{10} = -0.87764 \times 10^{-9}$
$A_{12} = 0.12303 \times 10^{-10}$

TABLE 55

<Embodiment 47>
$f = 37.9 \sim 15.0 \sim 6.7$   $F_{NO} = 2.381 \sim 2.345 \sim 2.060$

| Radius of Curvature | Axial Distance | Refractive Index | Abbe Number |
|---|---|---|---|
| $r_1$ 18.249 | | | |
| | $d_1$ 0.800 | $N_1$ 1.84666 | $\nu_1$ 23.82 |
| $r_2$ 12.465 | | | |
| | $d_2$ 0.800 | | |
| $r_3$ 13.272 | | | |
| | $d_3$ 4.500 | $N_2$ 1.72000 | $\nu_2$ 52.14 |
| $r_4$ 390.562 | | | |
| | $d_4$ 17.151~9.502~1.500 | | |
| $r_5$ −68.833 | | | |
| | $d_5$ 0.900 | $N_3$ 1.77250 | $\nu_3$ 49.77 |
| $r_6$ 6.688 | | | |
| | $d_6$ 3.000 | | |
| $r_7$ −251.740 | | | |
| | $d_7$ 2.500 | $N_4$ 1.83350 | $\nu_4$ 21.00 |
| $r_8$* −26.466 | | | |
| | $d_8$ 1.000~8.649~16.651 | | |
| $r_9$ ∞(iris) | | | |
| | $d_9$ 2.500~2.125~3.204 | | |
| $r_{10}$ 19.106 | | | |
| | $d_{10}$ 1.500 | $N_5$ 1.69680 | $\nu_5$ 56.47 |
| $r_{11}$* −43.020 | | | |
| | $d_{11}$ 1.300 | | |
| $r_{12}$ 43.787 | | | |
| | $d_{12}$ 0.900 | $N_6$ 1.84666 | $\nu_6$ 23.82 |
| $r_{13}$ 10.192 | | | |
| | $d_{13}$ 4.000 | $N_7$ 1.69680 | $\nu_7$ 56.47 |
| $r_{14}$* −8.452 | | | |
| | $d_{14}$ 0.400~2.775~3.696 | | |
| $r_{15}$ 100.00 | | | |
| | $d_{15}$ 0.900 | $N_8$ 1.77250 | $\nu_8$ 49.77 |
| $r_{16}$ 8.771 | | | |
| | $d_{16}$ 5.500~3.500~1.500 | | |
| $r_{17}$ ∞ | | | |
| | $d_{17}$ 5.500 | $N_9$ 1.51680 | $\nu_9$ 64.20 |
| $r_{18}$ ∞ | | | |

Condition(18)

$r_8$: $\delta = -0.077526$
$|\delta/fS| = 0.011571$

TABLE 55-continued

<Embodiment 47>
$f = 37.9 \sim 15.0 \sim 6.7$   $F_{NO} = 2.381 \sim 2.345 \sim 2.060$ Aspherical coefficient $r_8$: $\epsilon = 0.10000 \times 10$
$A_4 = -0.13572 \times 10^{-3}$   $A_6 = -0.57167 \times 10^{-5}$
$A_8 = 0.16836 \times 10^{-6}$   $A_{10} = 0.96707 \times 10^{-10}$
$A_{12} = -0.17261 \times 10^{-9}$ $r_{11}$: $\epsilon = 0.10000 \times 10$
$A_4 = 0.44923 \times 10^{-3}$   $A_6 = 0.41445 \times 10^{-5}$
$A_8 = 0.29866 \times 10^{-7}$   $A_{10} = 0.51784 \times 10^{-8}$
$A_{12} = 0.37212 \times 10^{-10}$ $r_{14}$: $\epsilon = 0.10000 \times 10$
$A_4 = 0.18540 \times 10^{-3}$   $A_6 = -0.30770 \times 10^{-6}$
$A_8 = -0.10566 \times 10^{-6}$   $A_{10} = -0.88115 \times 10^{-9}$
$A_{12} = 0.11996 \times 10^{-10}$

TABLE 56

<Embodiment 48>
$f = 37.9 \sim 14.0 \sim 6.7$   $F_{NO} = 2.249 \sim 2.222 \sim 2.060$

| Radius of Curvature | Axial Distance | Refractive Index | Abbe Number |
|---|---|---|---|
| $r_1$ 19.144 | | | |
| | $d_1$ 0.800 | $N_1$ 1.84666 | $\nu_1$ 23.82 |
| $r_2$ 13.184 | | | |
| | $d_2$ 0.800 | | |
| $r_3$ 13.963 | | | |
| | $d_3$ 4.500 | $N_2$ 1.71300 | $\nu_2$ 53.93 |
| $r_4$ 241.859 | | | |
| | $d_4$ 18.969~10.088~1.500 | | |
| $r_5$ −50.220 | | | |
| | $d_5$ 0.900 | $N_3$ 1.77250 | $\nu_3$ 49.77 |
| $r_6$ 5.968 | | | |
| | $d_6$ 3.000 | | |
| $r_7$ −133.427 | | | |
| | $d_7$ 2.500 | $N_4$ 1.84666 | $\nu_4$ 23.82 |
| $r_8$* −21.558 | | | |
| | $d_8$ 1.000~9.881~18.469 | | |
| $r_9$ ∞(iris) | | | |
| | $d_9$ 1.000 | | |
| $r_{10}$ 14.375 | | | |
| | $d_{10}$ 1.500 | $N_5$ 1.60311 | $\nu_5$ 60.74 |
| $r_{11}$* −38.506 | | | |
| | $d_{11}$ 1.800~1.994~3.535 | | |
| $r_{12}$ 14.291 | | | |
| | $d_{12}$ 0.900 | $N_6$ 1.83350 | $\nu_6$ 21.00 |
| $r_{13}$ 7.538 | | | |
| | $d_{13}$ 4.000 | $N_7$ 1.60311 | $\nu_7$ 60.74 |
| $r_{14}$* −11.727 | | | |
| | $d_{14}$ 0.400~2.239~2.664 | | |
| $r_{15}$ 100.00 | | | |
| | $d_{15}$ 0.900 | $N_8$ 1.77250 | $\nu_8$ 49.77 |
| $r_{16}$ 8.771 | | | |
| | $d_{16}$ 5.500~3.467~1.501 | | |
| $r_{17}$ ∞ | | | |
| | $d_{17}$ 5.500 | $N_9$ 1.51680 | $\nu_9$ 64.20 |
| $r_{18}$ ∞ | | | |

Condition(18)

$r_8$: $\delta = -0.078991$
$|\delta/fS| = 0.011790$

Aspherical coefficient $r_8$: $\epsilon = 0.10000 \times 10$
$A_4 = -0.16057 \times 10^{-3}$   $A_6 = -0.10097 \times 10^{-4}$
$A_8 = 0.25546 \times 10^{-6}$   $A_{10} = -0.21783 \times 10^{-12}$
$A_{12} = -0.26835 \times 10^{-9}$ Aspherical coefficient $r_{11}$: $\epsilon = 0.10000 \times 10$
$A_4 = 0.16513 \times 10^{-3}$   $A_6 = 0.12668 \times 10^{-5}$
$A_8 = -0.87748 \times 10^{-7}$   $A_{10} = 0.30906 \times 10^{-8}$

TABLE 56-continued

<Embodiment 48>
f = 37.9~14.0~6.7   F$_{NO}$ = 2.249~2.222~2.060

$A_{12} = 0.89845 \times 10^{-12}$
$r_{14}$: $\epsilon = 0.10000 \times 10$
$A_4 = 0.30882 \times 10^{-3}$     $A_6 = 035635 \times 10^{-5}$
$A_8 = -0.33888 \times 10^{-6}$   $A_{10} = -0.66897 \times 10^{-8}$
$A_{12} = -0.99916 \times 10^{-10}$

TABLE 57

<Embodiment 49>
f = 37.9~15.0~6.7   F$_{NO}$ = 1.938~2.096~2.060

| | Radius of Curvature | Axial Distance | Refractive Index | Abbe Number |
|---|---|---|---|---|
| $r_1$ | 17.523 | | | |
| | | $d_1$ 1.100 | $N_1$ 1.83350 | $v_1$ 21.00 |
| $r_2$ | 13.136 | | | |
| | | $d_2$ 0.800 | | |
| $r_3$ | 14.089 | | | |
| | | $d_3$ 5.800 | $N_2$ 1.69680 | $v_2$ 56.47 |
| $r_4$* | 221.028 | | | |
| | | $d_4$ 17.104~9.656~1.000 | | |
| $r_5$ | −102.927 | | | |
| | | $d_5$ 0.900 | $N_3$ 1.77250 | $v_3$ 49.77 |
| $r_6$ | 5.611 | | | |
| | | $d_6$ 2.600 | | |
| $r_7$ | 93.696 | | | |
| | | $d_7$ 2.500 | $N_4$ 1.83350 | $v_4$ 21.00 |
| $r_8$* | −44.358 | | | |
| | | $d_8$ 1.000~8.447~17.104 | | |
| $r_9$ | ∞(iris) | | | |
| | | $d_9$ 3.500~1.863~2.072 | | |
| $r_{10}$ | 13.640 | | | |
| | | $d_{10}$ 2.500 | $N_5$ 1.71300 | $v_5$ 53.93 |
| $r_{11}$* | −62.699 | | | |
| | | $d_{11}$ 2.000 | | |
| $r_{12}$ | 78.902 | | | |
| | | $d_{12}$ 0.900 | $N_6$ 1.84666 | $v_6$ 23.82 |
| $r_{13}$ | 9.098 | | | |
| | | $d_{13}$ 3.600 | $N_7$ 1.75450 | $v_7$ 51.57 |
| $r_{14}$* | −8.982 | | | |
| | | $d_{14}$ 1.000~2.637~2.428 | | |
| $r_{15}$ | 100.00 | | | |
| | | $d_{15}$ 0.900 | $N_8$ 1.77250 | $v_8$ 49.77 |
| $r_{16}$ | 8.771 | | | |
| | | $d_{16}$ 2.000 | | |
| $r_{17}$ | ∞ | | | |
| | | $d_{17}$ 5.500 | $N_9$ 1.51680 | $v_9$ 64.20 |
| $r_{18}$ | ∞ | | | |

Condition(18)

$r_8$: δ = −0.090185
|δ/fS| = 0.013460
Aspherical coefficient $r_4$: $\epsilon = 0.1000 \times 10$
$A_4 = 0.49057 \times 10^{-5}$     $A_6 = 0.11251 \times 10^{-7}$
$A_8 = -0.87377 \times 10^{-9}$   $A_{10} = 0.74229 \times 10^{-11}$
$A_{12} = -0.30645 \times 10^{-13}$
$r_8$: $\epsilon = 0.10000 \times 10$
$A_4 = -0.32563 \times 10^{-3}$    $A_6 = -0.19605 \times 10^{-5}$
$A_8 = -0.41450 \times 10^{-7}$    $A_{10} = -0.63958 \times 10^{-8}$
$A_{12} = -0.42775 \times 10^{-10}$
$r_{11}$: $\epsilon = 0.10000 \times 10$
$A_4 = 0.39421 \times 10^{-3}$     $A_6 = 0.12645 \times 10^{-5}$
$A_8 = -0.20660 \times 10^{-6}$    $A_{10} = 0.33031 \times 10^{-7}$
$A_{12} = -0.10466 \times 10^{-8}$
$r_{14}$: $\epsilon = 0.10000 \times 10$
$A_4 = 0.28947 \times 10^{-3}$     $A_6 = -0.94543 \times 10^{-6}$
$A_8 = 0.39259 \times 10^{-6}$     $A_{10} = -0.59020 \times 10^{-7}$
$A_{12} = 0.19613 \times 10^{-8}$

What is claimed is:

1. A zoom lens system comprising, from the object side to the image side:

a first lens unit of a positive refractive power, said first lens unit including a negative high dispersion lens element and a positive lens element;

a second lens unit of a negative refractive power, said second lens unit consisting of two or three lens elements including a positive high dispersion lens element and a negative lens element, and having at least one aspherical surface; and a third lens unit of a positive refractive power, said third lens unit consisting of at least three and at most five lens elements including a negative high dispersion lens element and one or two positive lens elements located on the object side of the negative high dispersion lens element, and having at least one aspherical surface;

and wherein high dispersion includes an Abbe number of approximately 30 or lower, and at least said second and third lens units shift on an optical axis of said zoom lens system during the zooming operation, and said zoom lens system fulfills the following condition:

$$f_w \phi_I > 0.15$$

wherein:

$f_w$ represents the shortest focal length of said zoom lens system; and $\phi_I$ represents the power of said first lens unit.

2. A zoom lens system as claimed in claim 1, wherein said third lens unit shifts along a locus convex to the object side with the zooming operation from the longest focal length condition to the shortest focal length condition.

3. A zoom lens system as claimed in claim 2, wherein said third lens unit shifts on the optical axis for the focusing operation.

4. A zoom lens system as claimed in claim wherein said third lens unit consists of three or four lens elements including the only one negative high dispersion lens element, one or two positive lens elements located on the object side of the negative high dispersion lens element and one or two positive lens elements located on the image side of the negative high dispersion lens element.

5. A zoom lens system as claimed in claim 1, wherein said first lens unit consists of a negative meniscus lens element convex to the image side and a positive lens element whose object side surface has a stronger refractive power than its image side surface, and fulfills the following conditions:

$$0.20 < \phi I / |\phi III| < 0.31$$

$$v_2 - v_1 > 25$$

wherein;

$\phi$II represents the refractive power of said second lens unit;

$v_1$ represents the Abbe number of the negative meniscus lens element with respect to the D line; and $v_2$ represents the Abbe number of the positive lens element with respect to the D line.

6. A zoom lens system as claimed in claim wherein said third lens unit consists of three or four lens elements including the only one negative high dispersion lens element, one or two positive lens elements located on the object side of the negative high dispersion lens element and one or two positive lens elements located on the image side of the negative high dispersion lens element.

7. A zoom lens system as claimed in claim 6, wherein said second lens unit consists of a negative lens element whose image side surface has a stronger refractive power than its object side surface and a positive lens element with an air space between the negative and positive lens elements, and wherein said zoom lens system has an aperture stop between said second and third lens units and fulfills the following conditions:

$-0.4 < r_6/r_7 < 1.0$ $v_3 - \epsilon_4 > 16$ wherein;

$r_6$ represents the radius of curvature of the image side surface of the negative lens element;

$r_7$ represents the radius of curvature of the object side surface of the positive lens element;

$\epsilon_3$ represents the Abbe number of the negative lens element with respect to the D line; and $\epsilon_4$ represents the Abbe number of the positive lens element with respect to the D line.

8. A zoom lens system as claimed in claim 7, wherein said third lens unit consists of, from the object side to the image side, a positive lens element, a negative lens element and a positive lens element.

9. A zoom lens system as claimed in claim 7, wherein said third lens unit consists of, from the object side to the image side, two positive lens elements, a negative lens element whose image side surface has a stronger refractive power than its object side surface and a positive lens element.

10. A zoom lens system as claimed in claim 7, wherein said third lens unit consists of, from the object side to the image side, a positive lens element, biconcave lens element and two positive lens element.

11. A zoom lens system as claimed in claim 7, wherein said third lens unit comprises at least two sub units and wherein the sub units shift each other on the optical axis as the floating for the focusing operation.

12. A zoom lens system as claimed in claim 7, wherein said third lens unit comprises at least two sub units and wherein the sub units shift each other on the optical axis as the floating for the zooming operation.

13. A zoom lens system as claimed in claim 5, wherein said third lens unit consists of, from the object side to the image side, two positive lens elements and a negative lens element.

14. A zoom lens system as claimed in claim 13, wherein said second lens unit consists of a negative lens element whose image side surface has a stronger refractive power than its object side surface and a positive lens element with an air space between the negative and positive lens elements.

15. A zoom lens system as claimed in claim 5, wherein said first lens unit has at least one aspherical surface.

16. A zoom lens system as claimed in claim 15, wherein said second lens unit consists of a negative lens element whose image side surface has a stronger refractive power than its object side surface and a positive lens element with an air space between the negative and positive lens elements.

17. A zoom lens system as claimed in claim 16, wherein said third lens unit consists of three or four lens elements.

18. A zoom lens system comprising, from the object side to the image side:

a first lens unit of a positive refractive power;

a second lens unit of a negative refractive power, said second lens unit consisting of, from the object side to the image side, a negative lens element whose image side surface has a stronger refractive power than its object side surface, a biconcave lens element, and a positive high dispersion lens element whose object side surface has a stronger refractive power than its image side surface; and a third lens unit of a positive refractive power, said third lens unit consisting of at least three and at most five lens elements including at least one aspherical surface;

and wherein high dispersion includes an Abbe number of approximately 30 or lower, and at least said second and third lens units shift on an optical axis of said zoom lens system during the zooming operation, and wherein all of said lens units include at least one high dispersion lens element having a refractive power opposite to that of the lens unit.

19. A zoom lens system as claimed in claim 18, wherein said third lens unit consists of a first sub unit and a second sub unit located on the image side of the first sub unit, said first sub unit consisting of one or two positive lens elements and having a positive refractive power so as to change divergent rays from said second lens unit into convergent rays and said second sub unit consisting of a negative high dispersion lens element and one or two positive lens elements and wherein said zoom lens system fulfills the following conditions:

$0.18 < \phi I/\phi III < 0.28$ $1.3 < \phi III^A/\phi I < 6.0$ wherein;

ø I represents the refractive power of said first lens unit;

ø II represents the refractive power of said second lens unit; and

ø III$^A$ represents the refractive power of the first sub unit.

20. A zoom lens system as claimed in claim 19, wherein said first lens unit consists of a negative meniscus high dispersion lens element convex to the object side and a positive lens element whose object side surface has a stronger refractive power than its image side surface.

21. A zoom lens system as claimed in claim 20, wherein said third lens unit consists of, from the object side to the image side, a positive lens element as the first sub unit, and the negative high dispersion lens element and a positive lens element as the second sub unit.

22. A zoom lens system as claimed in claim 20, wherein said third lens unit consists of, from the object side to the image side, a positive lens element as the first sub unit, and a positive lens elements and the negative meniscus high dispersion lens element is convex to the image side.

23. A zoom lens system as claimed in claim 20, wherein said third lens unit consists of, from the object side to the image side, two positive lens elements as the first sub unit, and the negative high dispersion lens element whose image side surface has a stronger refractive power than its object side surface and a positive lens element as the second sub unit.

24. A zoom lens system as claimed in claim 20, wherein said third lens unit consists of, from the object side to the image side, a positive lens element as the first sub unit, and the biconcave high dispersion lens element and two positive lens elements as the second sub unit.

25. A zoom lens system as claimed in claim 19, wherein said first lens units shifts on the optical axis during the zooming operation.

26. A zoom lens system as claimed in claim 25, wherein said first lends unit consists of a positive meniscus high dispersion lens element convex to the object side and a positive lens element whose object side surface has a stronger refractive power than its image side surface, and wherein third lens unit consists of a negative high dispersion lens element and two or three positive lens elements.

27. A zoom lens system as claimed in claim 19, wherein said zoom lens system fulfills the following condition:

$$f_w \phi I > 0.15$$

wherein;

$f_w$ represents the shortest focal length of said zoom lens system.

28. A zoom lens system as claimed in claim 18, wherein said third lens unit shifts along a locus convex to the object side with the zooming operation from the longest focal length condition to the shortest focal length condition.

29. A zoom lens system as claimed in claim 28, wherein said third lens unit consists of a positive lens element located on the object side end, a positive lens element and a negative lens element.

30. A zoom lens system as claimed in claim 29, wherein said first lens unit consists of a positive meniscus high dispersion lens element convex to the object side and a positive lens element whose object side surface has a stronger refractive power than its image side surface.

31. A zoom lens system as claimed in claim 28, wherein said third lens unit consists of a positive lens element located on the object side end, a negative lens element and two positive lens elements.

32. A zoom lens system as claimed in claim 31, wherein said first lens unit consists of a positive meniscus high dispersion lens element convex to the object side and a positive lens element whose object side surface has a stronger refractive power than its image side surface.

33. A zoom lens system comprising, from the object side to the image side:

a first lens unit of a positive refractive power;

a second lens unit of a negative refractive power; and a third lens unit of a positive refractive power, said third lens unit consisting of, from the object side to the image side, a positive lens element and a negative lens element and having at least one aspherical surface;

and wherein at least said second and third lens units shift on an optical axis of said zoom lens system during the zooming operation, and wherein all of said lens units include at least one high dispersion lens element having a refractive power opposite to that of the lens unit with an Abbe number of approximately 30 or lower.

34. A zoom lens system as claimed in claim 33, wherein said second lens unit consists of, from the object side to the image side, a negative lens element whose image side surface has a stronger refractive power than its object side surface and a positive lens element and has at least one aspherical surface, and wherein said zoom lens system fulfills the following conditions:

$$\phi_T f_T > 0.7$$

$$0.21 < \phi I / |\phi III| > 0.33$$

$$-0.3 < r\ II_N^R / r\ II_N^F < 0.2$$

$$-3.0 < r\ III^F / r\ III^R < -0.5$$

wherein;

$\phi I$ represents the refractive power of said first lens unit;

$\phi II$ represents the refractive power of said second lens unit;

$f_T$ represents the longest focal length of said zoom lens system;

$r\ II_N^F$ represents the radius of curvature of the object side surface of the negative lens element in said second lens unit;

$r\ II_N^R$ represents the radius of curvature of the image side surface of the negative lens element in said second lens unit;

$r\ III^F$ represents the radius of curvature of the object side end surface of said third lens unit; and $r\ III^R$ represents the radius of curvature of the image side end surface of said third lens unit.

35. A zoom lens system as claimed in claim wherein said third lens unit consists of a doublet lens element having aspherical surfaces on its object and image sides.

36. A zoom lens system as claimed in claim 35, wherein said third lens unit shifts along a locus convex to the object side with the zooming operation from the longest focal length condition to the shortest focal length condition.

37. A zoom lens system as claimed in claim 35, wherein said first lens unit shifts on the optical axis during the zooming operation.

38. A zoom lens system as claimed in claim 33, wherein said first and second lens units have at least one aspherical surface, respectively.

39. A zoom lens system as claimed in claim 35, wherein said third lens unit shifts on the optical axis for the focusing operation.

40. A zoom lens system comprising, from the object side to the image side:

a first lens unit of a positive refractive power;

a second lens unit of a negative refractive power; and a third lens unit of a positive refractive power, wherein said third lens unit is a doublet lens element consisting of, from the object side to the image side, a negative lens element and a positive lens element and having two aspherical surfaces on its object and image sides;

and wherein at least said second and third lens units shift on an optical axis of said zoom lens system during the zooming operation, and wherein all of said lens units include at least one high dispersion lens element having a refractive power opposite to that of the lens unit with an Abbe number of approximately 30 or lower.

41. A zoom lens system as claimed in claim 40, wherein said second lens unit consists of, from the object side to the image side, a negative lens element whose image side surface has a stronger refractive power than its object side surface and a positive lens element and has at least one aspherical surface, and wherein said zoom lens system fulfills the following conditions:

$$\phi_T f_T > 0.7$$

$$0.21 > \phi I / |\phi III| < 0.33$$

$$-0.3 < r\ II_N^R / r\ II_N^F < 0.2$$

$$-3.0 < r\ III^F / r\ III^R < -0.5$$

wherein;

$\phi I$ represents the refractive power of said first lens unit;

$\phi II$ represents the refractive power of said second lens unit;

$f_T$ represents the longest focal length of said zoom lens system;

$r\ II_N^F$ represents the radius of curvature of the object side surface of the negative lens element in said second lens unit;

r II $_N^R$ represents the radius of curvature of the image side surface of the negative lens element in said second lens unit;

r III $^F$ represents the radius of curvature of the object side end surface of said third lens unit; and r III $^R$ represents the radius of curvature of the image side end surface of said third lens unit.

42. A zoom lens system as claimed in claim 41, wherein said third lens unit shifts along a locus convex to the object side with the zooming operation from the longest focal length condition to the shortest focal length condition.

43. A zoom lens system as claimed in claim 41, wherein said third lens unit shifts on the optical axis for the focusing operation.

44. A zoom lens system as claimed in claim 40, wherein said first lens unit shifts during the zooming operation.

45. A zoom lens system as claimed in claim 40, wherein said first and second lens units have at least one aspherical surface, respectively.

46. A zoom lens system comprising, from the object side to the image side:

a first lens unit of a positive refractive power, said first lens unit including a negative meniscus lens element convex to the object side;

a second lens unit of a negative refractive power, said second lens unit including a positive high dispersion lens element with an Abbe number of approximately 30 or lower; and a third lens unit of a positive refractive power, said third lens unit including a positive lens element located on the object side end and another positive lens element located on the image side end;

and wherein at least said second and third lens units shift on an optical axis of said zoom lens system during the zooming operation, and said zoom lens system fulfills the following condition:

$$13<(\phi III/\phi I)\cdot(Y'/f_W)\cdot Z<28$$

wherein:

$\phi I$ represents the refractive power of said first lens unit;

$\phi II$ represents the refractive power of said second lens unit;

$f_W$ represents the shortest focal length of said zoom lens system;

Y' represents the effective image height; and

Z represents the zoom ratio.

47. A zoom lens system as claimed in claim 46, wherein said third lens unit has at least one aspherical surface and wherein said zoom lens system fulfills the following condition:

$$1.8<|\phi III|\cdot Z\cdot Y'<3.6$$

48. A zoom lens system as claimed in claim 47, wherein said third lens unit consists of a first sub unit and a second sub unit located on the image side of the first sub unit, said first sub unit having a positive refractive power and said second sub unit including a negative high dispersion lens element of an Abbe number of approximately 30 or lower, and wherein said zoom lens system fulfills the following condition:

$$1.6<\phi_A\cdot fT\cdot F_W<3.5$$

wherein:

$\phi_A$ represents the refractive power of the first sub unit;

$f_T$ represents the longest focal length of said zoom lens system; and $F_W$ represents the minimum f-number at the shortest focal length condition.

49. A zoom lens system as claimed in claim 48, wherein said second lens unit consists of, from the object side to the image side, a negative lens element whose image side surface has a stronger refractive power than its object side surface, a biconcave lens element and a positive lens element whose object side surface has a stronger refractive power than its image side surface, and wherein said zoom lens system fulfills the following condition:

$$0.05<r_B/|r_A|<0.8$$

wherein;

$r_B$ represents the radius of curvature of the object side end surface of the biconcave lens element; and $r_A$ represents the radius of curvature of the image side end surface of the biconcave lens element.

50. A zoom lens system as claimed in claim 49, wherein said first lens unit consists of, from the object side to the image side, a negative meniscus lens element convex to the object side and two positive lens elements whose object side surfaces have a stronger refractive power than their image side surfaces, respectively.

51. A zoom lens system as claimed in claim 50, wherein said third lens unit consists of a first sub unit and a second sub unit located on the image side of the first sub unit, said first sub unit consisting of two lens elements whose object side surface has a stronger refractive power than its image side surface and said second sub unit consisting of, from the object side to the image side, a negative lens element whose image side surface has a stronger refractive power than its object side and a positive lens element whose object side surface has a stronger refractive power than its image side surface.

52. A zoom lens system as claimed in claim 51, wherein the positive lens element in the second sub unit has at least one aspherical surface, and wherein said zoom lens system fulfills the following condition:

$$-0.2<f_W/r_D<0.3$$

wherein;

$r_D$ represents the radius of curvature of the image side surface of the positive lens element.

53. A zoom lens system as claimed in claim 52, wherein the negative lens element of said second lens unit has at least one aspherical surface.

54. A zoom lens system as claimed in claim 50, wherein said third lens unit consists of a first sub unit and a second sub unit located on the image side of the first sub unit, said first sub unit consisting of a positive lens element whose object side surface has a stronger refractive power than its image side surface and said second sub unit consisting of, from the object side to the image side, a negative lens element whose image side surface has a stronger refractive power than its object side surface and a positive lens element whose object side surface has a stronger refractive power than its image side surface.

55. A zoom lens system as claimed in claim 54, wherein the positive lens element in the second sub unit has at least one aspherical surface, and wherein said zoom lens system fulfills the following conditions:

$$-0.2<f_W/r_D<0.3$$

$$-0.2 < r_R/r_F < 0.5$$

wherein;

$r_F$ represents the radius of curvature of the object side surface of the negative lens element of the second sub unit; and $r_R$ represents the radius of curvature of the image side surface of the negative lens element of the second sub unit.

56. A zoom lens system as claimed in claim 49, wherein said first lens unit consists of, from the object side to the image side, a negative meniscus lens element convex to the object side and a positive lens element whose object side surface has a stronger refractive power than its image side surface.

57. A zoom lens system as claimed in claim 56, wherein said third lens unit consists of a first sub unit and a second sub unit located on the image side of the first sub unit, said first sub unit consisting of two lens elements whose object side surface has a stronger refractive power than its image side surface and said second sub unit consisting of, from the object side to the image side, a negative lens element whose image side surface has a stronger refractive power than its object side surface and a positive lens element whose object side surface has a stronger refractive power than its image side surface.

58. A zoom lens system as claimed in claim 57, wherein the positive lens element in the second sub unit has at least one aspherical surface, and wherein said zoom lens system fulfills the following condition:

$$-0.2 < f_W/r_D < 0.3$$

59. A zoom lens system comprising, from the object side to the image side:

a first lens unit of a positive refractive power, said first lens unit consisting of, from the object side to the image side, a negative meniscus lens element convex to the object side and two positive lens elements;

a second lens unit of a negative refractive power, said second lens unit consisting of, from the object side surface to the image side, a negative lens element whose image side surface has a stronger refractive power than its object side surface, a biconcave lens element and a positive lens element; and a third lens unit of a positive refractive power, said third lens unit consisting of a first sub unit having a positive refractive power and a second sub unit located on the image side of the first sub unit and including a negative high dispersion lens element with an Abbe number of approximately 30 or lower, and said third lens unit consisting of three or four lens elements;

and wherein at least said second and third lens units shift on an optical axis of said zoom lens system during the zooming operation.

60. A zoom lens system as claimed in claim 59, wherein the first sub unit consists of a positive lens element and the second sub unit consists of a positive lens element and the negative high dispersion lens element with an Abbe number of approximately 30 or lower, and wherein said third lens unit has at least one aspherical surface.

61. A zoom lens system as claimed in claim 60, wherein the positive lens element as the first sub unit has a stronger refractive power at the object side surface than the image side surface and has at least one aspherical surface, and wherein the in positive lens element in the second sub unit has at least one aspherical surface.

62. A zoom lens system as claimed in claim 59, wherein said third lens unit has at least one aspherical surface, the first sub unit consists of two elements, and the second sub unit consists of a negative high dispersion lens element with an Abbe number of approximately 30 or lower and a positive lens element.

63. A zoom lens system as claimed in claim 62, wherein the first sub unit consists of two positive single lens elements and second sub unit consists of, from the object side to the image side, the negative high dispersion lens element whose image side surface has a stronger refractive power than its object side surface and the positive lens element whose object side surface has a stronger refractive power than its image side surface, and said positive lens element in the second sub unit has at least one aspherical surface.

64. A zoom lens system comprising, from the object side to the image side:

a first lens unit of a positive refractive power;

a second lens unit of a negative refractive power; and a third lens unit of a positive refractive power, said third lens unit consisting of, from the object side to the image side, a positive lens element and a positive composite lens element of a negative high dispersion lens element whose image side surface has a stronger refractive power than the object side surface and a positive lens element, and said third lens unit has an aspherical surface at the image side end surface;

and wherein at least said second and third lens units shift on an optical axis of said zoom lens system during the zooming operation, and wherein all of said lens units include at least one high dispersion lens element having an Abbe number of approximately 30 or lower and having a refractive power opposite to that of the lens unit.

65. A zoom lens system as claimed in claim 64, wherein said second lens unit consists of, from the object side to the image side, a negative lens element whose image side surface has strong refractive power than its object side surface and a positive high dispersion lens element with an air space between the negative lens element and the positive high dispersion lens element, and wherein the positive high dispersion lens element has at least one aspherical surface.

66. A zoom lens system as claimed in claim 65, wherein said zoom lens system fulfills the following condition:

$$v_3 - v_4 > 20$$

wherein;

$v_3$ represents the Abbe number of the negative lens element in said second lens unit with respect to the D line; and $v_4$ represents the Abbe number of the positive high dispersion lens element with respect to the D line.

67. A zoom lens system comprising, from the object side to the image side:

a first lens unit of a positive refractive power;

a second lens unit of a negative refractive power, said second lens unit consisting of, from the object side to the image side, a negative lens element whose image side surface has a stronger refractive power than its object side surface and a positive high dispersion lens element with an air space between the negative lens element and the high dispersion lens element, and said second lens unit has at least one aspherical surface; and a third lens unit of a positive refractive power;

and wherein at least said second and third lens units shift on an optical axis of said zoom lens system during the zooming operation, and wherein all of said lens units include at least one high dispersion lens element having an Abbe number of approximately 30 or lower and having a refractive power opposite to that of the lens unit and fulfills the following condition:

$$0.20 < |\phi I|/|\phi III| < 0.31$$

$$v_3 - v_4 < 20$$

wherein:

$\phi I$ represents the refractive power of said first lens unit;

$\phi II$ represents the refractive power of said second lens unit;

$v_3$ represents the Abbe number of the negative lens element in said second lens unit with respect to the D line; and $v_4$ represents the Abbe number of the positive high dispersion lens element with respect to the D line.

68. A zoom lens system as claimed in claim 67, where said third lens unit has at least one aspherical surface and consists of a first sub unit of a positive refractive power and a second sub unit including a negative high dispersion lens element, said third lens unit consisting of three or four lends elements, and wherein the aspherical surfaces in said second and third lens units are formed on the positive lens elements.

69. A zoom lens system having at least one negative lens unit and at least one positive lens unit, both of which shift on an optical axis of said zoom lens system during the zooming operation, wherein the negative lens unit includes a positive lens element located on the image side end, and said zoom lens system has aspherical surfaces in at least two lens units, including the negative lens unit, and all of the aspherical surfaces are formed on a positive lens element.

70. A zoom lens system as claimed in claim 69, wherein said zoom lens system comprises, from the object side to the image side, a first positive lens unit and the negative lens unit as a second lens unit.

71. A zoom lens system as claimed in claim 70, wherein said zoom lens system further comprises a third positive lens unit, located on the image side of the second lens unit, said third positive lens unit consisting of, from the object side to the image side, a positive single lens element and a positive composite lens element of a positive lens element and a negative lens element and having at least one aspherical surface in at least one positive lens element.

72. A zoom lens system as claimed in claim 70, wherein the first positive lens unit consists of two lens elements.

73. A zoom lens system as claimed in claim 72, wherein the first positive lens unit consists of, from the object side to the image side, a negative lens element whose image side surface has a stronger refractive power than its object side surface and a positive lens element.

74. A zoom lens system as claimed in claim 70, wherein said zoom lens system further comprises a third lens unit located on the image side of the second lens unit, and wherein said first positive lens unit is fixed on the optical axis and the second and third lens units shift on the optical axis during the zooming operation.

75. A zoom lens system as claimed in claim 71, wherein the positive single lens element in the third positive lens unit is a meniscus lens element convex to the object side, and the negative lens element in the positive composite lens element has a stronger negative surface at the image side than the object side.

76. A zoom lens system as claimed in claim 73, further comprising a third positive lens unit located on the image side of the second negative lens unit and a fourth negative lens unit located on the image side of the third lens unit, wherein said third positive lens unit includes at least a negative lens element and a positive lens element having at least one aspherical surface.

77. A zoom lens system as claimed in claim 73, further comprising from the object side of the second negative lens unit to the image side, third positive lens unit, fourth positive lens unit and fifth negative lens unit, wherein said third positive and fourth positive lens units include at least a positive lens element having at least one aspherical surface each.

78. A zoom lens system comprising, from the object side to the image side:

a first positive lens unit;

a second negative lens unit consisting of, from the object side to the image side, a negative lens element whose image side surface has a stronger refractive power than its object side surface and a positive lens element; and and wherein both of the side surfaces of the negative lens element are spherical surfaces and the positive lens element has at least one aspherical surface.

79. A zoom lens system as claimed in claim 78, wherein said zoom lens system further comprises a third positive lens unit, located on the image side of the second lens unit, said third positive lens unit consisting of, from the object side to the image side, a positive single lens element and a positive composite lens element of a positive lens element and a negative lens element and having at least one aspherical surface in at least one positive lens element.

80. A zoom lens system as claimed in claim 78, wherein the first positive lens unit consists of two lens elements.

81. A zoom lens system as claimed in claim 80, wherein the first positive lens unit consists of, from the object side to the image side, a negative lens element whose image side surface has a stronger refractive power than its object side surface and a positive lens element.

82. A zoom lens system as claimed in claim 78, wherein said zoom lens system further comprises a third lens unit located on the image side of the second lens unit, and wherein said first positive lens unit is fixed on the optical axis and the second and third lens units shift on the optical axis during the zooming operation.

83. A zoom lens system as claimed in claim 79, wherein the positive single lens element in the third positive lens unit is a meniscus lens element convex to the object side, and the positive lens element in the positive composite lens element has a stronger negative surface at the image side than the object side.

84. A zoom lens system as claimed in claim 81, further comprising a third positive lens unit located on the image side of the second negative lens unit and a fourth negative lens unit located on the image side of the third lens unit, wherein said third positive lens unit includes at least a negative lens element and a positive lens element having least one aspherical surface.

85. A zoom lens system as claimed in claim 81, further comprising, from the object side of the second negative lens unit to the image side, third positive lens unit, fourth positive lens unit and fifth negative lens unit, wherein said third positive and fourth positive lens units include at least a positive lens element having at least one aspherical surface each.

86. A compact zoom lens system having a high zoom ratio of at least 6 comprising:

a first lens unit of a positive refractive power;

a second lens of a negative refractive power; and a third lens unit of a positive refractive power, said third lens unit consisting of, from the object side to the image side, a positive lens element and a negative lens element and having at least one aspherical surface;

wherein at least said second and third lens units shift on an optical axis of said zoom lens system during the zooming operation, and wherein all of said lens units include at least one high dispersion lens element having a refractive power opposite to that of the lens unit with an Abbe number of approximately 30 or lower, and the respective lens units can be positioned to provide an angle of view of approximately 60 degrees.

87. A compact zoom lens system having a high zoom ratio of at least 6 and comprising:

at least one negative lens unit and at least one positive lens unit, both of which shift along an optical axis of said zoom lens system during the zooming operation, wherein the negative lens unit includes a positive lens element located on the image side end, and said zoom lens system has aspherical surfaces in at least two lens units, including the negative lens unit, and all of the aspherical surfaces are formed on a positive lens element, and the respective lens units can be positioned to provide an angle of view of at least approximately 60 degrees.

* * * * *